US012141753B2

(12) United States Patent
Noyes et al.

(10) Patent No.: US 12,141,753 B2
(45) Date of Patent: Nov. 12, 2024

(54) GRAPHICAL USER INTERFACE-BASED PLATFORM SUPPORTING BILL OF MATERIALS (BOM) CHARACTERIZATION

(71) Applicant: Raytheon Company, Waltham, MA (US)

(72) Inventors: Wendy Jane Noyes, Mendon, MA (US); Nancy E. Woods, Litchfield, NH (US); Jeffrey A. Ard, Dallas, TX (US)

(73) Assignee: Raytheon Company, Tewksbury, MA (US)

( * ) Notice: Subject to any disclaimer, the term of this patent is extended or adjusted under 35 U.S.C. 154(b) by 284 days.

(21) Appl. No.: 16/828,806

(22) Filed: Mar. 24, 2020

(65) Prior Publication Data

US 2021/0304134 A1 Sep. 30, 2021

(51) Int. Cl.
*G06Q 10/0875* (2023.01)
*G06F 18/21* (2023.01)
(Continued)

(52) U.S. Cl.
CPC ..... *G06Q 10/0875* (2013.01); *G06F 18/2178* (2023.01); *G06N 20/00* (2019.01);
(Continued)

(58) Field of Classification Search
CPC ........... G06Q 10/0875; G06Q 10/0835; G06Q 30/0643; G06K 9/6263; G06K 9/6253; G06K 9/6256; G06N 20/00; G06V 30/10
See application file for complete search history.

(56) References Cited

U.S. PATENT DOCUMENTS 5,765,138 A 6/1998 Aycock et al.
6,356,909 B1 3/2002 Spencer
(Continued)

FOREIGN PATENT DOCUMENTS

AU 2011203185 A1 7/2011
AU 2014201625 A1 10/2014
(Continued)

OTHER PUBLICATIONS

Pak, Ho Ting Jeffrey. Procurement Optimization under a Flexible Bill-of-Materials. Diss. University of Toronto (Canada), 2016. (Year: 2016).*
(Continued)

*Primary Examiner* — Nathan A Mitchell

(57) ABSTRACT

A method includes receiving, using a graphical user interface, an identification of at least one bill of materials (BOM). The method also includes identifying multiple materials contained in the at least one BOM. The method further includes determining a BOM characterization that identifies multiple bid groups associated with different groups of materials from the at least one BOM to be potentially sourced from different groups of suppliers. The method also includes presenting at least one visualization to one or more users. The at least one visualization is based on how the different groups of materials are to be potentially sourced from the different groups of suppliers according to the determined BOM characterization. The method further includes receiving user input via the at least one visualization. The user input modifies at least one bid group. In addition, the method includes updating the at least one visualization based on the user input.

20 Claims, 69 Drawing Sheets

(51) Int. Cl.
*G06N 20/00* (2019.01)
*G06Q 10/0835* (2023.01)
*G06Q 30/0601* (2023.01)
*G06V 30/10* (2022.01)

(52) U.S. Cl.
CPC ..... *G06Q 10/0835* (2013.01); *G06Q 30/0643* (2013.01); *G06V 30/10* (2022.01)

(56) References Cited

U.S. PATENT DOCUMENTS

| | | | |
|---|---|---|---|
| 6,810,383 B1 | 10/2004 | Loveland | |
| 7,013,299 B1 | 3/2006 | Sherwood | |
| 7,353,183 B1 | 4/2008 | Musso | |
| 7,440,911 B1* | 10/2008 | Fors | G06Q 30/0611 |
| | | | 705/26.4 |
| 7,797,203 B2 | 9/2010 | Zmolek | |
| 8,112,317 B1* | 2/2012 | Ballaro | G06Q 30/0631 |
| | | | 705/26.7 |
| 8,200,552 B2 | 6/2012 | Swanson | |
| 8,296,221 B1 | 10/2012 | Waelbroeck et al. | |
| 8,533,096 B2 | 9/2013 | Wong | |
| 8,615,401 B1 | 12/2013 | Price | |
| 8,700,488 B2 | 4/2014 | Frost et al. | |
| 9,367,868 B2 | 6/2016 | McNall et al. | |
| 10,311,529 B1 | 6/2019 | Noel et al. | |
| 10,672,053 B1* | 6/2020 | Clemmens | G06Q 30/0635 |
| 10,810,643 B2 | 10/2020 | Rajbhoj et al. | |
| 11,037,103 B1* | 6/2021 | Shilovitsky | G06F 21/57 |
| 2002/0032584 A1* | 3/2002 | Doctor | G06Q 10/10 |
| | | | 705/3 |
| 2002/0052807 A1 | 5/2002 | Han et al. | |
| 2002/0087440 A1 | 7/2002 | Blair et al. | |
| 2002/0091536 A1 | 7/2002 | Seaman et al. | |
| 2002/0107775 A1* | 8/2002 | Hawkins | G06Q 40/04 |
| | | | 705/37 |
| 2002/0152133 A1 | 10/2002 | King et al. | |
| 2002/0165805 A1* | 11/2002 | Varga | G06Q 30/06 |
| | | | 705/28 |
| 2002/0184139 A1* | 12/2002 | Chickering | G06Q 40/025 |
| | | | 705/38 |
| 2004/0015391 A1* | 1/2004 | Dupreez | G06Q 30/06 |
| | | | 705/37 |
| 2004/0039650 A1* | 2/2004 | Lentz | G06Q 50/188 |
| | | | 705/26.81 |
| 2004/0039681 A1 | 2/2004 | Cullen, III et al. | |
| 2004/0163050 A1 | 8/2004 | Matter | |
| 2005/0015305 A1 | 1/2005 | Agarwal | |
| 2005/0027639 A1 | 2/2005 | Wong | |
| 2005/0055299 A1 | 3/2005 | Chambers et al. | |
| 2005/0102192 A1* | 5/2005 | Gerrits | G06Q 30/0629 |
| | | | 705/26.64 |
| 2005/0144082 A1* | 6/2005 | Coolman | G06Q 30/0635 |
| | | | 705/26.81 |
| 2006/0041502 A1 | 2/2006 | Blair et al. | |
| 2006/0149658 A1 | 7/2006 | Smith | |
| 2006/0155633 A1 | 7/2006 | Fellenstein et al. | |
| 2006/0190391 A1 | 8/2006 | Cullen, III et al. | |
| 2008/0120129 A1 | 5/2008 | Seubert et al. | |
| 2008/0300933 A1 | 12/2008 | Britton et al. | |
| 2008/0300959 A1* | 12/2008 | Sinha | G06Q 10/10 |
| | | | 705/7.29 |
| 2009/0171905 A1 | 7/2009 | Garcia | |
| 2009/0299874 A1* | 12/2009 | Allen | G06Q 30/0631 |
| | | | 705/26.1 |
| 2011/0029120 A1* | 2/2011 | Kienzle | G06Q 10/06 |
| | | | 705/29 |
| 2012/0072299 A1 | 3/2012 | Sampsell | |
| 2012/0158555 A1* | 6/2012 | Rothley | G06Q 40/12 |
| | | | 705/30 |
| 2012/0226573 A1* | 9/2012 | Zakas | G06Q 30/0207 |
| | | | 705/26.7 |
| 2012/0271730 A1 | 10/2012 | McNall et al. | |
| 2013/0110572 A1* | 5/2013 | Eagan | G06Q 30/04 |
| | | | 705/7.23 |
| 2013/0246118 A1 | 9/2013 | Dyess et al. | |
| 2013/0262104 A1 | 10/2013 | Makhija et al. | |
| 2014/0089150 A1 | 3/2014 | Wong et al. | |
| 2014/0172486 A1 | 6/2014 | Kwan et al. | |
| 2014/0222453 A1 | 8/2014 | Wills et al. | |
| 2015/0026095 A1 | 1/2015 | Ohana | |
| 2015/0058067 A1 | 2/2015 | Yuen et al. | |
| 2015/0120486 A1* | 4/2015 | Haidet | G06Q 30/0611 |
| | | | 705/26.4 |
| 2015/0134597 A1 | 5/2015 | Badea et al. | |
| 2015/0213631 A1 | 7/2015 | Vander Broek | |
| 2015/0379596 A1* | 12/2015 | Li | G06Q 10/083 |
| | | | 705/26.2 |
| 2016/0019662 A1* | 1/2016 | Pineda | G06Q 10/06313 |
| | | | 705/7.23 |
| 2016/0110788 A1* | 4/2016 | Stephenson | G06Q 40/04 |
| | | | 705/7.29 |
| 2016/0162906 A1 | 6/2016 | Irby et al. | |
| 2016/0315972 A1 | 10/2016 | Lim | |
| 2017/0032457 A1 | 2/2017 | Dierickx | |
| 2017/0083500 A1 | 3/2017 | Ritz et al. | |
| 2018/0372109 A1 | 12/2018 | Roberts | |
| 2019/0095069 A1 | 3/2019 | Proctor et al. | |
| 2019/0220157 A1* | 7/2019 | Crouch | G06F 9/453 |
| 2019/0311301 A1 | 10/2019 | Pyati | |
| 2019/0340662 A1* | 11/2019 | Masenza | G06Q 30/0637 |
| 2019/0394238 A1* | 12/2019 | Putz | G06N 3/08 |
| 2020/0020031 A1 | 1/2020 | Bienstock | |
| 2020/0143277 A1 | 5/2020 | Levine et al. | |
| 2020/0365274 A1 | 11/2020 | Karl et al. | |
| 2020/0380578 A1* | 12/2020 | Xu | G06N 7/005 |
| 2021/0182925 A1* | 6/2021 | Masenza | G06Q 30/0637 |
| 2021/0304271 A1* | 9/2021 | Norwood | G06Q 30/0641 |
| 2021/0406812 A1* | 12/2021 | Deshmukh | G06Q 10/087 |

FOREIGN PATENT DOCUMENTS

| | | |
|---|---|---|
| EP | 1870845 A2 | 12/2007 |
| WO | 03036847 A2 | 5/2003 |

OTHER PUBLICATIONS

Costantino, Nicola, and Roberta Pellegrino. "Choosing between single and multiple sourcing based on supplier default risk: A real options approach." Journal of Purchasing and Supply Management 16.1 (2010): 27-40. (Year: 2010).*

Office Action dated Jan. 6, 2022 in connection with U.S. Appl. No. 16/828,765, 54 pages.

Office Action dated Dec. 27, 2021 in connection with U.S. Appl. No. 16/828,785, 40 pages.

Office Action dated Feb. 18, 2022 in connection with U.S. Appl. No. 16/828,769, 36 pages.

RFPIO, "RFPIO Adds Artificial Intelligence to Their RFP Software", PRNewsWire.com, Mar. 2018, 2 pages.

Isa et al., "Text Document Preprocessing with the Bayes Formula for Classification Using the Support Vector Machine", IEEE Transactions on Knowledge and Data Engineering, vol. 20, No. 9, Sep. 2008, 9 pages.

Ryder, "The Ultimate Guide to Writing Your First RFP Response—and Making it Kick Ass", Mar. 2019, 27 pages.

Li et al., "A Data Architecture Model Based on IDEF0 for Business-to-Business Electric Commerce", Sep. 2009, 5 pages.

Cerquides et al., "Enabling assisted strategic negotiations in actual-world procurement scenarios", Electron Commerce Res., Oct. 2007, 32 pages.

Office Action dated May 20, 2021 in connection with U.S. Appl. No. 16/828,785, 22 pages.

International Search Report and Written Opinion of the International Searching Authority dated May 25, 2021 in connection with International Patent Application No. PCT/US2021/023860, 17 pages.

Office Action dated May 27, 2021 in connection with U.S. Appl. No. 16/828,794, 22 pages.

(56) References Cited

OTHER PUBLICATIONS

Office Action dated Jul. 2, 2021 in connection with U.S. Appl. No. 16/828,769, 33 pages.
Heinzmann, "Bid Ops: Vendor Analysis, Solution Overview, Selection Checklist (Part 1) [PRO]", Jun. 2019, 4 pages.
Office Action dated Aug. 2, 2021 in connection with U.S. Appl. No. 16/828,765, 34 pages.
Wongvasu, "Methodologies for Providing Rapid and Effective Response to Request for Quotation (RFQ) of Mass Customization Products", A Thesis Presented to the Department of Mechanical, Industrial and Manufacturing Engineering, Northeastern University, Jun. 2001, 397 pages.
Office Action dated Mar. 2, 2021 in connection with U.S. Appl. No. 16/828,769, 37 pages.
Final Office Action dated Aug. 31, 2021 in connection with U.S. Appl. No. 16/828,785, 27 pages.
Final Office Action dated Sep. 16, 2021 in connection with U.S. Appl. No. 16/828,794, 12 pages.
Non-Final Office Action dated Oct. 27, 2021 in connection with U.S. Appl. No. 16/828,769, 37 pages.
Doig, "12 ways to fix the traditional but broken software RFP selection process," CIO.com, 2015, 13 pages.
Miller, "To Weed Out Irrelevant Government Bids, Tech Company Turns to AI," GovTech.com, 2018, 8 pages.
Aerospace Industries Association, "Supplier Proposal Adequacy Guidelines", Feb. 2020, 59 pages.
Bodas, "AI Will Change the Way We Look at Contracts Forever", May 2018, 5 pages.
Icertis Inc., "The ICM DiscoverAI Application", Dec. 2019, 2 pages.
Raytheon Co., "RFP-001", Template, Dec. 2011, 14 pages.
Raytheon Co., "RFP-002", Template, Mar. 2011, 5 pages.
Raytheon Co., "RFP-003", Template, Oct. 2010, 2 pages.
Raytheon Co., "RFP-004", Template, Apr. 2009, 3 pages.
Raytheon Co., "Request for Quotation/Proposal", Template, SCM_FRM_008, Rev. 4, Jun. 2015, 2 pages.
Raytheon Co., "Raytheon Missile Systems Request for Proposal", Template, Rev. 01.02.18, Jan. 2018, 9 pages.
SupplierSelect, "SupplierSelect Product Features", Jun. 2017, 86 pages.
Wax Digital, "web3 for Direct Spend", 2019, 8 pages.
Wax Digital, "web3 for Constructions, Building the blueprint for procurement in construction businesses", Solutions Guide, 2018, 14 pages.
Icertis Inc., "What Is Contract Intelligence?", available Nov. 2019, 12 pages.
Exostar, LLC, "Digitization: The Route to Supply Chain Maturity", 2018, 10 pages.
Infotivity Technologies, Inc., "Templates for Software Selection, Requirements, RFPs, & Software Evaluation & Demonstration", available Nov. 2019, 80 pages.
Shen et al., "From 0.5 Million to 2.5 Million: Efficiently Scaling up Real-Time Bidding", IEEE International Conference on Data Mining, 2015, 6 pages.
Office Action dated Oct. 25, 2022 in connection with U.S. Appl. No. 16/828,785, 23 pages.
Office Action dated Sep. 15, 2022 in connection with U.S. Appl. No. 16/828,765, 22 pages.
Non-final Office Action dated Mar. 16, 2022 in connection with U.S. Appl. No. 16/828,794, 15 pages.
Non-final Office Action dated May 10, 2022 in connection with U.S. Appl. No. 16/828,765, 24 pages.
Cleland-Huang et al., "A Machine Learning Approach for Tracing Regulatory Codes to Product Specific Requirements," ICSE 10, 2010, 10 pages.
Motahari-Nezhad et al., "RFPCog: Linguistic-based Identification and Mapping of Service Requirements in Request for Proposals (RFPs) to IT Service Solutions," 49th Hawaii International Conference on System Sciences (HICSS), Computer Society, IEEE, 2016, 10 pages.
Zhang et al., "A Machine Learning Approach for Compliance Checking-Specific Semantic Role Labeling of Building Code Sentences," Advances in Informatics and Computing in Civil and Construction Engineering, 2018, 24 pages.
Final Office Action dated Jul. 11, 2022 in connection with U.S. Appl. No. 16/828,794, 18 pages.
Non-Final Office Action dated Jun. 23, 2022 in connection with U.S. Appl. No. 16/828,769, 49 pages.
Final Office Action dated Jun. 20, 2022 in connection with U.S. Appl. No. 16/828,785, 47 pages.
Final Office Action dated Dec. 27, 2022 in connection with U.S. Appl. No. 16/828,769, 22 pages.
Non-Final Office Action dated Jan. 6, 2023 in connection with U.S. Appl. No. 16/828,794, 18 pages.
Notice of Allowance dated Feb. 23, 2023 in connection with U.S. Appl. No. 16/828,765, 17 pages.
Final Office Action dated Feb. 24, 2023 in connection with U.S. Appl. No. 16/828,785, 19 pages.
Deeb, "The 10 Things You Need to Know When Responding to RFPs", Entrepreneur, Oct. 2015, 10 pages.
Corrected Notice of Allowability dated Apr. 12, 2023 in connection with U.S. Appl. No. 16/828,765, 15 pages.
Business Wire, "Aestiva Announces New RFQ Software Product," Feb. 2008, 2 pages.
Non-Final Office Action dated Nov. 16, 2023 in connection with U.S. Appl. No. 16/828,794, 16 pages.
Notice of Allowance dated Mar. 18, 2024 in connection with U.S. Appl. No. 16/828,794, 9 pages.
Final Office Action dated Apr. 28, 2023 in connection with U.S. Appl. No. 16/828,794, 20 pages.

\* cited by examiner

∨ Required Forms ← 1108
https://www.raytheon.com/suppliers/supplier_resources

CR-001: Cost Accounting Standards (CAS) Notices and Certifications ← 1110    [Choose One... ∨] ← 1112

CR-002: Certification of Current Cost and Pricing Data    [Choose One... ∨]

CR-003: Annual Supplier Representations and Certifications    [Choose One... ∨]

CR-004: Small Business Subcontracting Plan    [Choose One... ∨]

CR-006: Assertion of Commerciality    [Choose One... ∨]

IN-008 0300 OFFSHORE PROCUREMENT PROVISION    [Choose One... ∨]

IN-009: INTERNATIONAL TRAFFIC IN ARMS REGULATIONS (ITAR) CERTIFICATE — REPORTING OF POLITICAL CONTRIBUTIONS, FEES OR COMMISSIONS    [Choose One... ∨]

IP-006: Addendum to Software Licenses with Raytheon    [Choose One... ∨]

PT-001: Property in Possession of Seller    [Choose One... ∨]

PT-001_No_Change: should be PT-002 No Change INSTRUCTIONS FOR REPAIR/REWORK ORDERS - ESTIMATE ONLY    [Choose One... ∨]

SA-004: Seller's Assurance of Required Insurance Coverage    [Choose One... ∨]

SA-009_No_Change: Lease/Rental Agreement    [Choose One... ∨]

FIG. 11B

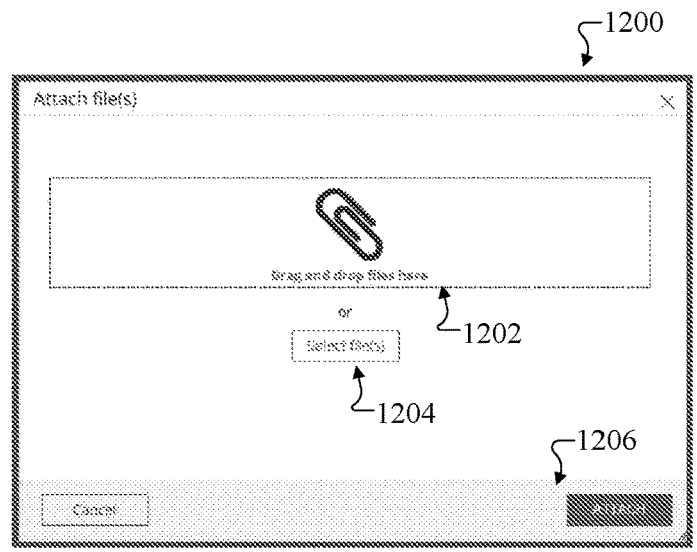

FIG. 12A

Request for Proposal

Raytheon

Business Unit Space and Airborne Systems (SAS)  Request Date 2/21/2020 2:19 PM
Solicitation RFP Number 12345  Solicitation Revision Number 0  ← 1302
Solicitation Revision Summary abcde

Contact Information
RTN Contact Information
Supplier Contact Information Contact Name 1 Person Doe  Supplier Name anyone
Phone 123-456-7890  Supplier BID
Email email@email.com  Contact Name Jane Doe  ← 1304
Address 1 Main Street, Dallas, TX 75201  Phone
Contact Name 2 N/A  Email
Email  Address , Dallas, Texas

General Information

Proposal Effort Name
Due Date 12/24/2020  Anticipated Award Date
Proposal Validity 01/27/2020 through null  ← 1306
Supplier Contract Type FFP: Firm Fixed Price  Payment Terms Net XX
INCOTERMS FOB: Freight On Board  INCOTERMS Destination Florida
Prime Solicitation/Contract Number(s)
Prime Customer Type  Solicitation Type
DPAS Rating  Supplier Location
Period of Performance 01/31/2021 through 12/31/2025

DD254
Is Classification/DD254 Required? No  ← 1308

Bid Instructions
Execution Strategy Single Year  Quantity Options Single Quantity Price
Program/Prime Contract Scope One Prime Contract and One Program  ← 1310

Acquisition Strategy
RFP Scenario
Single Contract Action: Raytheon anticipates a single award to be placed for the requirements covered by this proposal. Deliveries may span across years depending on lead-time and delivery schedule. Single Quantity: Only one quantity to be bid, award is anticipated to be based on the proposed quantity. One Prime Contract, Supplier proposal will support one prime contract action.

How To Determine FAR 15.4 Threshold
For threshold determination, IF proposed total exceeds TINA threshold and IF no exemptions apply to cost and pricing data requirements, THEN supplier is required to submit certified cost and pricing data for entire proposed amount. See Supplier Proposal Adequacy Checklist (SPAC) for details.

Cost of Pricing Data
Cost Elemental Summaries. Provide a cost elemental breakdown (CEB) for each part number (CLIN). In addition, provide a cost element summary aggregating all the part numbers (CLINs) costs into a single cost element summary (CES). The contract cover sheet must reflect the total dollar value of the proposed amount. Costs for non-recurring items must be separated from cost for recurring production items.

Bill Of Material Consolidation:
Bill of Material (BOM) Consolidation: Material for all parts/services must be combined at the line item level on the consolidated BOM. Each sub-tier supplier on the consolidated BOM whose total cost exceeds the TINA threshold is required to provide certified cost or pricing data, unless an exemption pertains. ← 1312

Additional Flowdowns
None  ← 1314

Terms and Conditions
The applicable version of the Terms and Conditions must be the latest version as of the "Request Date" in the RFP
TC-Hardcode: Standard Hardcoded Purchase Order Terms and Conditions Required
TC-001: General Terms and Conditions Required  ← 1316

FIG. 13A

Request for Proposal 

D. Use of Government/Customer Property: You must identify any anticipated use of Government/Customer Furnished Property needed to execute the requirements detailed herein. You must also identify all existing Government-Owned or Buyer-Owned Special Tooling, Special Test Equipment, and/or Equipment that will be used for this effort.

E. Proprietary Rights: All enclosures and information are considered Raytheon proprietary. This information shall be used only for purposes of providing Raytheon a quotation and shall not be reproduced or disclosed or used to provide quotations to any third party without Raytheon's express written consent. Technical data transmitted with this request for proposal are considered Raytheon Proprietary and as such must be handled in accordance with the terms and conditions of the Proprietary Information Agreement executed between the parties. All enclosures are to be returned to Raytheon upon demand or dispositioned in accordance with instructions from Raytheon. Unless you request otherwise in your proposal, Raytheon reserves the right to destroy proposals with all attachments and enclosures.

F. Previously Developed Technology: You should consider the use of previously developed technology, systems and equipment, such as; tooling, test equipment and components, to the extent technically feasible, and clearly identify any such utilization in your proposal. Cross program suggestions for savings are encouraged. Consider productivity issues in formulation of your proposal. Analyze all design approaches to determine the most practical and cost effective approach, production risks and mitigation measures, manufacturing technology deficiencies, long lead items and low rate initial production.

G. Obsolescence: Specify any items, materials, and/or parts contained in your product(s) that are now obsolete or may become obsolete during the period of performance, and provide a proposal for replacement of those items and any associated costs.

H. Alternate Proposals: Your response must comply with RFP and associated technical documents to be fully responsive. You may submit alternate proposals clearly identifying the suggested elements of change, proposed savings, proposed investments and associated risk to reduce proposal prices by taking advantage of price breaks, delivery schedule variations, economical packaging, or technical data package changes that do not impair any essential characteristic of form, fit or function, such as service life, reliability, ease of maintenance or interchangeability. Suggested changes to Buyer requirements, if accepted, become the property of Buyer unless otherwise stated by the Offeror.

I. Authorized Representative: The undersigned procurement representative is the only authorized agent to make any commitments or changes that will affect price, quality, quantity, delivery, or any other term or condition of this solicitation. This solicitation shall not be considered an award of a subcontract. Such authorization shall be evidenced when a subcontract is issued by the Raytheon Purchasing Representative, the authorized procurement representative. Any work performed without such written authorization will be at the Offeror's expense and liability.

J. Country of Origin: You must list in your proposal, all products, grouped by product part numbers, descriptions and countries of origin, that are manufactured in whole or in part, outside of the United States.

K. Technical Data / Software Assertion Rights: You must identify any commercial and non-commercial technical data and computer software to be delivered with anything less than unlimited rights to Buyer and to the USG or end user. If this RFQ/RFP is in support of an existing or anticipated USG prime contract, your proposal must include a DFARS or required data assertions table if you are asserting any technical data or software rights in the deliverables pursuant to the asserted rights categories (e.g.,limited, restricted, government purpose, specifically negotiated license, SBIR) in DFARS 252.227-7013 and DFARS 252.227-7014.

L. Interpolation: Raytheon reserves the right to straight-line interpolate quoted prices unless otherwise stated by the Supplier.

M. NAICS: To be considered a small business for this solicitation, the Offeror must certify as small for the RFP NAICS Code on its Annual Offeror Registration Data, Representations and Certifications (CR-003). For the most common NAICS codes that Raytheon procures, see:
https://www.Raytheon.com/suppliers/supplier_diversity/Common_RTN_NAICS_Codes.xls.

NOTE: The individual NAICS codes identified on this RFP may differ from the NAICS code on the resulting Purchase Order, which Raytheon will designate to best describe the principal purpose of such Purchase Order in accordance with FAR 52.219-9(e)7.

Resources
Packaging Clauses   https://tandc.rms.raytheon.com/context/rms.sp?tableType=1&bu=1
Quality Clauses   http://wwwxt.raytheon.com/scm/quality/
General Supplier Resources   https://www.raytheon.com/suppliers/supplier_resources
NAICS Codes and Small Business Resources   https://www.Raytheon.com/suppliers/supplier_diversity/Common_RTN_NAICS_Codes.xls

Proposal Deliverables
Schedule A
Compliance Matrix
Reps and Certs
GFAC Checklist
Cost and Pricing Data

FIG. 13C

| Scenario Code | Scenario Characteristics | | | How to Determine FAR 15.4 Thresholds | Cost or Pricing Data: Cost Element Breakdown (CEB) Consolidation | Cost or Pricing Data: Bill of Material (BOM) Consolidation |
|---|---|---|---|---|---|---|
| | Year | Quantity | Prime Contract | | | |
| SSS | Single Contract Action Anticipated: A single award to be placed for the requirements covered by this proposal. Deliveries may span across years depending on lead-time and delivery schedule. | Single Quantity: Only one quantity to be bid; award is anticipated to be based on the proposed quantity. | One Prime Contract: Supplier proposal will support one prime contract action. | ... | ... | ... |
| SMS | Single Contract Action Anticipated: A single award to be placed for the requirements covered by this proposal. Deliveries may span across years depending on lead-time and delivery schedule. | Multiple Quantities: Proposal will include pricing for more than one quantity; award is anticipated to be placed for one of these quantities proposed. | One Prime Contract: Supplier proposal will support one prime contract action. | ... | ... | ... |
| SSM | Single Contract Action Anticipated: A single award to be placed for the requirements covered by this proposal. Deliveries may span across years depending on lead-time and delivery schedule. | Single Quantity: Only one quantity to be bid; award is anticipated to be based on the proposed quantity. | Multiple Prime Contracts: Supplier proposal covers parts or services for more than one prime contract action. | ... | ... | ... |
| SMM | Single Contract Action Anticipated: A single award to be placed for the requirements covered by this proposal. Deliveries may span across years depending on lead-time and delivery schedule. | Multiple Quantities: Proposal will include pricing for more than one quantity; award is anticipated to be placed for one of these quantities proposed. | Multiple Prime Contracts: Supplier proposal covers parts or services for more than one prime contract action. | ... | ... | ... |
| MSS | Multiple Option Years Anticipated: Award to be placed in base year, with negotiated pricing that can be exercised in the option years based on terms and conditions set forth in the award. | Single Quantity: Only one quantity to be bid; award is anticipated to be based on the proposed quantity. | One Prime Contract: Supplier proposal will support one prime. | ... | ... | ... |
| MMS | Multiple Option Years Anticipated: Award to be placed in base year, with negotiated pricing that can be exercised in the option years based on terms and conditions set forth in the award. | Multiple Quantities: Proposal will include pricing for more than one quantity per year; awards are anticipated to be placed for one of the quantities proposed each year. | One Prime Contract: Supplier proposal will support one prime. | ... | ... | ... |
| MSM | Multiple Option Years Anticipated: Award to be placed in base year, with negotiated pricing that can be exercised in the option years based on terms and conditions set forth in the award. | Single Quantity: Only one quantity to be bid; award is anticipated to be based on the proposed quantity. | Multiple Prime Contracts: Supplier proposal covers parts or services for more than one prime contract. | ... | ... | ... |
| MMM | Multiple Option Years Anticipated: Award to be placed in base year, with negotiated pricing that can be exercised in the option years based on terms and conditions set forth in the award. | Multiple Quantities: Proposal will include pricing for more than one quantity per year; awards are anticipated to be placed for one of the quantities proposed each year. | Multiple Prime Contracts: Supplier proposal covers parts or services for more than one prime contract. | ... | ... | ... |
| 1402 | 1404 | 1406 | 1408 | 1410 | 1412 | 1414 |

FIG. 14

Create New Sole Source Proposal

First, let's fill out a cover sheet form that gives the buyer general information about your proposal. We have some information on you already, so please click the import button below and we'll fill in as much information as possible for you. Otherwise, feel free fill out the form completely on your own.

Import

Continue to form without importing data.

FIG. 15B

Cost Elements

Our Customer requires cost element detail for each quantity proposed and Summary cost element breakdown by quantity by year/lot proposed. Please enter the quantity proposed per part number per year below. Next, upload the related Excel file(s).

Part Number   Years   QTY   Excel File

If you have all your cost element data in one Excel, upload it here.

Back   Next

*For your convenience, should you wish, Raytheon has developed an Excel that will likely make the development of your proposal data more efficient. Please click here for the optional Excel.*

*[Links for FAR clauses and hints at bottom or linked to specific input fields]*

FIG. 15D

Material

Based on input from the previous screen, you are submitting the following:

[1 Row = one part number, one quantity, one year/lot combination from previous screen. List as many rows as needed with a matching BOM upload field.] ⌐1530

Upload the BOM for this row here ⌐1532

⌐1534

Once you have uploaded all of your individual BOMs, please upload your Consolidated BOM.

Upload the CBOM here ⌐1538

If you do not have one or all of these files, please tell us why here: ⌐1540

Back    Next

[Links for FAR clauses and hints at bottom or linked to specific input fields]

FIG. 15E

Material

We'd like to ask you a few questions about the material portion of your proposal. Please answer each question to the best of your knowledge. Remember we are here to help, so feel free to click on the hint booklets and/or give your Raytheon Lead a call.

1. Is there an individual Bill of Material provided for each part and at each price point?
2. Has a material basis of estimate and copies of support documentation been provided?
3. Has a consolidated Bill of Materials been provided for each price point proposed and lot/year?
4. Do the Individual and Consolidated Bill of Materials contain the required information?
5. If necessary, have Suppliers and Sub-Tiers that exceed $750,000 been adequately addressed?
6. If necessary, have Interorganizational costs (IOTs) been addressed adequately, and required data provided?
7. If necessary, have Pass-through, Have sub-tier suppliers included sub-tier certified cost or pricing data?
8. Excessive Pass-through, Have sub-tier suppliers expected to be > 70% of the total cost been identified

*Answers to each will be a required Yes or No, with a notes section as optional if yes, required if no.*

Back    Next

*[Links for FAR clauses and hints at bottom or linked to specific input fields]*

FIG. 15F

Labor Hours

We'd like to ask you a few questions about the labor portion of your proposal. Please answer each question to the best of your knowledge. Remember we are here to help, so feel free to click on the hint booklets and/or give your Raytheon Lead a call.

Please upload your Labor BOE files.

Please upload your Labor Actuals used in support of this proposal.

Please upload your time-phased labor breakout.

*Each field may need to hold more than one file depending on your and qty combinations.*

1. For labor basis of estimates, does the proposal include labor categories, labor hours and tasks?
2. Has a basis of estimates been provided showing how the proposed labor hours were developed?
3. Does the proposal contain a time-phased labor breakout?

Back    *Answers to each will be a required Yes or No, with a notes section as optional if yes, required if no.*    Next

*[Links for FAR clauses and hints at bottom or linked to specific input fields]*

FIG. 15G

Rates

We'd like to ask you a few questions about the rates used in preparing your proposal. Please answer each question to the best of your knowledge. Remember we are here to help, so feel free to click on the hint booklets and/or give your Raytheon Lead a call.

Please upload your rate files here.

1. Does the proposal indicate the basis of estimate for proposed rates and how they are applied?
2. Is there a Government forward pricing rate agreement in place? If so, is the official submittal identified?
3. Are you willing to allow Raytheon to audit the proposed Direct and Indirect rates?
4. If Raytheon is allowed to audit the proposed rates, has the rate support been provided?
5. If Raytheon has been denied access to rate support, has a separate written denial been provided?
6. If necessary, does the proposal include submission of Form CASB-CMF for facilities capital cost of money?

Back    Answers to each will be a required Yes or No, with a notes section as optional if yes, required if no.    Next

*[Links for FAR clauses and hints at bottom or linked to specific input fields]*

FIG. 15H

Other Direct Costs (ODC)

We'd like to ask you a few questions about any additional costs listed within your proposal. Please answer each question to the best of your knowledge. Remember we are here to help, so feel free to click on the hint booklets and/or give your Raytheon Lead a call.

Please upload your ODC documents here.

1. Has a basis of estimate and unit support been provided for proposed ODC items?
2. If travel is proposed is there detail showing the number of trips, people and days by location and rate?
3. If royalties have been proposed and they exceed $1,500, has the required information been provided?

| | | | |
|---|---|---|---|
| | | ☐ | ☐ |
| | | ☐ | ☐ |
| | | ☐ | ☐ |

Back     Answers to each will be a required Yes or No, with a notes section as optional if yes, required if no.

Next

[Links for FAR clauses and hints at bottom or linked to specific input fields]

FIG. 15I

Non Recurring Engineering (NRE), etc.

⌐1500

⌐1566

We'd like to ask you a few questions about any NRE you may have proposed and a few additional questions. Please answer each question to the best of your knowledge. Remember we are here to help, so feel free to click on the hint booklets and/or give your Raytheon Lead a call.

Did you propose NRE? ☐☐  ⌐1568  If no, question below grays out. If yes, question below is required. ⌐1570

1. Has a basis of estimate and cost support been provided for proposed NRE items? ☒☐☐

Please upload your NRE documents here. ⌐1572

1. If the proposal is for a change to an existing contract, has the proposal been submitted in the correct format? ☒☐☐
2. Has the proposal been submitted in non-password protected versions of Excel and Word? ☒☐☐

Back  Answers to each will be a required Yes or No, with a notes section as optional if yes, required if no. ⌐1574  Next

*[Links for FAR clauses and hints at bottom or linked to specific input fields]*

FIG. 15J

Signatures

By signing below, electronically, you are confirming that required cost and pricing data is part of your proposal and meets the requirements of Raytheon's proposal pricing instructions. ⤺1576

Seller's Representative

| Type your name here |

| Upload Signature Image here | ⤺1578

| Date |

| Back |

| Submit | ⤺1580

| REFERENCE | SPEC QUESTION | SUBQUESTION LEVEL 1 | RESOLUTION LEVEL 1 | SUBQUESTION LEVEL 2 | RESOLUTION LEVEL 2 | SUBQUESTION LEVEL 3 | RESOLUTION LEVEL 3 | SUBQUESTION LEVEL 4 | RESOLUTION LEVEL 4 |
|---|---|---|---|---|---|---|---|---|---|
| FAR 15.408 Table 15-2, 1.A | Is profit total reported? | Profit total reported Y/N? | If N, determine why | If proprietary = PROVISIONALLY NON-COMPLIANT, log reason | Resolution = fall assist audit | | | | |
| | | | | Any other reason = NON-COMPLIANT | Resolution = provide profit | | | | |
| | | | If Y, verify summary value | If numeric = COMPLIANT, further check | Is profit provided at part level? | If Y = PROVISIONALLY COMPLIANT | Resolution = still need to verify that part detail adds to summary total | | |
| | | | | | | If N, log as non-compliant, may log for cost element breakdown at part level | Is there no profit at part level because cost element breakdown at part level doesn't exist? | If Y = NON-COMPLIANT | Resolution = provide profit at part level, ensure this adds to summary value |
| | | | | | | | | If N = PROVISIONALLY NON-COMPLIANT | Resolution = provide cost element breakdown at part level |
| | | | | If -0, log = INVESTIGATION REQUIRED | Why was negative profit proposed? | If MISTAKE = PROVISIONALLY NON-COMPLIANT | Resolution = provide updated profit | | |
| | | | | | | If DELIBERATE = COMPLIANT | Resolution = log for fact-finding to seek explanation | | |

FIG. 17

|  | Suppliers<br>List suppliers in Top 80% | | | | | | | | |
|---|---|---|---|---|---|---|---|---|---|
| Terms | Supplier 1 | Supplier 2 | Supplier 3 | Supplier 4 | Supplier 5 | Supplier 6 | Supplier 7 | Supplier 8 | Supplier 9 |
| TC-003 Section | | | | | | | | | |
| 1. Acceptance of Purchase Order | ▨ | ▨ | ▨ | | | | | | |
| 2. Shipping Instructions; Risk of Loss | ▨ | ▨ | ▨ | | | | | | |
| 3. Delivery; Notice of Delay; Obsolescence | ▨ | ▨ | ■ | | | | | | |
| 4. Termination for Convenience | ▨ | ▨ | ▨ | | | | | | |
| 5. Termination for Default | ▨ | ▨ | ▨ | | | | | | |
| 6. Force Majeure | ▨ | ▦ | ▨ | | | | | | |
| 7. Disputes and Governing Law | ▨ | ▨ | ▨ | | | | | | |
| 8. Remedies | ▨ | ▨ | ▨ | | | | | | |
| 9. Proprietary Rights | ▨ | ▨ | ▨ | | | | | | |
| 10. Buyer's Property | ▦ | ▨ | ▨ | | | | | | |
| 11. Release of Information | ▨ | ▨ | ▨ | | | | | | |
| 12. Order of Precedence | ▨ | ▨ | ▨ | | | | | | |
| 13. Warranty | ▨ | ▨ | ▨ | | | | | | |
| 14. Inspection | ▨ | ▨ | ▨ | | | | | | |
| 15. Changes | ▨ | ■ | ▦ | | | | | | |
| 16. Infringement | ▨ | ▨ | ▨ | | | | | | |
| 17. Taxes and Drawback | ▨ | ▨ | ▨ | | | | | | |
| 18. Assignments, Subcontracting, Organizational Changes, and Place of Performance | ▨ | ▨ | ▨ | | | | | | |
| 19. Compliance with Law | ■ | ▨ | ▨ | | | | | | |
| 20. Responsibility and Insurance | ▨ | ▨ | ▨ | | | | | | |
| 21. Indemnity Against Claims | ▨ | ▨ | ▦ | | | | | | |
| 22. Currency and Offsets | ▦ | ▨ | ▨ | | | | | | |
| 23. Export/Import Controls | ▨ | ▨ | ▨ | | | | | | |
| 24. Severability | ▨ | ■ | ▨ | | | | | | |
| 25. Standards of Business Ethics and Conduct | ▨ | ▨ | ▨ | | | | | | |
| 26. Priority Rating | ▨ | ▨ | ▨ | | | | | | |
| 27. Survivability | ▨ | ▨ | ▨ | | | | | | |
| 28. Electronic Transmissions | ▨ | ▨ | ▨ | | | | | | |
| 29. Buyer's Access to Seller Records and Facilities | ■ | ▨ | ▨ | | | | | | |
| 30. Quality Requirements Flow Down | ▨ | ▨ | ▨ | | | | | | |
| 31. Information Technology Assurance | ▨ | ▨ | ■ | | | | | | |
| Limitations of Liability (not part of RTN Standard Ts&Cs) | ▨ | ▨ | ▨ | | | | | | |

| Supplier (if available) | Part Number / Activity | Risk Assessment – Current Performance | | | | Risk Assessment – Expected Performance on this Effort | | | | Risk | Mitigation Plan | Is Funding approved (Y/N) | Who | When |
|---|---|---|---|---|---|---|---|---|---|---|---|---|---|---|
| | | Cost | Schedule | Ts&Cs | Performance | Cost | Schedule | Ts&Cs | Performance | | | | | |
| Supplier A | Structure | | | | | | | | | Add risk details, if necessary add separate risk chart | | | | |
| Supplier B | Cooler | | | | | | | | | Add risk details, if necessary add separate risk chart | | | | |
| Supplier C | CCAs | | | | | | | | | Add risk details, if necessary add separate risk chart | | | | |
| N/A | Cables | | | | | | | | | Add risk details, if necessary add separate risk chart | | | | |
| 0 | 0 | | | | | | | | | | | | | |
| 0 | 0 | | | | | | | | | | | | | |
| 0 | 0 | | | | | | | | | | | | | |
| 0 | 0 | | | | | | | | | | | | | |
| 0 | 0 | | | | | | | | | | | | | |
| 0 | 0 | | | | | | | | | | | | | |
| 0 | 0 | | | | | | | | | | | | | |
| 0 | 0 | | | | | | | | | | | | | |
| Multiple | Remaining Material | | | | | | | | | | | | | |

FIG. 18C

Raytheon

2102 → Price Analysis
CASE NUMBER
PROGRAM NAME

2104 → Background Information

<u>*Please Note*</u>: *This report includes data or information that shall not be disclosed, distributed, used or duplicated outside participating Government audit organizations and the distribution identified in the header of this report in whole or in part without the express written consent of the Raytheon Manager authorized to release this information.*

Price Analysis for P.O. Placement or Proposal (Check one):
P.O. Placement ☐     Proposal ☐ ← 2106    2108

P.O. Placement Description:
Prime Proposal Description:     2110

Contract Type:
Date of RFP:
Date Proposal/Quote Received:     2112
P.O. Amount:
Max Proposed Amount:
Period of Performance:

Supplier Name:
Supplier Location:     2114
Supplier Website:

Brief Description of Product:     2116

Summary of Proposed, Analyzed, and Recommended Price
2118

Raytheon

Price Analysis
CASE NUMBER
PROGRAM NAME

Price Analysis Conclusion — 2144

Final Fair and Reasonable Price Recommendation: ——2146

Will Recommended Price be Priced as Part of Prime Proposal?:
Yes ☐   No ☐ ——2148

Was Recommended Price Negotiated?:
Yes ☐   No ☐ ——2150

Verifiable Explanation Supporting Why Not:

——2152

Signatures and Attachments — 2154

Analyst Name:
Analyst Title:
Date Analyst Completed Analysis:
Analyst Signature:

Manager Name:
Manager Title:
Date Manager Reviewed:
Manager Signature:

——2156

Attachments:

GRAPHICAL USER INTERFACE-BASED PLATFORM SUPPORTING BILL OF MATERIALS (BOM) CHARACTERIZATION

TECHNICAL FIELD

This disclosure is generally directed to computing systems. More specifically, this disclosure is directed to a graphical user interface (GUI)-based platform supporting bill of materials (BOM) characterization, which in some cases may be used as part of a GUI-based request for X (RFX) platform.

BACKGROUND

Organizations routinely interact with suppliers using request for proposal (RFP), request for quote (RFQ), request for bid (RFB), or request for information (RFI) processes. These processes are often referred to collectively as request for X (RFX) processes. In a typical RFX process, for example, an originating organization issues an RFX to multiple potential suppliers, where the RFX requests the supply of various materials or services from the potential suppliers. The suppliers can then generate responses to the RFX, where each RFX response indicates how the associated supplier proposes to provide materials or services to the originating organization pursuant to the RFX. The RFX responses are reviewed by the originating organization, and the originating organization eventually selects one or more suppliers based on their RFX responses.

SUMMARY

This disclosure relates to a graphical user interface (GUI)-based platform supporting bill of materials (BOM) characterization.

In a first embodiment, a method includes receiving, using a graphical user interface, an identification of at least one bill of materials (BOM). The method also includes identifying multiple materials contained in the at least one BOM. The method further includes determining a BOM characterization that identifies multiple bid groups associated with different groups of the materials from the at least one BOM to be potentially sourced from different groups of suppliers. The method also includes presenting at least one visualization to one or more users, where the at least one visualization is based on how the different groups of the materials are to be potentially sourced from the different groups of the suppliers according to the determined BOM characterization. The method further includes receiving user input via the at least one visualization, where the user input modifies at least one of the bid groups. In addition, the method includes updating the at least one visualization based on the user input.

In a second embodiment, an apparatus includes at least one processor configured to receive, using a graphical user interface, an identification of at least one bill of materials (BOM). The at least one processor is also configured to identify multiple materials contained in the at least one BOM. The at least one processor is further configured to determine a BOM characterization that identifies multiple bid groups associated with different groups of the materials from the at least one BOM to be potentially sourced from different groups of suppliers. The at least one processor is also configured to initiate presentation of at least one visualization to one or more users, where the at least one visualization is based on how the different groups of the materials are to be potentially sourced from the different groups of the suppliers according to the determined BOM characterization. The at least one processor is further configured to receive user input via the at least one visualization, where the user input modifies at least one of the bid groups. In addition, the at least one processor is configured to update the at least one visualization based on the user input.

In a third embodiment, a non-transitory computer readable medium contains instructions that when executed cause at least one processor to receive, using a graphical user interface, an identification of at least one bill of materials (BOM). The medium also contains instructions that when executed cause the at least one processor to identify multiple materials contained in the at least one BOM. The medium further contains instructions that when executed cause the at least one processor to determine a BOM characterization that identifies multiple bid groups associated with different groups of the materials from the at least one BOM to be potentially sourced from different groups of suppliers. The medium also contains instructions that when executed cause the at least one processor to initiate presentation of at least one visualization to one or more users, where the at least one visualization is based on how the different groups of the materials are to be potentially sourced from the different groups of the suppliers according to the determined BOM characterization. The medium further contains instructions that when executed cause the at least one processor to receive user input via the at least one visualization, where the user input modifies at least one of the bid groups. In addition, the medium contains instructions that when executed cause the at least one processor to update the at least one visualization based on the user input.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 5A through 5I illustrate an example graphical user interface for creating a new sourcing event in a GUI-based RFX platform according to this disclosure;

FIGS. 8A through 8C illustrate an example graphical user interface for managing bid groups as part of BOM characterization in a GUI-based RFX platform according to this disclosure;

FIGS. 10A through 10C illustrate an example graphical user interface for obtaining additional RFX-related information in a GUI-based RFX platform according to this disclosure;

FIGS. 11A through 11C illustrate an example graphical user interface for selecting RFX-related terms and conditions in a GUI-based RFX platform according to this disclosure:

FIGS. 12A and 12B illustrate an example graphical user interface for uploading additional RFX-related documentation in a GUI-based RFX platform according to this disclosure;

FIGS. 13A through 13C illustrate an example RFX generated using a GUI-based RFX platform according to this disclosure;

FIG. 14 illustrates an example acquisition strategy matrix used in a GUI-based RFX platform according to this disclosure;

FIGS. 15A through 15K illustrate an example graphical user interface for providing an RFX response in a GUI-based RFX platform according to this disclosure;

FIGS. 16A and 16B illustrate an example graphical user interface for providing responses to individual elements of an RFX in a GUI-based RFX platform according to this disclosure;

FIG. 17 illustrates an example auto-compliance matrix used in a GUI-based RFX platform according to this disclosure;

FIGS. 18A through 18C illustrate example visualizations containing exception-related information or other information for RFX responses in a GUI-based RFX platform according to this disclosure;

FIGS. 21A through 21D illustrate an example graphical user interface for defining an analysis report for an RFX response in a GUI-based RFX platform according to this disclosure;

FIGS. 22A through 22C illustrate an example cost and price analysis (CAPA) workbook for use with RFX responses in a GUI-based RFX platform according to this disclosure;

FIG. 23 illustrates an example graphical user interface for obtaining information related to reporting requirement events associated with a GUI-based RFX platform according to this disclosure:

FIG. 26 illustrates an example checklist that can be generated in a GUI-based RFX platform according to this disclosure;

DETAILED DESCRIPTION

Figure 1:
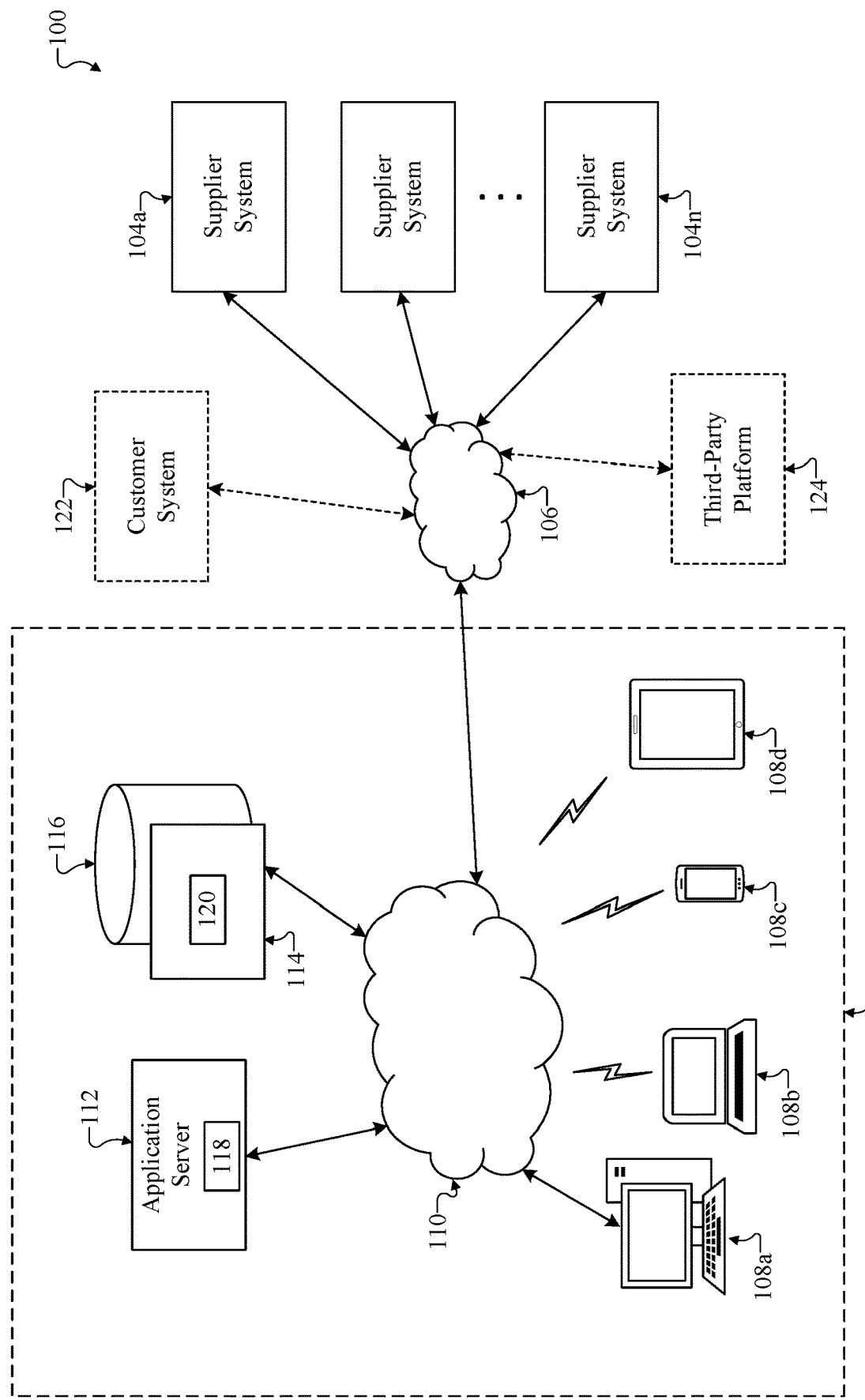
FIG. 1 illustrates an example system supporting a graphical user interface (GUI)-based request for X (RFX) platform according to this disclosure.

FIGS. 1 through 32, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, organizations routinely interact with suppliers using request for X (RFX) processes, which may include request for proposal (RFP), request for quote (RFQ), request for bid (RFB), or request for information (RFI) processes. In a typical RFX process, an originating organization issues an RFX to multiple potential suppliers, and the suppliers can generate responses to the RFX indicating how the suppliers propose to provide materials or services to the originating organization pursuant to the RFX. The RFX responses are reviewed by the originating organization, and the originating organization eventually selects one or more suppliers based on their RFX responses.

Unfortunately, this can be an extremely time-consuming and resource-intensive process. For example, an originating organization may wish to sell products having a large number of individual parts, so the originating organization may issue a large number of RFXs to different potential suppliers just to be able to obtain and assemble the parts in order to sell one specific type of product. As particular examples, an automaker may wish to sell vehicles to the public, or a government contractor may wish to sell defense-related products to governmental agencies, where the vehicles or defense-related products have thousands and thousands of individual components that require hundreds of RFXs to be sent to numerous potential suppliers. It may take huge amounts of time and effort just to issue all of the RFXs and analyze all of the RFX responses for a single product, and the originating organization typically wishes to sell multiple types of products over many years. These difficulties can be compounded by the fact that different people may perform RFX processes inconsistently even within the same organization, resulting in inconsistencies with the RFX processes.

Another issue that can negatively impact the RFX process is the lack of system-wide or institutional knowledge. For example, individual people in an organization are often responsible for issuing RFXs, analyzing RFX responses, and negotiating with suppliers. If one person leaves an organization, there is often not another person who can easily step into the vacated role and assume those responsibilities. Yet another issue that can negatively impact the RFX process is the requirement to use multiple tools, data sources, and data formats. For instance, employees of both an originating organization and suppliers often use different software tools and need to access different data sources that store data in different formats to obtain necessary information and interact with one another.

In addition, in some instances, RFXs are subject to a number of external laws, rules, regulations, or other requirements that impact the RFX process. For example, government contractors and other private companies are often subject to various legal or other requirements associated with sourcing at least a specified percentage of product components from small businesses, women-owned businesses, minority-owned businesses, veteran-owned businesses, or businesses in other types of diversity classifications. Government contractors are also subject to various laws, rules, or regulations associated with how government contracts are awarded, such as the Federal Acquisition Regulation (FAR), the Defense Federal Acquisition Regulation Supplement (DFARS), and the Truth In Negotiations Act (TINA) in the United States. These requirements add an additional layer of complexity into an already-complex RFX process. Finally, determining compliance with governmental or other requirements is typically subjective and therefore not standardized, which can lead to inconsistent determinations and increase the risk of being penalized for non-compliance.

This disclosure provides a graphical user interface (GUI)-based RFX platform that supports various functions to improve the RFX process. The platform can support a number of features described below, many of which are related to GUI-based tools or other tools that facilitate the creation, management, and use of RFXs and the analysis and use of RFX responses. For example, various tools described below support the collection and (if necessary) digitization and normalization of various RFX-related information, which can be stored in a centralized cloud-based repository or other repository to facilitate use and re-use of the information. Integrated dashboard and reporting functions can be based on the stored information, and various tools can support functions such as automated RFX response analysis, RFX response compliance checking, and document/report generation. Machine learning can be leveraged in various ones of these tools to support a number of functions, such as data mapping, data analysis, and data visualization. Overall, the platform described below can provide an organization-wide sourcing solution, possibly through a single user interface, that is linked to cloud-based or other data storage for supporting standardized RFX processes, data collection, data analyses, risk and opportunity identification and calculation, and automated exception reporting (among other things).

In this way, the GUI-based RFX platform described below helps to greatly simplify the creation and management of RFXs and the analysis and use of responses to those RFXs. This is accomplished, among other ways, by using GUI-based tools and other tools that help to improve the efficiency and the accuracy of the overall RFX process and individual operations within the overall RFX process. For example, GUI-based tools can be used to improve the efficiency and accuracy with which RFXs are generated and disseminated, as well as to improve the efficiency and accuracy with which RFX responses are received and analyzed. This can be accomplished using user-friendly graphical user interfaces with built-in logic to reduce errors, reduce manual efforts, and standardize RFXs sent to suppliers (which also improves efficiency and consistency). Also, information can be filtered based on user-defined selections in the graphical user interfaces to flow proper requirements for the users, and a matrix of acquisition scenarios can be used to identify the proper requirements for the users in different situations. This can be extremely useful and valuable, particularly for large organizations or governmental agencies that issue numerous RFXs in the span of a single year.

Moreover, this can significantly reduce the cycle time needed to select suppliers and finalize the results of each RFX process. Again, this can be extremely useful and valuable, such as to large organizations or governmental agencies that issue numerous RFXs. Further, the ability to centralize information and knowledge helps to support continued operations in the presence of personnel turnover, and the RFX platform here can significantly reduce the number of tools, data sources, and data formats used by personnel. In addition, the RFX platform can help to simplify compliance with governmental or other requirements and can more objectively help to ensure that the requirements are satisfied.

Note that while the overall GUI-based RFX platform and specific features within the overall RFX platform are described below, each specific implementation of an RFX platform may include any individual feature or any combination of features described below. Stated another way, the following description describes an overall GUI-based RFX platform in which various tools and other functionality are implemented, but other RFX platforms in which one or some of these tools or other functionality may be implemented can be used without departing from the scope of this disclosure. This disclosure is therefore not limited to the specific RFX platform containing each and every tool and function described below. In some cases, various tools and other functionality described below may be implemented in a "modularized" fashion, and various modules may be used as needed or desired in any specific implementation. Also note that while specific graphical user interfaces are described below, graphical user interfaces are highly customizable and can be easily altered as needed or desired. This disclosure is therefore not limited to the specific graphical user interfaces described below. Further, note that while the following description often describes the use of RFXs in the context of an originating organization procuring materials from suppliers, the same or similar approaches described below can be used with RFXs in any other suitable context, such as with RFXs used by originating organizations to procure services from suppliers or with RFXs used by governmental agencies to procure materials or services from government contractors. In addition, certain tools and other functionality described below (such as BOM characterization or price analysis) may be used in other systems not related to RFX processes.

FIG. 1 illustrates an example system 100 supporting a GUI-based RFX platform according to this disclosure. As shown in FIG. 1, the system 100 generally includes at least one originating system 102, multiple supplier systems 104a-104n, and at least one network 106.

The originating system 102 generally represents a computing system that is owned by, operated by, or otherwise associated with an originating organization that issues RFXs. In some cases, the originating organization may represent a government contractor or other private or commercial organization that uses the RFXs to source or obtain raw materials, individual components, subassemblies, parts, or other items (generally referred to as "materials") for products that are assembled or otherwise manufactured by the organization. In other cases, the originating organization may represent a private or commercial organization that uses the RFXs to source services that are to be provided to the organization. In still other cases, the originating organization may represent a public entity, such as a public utility, or other governmental entity that uses the RFXs to source materials or services to be provided to the governmental entity. In general, the originating organization represents any individual or organization (whether public or private and in whatever form) that issues RFXs and receives RFX responses from potential suppliers. Note that while a single originating system 102 is shown here, the system 100 may include any number of originating systems 102 associated with any number of originating organizations.

Each supplier system 104a-104n generally represents a computing system that is owned by, operated by, or otherwise associated with a supplier of one or more materials or services that might be provided to at least one originating organization. In some cases, the supplier may provide materials to an originating organization, which may then use the materials in any suitable manner. In other cases, the supplier may provide services to an originating organization. In general, each supplier represents any individual or organization (whether public or private and in whatever form) that receives RFXs and provides responses to the RFXs. Note that while n supplier systems 104a-104n are shown here, the system 100 may include any number of supplier systems 104a-104n associated with any number of suppliers.

The network 106 facilitates communication between or involving various components of the systems 102 and 104a-104n. For example, the network 106 may communicate Internet Protocol (IP) packets, frame relay frames, Asynchronous Transfer Mode (ATM) cells, or other suitable information between network addresses. The network 106 may include one or more local area networks (LANs), metropolitan area networks (MANs), wide area networks (WANs), all or a portion of a global network such as the Internet, or any other communication system or systems at one or more locations. The network 106 may also operate according to any appropriate communication protocol or protocols. In some embodiments, the originating organization and the suppliers are separate entities, so the network 106 may typically represent or include at least one public data communication network, such as the Internet. However, private data communication networks may also be used here.

In this example, the originating system 102 includes multiple user devices 108a-108d, at least one network 110, at least one application server 112, and at least one database server 114 associated with at least one database 116. Note, however, that other combinations and arrangements of components may be used in the originating system 102.

Each user device 108a-108d is coupled to or communicates over the network 110. Communications between each user device 108a-108d and the network 110 may occur in any suitable manner, such as via a wired or wireless connection. Each user device 108a-108d represents any suitable device or system used by at least one user to provide information to the application server 112 or database server 114/database 116 or to receive information from the application server 112 or database server 114/database 116. Any suitable number(s) and type(s) of user devices 108a-108d may be used in the originating system 102. In this particular example, the user device 108a represents a desktop computer, the user device 108b represents a laptop computer, the user device 108c represents a smartphone, and the user device 108d represents a tablet computer. However, any other or additional types of user devices may be used in the originating system 102. Each user device 108a-108d includes any suitable structure configured to transmit and/or receive information.

The network 110 facilitates communication between or involving various components of the originating system 102. For example, the network 110 may communicate IP packets, frame relay frames, ATM cells, or other suitable information between network addresses. The network 110 may include one or more LANs, MANS, WANs, all or a portion of a global network such as the Internet, or any other communication system or systems at one or more locations. The network 110 may also operate according to any appropriate communication protocol or protocols. In some embodiments, the network 110 is used and maintained internally within an originating organization, so the network 110 may typically represent or include at least one private data communication network. However, the network 110 may represent or include at least part of a public network, such as when the originating organization has multiple campuses or facilities that are geographically separated but communicatively coupled by the network 110.

The application server 112 is coupled to the network 110 and is coupled to or otherwise communicates with the database server 114 and database 116. The application server 112 executes one or more applications 118 to support various functions in the system 100, and the database server 114 and database 116 store various information 120 used to support the execution of the one or more applications 118. For example, the one or more applications 118 may be used to provide a GUI-based RFX platform, and the database server 114 and database 116 may be used to store RFX-related information 120. As described below; the GUI-based RFX platform is used by users of the user devices 108a-108d to create and disseminate RFXs to appropriate supplier systems 104a-104n. The GUI-based RFX platform is also used to receive RFX responses from the supplier systems 104a-104n and analyze the RFX responses. The GUI-based RFX platform is further used to provide RFX responses or information associated with the RFX responses to the users of the user devices 108a-108d. The information associated with the RFX responses can include various dashboards or other visualizations related to different aspects of the RFX responses, at least some of which may include results of analyses performed by the GUI-based RFX platform. Some, most, or all of these functions can be supported using GUI-based interactions with the users of the user devices 108a-108d.

In some instances, the originating organization associated with the originating system 102 assembles or otherwise manufactures (or would like to manufacture) products that are defined based on one or more RFXs or other information received from one or more customers of the originating organization. For example, an originating organization may operate an electronics assembly facility and may receive RFXs related to assembling parts into finished electronic products from different electronics companies. As another example, a government contractor may assemble parts to produce defense-related products and may receive RFXs related to specific defense-related products that one or more government agencies wish to procure. Thus, in FIG. 1, the originating system 102 may optionally interact with at least one customer system 122, which generally represents at least one computing system that is owned by, operated by, or otherwise associated with at least one individual or organization that provides one or more initial customer RFXs or other information to the originating system 102. In these embodiments, the RFXs that are generated by the originating system 102 and sent to the supplier systems 104a-104n may be based on the initial customer RFXs or other information received by the originating system 102 from one or more customer systems 122. For instance, it is common for many terms of a customer RFX to be included in the RFXs generated by the originating system 102.

An optional third-party platform 124 is also shown in FIG. 1. In some embodiments, the RFX-related functionality of the application server 112 and the storage of RFX-related data by the database server 114 and database 116 may be implemented partially or completely outside the originating system 102. Thus, the third-party platform 124 may include one or more servers, databases, and other components implementing a GUI-based RFX platform that is accessible by both users of the originating system 102 and users of the supplier systems 104a-104n. The party that owns or operates the third-party platform 124 may therefore be a separate party and not represent either an originating organization that issues RFXs or a supplier organization that responds to RFXs. In other embodiments, the GUI-based RFX platform can be implemented in the originating system 102, and the third-party platform 124 may be used to route RFXs to the supplier systems 104a-104n, route RFX responses to the originating system 102, or otherwise support indirect electronic communications between the systems 102, 104a-104n. For instance, RFXs and RFX responses may be exchanged between the originating system 102 and the supplier systems 104a-104n through email or through data uploads/downloads via the third-party platform 124. Note, however, that any suitable form of direct or indirect communication between the originating system 102 and the supplier systems 104a-104n may be used here.

The GUI-based RFX platform provided by the application server 112, database server 114, database 116, third-party platform 124, or other suitable component(s) can support a number of tools and other functions described below. The following description represents a brief introduction to various examples of the types of functions that can be performed by the GUI-based RFX platform. Additional details for various ones of these functions are provided below. However, the GUI-based RFX platform can also perform a number of additional functions, some of which are also described further below but which are omitted here for brevity. In the following discussion, it is assumed that the GUI-based RFX platform is implemented within the originating system 102, but the GUI-based RFX platform may be implemented in any other suitable manner.

Assume an initial customer RFX is received by the application server 112 from a customer system 122, where the initial customer RFX may have any suitable format. The initial customer RFX may request that the originating organization submit a bid for providing a specific product to a particular customer. The GUI-based RFX platform can apply a trained machine learning model or other logic to the initial customer RFX (regardless of its format) in order to (i) identify elements to be acted upon in the initial customer RFX and (ii) map specified elements in the initial customer RFX to a predefined data dictionary. The predefined data dictionary can represent known or expected fields or contents related to RFXs or RFX responses, and mapping the specified elements in the initial customer RFX to the predefined data dictionary enables further processing downstream.

Now assume that the initial customer RFX requires the originating organization to issue its own RFXs to its suppliers so that the originating organization can collect the necessary information and generate an appropriate bid. The application server 112 can apply a trained machine learning model or other logic to identify requirements from the initial customer RFX that need to flow down or be applied to any suppliers used by the originating organization, and those requirements can be included in one or more RFXs to be generated for those suppliers. The application server 112 can also use a GUI-based tool, such as one that supports an interactive user question and answer session, to interpret user inputs and identify the specific requirements that need to be applied to the one or more RFXs to be generated. The specific requirements here may be based on lengthy and complex regulatory requirements (such as FAR and DFARS requirements), but the GUI-based tool is designed based on a conversion of these complex regulatory requirements into a simplified format (such as plain English instructions) applicable to the specific RFX(s) being generated. Thus, the GUI-based tool can allow the user to specify and control the contents of the RFX(s) being generated based on user inputs and ensure that required contents are included in the RFX(s) being generated.

As part of the RFX generation process, the application server 112 supports bill of materials (BOM) characterization. A bill of materials typically identifies all materials for a specific product and the quantity of each material. The application server 112 can apply a trained machine learning model or other logic to gather data related to the bill of materials for a product associated with at least one RFX being generated (possibly from multiple sources) and organize the data into a standardized or predefined format. Often times, this involves grouping related materials from the BOM into different groups of materials. The application server 112 can also generate (or interact with users to obtain) bid groups, which identify potential suppliers for different groups of materials. The application server 112 can further generate unique visualizations that allow users to view different characterizations of the bill of materials and the bid groups, such as to verify whether applicable small business, women-owned business, minority-owned business, veteran-owned business, or other diversity-related classification requirements are satisfied based on those bid groups. A specific combination of different groups of materials and the potential suppliers for those groups is referred to as a material sourcing plan. Once a desired material sourcing plan is identified and selected, RFXs can be generated and sent to the supplier systems 104a-104n of the suppliers identified in that material sourcing plan by the application server 112.

After one or more RFXs are generated and sent to the supplier systems 104a-104n, various RFX responses are typically received from the suppliers. The application server 112 can apply a trained machine learning model or other logic to the RFX responses (regardless of their format) in order to (i) identify elements to be acted upon in the RFX responses and (ii) map specified elements in the RFX responses to the predefined data dictionary. Again, this mapping enables further processing downstream. The application server 112 can also apply extracted information from each RFX response to an auto-compliance matrix, which identifies the necessary contents or other information in order for the RFX response to be considered compliant. In some instances, for example, the auto-compliance matrix may represent an encoded version of information from the FAR and DFARS regulations or from Defense Contract Management Agency (DCMA)/Defense Contract Audit Agency (DCAA) audit guidance. This is essentially a compliance check to determine whether each RFX response satisfies all applicable conditions (such as applicable government requirements), and the results of the compliance check can be presented to each associated supplier (particularly if a non-compliance issue is detected). This allows the supplier to immediately identify any issues resulting in a lack of compliance, and the supplier can take steps to resolve the non-compliance issues, such as updating the supplier's RFX response. The application server 112 can track corrections submitted by each supplier over time until compliance is achieved.

The RFX responses or data associated with the RFX responses can also be analyzed in various ways in order to generate additional information and visualizations for users of the originating organization. For example, U.S. government contracting requirements often require a price analysis for a bid that is submitted in response to a U.S. government RFX. Under applicable regulations (such as FAR), different types of price analyses are permitted, but those price analyses routinely do not provide the exact same results. The application server 112 can apply a trained machine learning model or other logic to gather data from multiple sources, perform all or user-selected price analyses related to RFX responses, and graphically display the results of the price analyses simultaneously to the user. The results can be presented in a format that allows the user to easily identify bad or dubious data points and annotate or exclude data points used by the application server 112, and automated generation of FAR-compliant price analysis reports or other reports can be supported.

In addition, U.S. government requirements often include complex requirements for cost proposals, and failure to satisfy all of these requirements when submitting a bid may result in delays or rejection of the bid. The application server 112 can support the automatic generation of a supplier proposal adequacy checklist (SPAC) or other contents to be included in or to be used to generate a bid that is submitted in response to a U.S. government RFX. The checklist can include regulatory references and examples of adequate/inadequate proposals, or other suitable contents can be generated that support compliance with the complex requirements for cost proposals.

Using these and other functions, the GUI-based RFX platform can greatly simplify the process of generating RFXs, receiving RFX responses, analyzing the RFX responses (such as to ensure compliance), generating visualizations, and (if necessary) producing information in documentary or other forms for submission to the U.S. government or other customer. In some embodiments, the GUI-based RFX platform can provide a single user interface through which all interactions between users of the originating system 102 and the GUI-based RFX platform can occur. The entire process (from receipt of a customer RFX, through submissions of RFXs to suppliers and analyses of supplier RFX responses, to generation of a final bid to the customer RFX) can be completed in significantly shorter time and with significantly fewer resources. As a particular example, the amount of time for the entire process may be reduced by 67% or even more. Also, the GUI-based RFX platform can provide for centralized storage of digitized and normalized RFX-related data and can perform standardized functions across all RFX processes for an organization (including standardized automated analyses, dashboard generation, and reporting). Further, the GUI-based RFX platform supports auto-population of graphical user interfaces and forms, compliance verification, and other operations that help to facilitate the receipt of compliant RFX responses and the generation of compliant government or other bids in response to customer RFXs. In addition, the GUI-based RFX platform supports an enterprise-to-enterprise (E2E) solution that overall helps in the identification of risks and opportunities within RFX processes, provides many opportunities for improvement, and enables more data-driven decisions to be made. Of course, the actual benefits obtained in any specific implementation of the system 100 can vary based on a number of factors, so the benefits described above can vary based on the implementation.

Although FIG. 1 illustrates one example of a system 100 supporting a GUI-based RFX platform, various changes may be made to FIG. 1. For example, the system 100 may include any suitable number of originating systems 102, supplier systems 104a-104n, and networks 106, and each originating system 102 may include any suitable number of user devices 108a-108d, networks 110, servers 112, 114, and databases 116. Also, these components may be located in any suitable locations and might be distributed over a large area. Moreover, while not shown here, each of the supplier systems 104a-104n may include one, some, or all of the same components shown in the originating system 102, although the supplier systems 104a-104n need not include a GUI-based RFX platform (although they may). Further, various components shown in FIG. 1 may be combined, further subdivided, replicated, omitted, or placed in any other suitable arrangement and additional components may be added according to particular needs. In addition, while FIG. 1 illustrates one example operational environment in which a GUI-based RFX platform may be used, this functionality may be used in any other suitable system.

Figure 2:
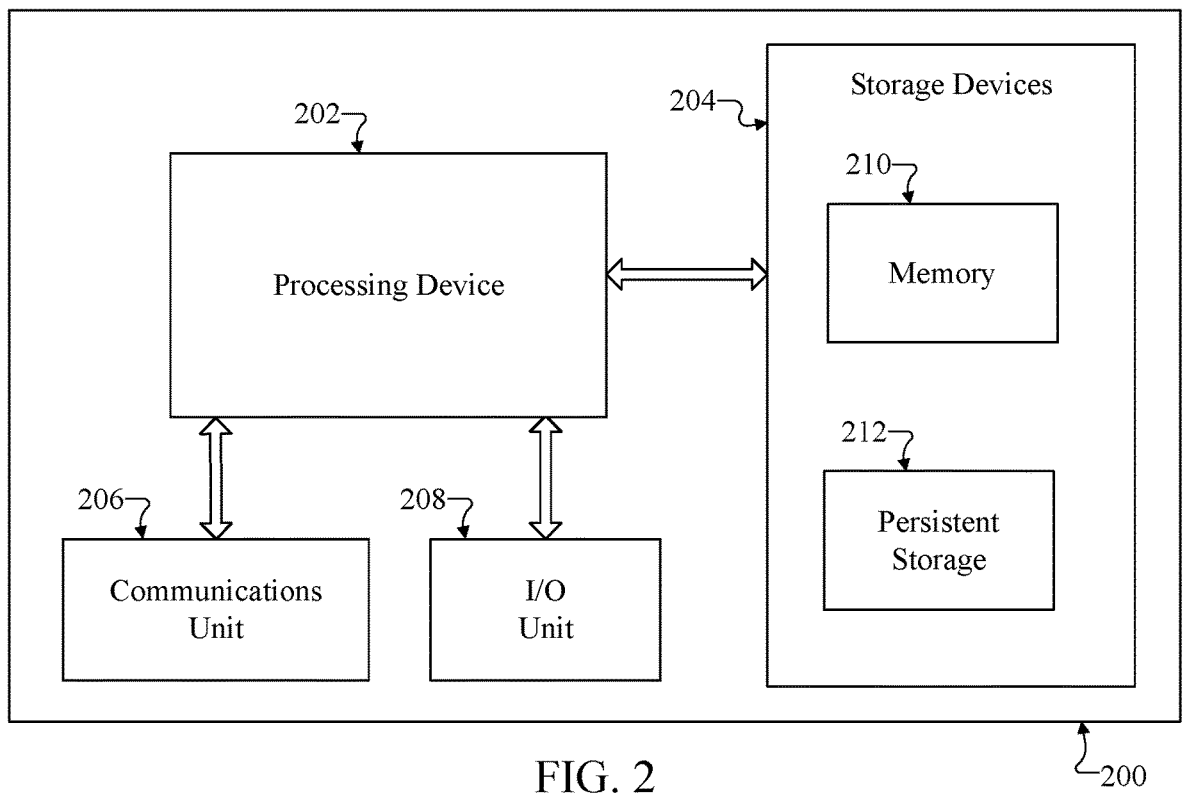
FIG. 2 illustrates an example device supporting at least part of a GUI-based RFX platform according to this disclosure.

FIG. 2 illustrates an example device 200 supporting at least part of a GUI-based RFX platform according to this disclosure. One or more instances of the device 200 may, for example, be used to at least partially implement the functionality of the application server 112 or the database server 114 of FIG. 1. However, the functionality of the application server 112 or the database server 114 may be implemented in any other suitable manner. Also, each of these components may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The instructions executed by the processing device 202 may include instructions that implement at least part of a GUI-based RFX platform (or some of the functions described below outside a GUI-based RFX platform). The processing device 202 includes any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network. The communications unit 206 may support communications through any suitable physical or wireless communication link(s). As a particular example, the communications unit 206 may support communication over the network(s) 106, 110 of FIG. 1.

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the I/O unit 208 may be omitted if the device 200 does not require local I/O, such as when the device 200 represents a server or other device that can be accessed remotely.

Although FIG. 2 illustrates one example of a device 200 supporting at least part of a GUI-based RFX platform, various changes may be made to FIG. 2. For example, computing and communication devices and systems come in a wide variety of configurations, and FIG. 2 does not limit this disclosure to any particular computing or communication device or system.

Figure 3:
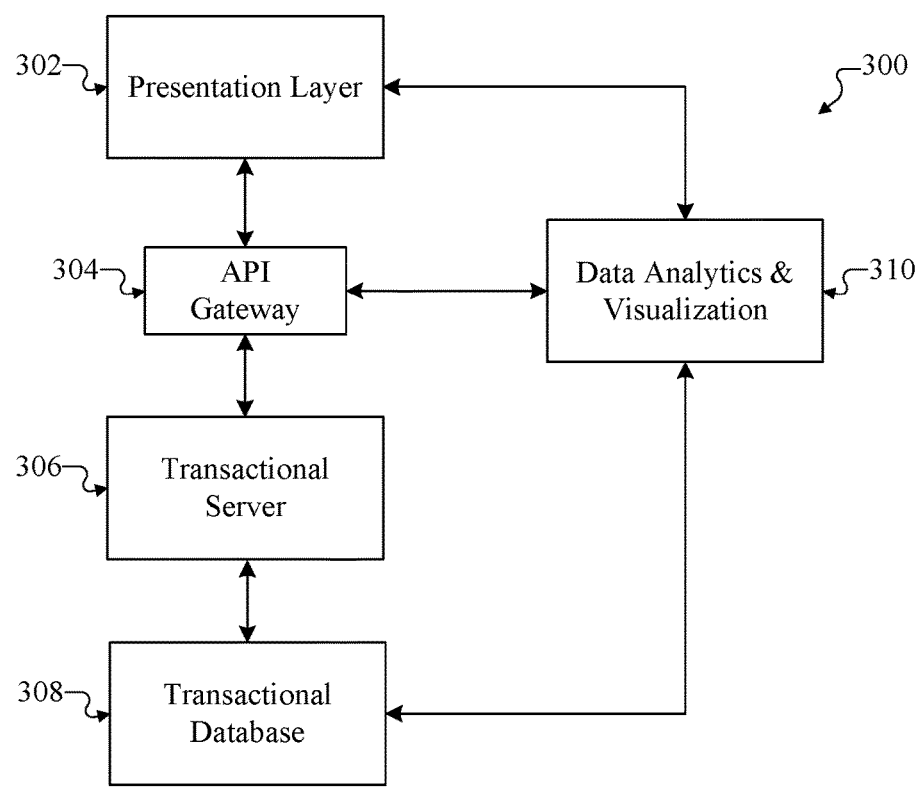
FIG. 3 illustrates an example high-level architecture of a GUI-based RFX platform according to this disclosure.

FIG. 3 illustrates an example high-level architecture 300 of a GUI-based RFX platform according to this disclosure. For ease of explanation, the high-level architecture 300 of FIG. 3 may be described as representing the application server 112 and the database server 114/database 116 in the system 100 of FIG. 1, where the application server 112 and the database server 114 may be implemented as shown in FIG. 2. However, the high-level architecture 300 of FIG. 3 may be implemented using any other suitable device(s) and in any other suitable system(s).

As shown in FIG. 3, the architecture 300 includes a presentation layer 302, which generally provides GUI-based interfaces and other presentation layer functionality used to interact with users. For example, the presentation layer 302 may be used by the application server 112 to provide graphical user interfaces that are presented to users on their user devices 108a-108d. The presentation layer 302 may also optionally interact with external users, such as users associated with the supplier systems 104a-104n.

The presentation layer 302 can also support user workflow management, meaning the presentation layer 302 can be used to interact with users in defined sequences of steps or operations to support various functions of the GUI-based RFX platform. For example, the presentation layer 302 may walk a user through a series of selections that are designed to obtain information about an RFX being created. That information can be used to identify a specific acquisition scenario, and any RFX requirements associated with that specific acquisition scenario can be identified (such as any requirements associated with specific laws, rules, or regulations). The presentation layer 302 may then obtain additional information about the RFX being created from the user, where the additional information is based on the identified requirements for the specific acquisition scenario.

The presentation layer 302 includes any suitable type of interface(s) supporting the use of graphical presentations and workflow control. Any suitable GUI-based interfaces may be supported by the presentation layer 302, such as web-based or form-based interfaces. In particular embodiments, the presentation layer 302 may be implemented using an intelligent business process management (BPM) software tool, such as a BPM software tool from PEGASYSTEMS INC., although the presentation layer 302 may be implemented in any other suitable manner.

An application programming interface (API) gateway 304 facilitates interactions between the presentation layer 302 and other components of the architecture 300. For example, the API gateway 304 can receive API calls from the presentation layer 302 and route the API calls to suitable destinations (or vice versa). The API gateway 304 supports any suitable functionality for facilitating interactions using APIs of multiple components in the architecture 300.

A transactional server 306 is used to perform or process various transactions involving RFX-related data, and a transactional database 308 is used to store RFX-related data. In some embodiments, the transactional server 306 may be implemented using the application server 112, and the transactional database 308 may be implemented using the database server 114 and the database 116. The transactional server 306 may be used to implement various functions in the architecture 300. For example, the transactional server 306 may be used to implement a services layer that provides various RFX-related services to users, such as RFX creation and RFX management. The transactional database 308 may be used to store various information, including information used, generated, or collected by the transactional server 306. As particular examples, the transactional database 308 can store RFX-related sourcing event data (such as incoming RFXs from customers), bills of materials for products, and material sourcing plans for the products. In some embodiments, users can interact with the transactional server 306 via the presentation layer 302 and the API gateway 304, such as through the use of RESTful APIs or other suitable APIs. The transactional database 308 may use any suitable database technology to store and facilitate retrieval of information, such as ORACLE database technology.

A data analytics and visualization system 310 collects data from the transactional database 308 (among other sources) and performs various functions associated with the generation of RFXs and the analysis of RFX-related data. For example, the data analytics and visualization system 310 can collect RFX-related data from the transactional database 308, generate BOM-related and RFX-related visualizations based on the collected data, and identify and provide RFX-related metrics to the transactional server 306 or the presentation layer 302. The data analytics and visualization system 310 includes any suitable functionality for analyzing RFX-related data and generating associated visualizations. In some embodiments, users can interact with the data analytics and visualization system 310 via the presentation layer 302 and the API gateway 304, such as through the use of RESTful JavaScript Object Notation (JSON) web token (JWT) APIs or other suitable APIs. The users may also be able to interact with the data analytics and visualization system 310 and receive visualizations or other information via the presentation layer 302, such as through the use of Hypertext Markup Language (HTML) or JavaScript.

Note that the data analytics and visualization system 310 can support a number of interactions with users via the presentation layer 302. Among other things, this allows the data analytics and visualization system 310 to present various visualizations to users and to receive changes to information or other user inputs via the presented visualizations. The data analytics and visualization system 310 may use the user inputs to perform various functions, including making changes to the data used or stored by the transactional server 306, transactional database 308, application server 112, database server 114, or database 116. In some cases, this can support a "write back" capability that allows inputs from users to be provided back to different processing functions so that live information updates can be obtained and propagated through the different processing functions, which allows the users to see how the users' inputs affect the processing results. Some examples of this type of functionality are described below, although the "write back" capability may be used in any suitable manner.

Although FIG. 3 illustrates one example of a high-level architecture 300 of a GUI-based RFX platform, various changes may be made to FIG. 3. For example, various components in FIG. 3 may be combined, further subdivided, replicated, omitted, or placed in any other suitable arrangement and additional components may be added according to particular needs. Also, a GUI-based RFX platform may have any other suitable architecture in any given implementation.

Figure 4:
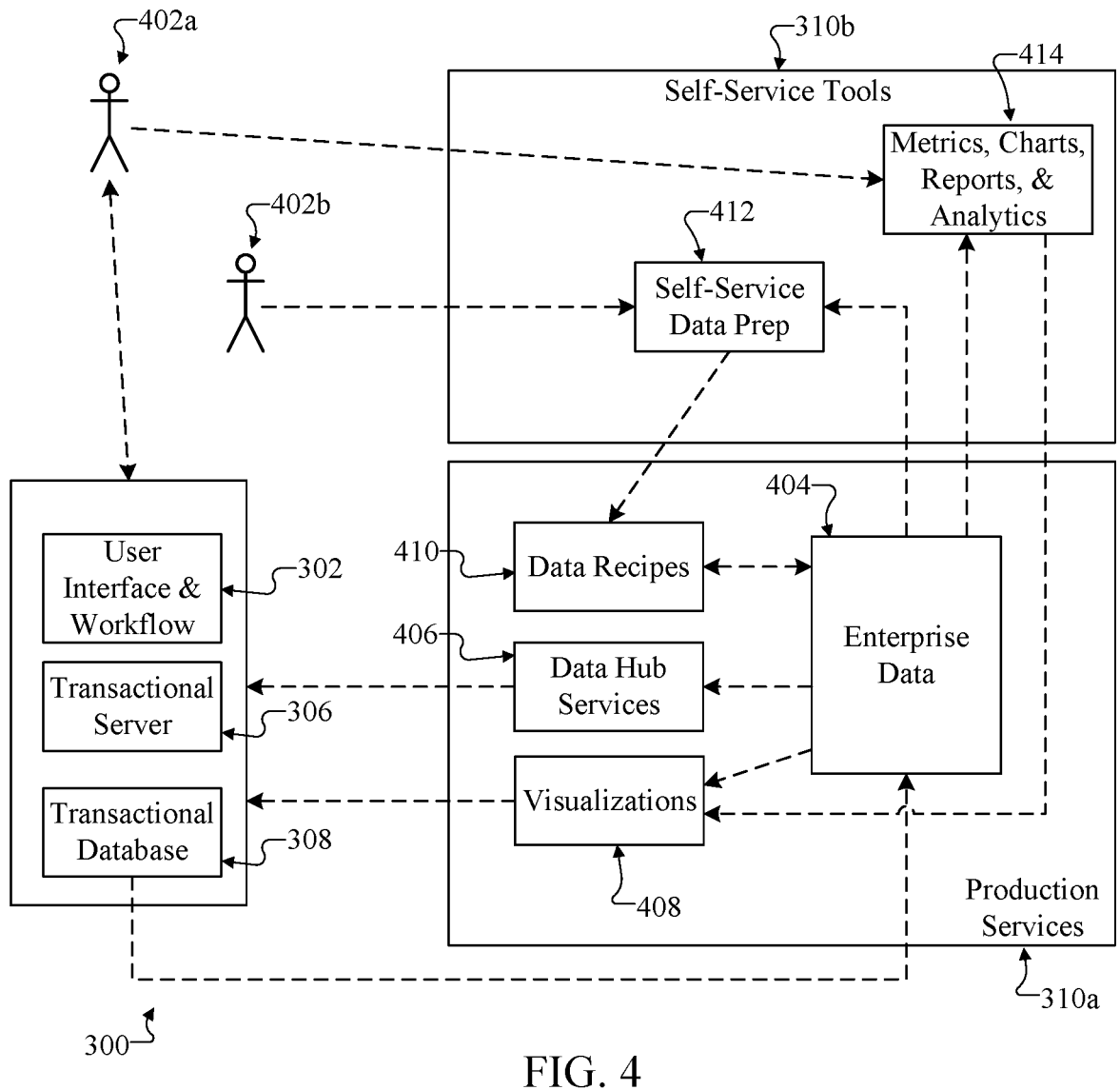
FIG. 4 illustrates example uses of a high-level architecture of a GUI-based RFX platform according to this disclosure.

FIG. 4 illustrates example uses of a high-level architecture 300 of a GUI-based RFX platform according to this disclosure. In particular, FIG. 4 illustrates how two specific types of users 402a-402b may use the architecture 300 of FIG. 3 to perform specific RFX-related functions. Note, however, that any other suitable users may access and use the architecture 300. Also note that the architecture 300 may be used to perform any other suitable RFX-related or other functions.

As shown in FIG. 4, one or more users 402a may represent one or more supply chain managers and material planning managers. These users 402a are generally responsible for obtaining and handling materials, such as parts, used to produce one or more products. These users 402a are also typically responsible for issuing RFXs to potential suppliers and negotiating with the potential suppliers. One or more users 402b may represent one or more supply chain data preparation subject matter experts. These users 402b are generally responsible for managing data flows related to the obtaining and handling of materials.

In this example, the users 402a can cooperate using the transactional server 306 and the data analytics and visualization system 310 to identify a desirable material sourcing plan for a product. The material sourcing plan for a product is typically determined using the bill of materials for the product, where the material sourcing plan identifies suppliers who might be used to obtain groups of materials needed for the product. This process is typically iterative, and different versions of a material sourcing plan can be versioned and stored in the transactional database 308 or the data analytics and visualization system 310. This may allow, for example, the users 402a to collaborate and identify multiple material sourcing plans and then select the most desirable material sourcing plan. Among other things, different material sourcing plans can identify how groups of materials for the associated product might be sourced from different combinations of suppliers. In other words, different material sourcing plans may be associated with different bid groups.

Once a material sourcing plan has been selected, one or more RFXs can be generated using the transactional server 306 or the data analytics and visualization system 310 and sent to the appropriate suppliers. As described below, the RFXs can be generated here using workflow forms and data imports, and the RFXs can have a standardized or predefined format used for all suppliers. At least some of the suppliers provide RFX responses, which often times include exceptions to terms or conditions in the RFXs (meaning the suppliers do not accept the terms or conditions as proposed). The RFX exception process can be implemented as described below to help ensure digitization and recording of all interactions with the suppliers. The users 402a can negotiate with the suppliers if needed to try and overcome the exceptions, eventually leading to finalized RFX responses. The initial, intermediate, and finalized RFX responses can, among other things, be stored in the transactional database 308 or the data analytics and visualization system 310.

In this example, the data analytics and visualization system 310 is implemented using two groups of components or functions, namely a production services group 310a and a self-service tools group 310b. The production services group 310a represents built-in or defined functions of the data analytics and visualization system 310 that can be automatically executed or triggered by users. For example, an enterprise data function 404 can be used to pull data from the transactional database 308 and other sources, condition the data, and store the data for further processing. As a particular example, the enterprise data function 404 can support extract, transform, and load (ETL) functionality, which can be used to retrieve (extract) data from the transactional database 308 and other sources, reformat or otherwise process (transform) the data, and store (load) the transformed data. The obtained data can be stored in any suitable manner, such as in a data lake or other repository. In some instances, the enterprise data function 404 can be implemented using a business data model (BDM) tool that supports enterprise data transformations. In particular implementations, the enterprise data function 404 may be implemented using ENTERPRISE DATA PREPARATION functionality from INFORMATICA LLC, although the enterprise data function 404 may be implemented in any other suitable manner.

Various additional functions in the production services group 310a can use the data obtained by the enterprise data function 404. For example, a data hub services function 406 can be used to retrieve data obtained by the enterprise data function 404 and to provide the retrieved data to the transaction server 306, user devices 108a-108d, or other destinations. Among other things, the data hub services function 406 may be used to support the retrieval of master data from a data lake or other repository and to support the retrieval (and possibly generation) of enterprise-level metrics. The data hub services function 406 includes any suitable functionality for providing RFX-related data and associated information. In some instances, the data hub services function 406 can be implemented using ODATA data hub functionality from SAP, INC., although the data hub services function 406 may be implemented in any other suitable manner.

A visualizations function 408 can be used to generate various visualizations based on the data obtained by the enterprise data function 404. For example, the visualizations function 408 may generate different visualizations related to different aspects of the RFX process, such as visualizations related to BOM characterizations, RFX response analyses, and price analyses. Various examples of visualizations are provided below, any of which can be generated by the visualizations function 408. The visualizations function 408 includes any suitable functionality for providing RFX-related visualizations or other visualizations of information. In some instances, the visualizations function 408 can be implemented using POWER BI business analytics services from MICROSOFT CORP., although the visualizations function 408 may be implemented in any other suitable manner.

A data recipes function 410 is used to execute various data preparation recipes, which define how the enterprise data function 404 retrieves and processes data for inclusion in a data lake or other repository. For example, the data recipes function 410 can define the interval at which data is retrieved from the transactional database 308 or other source by the enterprise data function 404, such as once every five minutes or once every day. The data recipes function 410 can also define the way or ways in which the retrieved data is processed by the enterprise data function 404 prior to storage in the data lake or other repository. This information can vary depending on the source or the information being retrieved. The data preparation recipes here can be reusable and can support complex data preparation operations as needed or desired.

The self-service tools group 310b includes various functions that can be invoked by users so that the users can initiate various tasks in the architecture 300 themselves. For example, in some embodiments, end users of the GUI-based RFX platform may use spreadsheets to provide BOM-related or RFX-related information via the presentation layer 302. Users can have the ability to combine that data with data from other data sources (such as from the data lake), which may occur in a sandbox. The combination here may be controlled by one or more data recipes, which can be defined by a self-service data preparation function 412. This function 412 allows the users 402b to define the data recipes to be used here. The self-service tools group 310b also includes a self-service charts, reports, and analytics function 414, which can be used by the users 402a to define various visualizations that can then be generated by the visualizations function 408. This may allow, for instance, users to supplement the visualizations generated by the visualizations function 408 with user-defined visualizations as needed or desired.

The architecture 300 shown here provides an enterprise-wide solution that supports a single user interface linked to cloud-based or other centralized storage for all RFX-related processes, data, analyses, risk and opportunity processing, and exception reporting used to complete sourcing for materials. This allows RFX sourcing to be completed in significantly shorter time periods through the use of functions such as digitizing and centralizing data, linking to various tools to pull needed data, automating workflows and processes to a common standard, and capturing data from work completed. This helps with the identification of RFX status, bottlenecks, commonalities, current and past executed agreements, current and past unit pricing for materials, and many more points of interest that are often needed or desired.

Among other benefits that can be obtained, the enterprise-wide solution provided by the GUI-based RFX platform increases the speed, efficiency, and accuracy with which RFXs are generated and RFX responses are analyzed and used to make decisions. Also, the GUI-based RFX platform supports automated compliance reviews, which can significantly reduce delays in obtaining compliant RFX responses. Further, the GUI-based RFX platform supports the collection and use of more accurate and complete data, decreases rework, and increases strategic focus, innovation, and risk and opportunity management. The GUI-based RFX platform overall provides an end-to-end solution for sourcing activities in a single solution set.

Although FIG. 4 illustrates example uses of a high-level architecture 300 of a GUI-based RFX platform, various change may be made to FIG. 4. For example, various components shown in FIG. 4 may be combined, further subdivided, replicated, omitted, or placed in any other suitable arrangement and additional components may be added according to particular needs. Also, the data analytics and visualization system 310 may be implemented in any other suitable manner and need not be implemented in the specific manner shown here. In addition, the API gateway 304 is not shown here for convenience but can be included.

The following now describes various specific features and functionalities that may be implemented in the high-level architecture 300 or another architecture that supports a GUI-based RFX platform. Note that any specific implementation of a GUI-based RFX platform may or may not support each and every one of the specific features and functionalities described below, and any individual feature or function or any combination of features or functions described below may be supported in a GUI-based RFX platform. Also note that some of the features and functionalities described below (such as the BOM characterization or price analysis functions) may be implemented in systems unrelated to RFX processes.

FIGS. 5A through 5I illustrate an example graphical user interface 500 for creating a new sourcing event in a GUI-based RFX platform according to this disclosure. For ease of explanation, the graphical user interface 500 may be described as being provided using the architecture 300 of FIG. 3. However, the graphical user interface 500 may be provided using any suitable device(s) and in any suitable system(s).

Here, a sourcing event generally refers to an event (or a sequence of events) related to the procurement of one or more materials or services from one or more suppliers. In some cases, a sourcing event can be related to the generation of one or more RFXs and the receipt of one or more RFX responses. However, other sourcing events may be supported by the GUI-based RFX platform, such as events involving the submission of purchase orders to suppliers previously selected using RFX processes, although that may not necessarily be required here. In some embodiments, the graphical user interface 500 can be presented to a user associated with an originating organization after the user logs into a suitable system, such as through a portal of the originating organization. The originating organization's users may, for example, need to provide a username and password to log into the GUI-based RFX platform.

Figure 5A:
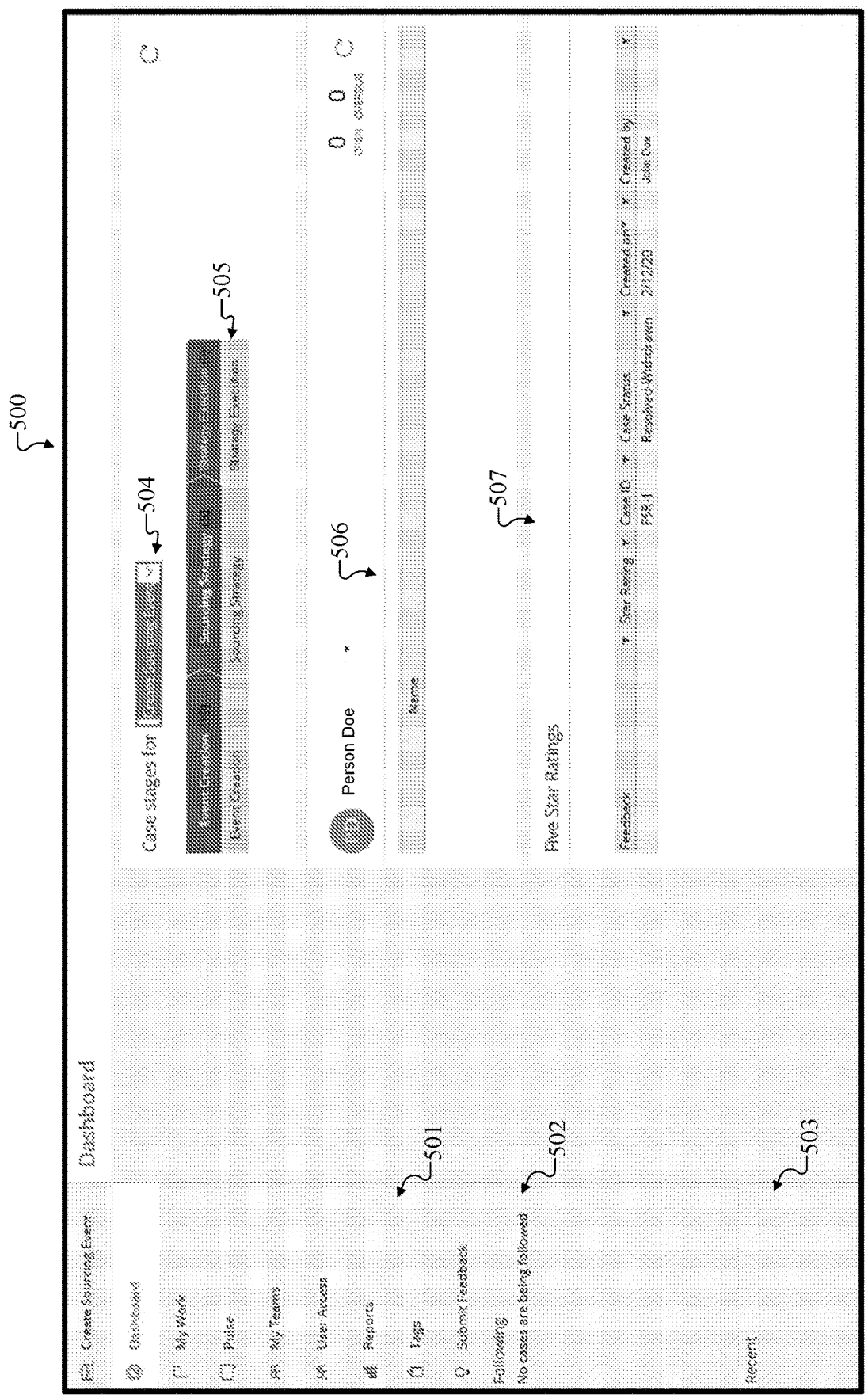

As shown in FIG. 5A, the graphical user interface 500 can be presented to one or more users, such as via one or more user devices 108a-108d. In this example, the graphical user interface 500 includes a list 501 of commands or functions that can be invoked by a user within the graphical user interface 500. The graphical user interface 500 shown in FIG. 5A currently includes a dashboard that provides sourcing event-related information to the user, since that is the option selected by the user from the list 501. The graphical user interface 500 also includes a list 502 of any sourcing events being followed by the user, which can be done to allow for quick access to specific sourcing events relevant to the user. The graphical user interface 500 further includes a list 503 of any recent sourcing events associated with the user, which again can be done to allow for quick access to specific sourcing events relevant to the user.

A drop-down menu 504 allows the user to select a particular type of sourcing event and to view a graphical representation 505 of the stages for that particular type of sourcing event. In this example, the user has indicated a desire to view the stages for creating a new sourcing event, which the graphical representation 505 indicates has three stages. Each stage identified in the graphical representation 505 may include a number indicating how many sourcing events the user has created that are currently in the associated stage. For instance, the graphical representation 505 here indicates that the user has nineteen sourcing events within the "event creation" stage, five sourcing events within the "sourcing strategy" stage, and no sourcing events within the "strategy execution" stage. A user information section 506 of the graphical user interface 500 can present relevant user-related information to the user, such as open or overdue sourcing event-related tasks that need to be completed by the user. A feedback section 507 of the graphical user interface 500) can present relevant feedback information to the user, such as feedback from other users.

Figure 5B:
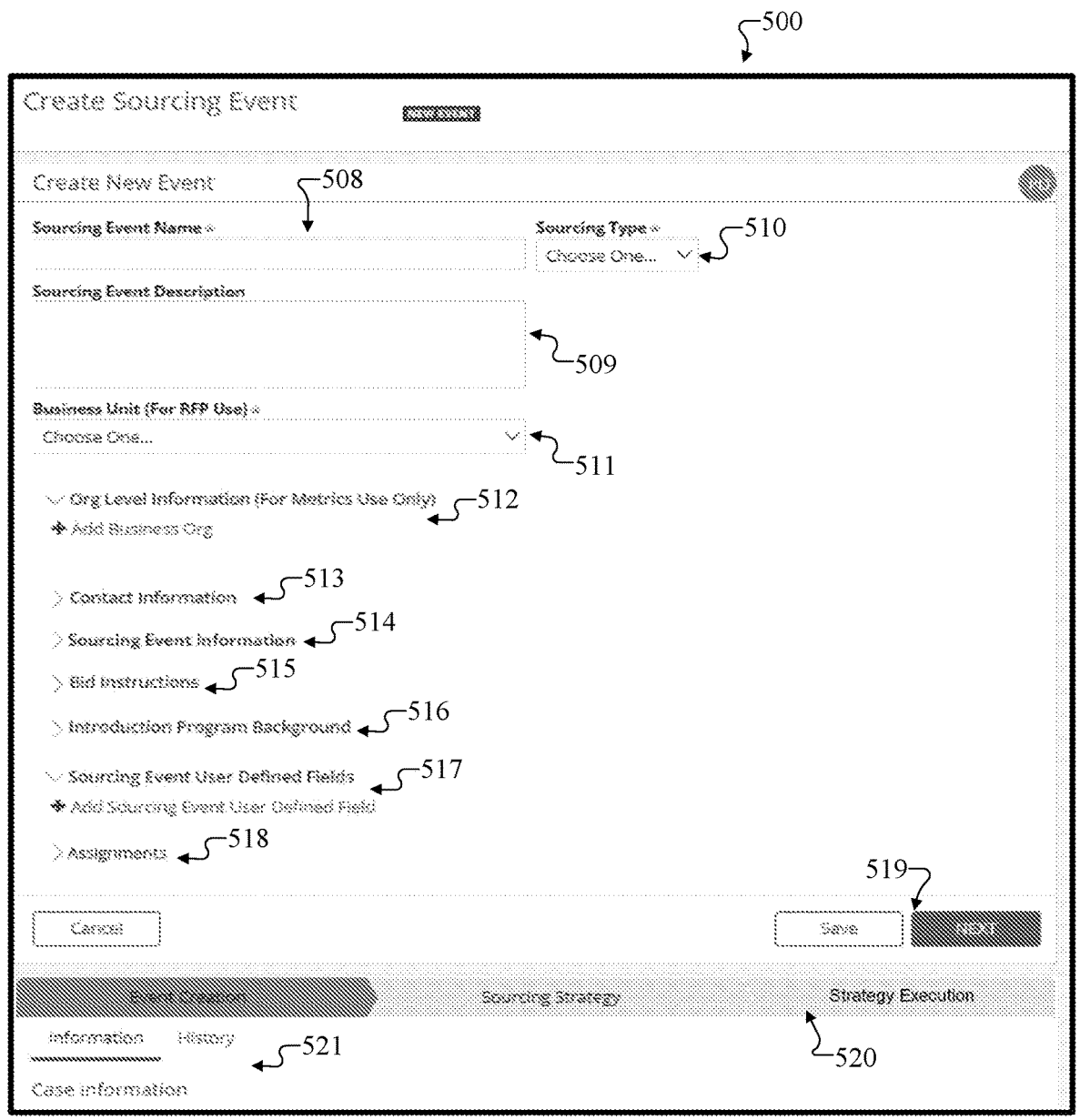

Assume the user who is using the graphical user interface 500 chooses the "create sourcing event" option in the list 501. The graphical user interface 500 can then present the user with content as shown in FIG. 5B. In FIG. 5B, the user is provided with a text box 508 in which the user can provide a name for the new sourcing event. The user is also provided with a text box 509 in which the user can optionally provide a textual description of the new sourcing event. The graphical user interface 500 also includes a drop-down menu 510 that allows the user to identify a type for the new sourcing event. Example types of sourcing events here may include "proposal" (which may involve the generation of at least one new RFX), "purchase order" (which may involve the submission of a purchase order to a supplier), and "agreement" (which may involve the formation of some other agreement with a supplier). Note that the ability to select sourcing types other than "proposal" is provided to support additional functionality related to other types of sourcing events, but a GUI-based RFX platform need not handle other sourcing event types (in which case the drop-down menu 510) may be omitted). For purposes of discussion, it is assumed that the user is creating a new "proposal" sourcing event, which will involve the creation of one or more RFXs.

The graphical user interface 500 further includes a drop-down menu 511, which allows the user to identify a business unit, division, or other subdivision of an originating organization. Note that if an originating organization does not have subdivisions or does not need to include a subdivision in its RFXs, the drop-down menu 511 may be omitted. Moreover, the graphical user interface 500 includes an organizational level-based input 512, which allows the user to optionally provide additional organization-related information about the sourcing event being created.

A contact information section 513 can be used to obtain contact information for one or more personnel related to the new sourcing event. A sourcing event information section 514 can be used to obtain preliminary information related to the new sourcing event. A bid instructions section 515 can be used to obtain information defining an acquisition strategy for the new sourcing event. A program introduction background section 516 can be used to obtain information identifying any program(s) or project(s) of the originating organization associated with the new sourcing event. A sourcing event user defined fields section 517 can be used to obtain information identifying custom fields to be created and used for the new sourcing event. An assignments section 518 can be used to obtain information identifying tasks associated with the new sourcing event and any users assigned to those tasks.

Controls 519 can be used to save the information obtained at that point through the graphical user interface 500, proceed to the next step of the process, or cancel the process. An event timeline 520 illustrates the different stages of the sourcing event creation process (which can match the stages shown in the graphical representation 505) and can identify the current stage of the sourcing event creation process. An informational section 521 can be used to present general information associated with the new sourcing event and historical information associated with the new sourcing event.

Figure 5C:
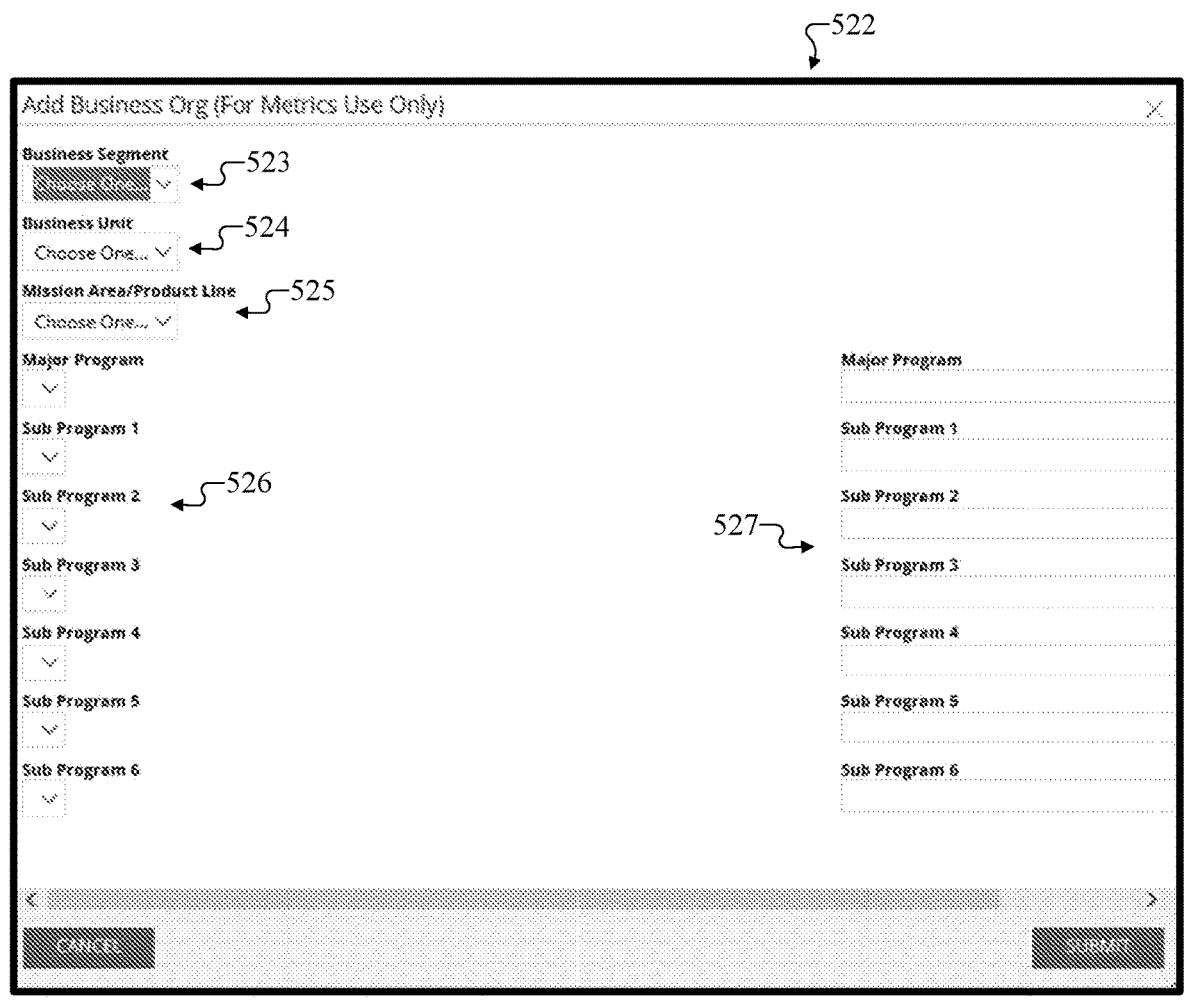

If the user selects the "Add Business Org" link for the organizational level-based input 512, the user may be presented with a pop-window 522 as shown in FIG. 5C. Here, the pop-up window 522 includes a drop-down menu 523 that allows the user to select a business segment of the originating organization. A drop-down menu 524 allows the user to select a business unit of the originating organization, which may be based on the selected business segment and/or the business unit selected using the drop-down menu 511. A drop-down menu 525 allows the user to select a mission area or product line of the originating organization, which may be based on the selected business segment and the selected business unit. The pop-up window 522 also includes drop-down menus 526 that allow the user to identify one or more types of programs and sub-programs and drop-down menus 527 that allow the user to identify one or more specific programs and sub-programs (which may be based on the selected types of programs and sub-programs). Programs and sub-programs are commonly used, for example, with government contractors to identify government programs and portions thereof, and this information can be associated with a sourcing event. If an originating organization does not require other organization-related information, the organizational level-based input 512 and the pop-up window 522 can be omitted.

Figure 5D:
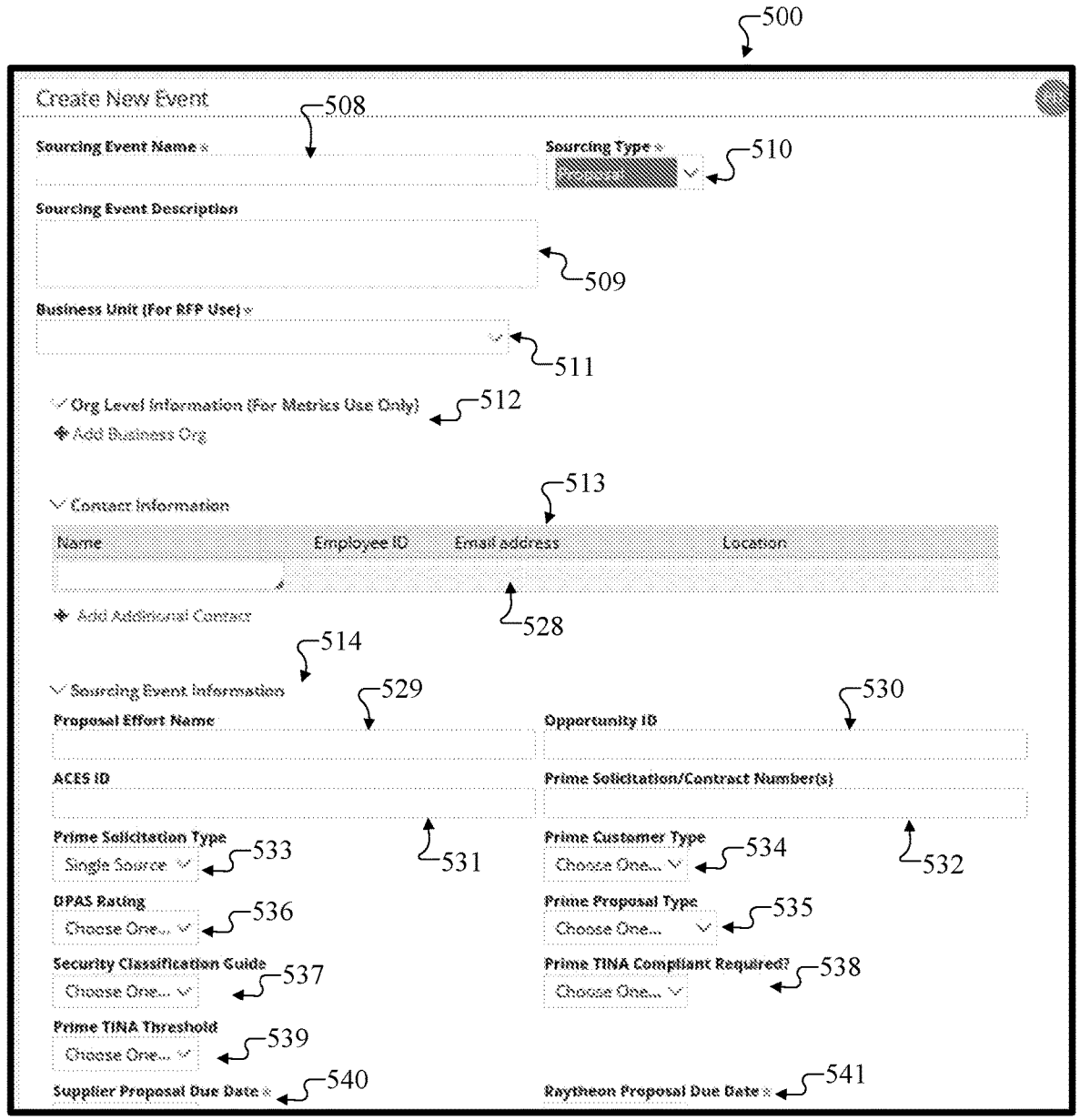

As shown in FIG. 5D, the contact information section 513 and the sourcing event information section 514 have been expanded by the user, such as by clicking on the arrow or the label of each section 513, 514. In the contact information section 513, a list 528 can identify the contact information for one or more users associated with the new sourcing event. In some embodiments, the list 528 may be prepopulated with the name and contact information for the user who is creating the new sourcing event, and additional users can be added if desired by selecting the "Add Additional Contact" link. Selecting this link might, for example, open a text box in which the user can enter search criteria or an identification of one or more additional users.

In the sourcing event information section 514, the graphical user interface 500 provides a text box 529 in which the user can provide a name for a proposal effort, a text box 530 in which the user can provide an identifier for an opportunity, a text box 531 in which the user can provide an Access Certificates for Electronic Services (ACES) identifier, and a text box 532 in which the user can provide at least one prime solicitation or contract number. These boxes may, for example, be useful for government contractors in order to provide information related to an initial customer RFX (if there is one). A drop-down menu 533 can be used by the user to select a prime solicitation type for the new sourcing event, such as to identify whether a solicitation type for the sourcing event is competitive or non-competitive (like single-source or sole-source). A drop-down menu 534 can be used by the user to select a prime customer type for the new sourcing event, such as to identify whether the sourcing event is being used to procure materials for a product to be sold to the U.S. government, to a foreign government, to commercial customers, or indirectly to another organization (which may then sell a product). A drop-down menu 535 can be used by the user to select a prime proposal type for the new sourcing event, such as to identify whether the sourcing event relates to a single-year type of sourcing event (like a single-year proposal for a set quantity or a set range of quantities), a multi-year type of sourcing event (like a proposal for multiple years for set or varying quantities), an indefinite delivery indefinite quantity (IDIQ) type of sourcing event (like a catalog-type agreement where any quantity can be ordered at any time at set pricing over some period of time), or a prime proposal type of sourcing event (like a proposal for a base year at a single quantity or multiple quantities with at least one additional year and quantity as an option that may be executed at a later date).

A drop-down menu 536 can be used by the user to select a Defense Priorities and Allocations System (DPAS) rating, which indicates whether the sourcing event is subject to certain preferential acceptance and performance. A drop-down menu 537 can be used by the user to select a security classification for the sourcing event, such as whether the sourcing event involves a program or prime contract that is subject to or has a governmental classification requirement. A drop-down menu 538 can be used by the user to indicate whether the sourcing event needs to comply with TINA or other reporting requirements, and (if so) a drop-down menu 539 can be used by the user to indicate the monetary threshold at which the TINA or other reporting requirements apply. In addition, text or calendar boxes 540) and 541 allow the user to identify the due date for receiving one or more RFX responses from one or more suppliers and the due date for the originating organization to submit a bid based on the RFX response(s) from the supplier(s).

Figure 5E:
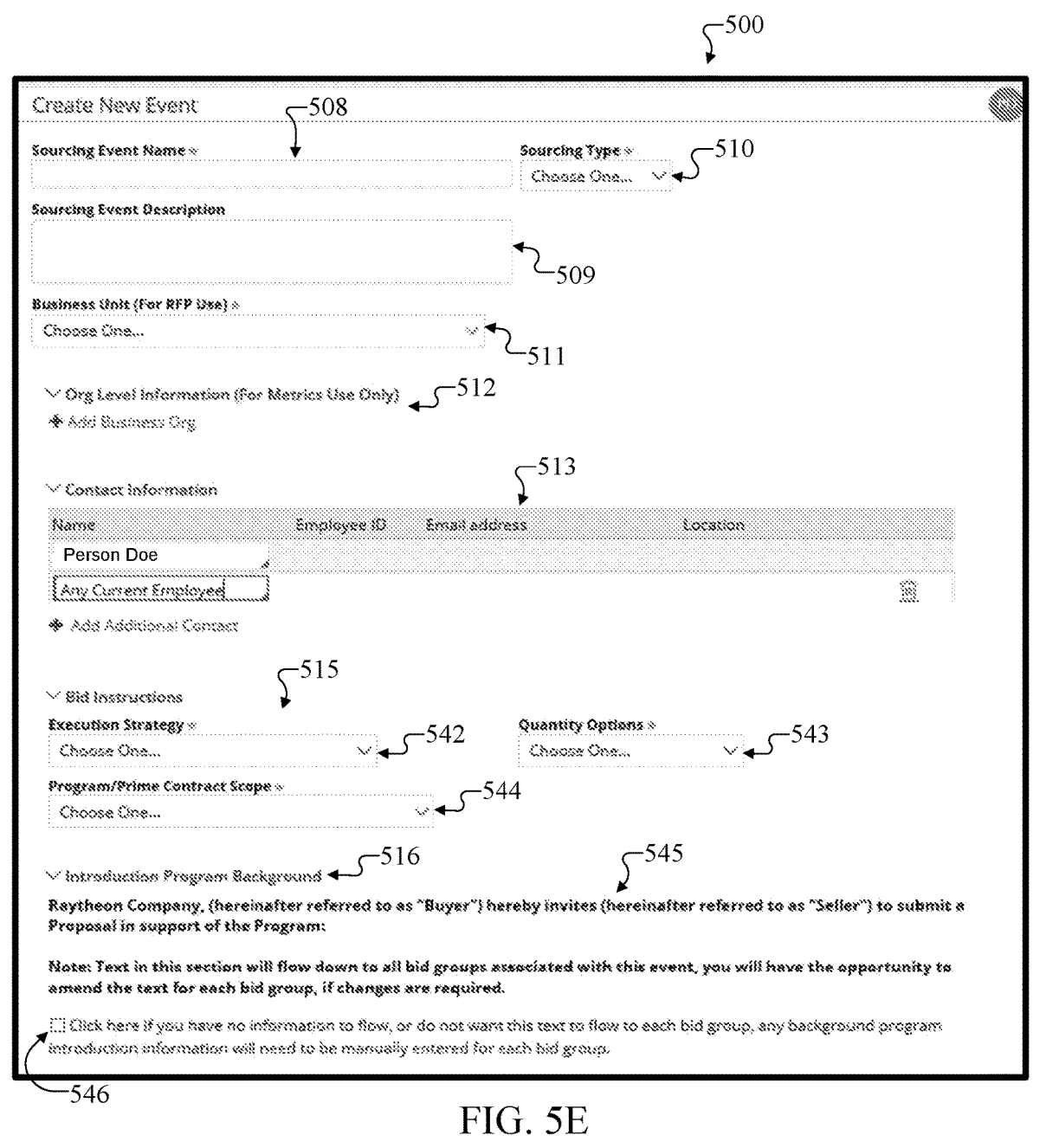

As shown in FIG. 5E, the bid instructions section 515 and the program introduction background section 516 have been expanded by the user, such as by clicking on the arrow or the label of each section 515, 516. In the bid instructions section 515, a drop-down menu 542 can be used by the user to indicate the execution strategy to be used with the new sourcing event. Example types of execution strategies may include a single-year strategy (such as when a proposal will span one year or less with a set quantity or a set range of quantities), a base-plus-options multi-year strategy (such as when a proposal will span multiple years with the first year's quantity/quantity range set and the following years subject to options), a single-structured multi-year strategy (such as when a proposal will span multiple years with a set quantity or a set range of quantities), a change proposal strategy, or a long-term agreement strategy (such as a forecast bundle or IDIQ). A drop-down menu 543 can be used by the user to indicate an expected number of quantities to be ordered under the new sourcing event, such as a single quantity or multiple quantity options. A drop-down menu 544 can be used by the user to indicate a program/prime contract scope for the new sourcing event. Example types of contract scopes can include one prime contract and one program, one prime contract and multiple programs, multiple prime contracts and one program, and multiple prime contracts and multiple programs. Here, a prime contract typically refers to a contract that has or will be issued by a governmental agency, and a program typically refers to a project or effort that is being made by an originating organization and that is associated with a prime contract.

In the program introduction background section 516, introductory text 545 to be included in one or more RFXs to be sent to potential suppliers for the new sourcing event can be identified. This may allow, for example, standard or predefined language to be included in each RFX generated as part of the new sourcing event. In this example, a checkbox 546 is provided in order to allow the user to indicate whether or not the standard or predefined language should be included (i.e., flow down) in RFXs for different bid groups, which are described below. If not (meaning the checkbox 546 is checked), the introductory text 545 in the program introduction background section 516 will not be included in the RFXs for the different bid groups, and the user will enter introductory text for each bid group.

Figure 5F:
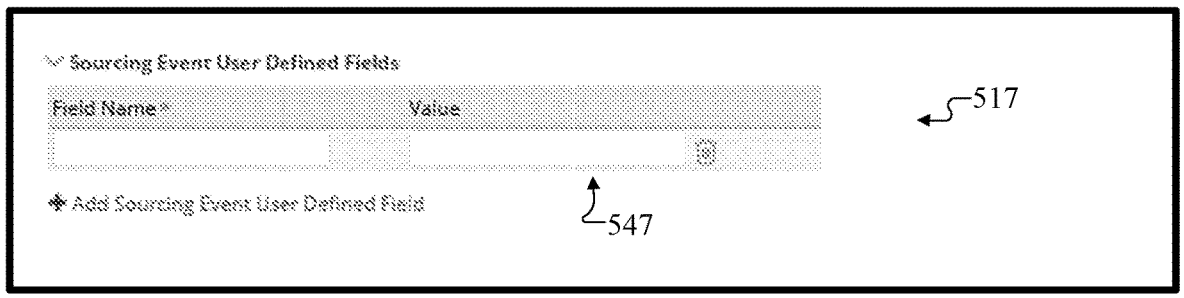

In FIG. 5F, the sourcing event user defined fields section 517 has been expanded by the user, such as by clicking on the arrow or the label of the section 517. The user has also selected the "Add Sourcing Event User Defined Field" link, which displays inputs 547 for receiving information about a new user-defined field being added to the sourcing event being created. For each new field being added, the inputs 547 in the sourcing event user defined fields section 517 include a text box for the new field's name and a text box for an optional value to be assigned to the new field. A trashcan icon is also included and can be selected to delete the associated field.

Figure 5G:
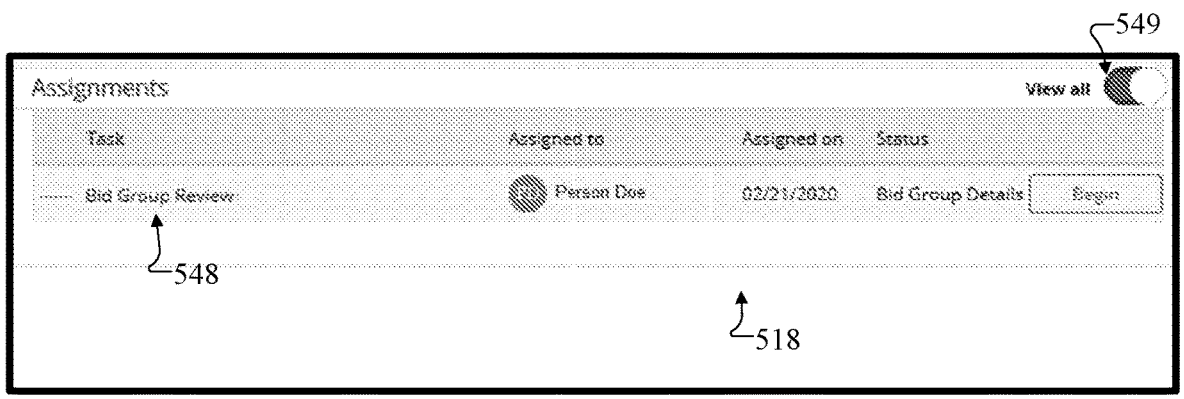

In FIG. 5G, the assignments section 518 has been expanded by the user, such as by clicking on the arrow or the label of the section 518. The assignments section 518 can include one or more entries 548, where each entry 548 identifies a task associated with the new sourcing event and optionally who has been assigned that task. For example, each entry 548 may identify the name or type of task to be completed, the current person assigned to the task (if any), and the date of assignment (if any). Each entry 548 can also identify the current status of the associated task and provide a link allowing the user to jump to a graphical user interface for that specific task. In some embodiments, any tasks associated with the new sourcing event being created may be automatically assigned to the user who is creating the new sourcing event and then reassigned if desired, although this need not be the case. The assignments section 518 also includes a control 549 that allows the user to control whether all outstanding tasks are identified in the assignments section 518 or just the outstanding tasks that have been assigned to the current user.

Figure 5H:
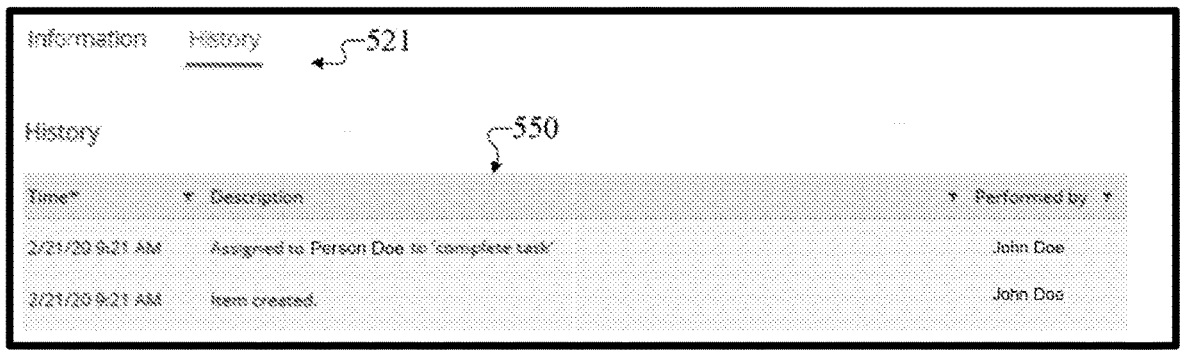

In FIG. 5H, the informational section 521 is now showing historical information 550 associated with the new sourcing event. Here, the historical information 550 can include one or more entries, where each entry identifies an action or milestone associated with the sourcing event being created. In this example, the historical actions include the event creation and the initial event assignment, although any other actions (such as reassignments and status changes) may also be identified.

Figure 5I:
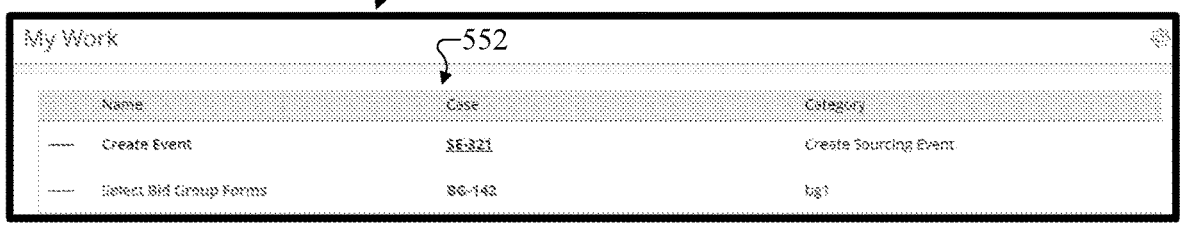

In FIG. 5I, a pop-up window 551 can be presented to the user, such as after the selection of the "My Work" option in the list 501 of the graphical user interface 500. The pop-up window 551 can identify various tasks assigned to the user across multiple sourcing events (as opposed to the assignments section 518, which relates to task assignments for an individual sourcing event). The pop-up window 551 can include an entry 552 for each task assigned to the user, and each entry 552 may identify a name of the task, a case (sourcing event) associated with the task, and a category of the task. Each name or each row for a task identified in the pop-up window 551 may act as a link that can be selected, allowing the user to jump to a graphical user interface for that specific task.

Using the graphical user interface 500 as shown in FIGS. 5A through 5I, a user is able (among other things) to initiate the creation of one or more new RFXs. For example, the user can select the "create sourcing event" function in the list 501, which initiates the first of the three stages for the "create sourcing event" function as represented in the graphical representation 505. The graphical user interface 500 then obtains a number of different pieces of information from the user using (among other things) text boxes, calendar boxes, drop-down menus, checkboxes, and links. The text boxes, calendar boxes, drop-down menus, checkboxes, and links can be used to capture key data useful in the RFX generation process, and the ability to add and remove custom fields provides for improved customization and flexibility in the RFX generation process.

Note that in some cases, various information fields in the graphical user interface 500 may be prepopulated based on, for example, information retrieved from an initial customer RFX or other data source(s). Thus, for instance, the application server 112 may apply machine learning or other logic to an initial customer RFX and prepopulate information fields, such as in the sourcing event information section 514 or the bid instructions section 515, based on the extracted information from the initial customer RFX.

The graphical user interface 500 here provides a mechanism for efficiently and accurately obtaining initial information associated with at least one RFX to be generated. The graphical user interface 500 can uniquely filter information in order to flow proper requirements based on user-defined selections, and (as described below) an acquisition strategy matrix can be used to help define the sourcing strategies for RFXs. Once this stage of the process is completed, the user can engage in sourcing strategy operations (the next stage of the "create sourcing event" function as shown by the graphical representation 505), which can involve operations such as BOM characterization and sourcing strategy determinations.

Among other things, the graphical user interface 500 helps to provide a user-friendly interface as a standard digital tool that has built-in logic to reduce errors, reduce manual efforts, and standardize language sent to suppliers. Overall, this helps to provide improved consistency in the RFX generation process. The graphical user interface 500 also drives accuracy and efficiency into the RFX generation process, which (among other things) can result in a reduction of non-compliant responses. In addition, the graphical user interface 500 helps to structure complex regulatory requirements (such as FAR and DFARS efficient and accurate) into plain-language instructions applicable to the specific effort, which again is done in a user-friendly interface and experience.

Although FIGS. 5A through 5I illustrate one example of a graphical user interface 500 for creating a new sourcing event in a GUI-based RFX platform, various changes may be made to FIGS. 5A through 5I. For example, the content, layout, and arrangement of the graphical user interface 500 are for illustration only. Also, while certain I/O mechanisms (such as lists, text boxes, calendar boxes, drop-down menus, checkboxes, and links) are shown here, the graphical user interface 500 may support the use of any suitable I/O mechanisms to obtain data from or provide data to users.

Prior to or as part of the RFX generation process, one or more users may identify the supplier or suppliers that will receive each RFX being generated. In some cases, this occurs as part of a BOM characterization process, where the bill of materials for a product is analyzed. Part of this analysis can involve grouping related materials together into larger groups, since it is often beneficial to obtain groups of materials from suppliers where possible. For example, a product may contain one hundred bolts and screws, and it is often beneficial to try and obtain all one hundred bolts and screws from a common supplier. As described below, the BOM characterization process provides a visual and interactive view of current material contents that can be used to make sourcing strategy decisions, such as part competition, make/buy decisions, level of purchase (assembly/component), or dual source decisions. Ideally, during BOM characterization, a strategy is identified and used to group common materials together and ultimately to assign each group of materials to an appropriate supply base (one or more suppliers). The end result of the BOM characterization process is at least one material sourcing plan, which identifies the suppliers that will receive RFXs and the material(s) or group(s) of materials that may be procured from each of those suppliers. Note that while the BOM characterization functionality is described here as forming part of a GUI-based RFX platform, BOM characterization is useful in a number of applications and can be used in any other suitable platform (whether or not related to RFX generation). Also note that BOM characterization may be based on or involve the processing of a wide variety of information. This information can include related information that enhances a sourcing decision, such as requalification costs, supplier intelligence, and other tangential information that is available in the transactional database 308 or the data lake or other repository of the data analytics and visualization system 310.

Figure 6:
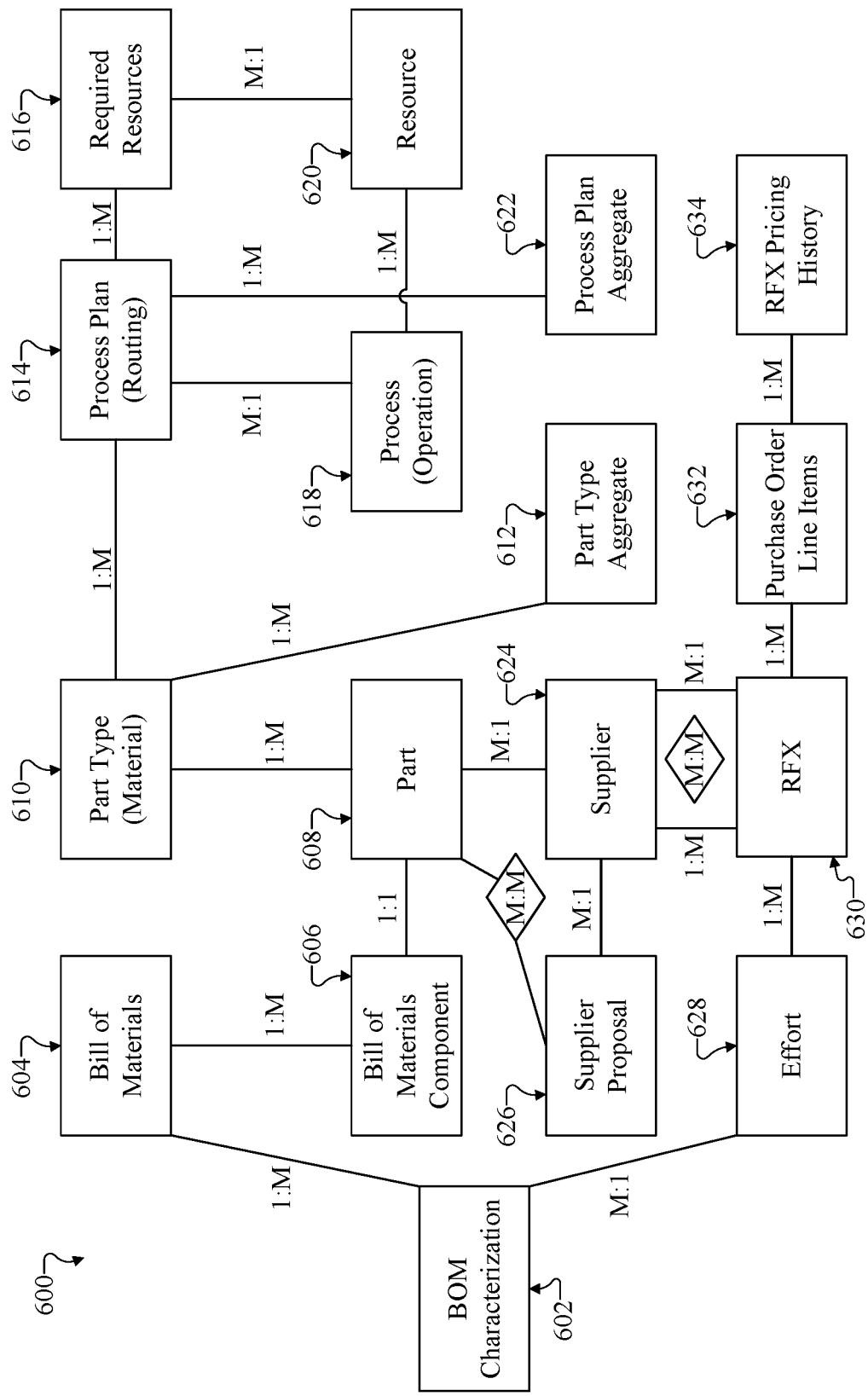
FIG. 6 illustrates an example data architecture associated with a bill of materials (BOM) in a GUI-based RFX platform according to this disclosure.

FIG. 6 illustrates an example data architecture 600 associated with a bill of materials in a GUI-based RFX platform according to this disclosure. In particular, the data architecture 600 in FIG. 6 illustrates example data and example data flows associated with a BOM characterization 602. For ease of explanation, the data architecture 600 may be described as being used by the architecture 300 of FIG. 3. However, the data architecture 600 may be used by any other suitable device(s) and in any other suitable system(s).

As shown in FIG. 6, the BOM characterization 602 is associated with one or more bills of materials 604. Each bill of materials 604 identifies the materials for a specific product and the quantity of each material for that specific product. Each bill of materials 604 is therefore associated with multiple bill of materials components 606, each of which represents one of the materials in the associated bill of materials 604. Each unique bill of materials component 606 is said in this example to represent a unique part 608, and multiple parts 608 of the same or similar type can be grouped together to form a part type 610. A collection of part types 610 forms a part type aggregate 612.

Multiple part types 610 can also be grouped together to form a process plan 614, which identifies how the different parts 608 are routed during use. The process plans 614 can be used to identify the required resources 616 that might to be used to process the part types 610. After being routed, the parts 608 are processed using various process operations 618, which also involve the use of various resources 620. A collection of process plans 614 forms a process plan aggregate 622.

The parts 608 can be sourced from various suppliers 624, and different combinations of suppliers 624 and parts 608 may be identified as different supplier proposals 626. An individual supplier 624 may be included in a single supplier proposal 626 or in multiple supplier proposals 626. Effort 628 represents inputs from users that help to identify one or more material sourcing plans for each product based on the possible combinations of suppliers 624 and parts 608. RFXs 630 may be generated for the identified suppliers 624, and materials may be purchased from one or more selected suppliers 624 once the suppliers 624 are selected based on their RFX responses. For instance, the materials may be typically listed as purchase order line items 632 sent to the selected suppliers 624. Information about the accepted RFXs, purchase orders, or other information can be stored as an RFX pricing history 634, which may be used in various analyses as needed or desired.

Note that in FIG. 6, the terms "1:1", "1:M", "M:1", and "M:M" are used to refer to one-to-one, one-to-many, many-to-one, and many-to-many relationships, respectively. Thus, the term "M" is used here to represent "many" (meaning a value greater than one). The term "M" here does not necessarily indicate that all "1:M", "M:1", and "M:M" relationships involve the exact same numerical value for M. Also note that, in some cases, the value "M" may be replaced in at least one of these relationships with a value of one, depending on the circumstances.

In most circumstances, there may be numerous ways in which groups of parts 608 can be sourced from different suppliers 624. BOM characterization is a process where the parts 608 are grouped, often by sorting the parts 608 using user-supplied criteria or other criteria. Machine learning or other logic can be applied to assign the groups of parts 608 to potential suppliers 624 who are candidates to supply those parts 608. In some cases, this can be performed using one or more optimization algorithms that consider a large number of potential variables. The variables can include numerous factors, such as manufacturing capabilities of the suppliers, complexities of the parts, geographic locations of the suppliers, sizes of the suppliers, known supplier pricing, prior supplier performances, and supplier performance and financial risk analyses. Various user-supplied criteria or other criteria can be used when assigning the groups of parts 608 to potential suppliers 624. Often times, there may be more than one possible way to assign the groups of parts 608 to potential suppliers 624 while satisfying all applicable criteria. There are also numerous ways to assign the groups of parts 608 to potential suppliers 624 in a sub-optimal manner where not all applicable criteria are satisfied. The GUI-based RFX platform or other platform can be used to obtain BOM-related information and perform various processing operations in order to assign the groups of parts 608 to potential suppliers 624 and generate one or more BOM characterizations, at least one of which may then be selected as used as one or more material sourcing plans for the parts 608.

Although FIG. 6 illustrates one example of a data architecture 600 associated with a bill of materials in a GUI-based RFX platform, various changes may be made to FIG. 6. For example, any other suitable data architecture may be used to store information related to bills of materials.

Figure 7:
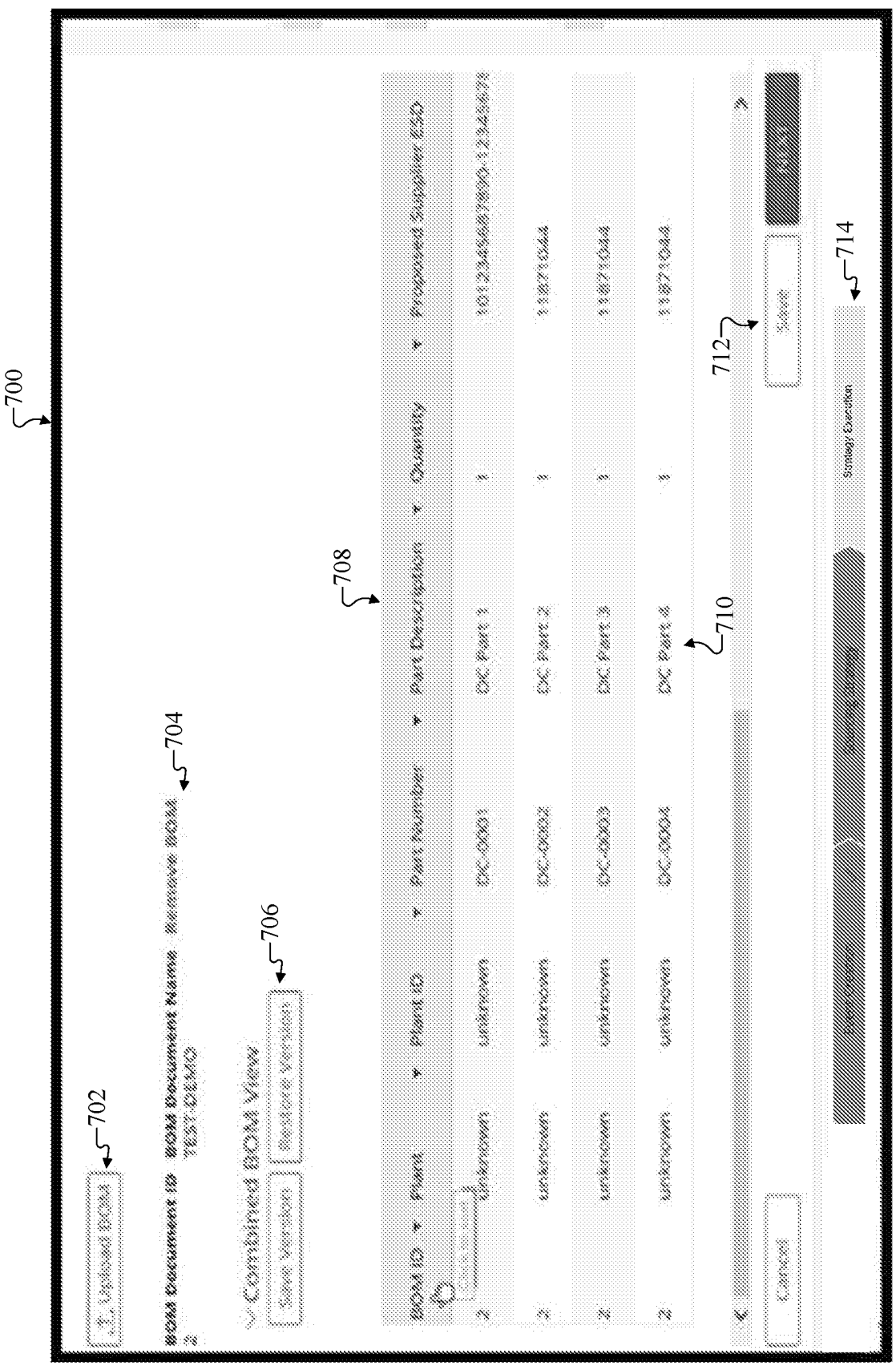
FIG. 7 illustrates an example graphical user interface for BOM uploading to support BOM characterization in a GUI-based RFX platform according to this disclosure.

FIG. 7 illustrates an example graphical user interface 700 for BOM uploading to support BOM characterization in a GUI-based RFX platform according to this disclosure. The graphical user interface 700 may, for example, represent a user interface that is continuing the "sourcing event creation" process started using the graphical user interface 500 described above. For ease of explanation, the graphical user interface 700 may be described as being provided using the architecture 300 of FIG. 3. However, the graphical user interface 700 may be provided using any suitable device(s) and in any suitable system(s).

BOM characterization is useful because it facilitates strategic planning for supply chain management. A bill of materials for a single product may contain hundreds or thousands of individual parts or other materials. Among other things, BOM characterization helps to assist with effective planning and risk management. In some embodiments, the architecture 300 can be used to aggregate BOM-related data (possibly from multiple sources), and the data analytics and visualization system 310 can perform various data joins, calculations, and transformations to enhance and affinitize the data. The data analytics and visualization system 310 can also generate various visualizations associated with the BOM-related data (examples of which are described below) in order to present the data in a standardized or predefined digestible informative fashion. Among other things, this allows users to derive execution strategies that are aligned with any applicable requirements, such as requirements related to diversity-related classifications. Help features can be provided, guidance can be provided regarding how to translate a BOM characterization and accompanying visuals/graphics into an execution strategy, and possible risks and opportunities can be identified.

As shown in FIG. 7, the graphical user interface 700 includes a control 702, such as a button, that allows the user to initiate uploading of a bill of materials. Selection of the control 702 may provide a pop-up window or other mechanism for file browsing that allows the user to locate a spreadsheet file or other file containing the bill of materials. Of course, other selection mechanisms may be used here, such as a "drag-and-drop" mechanism. The graphical user interface 700 may allow the user to upload and use multiple bills of materials here. Thus, a list 704 can identify any previously-uploaded bills of materials (such as by name and identifier), and a "Remove BOM" link can be provided so that the user can remove a previously-uploaded bill of materials if desired. Controls 706 allow the user to save the current combination of uploaded materials or to restore a previously-used combination of uploaded materials.

A list 708 identifies all of the parts or other materials contained in the uploaded bill(s) of materials. In this example, each entry 710 in the list 708 identifies one material by number and description, and each entry 710 has a quantity for the associated material. Each entry 710 also includes a BOM identifier that identifies the uploaded bill of materials from which the associated material was retrieved, which can match one identifier contained in the list 704. Each entry 710 further includes a plant name and plant identifier that identify the facility that will process or otherwise use the associated material. In addition, any proposed suppliers associated with each material may be identified in the associated entry 710. Headers labeling the different fields of the entries 710 may be selected by the user, such as by clicking, to sort the list 708 in various ways.

Controls 712 can be used to save the information obtained at that point through the graphical user interface 700, proceed to the next step of the process, or cancel the process. An event timeline 714 illustrates the different stages of the sourcing event creation process (which can match the stages shown in the graphical representation 505) and can identify the current stage of the sourcing event creation process, along with an identification of the previously-completed stage.

Although FIG. 7 illustrates one example of a graphical user interface 700 for BOM uploading to support BOM characterization in a GUI-based RFX platform, various changes may be made to FIG. 7. For example, the content, layout, and arrangement of the graphical user interface 700 are for illustration only. Also, while certain I/O mechanisms (such as buttons and links) are shown here, the graphical user interface 700 may support the use of any suitable I/O mechanisms to obtain data from or provide data to users.

Once the user has provided an identification of the desired bill(s) of materials to be processed, the transactional server 306 or the data analytics and visualization system 310 can process the identified bill(s) of materials in order to generate one or more BOM characterizations. During the generation of the BOM characterizations, machine learning or other logic can be applied to the identified bill(s) of materials and to various related information associated with the materials or suppliers. Related information may include information identifying suppliers who can or cannot supply various materials, historical information about the suppliers, diversity-related information about the suppliers, and information identifying whether specific materials are commercial or available from one or multiple sources. Related information may also include quantity forecast information, which can identify the amounts of materials that may be needed at different points in the future (since a small supplier may be overwhelmed by orders for large quantities of materials, for instance). The architecture 300 can process this information, such as by using one or more optimization algorithms, in order to group related materials and identify potential suppliers for each group of related materials. A bid group refers to a group of materials and a group of potential suppliers for those materials, and each BOM characterization may identify a number of bid groups for the identified bill(s) of materials.

In some embodiments, when identifying which suppliers may be used to source each group of materials, the transactional server 306 or the data analytics and visualization system 310 may use a hierarchy to identify the best fit of suppliers to materials. For example, a large number of suppliers might be used to source each group of materials, but the BOM characterization process can give preferences to certain suppliers over other suppliers based on considerations like history or type of supplier. As a particular example, one possible hierarchy might be based on a preference to have a supplier who is already on agreement rather than a single source supplier (meaning only one known supplier for the required material). Suppliers not falling within the hierarchy may be excluded from further consideration for sourcing a particular material or group of materials. Of course, any other suitable hierarchy may be used here.

Once all potential suppliers are identified for each group of materials (such as by identifying those suppliers within the hierarchy for each group), the architecture 300 can apply an optimization process in order to assign different suppliers to different groups of materials while considering the supplier hierarchy and any user-defined priorities. User-defined priorities here may relate to any aspect of the assignment of suppliers to groups of materials. In some embodiments, the optimization process can identify an initial BOM characterization (which might not satisfy various criteria including the user-defined priorities) and then iteratively modify the BOM characterization to try and satisfy those criteria. In particular embodiments, information related to the initial BOM characterization and information related the BOM characterization resulting from each iteration of this process can be presented to the user. Different BOM characterizations might also be saved by the architecture 300 so that the user can fall back to a prior BOM characterization or select a final BOM characterization from among multiple saved BOM characterizations.

Depending on the implementation, the BOM characterization process may be partially automated or completely automated. In a completely-automated approach, material-supplier combinations are processed possibly until all viable possibilities are exhausted, and a BOM characterization that fits the user-defined priorities or other criteria is saved. If multiple BOM characterizations fit the user-defined priorities or other criteria, the BOM characterization that satisfies the user's highest priority criteria the best can be selected. If no BOM characterization can be identified that meets all user-defined or other criteria, the single best imperfect BOM 30) characterization may be selected, or multiple best imperfect BOM characterizations may be ranked and presented to the user for selection.

In a partially-automated approach, different combinations of materials and suppliers are analyzed until (i) at least one BOM characterization is identified that fits all user-defined or other criteria or (ii) at least one BOM characterization is identified that most closely fits the criteria. The user may then be prompted to (1) accept an identified BOM characterization, (2) request that the optimization process be repeated, or (3) perform manipulations manually. Among other things, the manual option may enable the user to tweak a promising but sub-optimal automated outcome according to his or her own criteria. As particular examples, this may allow the user to modify his or her priorities or to make manual changes to the BOM characterization. The user can make the final selection of the BOM characterization to be used further.

The BOM characterization that is selected by the user or the automated process typically identifies one or more sourcing strategies (bid groups), each of which includes (i) a subset of materials from at least one bill of materials (which may be referred to as a bid group material list) and (ii) potential suppliers for that group of materials (which may be referred to as a bid group supplier list). Note that BOM characterization is a way to characterize the materials in a BOM to begin the process of building a sourcing strategy (bid groups that will likely provide the best RFX responses), and materials may have multiple characteristics and can move from one sourcing strategy to another to meet specific customer or program requirements. During or after the BOM characterization, the user may be given the option of manually defining or editing the bid groups, and various visualizations of a BOM characterization may be generated and provided to the user. Examples of this are now described.

Figure 8A:
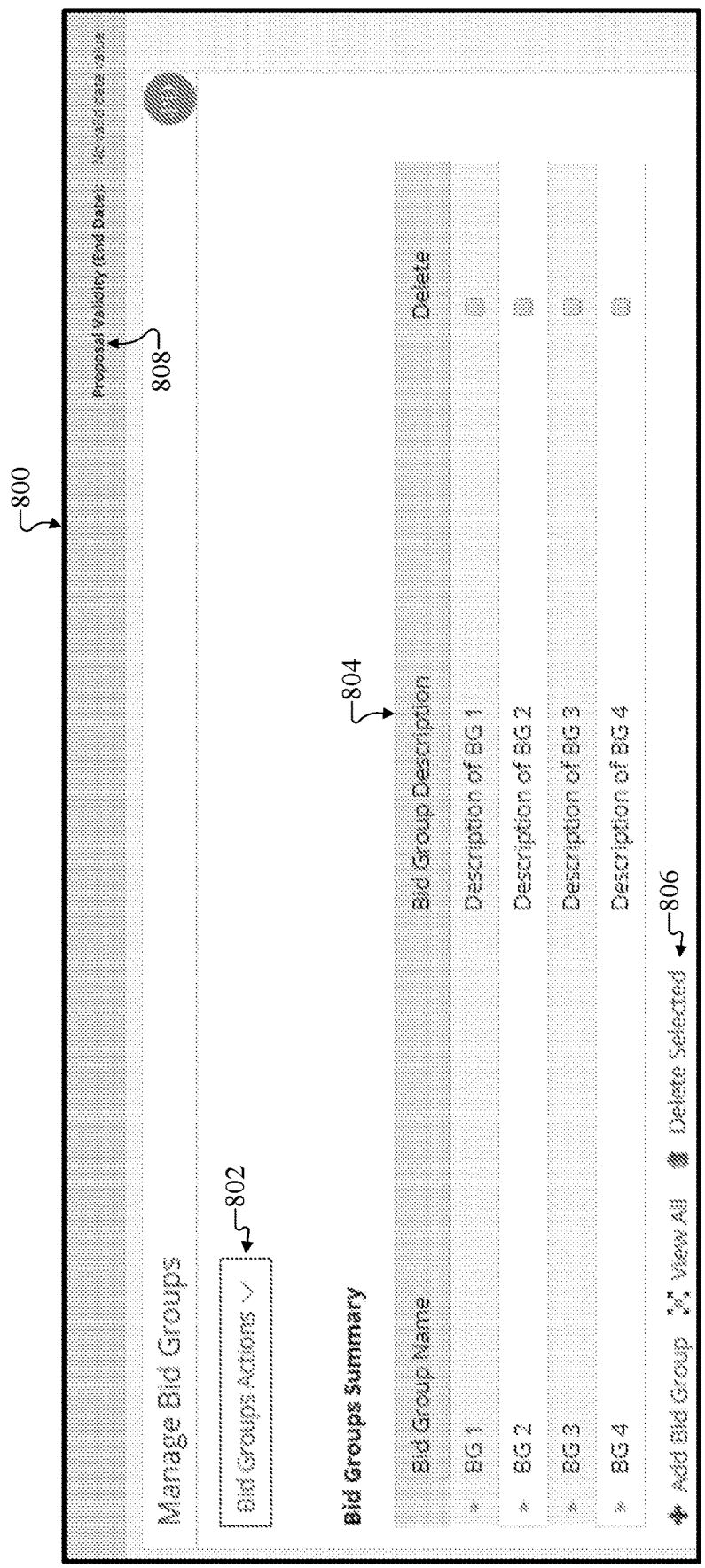
Figure 8B:
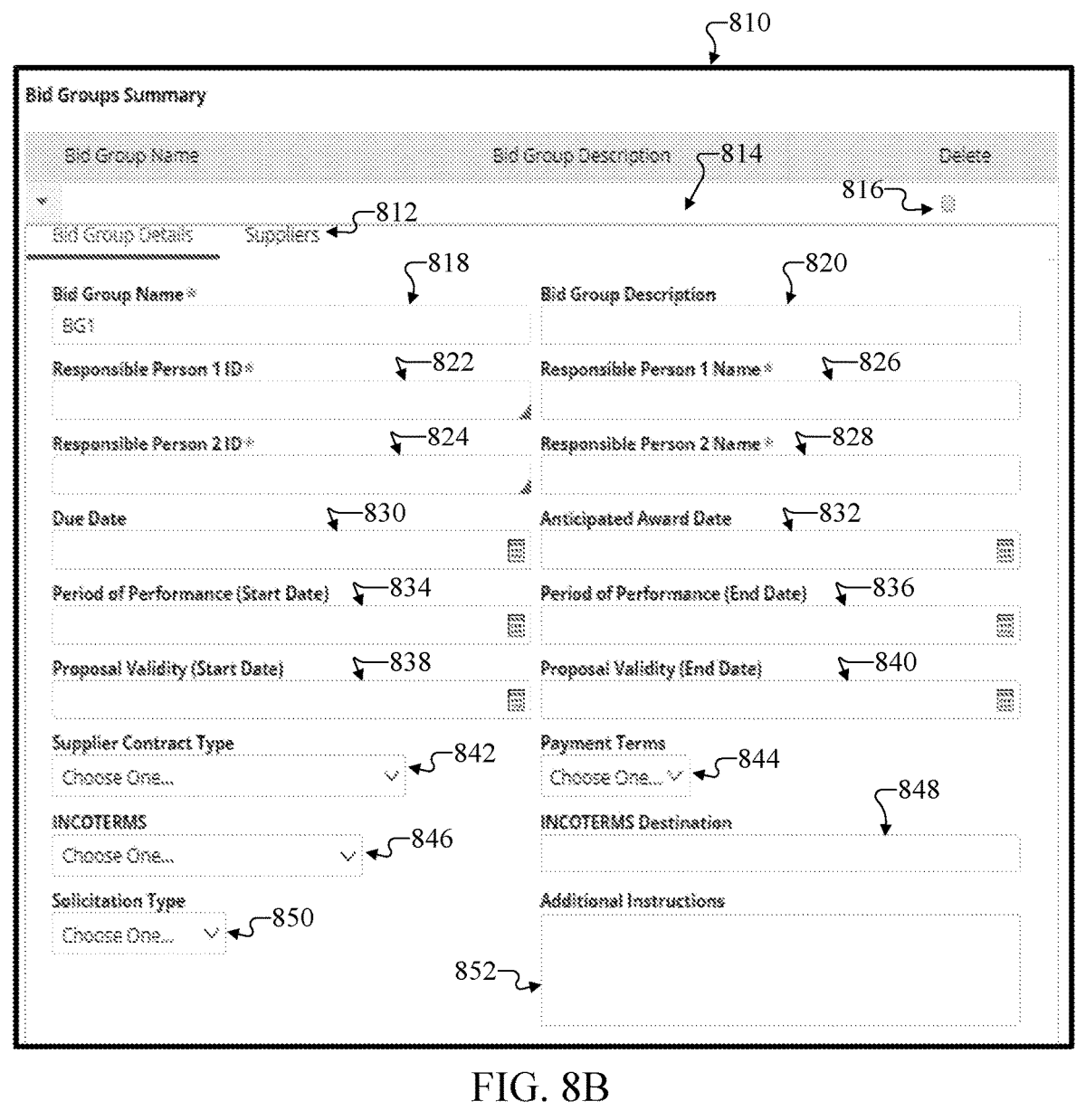
Figure 8C:
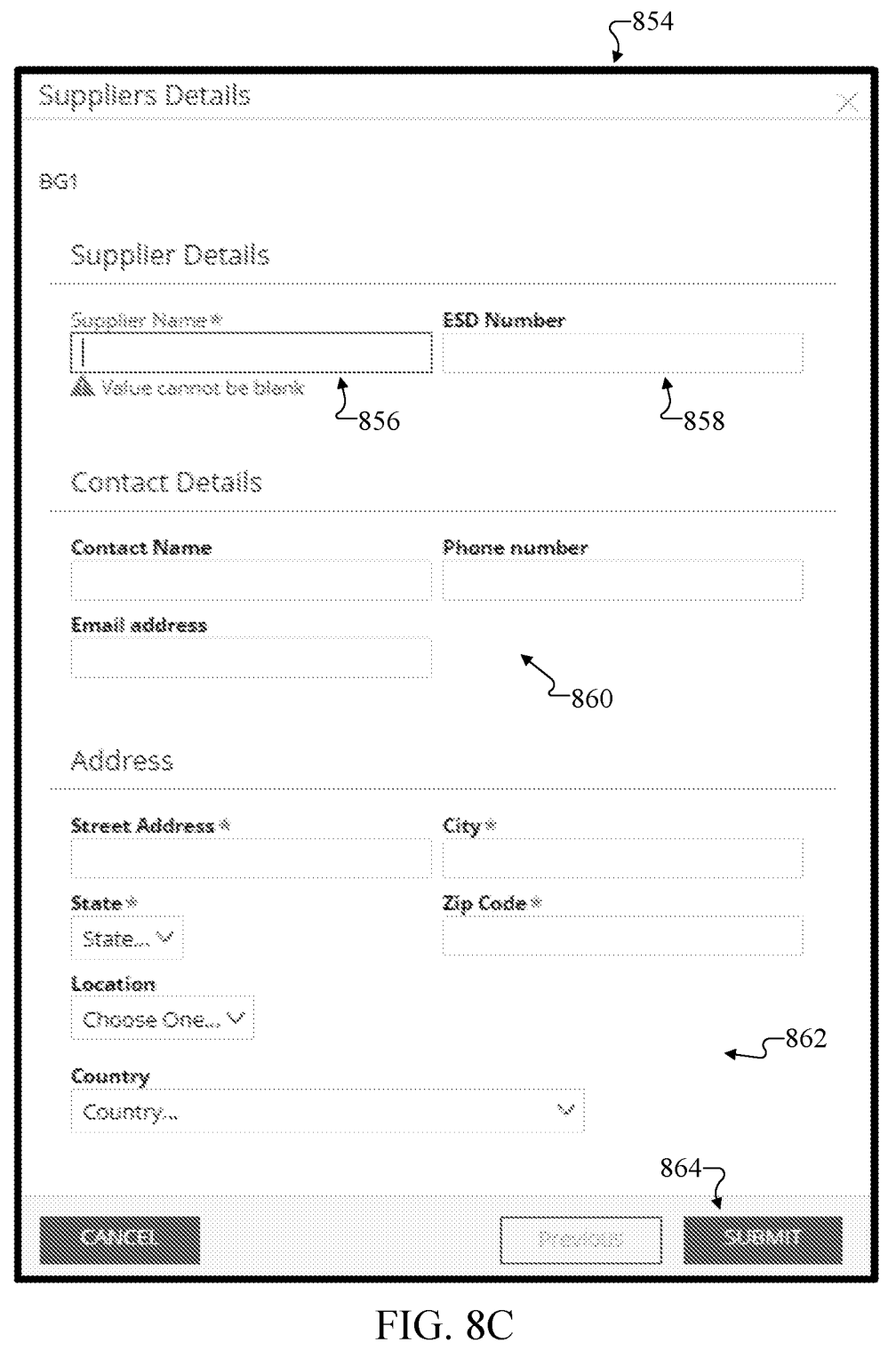

FIGS. 8A through 8C illustrate an example graphical user interface 800 for managing bid groups as part of BOM characterization in a GUI-based RFX platform according to this disclosure. The graphical user interface 800 may, for example, represent a user interface that is continuing the "sourcing event creation" process started using the graphical user interface 500 and continued using the graphical user interface 700 described above. For ease of explanation, the graphical user interface 800 may be described as being provided using the architecture 300 of FIG. 3. However, the graphical user interface 800 may be provided using any suitable device(s) and in any suitable system(s).

The graphical user interface 800 here allows users to create or edit bid groups. As shown in FIG. 8A, the graphical user interface 800 includes a drop-down menu 802, which allows the user to invoke various functions. Example functions that may be invoked here can include downloading a bid group template, downloading a supplier template, uploading a bid group, and uploading a supplier. The bid group template may represent a spreadsheet template or other template in which a user may manually fill in details regarding a bid group, such as a manual identification of the suppliers in the bid group and the materials or services that might be obtained from those potential suppliers. The supplier template may represent a spreadsheet template or other template in which a user may manually fill in details regarding a potential supplier. The upload options allow one or more completed templates to be uploaded, such as from a user device 108a-108d to the application server 112 for use.

The graphical user interface 800 also includes a bid groups summary section 804, which provides an overview of the bid groups that have been defined (either manually or by an automated process, such as the process described above). Here, each bid group is identified by name and description in the bid groups summary section 804, and each bid group can be selected for deletion. Selecting any specific bid group (such as by double-clicking on the bid group) may allow the user to edit the details of that specific bid group. Controls 806 can be used by the user to create a new bid group, delete one or more selected bid groups, or view all bid groups. In addition, if a bid group or supplier is manually uploaded, the contents of the uploaded information can be analyzed to identify any non-compliance issues or other problems with the uploaded data, such as by using a trained machine learning model or predefined rules. Any issues with the uploaded data can be identified, such as by presenting one or more notifications in a notification area 808 of the graphical user interface 800.

If a user chooses to manually create a new bid group/supplier or edit an existing bid group/supplier, the graphical user interface 800 can present a pop-up window 810 as shown in FIG. 8B. In FIG. 8B, the pop-up window 810 includes a control 812, which allows the user to control whether a bid group or a supplier is being edited. In FIG. 8B, a bid group is being edited, so the pop-up window 810 also includes a display area 814 in which the current bid group's name and description may be presented. This area 814 may initially be empty when a new bid group is being created or may be populated when an existing bid group is being edited. The display area 814 also includes an option 816 for deleting the current bid group.

The pop-up window 810 further includes a number of text boxes, calendar boxes, and drop-down menus used to define or edit the current bid group. For instance, the user is provided with a text box 818 in which the user can provide or edit a name for the bid group and a text box 820 in which the user can optionally provide or edit a description of the bid group. The user is also provided with text boxes 822 and 824 in which the user can provide or edit identifiers of two people who are responsible for the bid group and text boxes 826 and 828 in which the user can provide or edit the names of the two people who are responsible for the bid group. In some embodiments, at least some of the text boxes 822-828 may be prepopulated based on the current user who is creating or editing the bid group, although this is not required. The user is further provided with calendar boxes 830-840 in which the user can optionally provide a date by which bids from suppliers are due to the originating organization, a data by which the originating organization expects to select suppliers based on their RFX responses, a start date and an end date when performance under an RFX is expected to occur, and a start date and an end date when the originating organization expects the RFX responses to be valid.

A drop-down menu 842 allows the user to optionally select a supplier contract type to be awarded to one or more suppliers in the bid group. Example contract types can include firmed fixed price, center of excellence, cost plus award fee, cost plus fixed fee, cost plus incentive fee, cost plus no fee, cost reimbursement, fixed price award fee, fixed price incentive fee, fixed price level of effort, fixed price economic adjustment, fixed price reterminable, government material fixed price, inter-organizational transfer, labor hours, material induction, not to exceed, and time and material contract types. A drop-down menu 844 allows the user to optionally select desired payment terms from the suppliers in the bid group, such as "net 0 days," "net 30 days," "net 33 days," or "net 60 days." A drop-down menu 846 allows the user to optionally select a desired shipping technique from the suppliers in the bid group for the materials. Example shipping techniques can include freight on board at origin; costs at freight; costs, insurance, and freight; carriage and insurance paid; deliver at frontier; deliver at terminal; delivered duty paid; delivered duty unpaid; delivered excluding quality; delivered excluding shipping; excluding works; free alongside shipment; and free carrier. A text box 848 allows the user to optionally specify a desired delivery destination for the materials. A drop-down menu 850 allows the user to optionally define the type of solicitation to be sent to the suppliers in the bid group, such as competitive or non-competitive. A text box 852 allows the user to optionally provide any other desired instructions for the suppliers in the bid group.

If the user chooses to add a new supplier or edit an existing supplier associated with a bid group, the graphical user interface 800 can present a pop-up window 854 as shown in FIG. 8C. In FIG. 8C, the pop-up window 854 includes text boxes 856 and 858 in which the user can provide or edit a name and electronic identifier associated with the supplier. The pop-up window 854 also includes a collection 860 of text boxes in which the user can provide or edit a name and contact information for the originating organization's contact at the supplier. The pop-up window 854 further includes a collection 862 of text boxes and drop-down menus in which the user can provide or edit an address for the supplier. Controls 864 (which are shown in FIG. 8C but may also be included in FIG. 8B) can be used to save the information obtained at that point through the graphical user interface 800, proceed to the next step of the process, or cancel the process.

Although FIGS. 8A through 8C illustrate one example of a graphical user interface 800 for managing bid groups as part of BOM characterization in a GUI-based RFX platform, various changes may be made to FIGS. 8A through 8C. For example, the content, layout, and arrangement of the graphical user interface 800 are for illustration only. Also, while certain I/O mechanisms (such as text boxes, calendar boxes, checkboxes, and drop-down menus) are shown here, the graphical user interface 800 may support the use of any suitable I/O mechanisms to obtain data from or provide data to users.

FIGS. 9A through 9E illustrate example visualizations that can be generated based on BOM characterizations in a GUI-based RFX platform according to this disclosure. For example, the visualizations shown in FIGS. 9A through 9E may be generated after one or more users have used the graphical user interfaces 700, 800 to provide BOM-related and bid group-related information and a specific BOM characterization has been generated or selected. For ease of explanation, the visualizations may be described as being provided using the architecture 300 of FIG. 3. However, the visualizations may be provided using any suitable device(s) and in any suitable system(s).

Figure 9A:
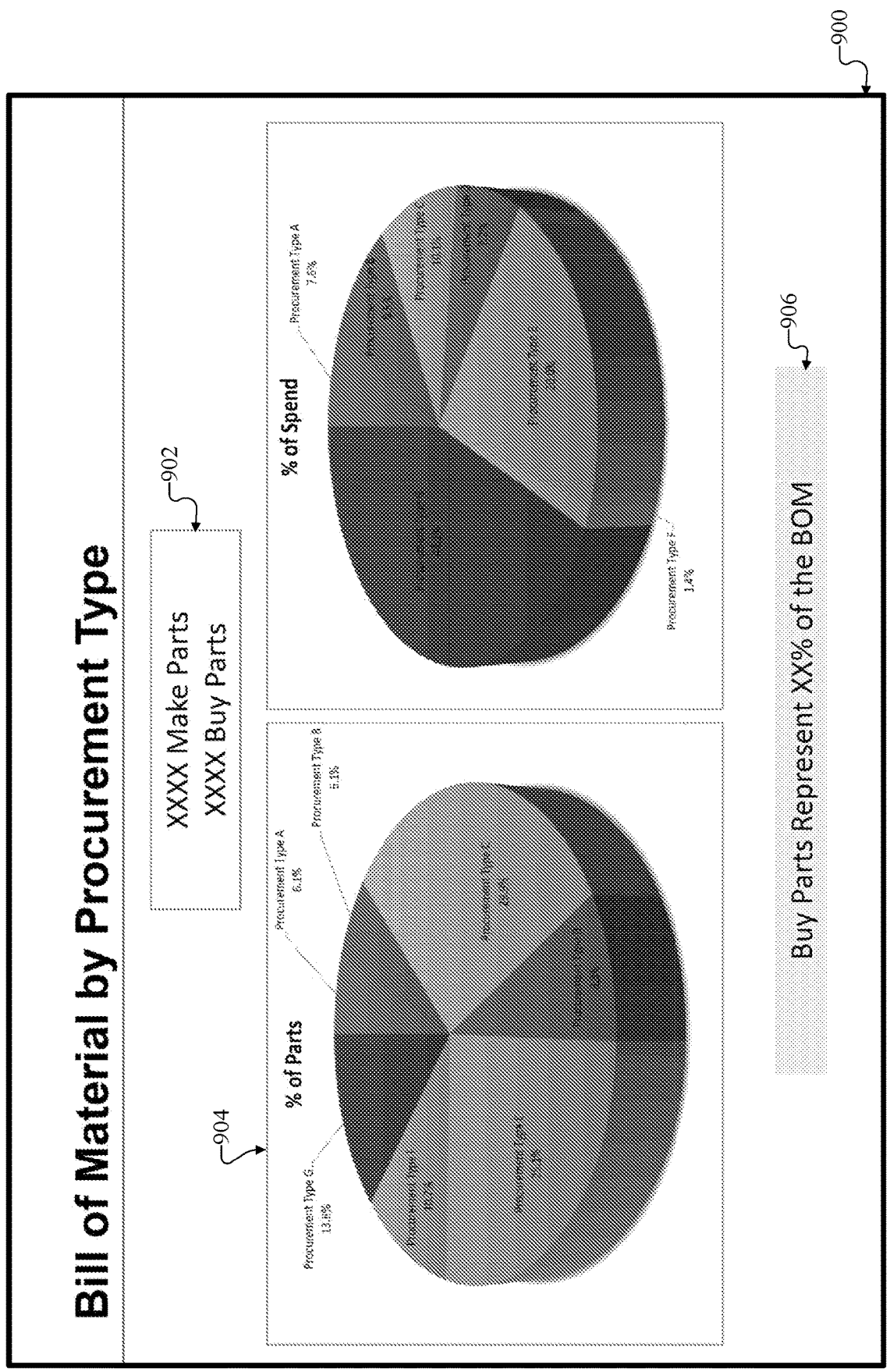
FIGS. 9A through 9E illustrate example visualizations that can be generated based on BOM characterizations in a GUI-based RFX platform according to this disclosure.

As shown in FIG. 9A, a first example visualization 900 identifies different information related to how materials in at least one BOM may be procured from suppliers using different procurement techniques. In FIG. 9A, the visualization 900 includes a summary section 902, which identifies the total number of materials in different subsets of materials for the BOM(s). The subsets here identify the number of materials to be manufactured and the number of materials to be purchased by an originating organization, although other or additional subsets may be used here. The visualization 900 also includes multiple graphs 904, which present different information related to how the materials may be procured. For example, one graph 904 identifies percentages of materials to be procured using the different procurement techniques, while another graph 904 identifies percentages of overall monetary value associated with the different procurement techniques. The visualization 900 further includes a section 906 that highlights some specific information related to the content presented in the visualization 900, which might be based on how well the current BOM characterization satisfies at least one user-defined criteria. Note that any suitable procurement techniques may be identified here, such as buyer-managed, on agreement, or other procurement techniques. Also note that only one of the graphs 904 may be shown here.

Figure 9B:
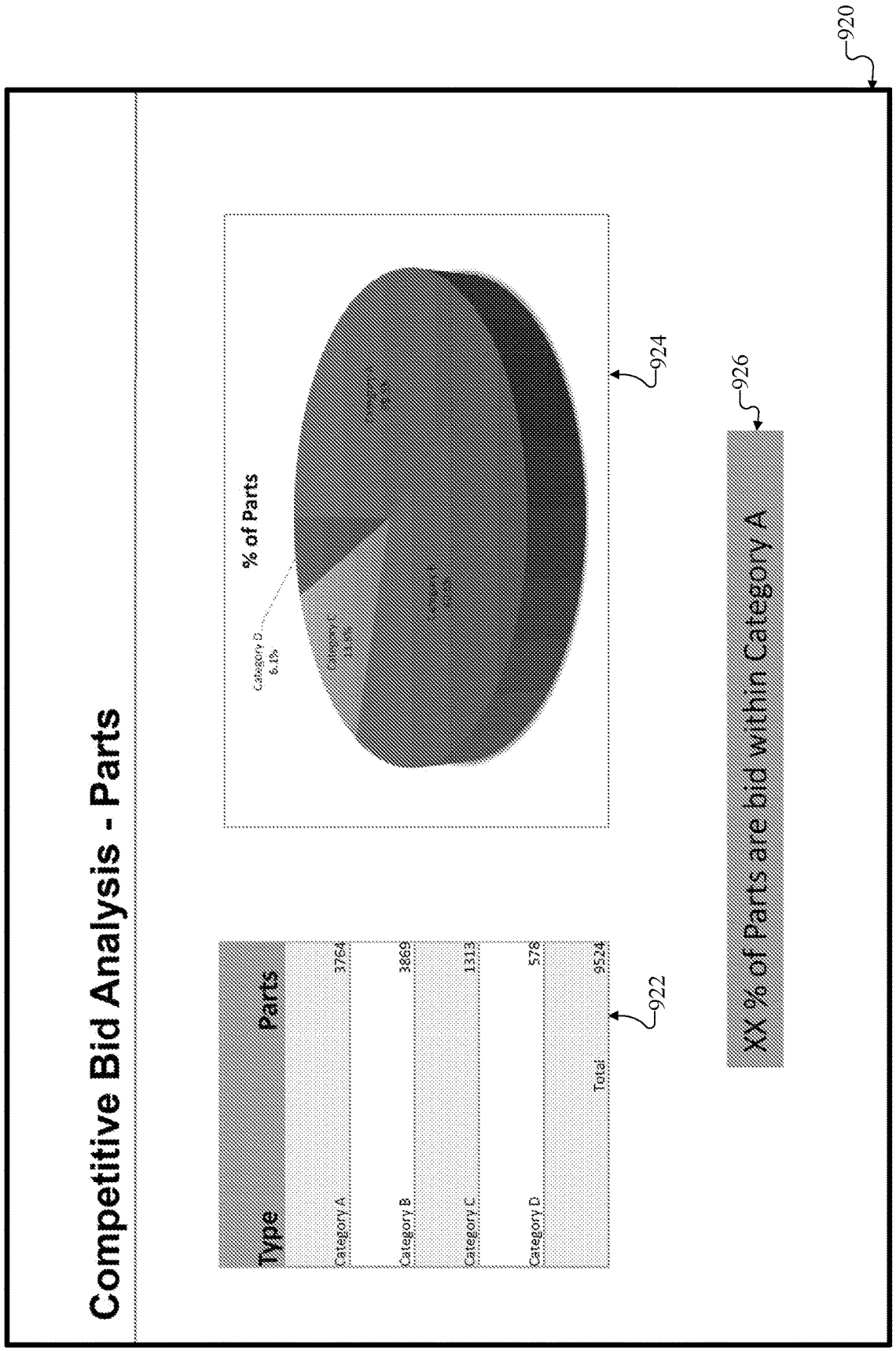

As shown in FIG. 9B, a second example visualization 920 identifies a competitive bid analysis for a BOM characterization, which breaks down at least one BOM into different categories based on how suppliers will bid in order to provide materials in the BOM(s). In FIG. 9B, a table 922 identifies different types of supplier bids and the number of materials to be procured using each bid type for a BOM characterization. Also, a graph 924 identifies percentages of materials to be procured using the different bid types. The visualization 920 further includes a section 926 that highlights some specific information related to the content presented in the visualization 920, which might be based on how well the current BOM characterization satisfies at least one user-defined criteria. Note that any suitable bid types may be identified here, such as competitive, on agreement, sole source, or other bid types. Also note that only one of the table 922 or the graph 924 may be shown here.

Figure 9C:
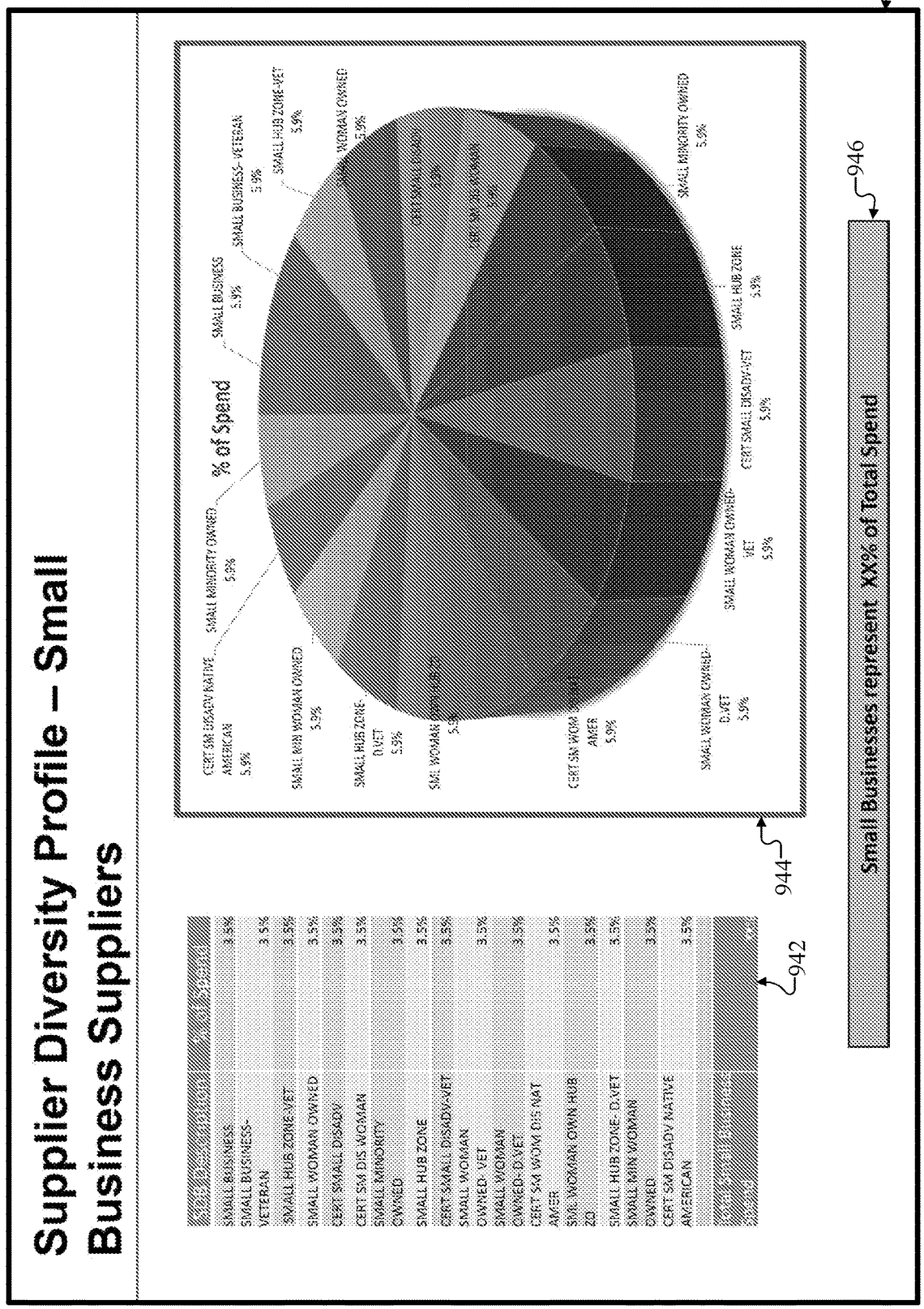

As shown in FIG. 9C, a third example visualization 940 identifies a breakdown of at least one BOM based on a potential diversity of suppliers for a BOM characterization. In FIG. 9C, the visualization 940) includes a table 942 and a graph 944 that identify different diversity-related classifications of suppliers and percentages of overall monetary value associated with the different diversity-related classifications of suppliers. The visualization 940 further includes a section 946 that highlights some specific information related to the content presented in the visualization 940, which might be based on how well the current BOM characterization satisfies at least one user-defined criteria. Note that any suitable diversity-related classifications may be identified here. Also note that only one of the table 942 or the graph 944 may be shown here.

Figure 9D:
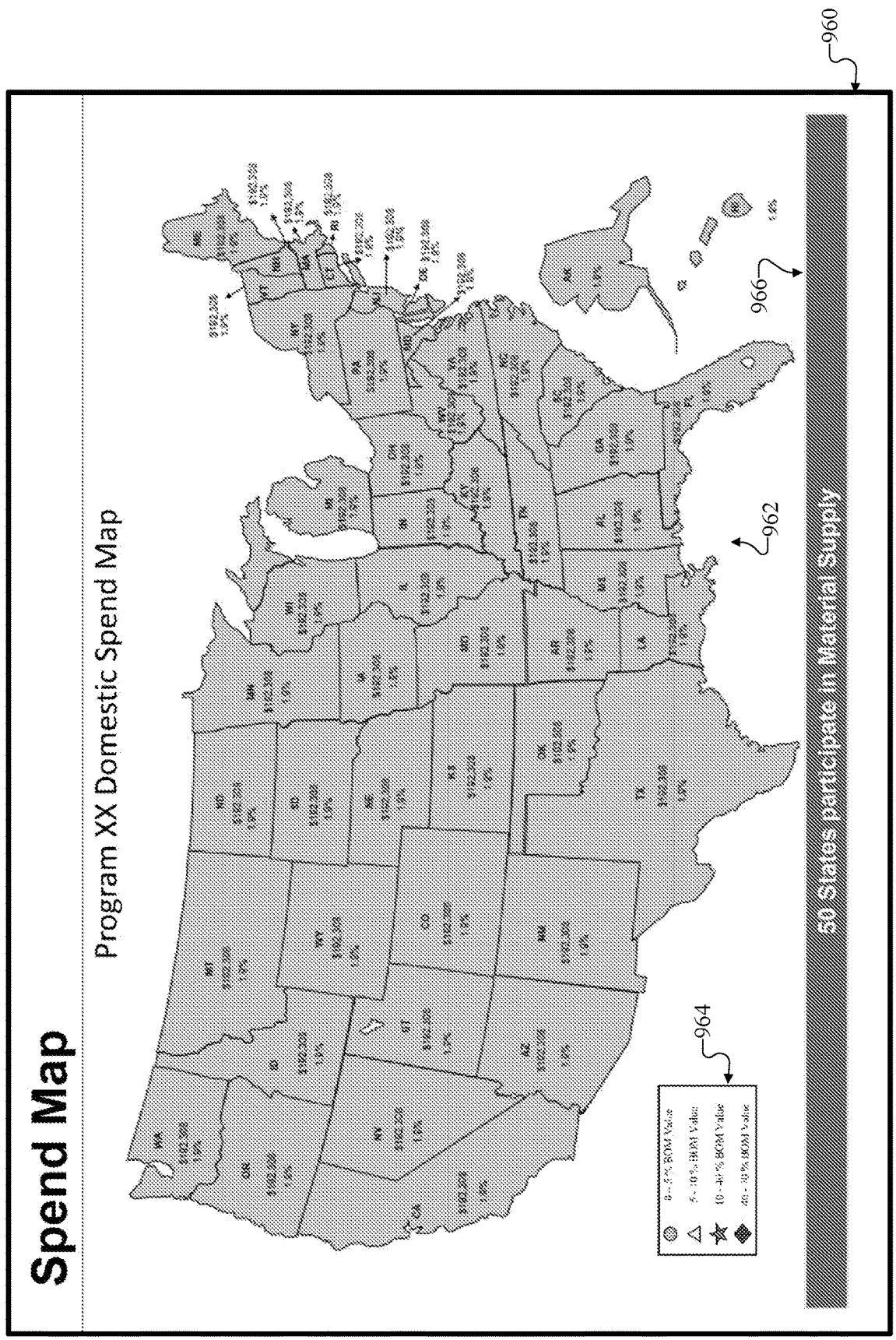

As shown in FIG. 9D, a fourth example visualization 960 identifies a spending map that breaks down a possible distribution of overall monetary value of materials by geographic region for a BOM characterization. In FIG. 9D, a graph 962 identifies different geographic regions (in this example, states) along with monetary values for the different geographic regions. A legend 964 can be used to identify different monetary ranges associated with symbols that might be used in the visualization 960. The visualization 960 further includes a section 966 that highlights some specific information related to the content presented in the visualization 960, which might be based on how well the current BOM characterization satisfies at least one user-defined criteria. Note that any suitable geographic regions, symbols, and value ranges may be identified here.

Figure 9E:
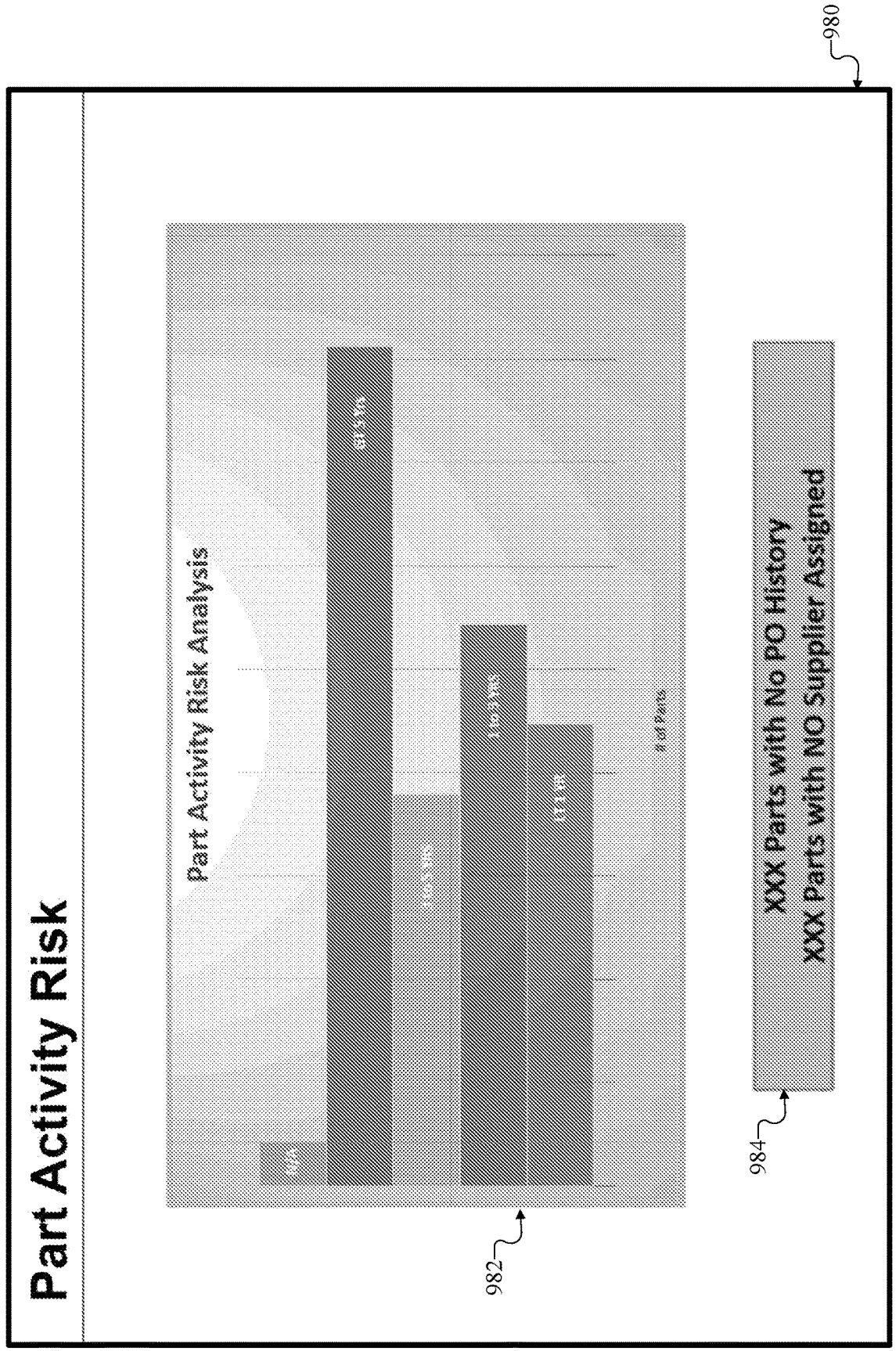

As shown in FIG. 9E, a fifth example visualization 980 identifies risk information associated with the suppliers associated with a BOM characterization. In FIG. 9E, the visualization 980 includes a graph 982 that plots the numbers of materials for which RFX responses were not received against the number of years since the same materials were previously provided by suppliers (if any). For example, if no RFX response is received for a particular material but a supplier has provided this material within a given time period (such as within the last year), this carries less risk. If no RFX response is received for a particular material and a supplier has not provided this material for a prolonged period (such as more than five years), this carries more risk. This type of information may be combined with supplier performances, financial risks, or other information. A section 984 of the visualization 980 also identifies potential risk issues. In this case, the risk issues include parts being sourced from suppliers who have not previously accepted purchase orders from the originating organization (meaning there is no history regarding factors like their reliability) and parts with no assigned suppliers. Note that any suitable types of risks may be identified here.

Once one or more visualizations associated with a BOM characterization are generated and presented to a user, the visualizations may support interactive operations with the user. For example, the user may select a particular piece of a pie chart, bar graph, or other visualization in order to view the suppliers or materials associated with that particular piece of the visualization. The user may also be allowed to modify the suppliers or materials associated with that particular piece of the visualization (such as by using the graphical user interface 800) in order to achieve some desired goal of the user. As a particular example, the user may select a particular piece of the pie chart forming the graph 944, such as to identify which suppliers fall within one specific diversity-related classification. If a particular diversity-related classification is underrepresented in the graph 944, the user might add additional suppliers or add additional materials to be sourced from the suppliers in that particular diversity-related classification. This may be done, for instance, to help ensure that specific requirements related to sourcing materials from certain types of suppliers are met. The architecture 300 can log information such as an initial BOM characterization and changes to the BOM characterization. This may allow one or more users to make changes to potential material sourcing plans and then select a particular material sourcing plan.

Among other things, BOM characterization is useful in developing an execution strategy (including risk and opportunity identification, proposal execution strategy, alignment with prime contract requirements and prime contract customer care-abouts, sourcing strategy, etc.) for use during subsequent RFX-related operations. The use of these types of visualizations helps to integrate best practices into an automated solution with cloud-based or other storage. This allows for re-use of data, provides unique processes for BOM characterization with novel visualizations of the data, and removes tactical data mining tasks. This also helps turn large amounts of raw unsorted data into actionable information automatically and enables more strategic program planning and execution.

The various visualizations shown in FIGS. 9A through 9E are merely meant to represent example types of visualizations that can be generated based on a BOM characterization. However, numerous other types of visualizations may be generated based on at least one BOM characterization. For example, other visualizations may include graphs, tables, or other information identifying numbers of materials or percentages of monetary value by top suppliers, by top sole-source suppliers, or by material type. Still other visualizations may include various other types of risk information associated with potential suppliers identified in a BOM characterization, such as risk ratings, order lead times, or financial stability ratings for the suppliers. Thus, this disclosure is not limited to any specific types of visualizations that are based on a BOM characterization.

Although FIGS. 9A through 9E illustrate examples of visualizations that can be generated based on BOM characterizations in a GUI-based RFX platform, various changes may be made to FIGS. 9A through 9E. For example, the content, layout, and arrangement of the visualizations here are for illustration only.

Once the user is satisfied with a BOM characterization for a sourcing event, the user can engage in strategy execution operations (as shown by the graphical representation 505). For example, the strategy execution operations may involve operations such as the finalization of RFX terms and the automatic generation of one or more RFXs for the suppliers in the identified bid group(s), as well as the analysis and use of the RFX responses. It should be noted that the strategy execution operations described below may occur collectively for multiple bid groups or individually for different bid groups.

Figure 10A:
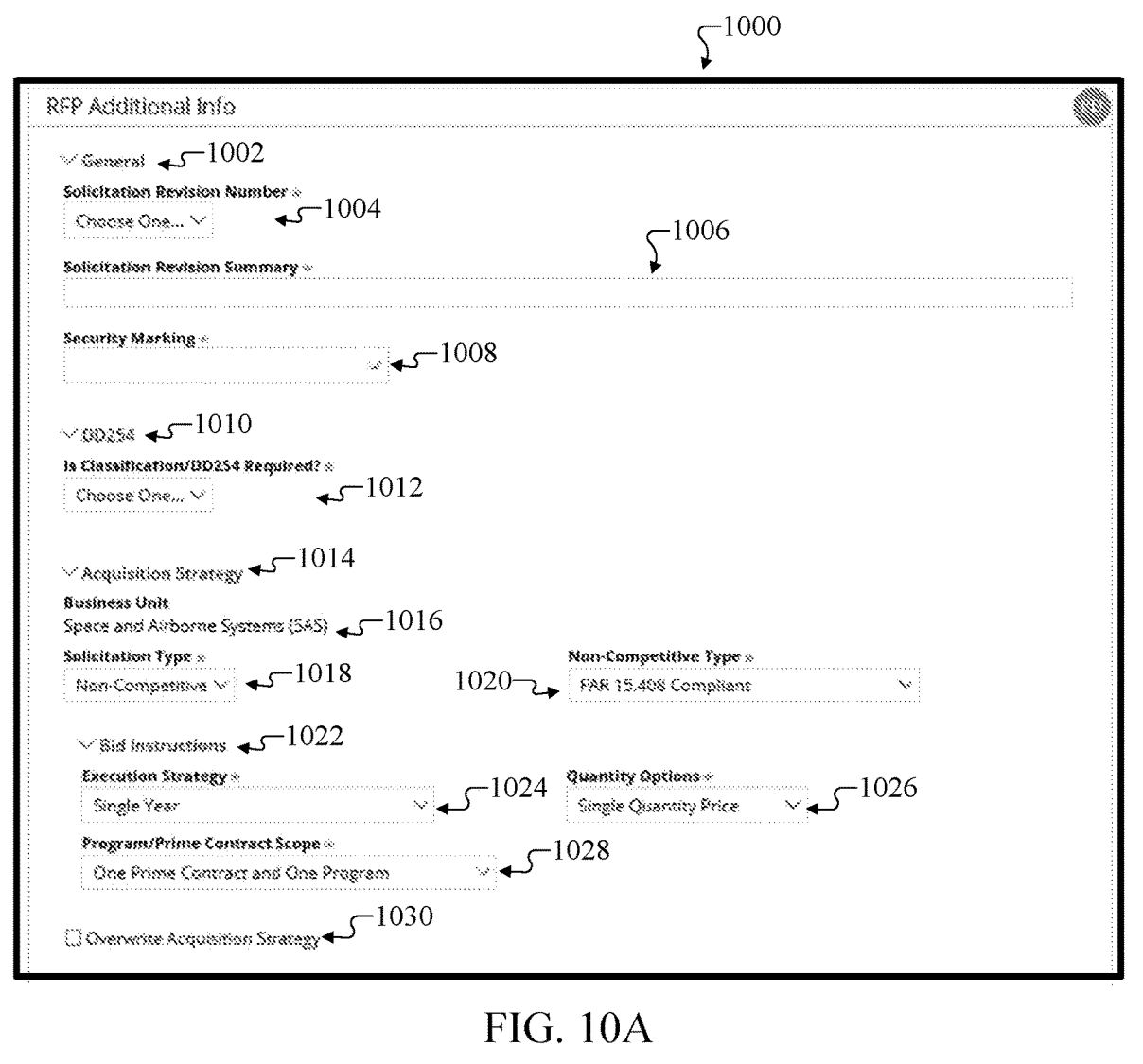
Figure 10B:
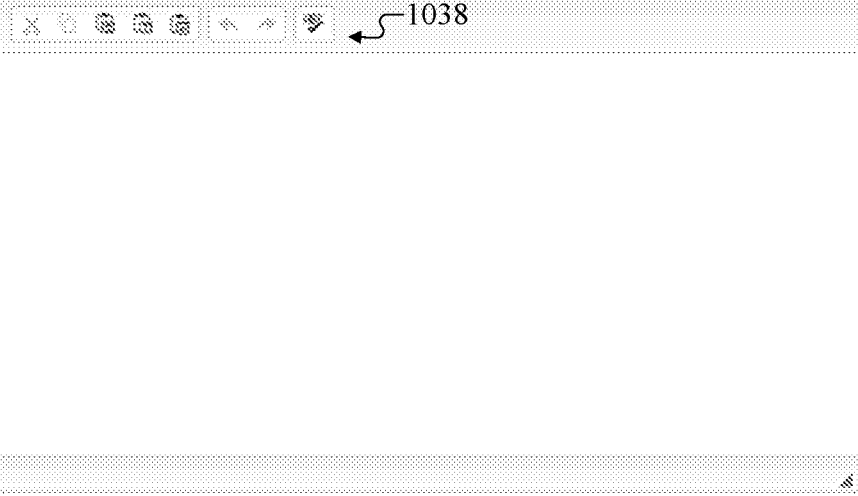
Figure 10C:
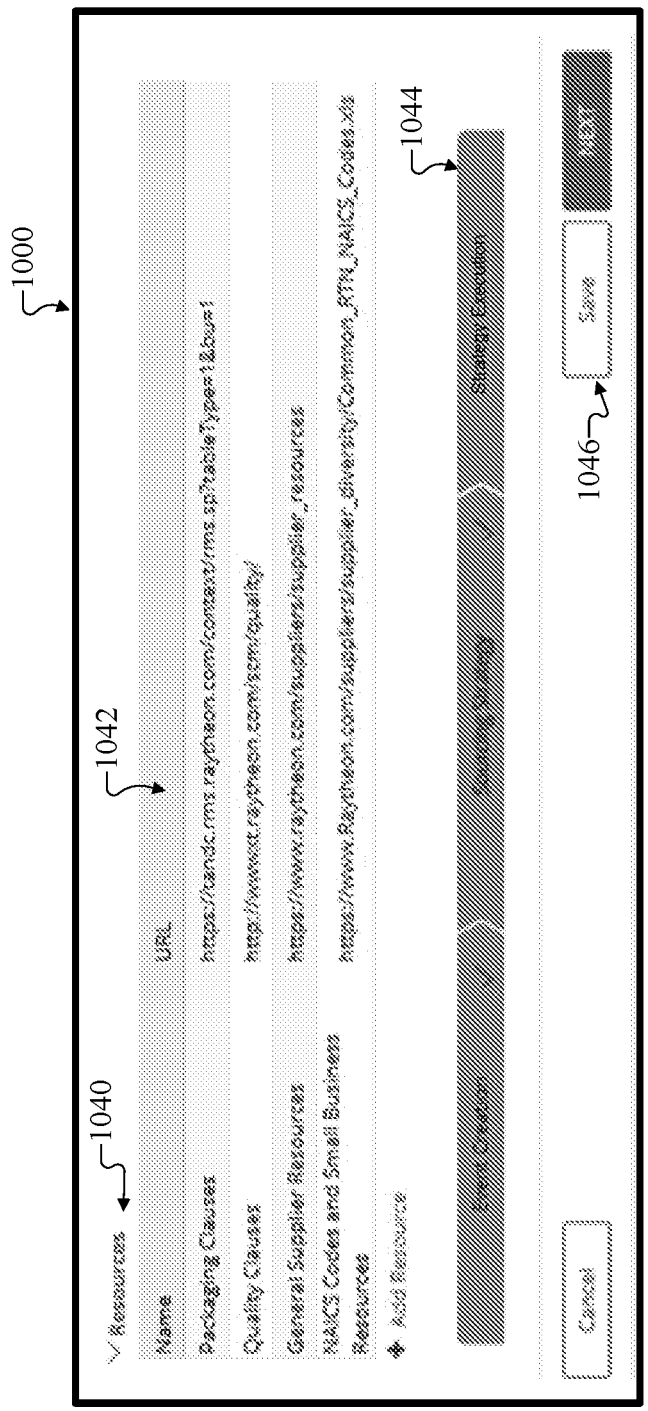

FIGS. 10A through 10C illustrate an example graphical user interface 1000 for obtaining additional RFX-related information in a GUI-based RFX platform according to this disclosure. The graphical user interface 1000 may, for example, represent a user interface that is continuing the "sourcing event creation" process started using the graphical user interface 500 and continued using the graphical user interfaces 700 and 800 described above. For ease of explanation, the graphical user interface 1000 may be described as being provided using the architecture 300 of FIG. 3. However, the graphical user interface 1000 may be provided using any suitable device(s) and in any suitable system(s).

The graphical user interface 1000 here allows users to provide additional RFX-related information, which can be done for all bid groups or for different bid groups that were defined previously. As shown in FIG. 10A, the graphical user interface 1000 includes a general information section 1002, which allows the user to provide various general information about the RFX to be created for at least one bid group. The general information section 1002 includes a drop-down menu 1004 that allows the user to select a revision number for the particular solicitation (RFX) being generated for at least one bid group. The general information section 1002 also includes a text box 1006 that allows the user to provide a textual description for this revision of the RFX. In addition, the general information section 1002 includes a drop-down menu 1008 that allows the user to select any security markings to be used with the RFX being generated, such as proprietary, internal use only, most private, approved for public release, and unrestricted (although these are examples only).

The graphical user interface 1000 also includes a classification section 1010, which includes a drop-down menu 1012 that allows the user to indicate whether the RFX being generated is subject to a U.S. Department of Defense clearance and safeguarding contract security classification (referred to as a DD254 classification). Of course, other classifications may be supported here, or no classification may be needed (in which case the classification section 1010 may be omitted). The graphical user interface 1000 further includes an acquisition strategy section 1014 that includes an identification 1016 of the originating organization's business unit associated with the RFX, which may be based on the selection made using the drop-down menu 511 or 524 above. The acquisition strategy section 1014 also includes a drop-down menu 1018 that allows the user to select a solicitation type (such as competitive or non-competitive) and a drop-down menu 1020 that allows the user to select a particular type of competitive or non-competitive solicitation. For instance, the drop-down menu 1020 may allow the user to select between "best value" or "lowest price" for a competitive solicitation type or "FAR 15.408 compliant", "TINA Not Required—DCS Prime Contract," "TINA Not Required-Competitive Prime," or "TINA Not Required—Pricing Request" for a non-competitive solicitation type. Of course, other solicitation types may be supported here, or the solicitation type may be omitted if not needed.

The acquisition strategy section 1014 further includes a bid instructions subsection 1022. A drop-down menu 1024 allows the user to indicate an execution strategy to be used with at least one bid group. A drop-down menu 1026 allows the user to indicate a number of quantities to be ordered from at least one bid group. A drop-down menu 1028 allows the user to indicate a program/prime contract scope for at least one bid group. Note that the drop-down menus 1024-1028 here may ask for the same types of information as the drop-down menus 542-544 described above. Thus, the drop-down menus 1024-1028 may be pre-positioned to match the options that were previously selected using the drop-down menus 542-544. However, a checkbox 1030 can be selected in order to allow the user to change the options in the drop-down menus 1024-1028 relative to the options that were previously selected using the drop-down menus 542-544. This may be useful, for example, if the user does not want the options selected using the drop-down menus 542-544 to apply to every bid group or every supplier. As a result, the checkbox 1030 can be selected by the user to establish different selections in one or more of the drop-down menus 1024-1028 for a particular bid group or even a particular supplier. As a specific example of this, the user may want some suppliers to receive an RFX that only encompasses the supply of materials for one year at specific quantities, while other suppliers may receive an RFX that encompasses the supply of materials for multiple years at various quantities.

As shown in FIG. 10B, the bid instructions subsection 1022 also includes a textual description 1032 describing the specific acquisition scenario defined by the selections in the drop-down menus 1024-1028. This information can be pre-defined and can vary based the specific acquisition scenario associated with an RFX being generated. In some cases, this information need not be provided to any suppliers and might only be presented to the user for use in ensuring that the appropriate acquisition scenario has been selected by the user. As a particular example, the textual description 1032 may be useful in helping users understand regulatory and other requirements that apply to the RFX being generated.

The graphical user interface 1000 further includes a proposed assumption and additional flowdowns section 1034, which allows the user to define requirements to be applied to the suppliers who receive an RFX being generated. For example, this section 1034 can be used to identify portions of an initial customer RFX that need to flow down and be applied to any suppliers who work under the initial customer RFX. The section 1034 here includes a text box 1036 in which the requirements can be included, along with controls 1038 that (among other things) may allow the user to select one or more portions of the initial customer RFX to be copied into the text box 1036.

As shown in FIG. 10C, the graphical user interface 1000 additionally includes a resources section 1040, which can be used by the user to identify various RFX-related information that can be accessed using a web browser or other device by suppliers. In this example, the resources section 1040 includes a list 1042 of currently-defined resources, each of which is identified using name and a uniform resource locator (URL). The user may select an "Add Resource" link in order to provide the name and URL of an additional resource, and the user may select an existing resource (such as by double-clicking the resource) to edit or delete the resource. An event timeline 1044 illustrates the different stages of the sourcing event creation process (which can match the stages shown in the graphical representation 505) and can identify the current stage of the sourcing event creation process, along with an identification of the previously-completed stages. Controls 1046 can be used to save the information obtained at that point through the graphical user interface 1000, proceed to the next step of the process, or cancel the process.

Using the graphical user interface 1000, the user is able to provide additional information that is useful in the generation of one or more RFXs for one or more bid groups. For instance, the user can verify or alter inputs that affect the acquisition strategy being used for one, some, or all bid groups. As described below, the acquisition strategy can also be used during later analyses, such as to perform auto-compliance in order to verify whether a supplier's RFX response complies with all governmental or other requirements.

Although FIGS. 10A through 10C illustrate one example of a graphical user interface 1000 for obtaining additional RFX-related information in a GUI-based RFX platform, various changes may be made to FIGS. 10A through 10C. For example, the content, layout, and arrangement of the graphical user interface 1000 are for illustration only. Also, while certain I/O mechanisms (such as lists, text boxes, drop-down menus, checkboxes, and links) are shown here, the graphical user interface 1000 may support the use of any suitable I/O mechanisms to obtain data from or provide data to users.

Figure 11A:
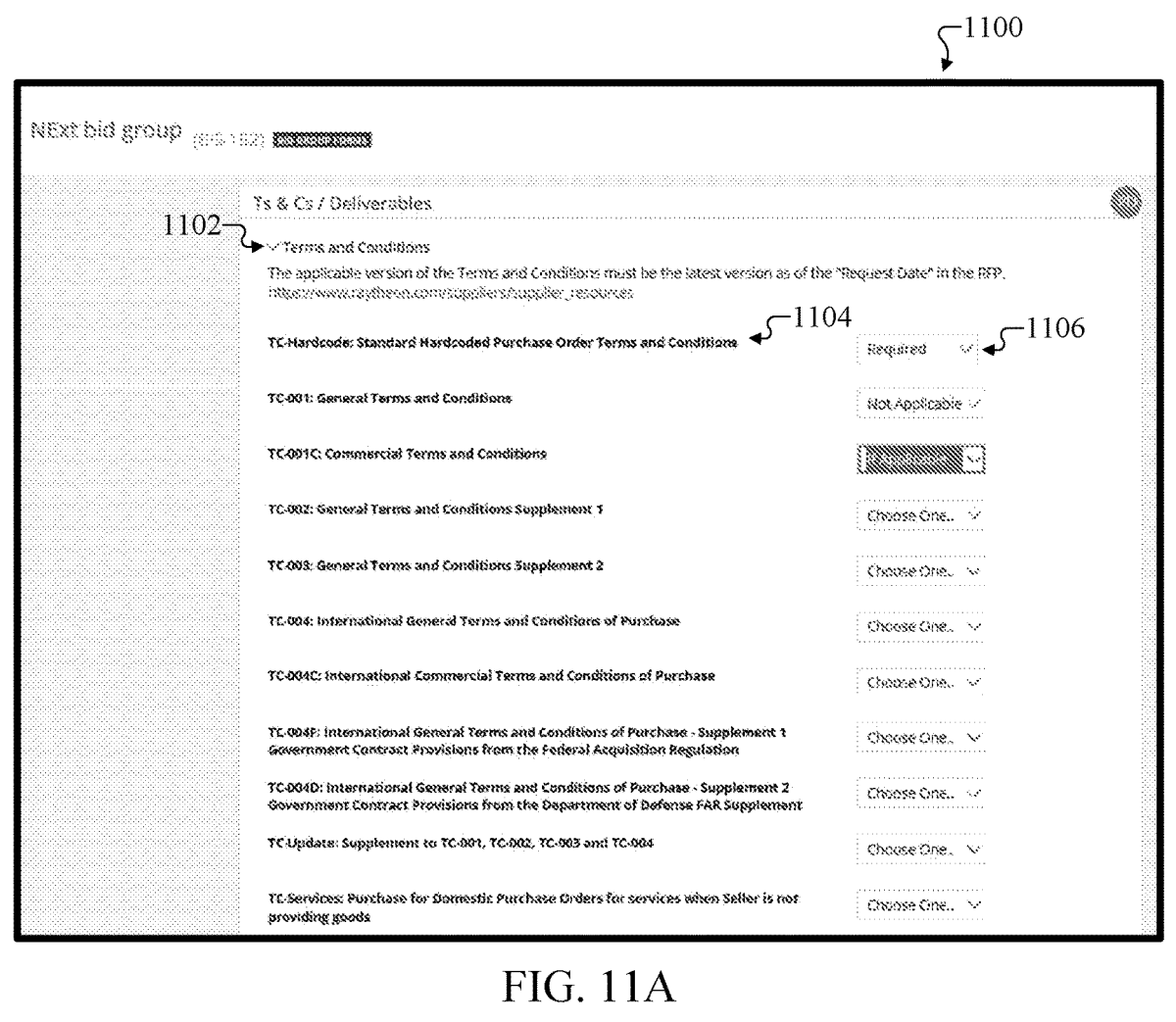
Figure 11C:
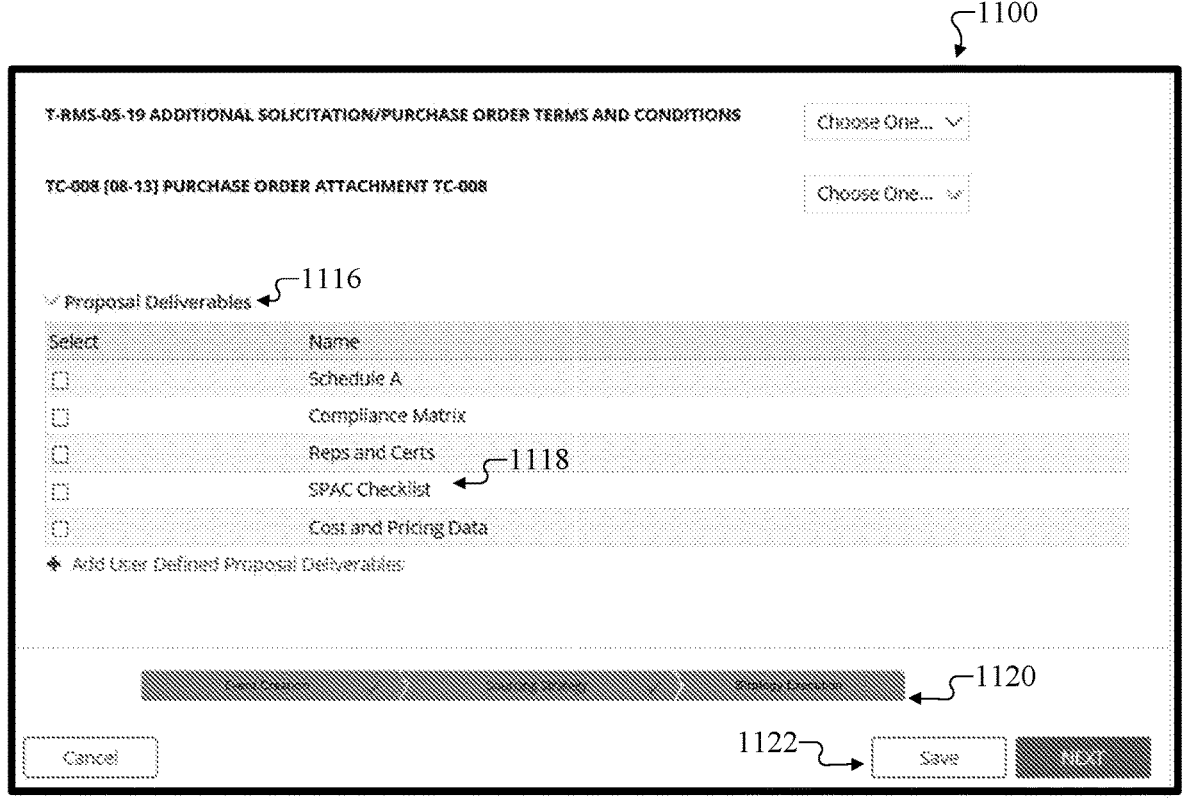

FIGS. 11A through 11C illustrate an example graphical user interface 1100 for selecting RFX-related terms and conditions in a GUI-based RFX platform according to this disclosure. The graphical user interface 1100 may, for example, represent a user interface that is continuing the "sourcing event creation" process started using the graphical user interface 500 and continued using the graphical user interfaces 700, 800, and 1000 described above. For ease of explanation, the graphical user interface 1100 may be described as being provided using the architecture 300 of FIG. 3. However, the graphical user interface 1100 may be provided using any other suitable device(s) and in any other suitable system(s).

The graphical user interface 1100 here allows users to select additional terms and conditions and identify documentary requirements to be applied to the suppliers in at least one bid group that will receive an RFX. As shown in FIG. 11A, the graphical user interface 1100 includes a terms and conditions (Ts & Cs) section 1102, which allows the user to select which sets of terms and conditions apply to a specific RFX being generated. In the context of government contractors, for example, there are often fixed sets of terms and conditions that can be applied in different situations, or an originating organization may have its own standard or custom sets of terms and conditions to be applied in different situations. The section 1102 includes various identifiers 1104, which identify the different sets of terms and conditions that might be applied to an RFX. In some cases, the identifiers 1104 may function as links (or a link can be provided elsewhere in the terms and conditions section 1102) so that the user can select the link(s) and view the associated terms and conditions. The section 1102 also includes drop-down menus 1106 that allow the user to indicate whether the different sets of terms and conditions should be included in an RFX. For example, each drop-down menu 1106 may allow the user to indicate whether an associated set of terms and conditions is required, not applicable, or may be applicable depending on the supplier's response. Note that in some embodiments, the user may need to make a selection in every drop-down menu 1106 before proceeding.

As shown in FIG. 11B, the graphical user interface 1100 also includes a required forms section 1108, which allows the user to select which forms may need to be provided by each supplier in at least one bid group. The section 1108 includes various identifiers 1110, which identify different forms that might be required from each supplier. In some cases, the identifiers 1110 may function as links (or a link can be provided elsewhere in the required forms section 1108) so that the user can select the link(s) and view the associated form(s) or information describing when the associated form(s) may be required. The section 1108 also includes drop-down menus 1112 that allow the user to indicate whether the different forms are needed from the suppliers. For example, each drop-down menu 1112 may allow the user to indicate whether an associated form is required, not applicable, or may be applicable depending on the supplier's response. Note that in some embodiments, the user may need to make a selection in every drop-down menu 1112 before proceeding.

As shown in FIG. 11C, the graphical user interface 1100 further includes a proposed deliverables section 1116, which can be used to identify specific contents to be included in each supplier's RFX response or otherwise received from each supplier in at least one bid group. For example, a list 1118 of possible contents can be provided with checkboxes, thereby allowing the user to select specific contents. An "Add User Defined Proposal Deliverables" link can also be selected to allow the user to create a custom deliverable. An event timeline 1120 illustrates the different stages of the sourcing event creation process (which can match the stages shown in the graphical representation 505) and can identify the current stage of the sourcing event creation process, along with an identification of the previously-completed stages. Controls 1122 can be used to save the information obtained at that point through the graphical user interface 1100, proceed to the next step of the process, or cancel the process.

Using the graphical user interface 1100, the user is able to quickly and easily identify which of numerous terms, conditions, forms, required deliverables, and other information are associated with one or more RFXs for one or more bid groups. This can help to ensure that appropriate contents are included in RFXs sent to one or more bid groups. Also, at least some of this information can be used during later analyses, such as to perform auto-compliance in order to verify whether a supplier's RFX response accepts all necessary terms and conditions, agrees to all form requirements, and contains all required deliverables.

Although FIGS. 11A through 11C illustrate one example of a graphical user interface 1100 for selecting RFX-related terms and conditions in a GUI-based RFX platform, various changes may be made to FIGS. 11A through 11C. For example, the content, layout, and arrangement of the graphical user interface 1100 are for illustration only. Also, while certain I/O mechanisms (such as lists, text boxes, drop-down menus, checkboxes, and links) are shown here, the graphical user interface 1100 may support the use of any suitable I/O mechanisms to obtain data from or provide data to users.

Figure 12B:
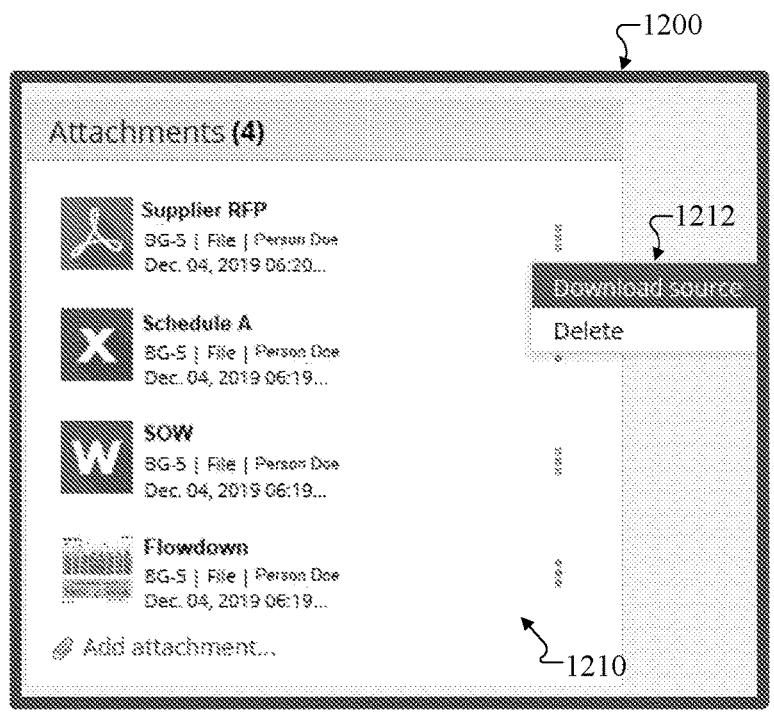

FIGS. 12A and 12B illustrate an example graphical user interface 1200 for uploading additional RFX-related documentation in a GUI-based RFX platform according to this disclosure. The graphical user interface 1200 may, for example, represent a user interface that is continuing the "sourcing event creation" process started using the graphical user interface 500 and continued using the graphical user interfaces 700, 800, 1000, and 1100 described above. For ease of explanation, the graphical user interface 1200 may be described as being provided using the architecture 300 of FIG. 3. However, the graphical user interface 1200 may be provided using any other suitable device(s) and in any other suitable system(s).

As shown in FIG. 12A, the graphical user interface 1200 allows the user to upload desired documents for inclusion (as attachments) with at least one RFX being generated for at least one bid group. In FIG. 12A, the graphical user interface 1200 includes an area 1202 where the user can drag-and-drop one or more files to be uploaded, and the graphical user interface 1200 includes a button 1204 that allows the user to browse for one or more files to be uploaded. Commands 1206 can be used to initiate upload of any identified file(s) or to cancel the upload.

As shown in FIG. 12B, once one or more files are uploaded, the graphical user interface 1200 can present a list 1210 of files that have been uploaded for attachment to at least one RFX. The user can also invoke various functions via a pop-up menu, such as downloading an uploaded file or deleting an uploaded file. This allows, for example, the user to easily control which attachments are included with at least one RFX being generated for at least one bid group.

Although FIGS. 12A and 12B illustrate one example of a graphical user interface 1200 for uploading additional RFX-related documentation in a GUI-based RFX platform, various changes may be made to FIGS. 12A and 12B. For example, the content, layout, and arrangement of the graphical user interface 1200 are for illustration only. Also, while certain I/O mechanisms (such as drag-and-drop inputs, buttons, lists, and pop-up menus) are shown here, the graphical user interface 1200 may support the use of any suitable I/O mechanisms to obtain data from or provide data to users.

Figure 13B:

FIGS. 13A through 13C illustrate an example RFX 1300 generated using a GUI-based RFX platform according to this disclosure. The RFX 1300 may, for example, be generated after the user has provided all necessary information to the application server 112 or architecture 300 using the various graphical user interfaces 700, 800, 1000, 1100, 1200 described above. The information provided by the user via these user interfaces can be used, along with any additional information as needed or desired, to generate at least one RFX 1300 for at least one bid group. For ease of explanation, the RFX 1300 may be described as being generated using the architecture 300 of FIG. 3. However, the RFX 1300 may be generated using any other suitable device(s) and in any other suitable system(s).

As shown in FIGS. 13A through 13C, the contents of the RFX 1300 rely heavily on the information entered via the various graphical user interfaces described above. In this example, the RFX 1300 includes a summary section 1302 that provides high-level information associated with the RFX 1300. The high-level information may include the associated business unit or other subdivision of the originating organization, the date and time of the creation of the RFX 1300, the RFX number, the revision number, and the revision summary. The RFX 1300 also includes a contact information section 1304, which provides contact information for the originating organization that issues the RFX 1300 and for the supplier that receives the RFX 1300. The RFX 1300 further includes a general solicitation information section 1306, classification section 1308, and bid instructions section 1310. These sections 1306, 1308, and 1310 can contain various information and options selected by the user as described above.

An acquisition strategy section 1312 generally describes the acquisition strategy being used by the originating organization. In this example, the acquisition strategy section 1312 relates to the adherence to regulatory requirements for complex procurement scenarios. Here, this is associated with the timing and number of material or service orders, whether certain government reporting thresholds are expected to be met, what types of cost information may need to be provided by the supplier, and whether BOM consolidation is permitted or required. In some embodiments, the information presented in the acquisition strategy section 1312 can be based on information from an acquisition strategy matrix, an example of which is described below: The information here is based on the specific acquisition strategy that is identified above based on the user's selections in the drop-down menus 542-544 or 1024-1028 for the specific supplier that is receiving the RFX 1300. Note, however, that the contents of the acquisition strategy section 1312 can vary, such as based on whether the originating organization is or is not a government contractor and based on any specific acquisition strategies that the originating organization may choose to support.

An additional flowdowns section 1314 identifies any proposed assumptions and flowdowns indicated by the user. A terms and conditions section 1316 identifies any sets of terms and conditions indicated by the user as being required, and a required forms section 1318 identifies any forms indicated by the user as being required. An attachments section 1320 identifies any attachments provided by the user, and a general terms section 1322 can include any general contract terms or other content desired by the originating organization. A resources section 1324 identifies any resources identified by the user, and a proposed deliverables section 1326 identifies any proposed deliverables indicated by the user as being required.

The RFX 1300 here can be generated to have any suitable form. For example, the RFX 1300) may be generated as an electronic Portable Document Format (PDF) file with embedded links for various contents, such as links to terms and conditions, required forms, attachments, or resources. Of course, the RFX 1300 can be generated in any suitable format. Note that the RFX 1300 here can be tailored to a specific supplier, and different RFXs 1300 can be tailored for different suppliers (including suppliers in the same bid group). Also note that contents such as the bid instructions section 1310 and the acquisition strategy section 1312 can easily vary between different bid groups. In this way, the GUI-based RFX platform can support the generation of a large number of RFXs 1300 that are tailored for specific bid groups and for specific suppliers in those bid groups.

Although FIGS. 13A through 13C illustrate one example of an RFX 1300 generated using a GUI-based RFX platform, various changes may be made to FIGS. 13A through 13C. For example, the content, layout, and arrangement of the RFX 1300 are for illustration only.

FIG. 14 illustrates an example acquisition strategy matrix 1400 used in a GUI-based RFX platform according to this disclosure. The acquisition strategy matrix 1400 can be used, among other things, to identify the acquisition strategy described in the acquisition strategy section 1312 of an RFX 1300 that is generated. Also, in some cases, the acquisition strategy can be determined or be based on the user's selections in the drop-down menus 542-544 or 1024-1028.

As shown in FIG. 14, each row of the acquisition strategy matrix 1400 identifies a different acquisition scenario that might be used to procure materials or services from one or more suppliers in at least one bid group. In this example, each acquisition scenario is identified using a scenario code 1402, which uniquely identifies that acquisition scenario. Each acquisition scenario is defined using three characteristics in this example, namely a number of years or other time periods 1404, a number of quantities 1406, and a number of prime contracts 1408. The number of years or other time periods 1404 indicates the overall length of time that orders for materials or services are expected to be placed by the originating organization. The number of quantities 1406 indicates how many orders for different quantities of materials or services are expected to be placed by the originating organization. The number of prime contracts 1408 indicates how many contracts or projects will be supported or will use the materials or services.

Each acquisition scenario is also associated with information 1410 indicating how one or more thresholds (such as FAR 15.4 reporting thresholds) are determined for that acquisition scenario. Each acquisition scenario is further associated with information 1412 indicating whether a cost element breakdown consolidation is needed in cost or pricing data provided by suppliers in any RFX response associated with that acquisition scenario. In addition, each acquisition scenario is associated with information 1414 indicating whether bill of materials consolidation is needed in cost or pricing data provided by suppliers in any RFX response associated with that acquisition scenario. In this example, the information 1410, information 1412, and information 1414 can vary based on a number of factors, including the originating organization that is providing the RFX and its interpretation of the applicable regulations. As a result, specific conditions are omitted here for the thresholds, cost element breakdown consolidation, and bill of materials consolidation, since they will routinely vary across originating organizations and across industries.

In some embodiments, the acquisition strategy matrix 1400 can be accessed by a user, and the user can determine the most appropriate acquisition scenario to be applied to an RFX being generated. In this case, the user may provide options via the drop-down menus 542-544 or 1024-1028 to identify the execution strategy, quantity, and program/prime contract scope that are appropriate given the expected acquisition scenario for at least one bid group. In other embodiments, the application server 112 may use a trained machine learning model or other logic to scrape information from an initial customer RFX and make a determination as to the most appropriate acquisition scenario for given materials (which may or may not be approved by the user). In that case, the application server 112 may auto-populate the drop-down menus 542-544 or 1024-1028 to identify the execution strategy, quantity, and program/prime contract scope that are estimated to be appropriate given the determined acquisition scenario. If desired, the user may change any of the settings in the drop-down menus 542-544 or 1024-1028 to alter the acquisition scenario when desired.

Although FIG. 14 illustrates one example of an acquisition strategy matrix 1400 used in a GUI-based RFX platform, various changes may be made to FIG. 14. For example, the acquisition strategies shown in FIG. 14 are for illustration only and can vary as needed or desired, such as based on the types of agreements typically entered into for a given originating organization or a given industry. Also, the characteristics used to distinguish between the acquisition strategies can vary as needed or desired.

Overall, the graphical user interfaces, visualizations, matrices, and other functions described above with reference to FIGS. 5A through 14 can be used with a GUI-based RFX platform to facilitate more efficient and accurate generation of RFXs and more efficient and accurate performance of various associated operations. Users are able to access desired graphical user interfaces, track tasks to be performed, perform tasks related to RFX generation, and control the generation of finalized RFXs for suppliers in a simplified manner. Moreover, users can do this across multiple RFX processes, stopping and starting the RFX processes for different programs, projects, and products as needed or desired. Further, machine learning can be leveraged in various areas to scrape data, prepopulate inputs, verify user selections, and perform other functions. As a result, this approach greatly simplifies the generation and management of RFXs, which can be extremely useful to a number of organizations and governments. In addition, functions such as BOM characterization and visualization can be used to support a number of additional non-RFX-related functions while providing improved usability.

FIGS. 15A through 15K illustrate an example graphical user interface 1500 for providing an RFX response in a GUI-based RFX platform according to this disclosure. For example, the graphical user interface 1500 may be used by a supplier to review one or more RFXs from an originating organization and to provide a supplier response to at least one of those RFXs. For ease of explanation, the graphical user interface 1500 may be described as being provided using the architecture 300 of FIG. 3. However, the graphical user interface 1500 may be provided using any suitable device(s) and in any suitable system(s).

In some embodiments, the graphical user interface 1500 can be presented to a user associated with a supplier after the user logs into a suitable system, such as through a portal of the originating organization. The suppliers' users may, for example, need to provide a username and password to log into the GUI-based RFX platform and review/respond to RFXs.

Figure 15A:
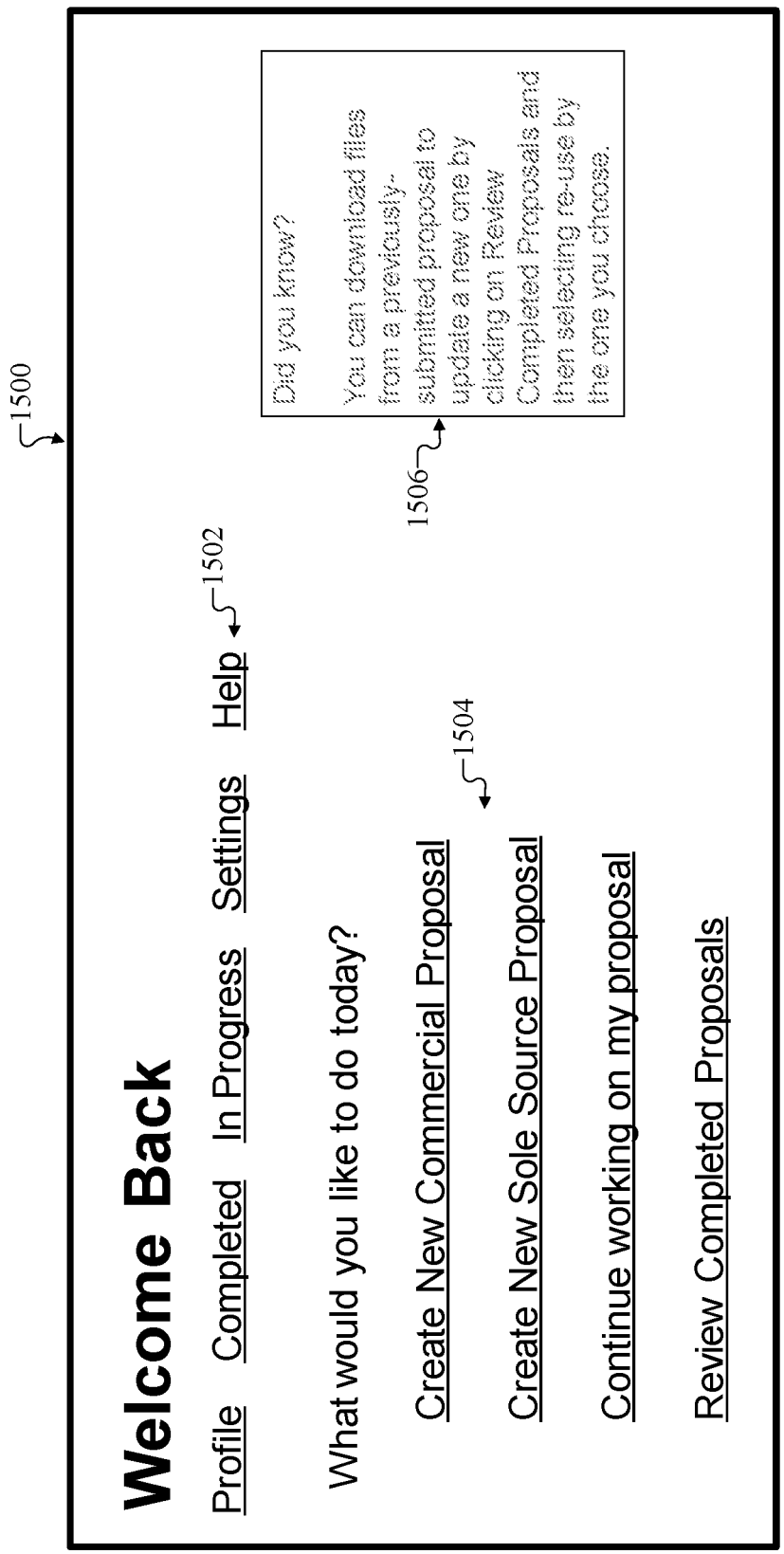

As shown in FIG. 15A, the graphical user interface 1500 is presenting a home screen to the user, where the home screen includes a list 1502 of functions that can be invoked by the user. The functions in the list 1502 may include reviewing or updating the supplier's profile (such as the supplier's contact information and an identification of authorized users), reviewing completed tasks, reviewing in-progress (incomplete) tasks, reviewing or updating user settings (such as email or phone number), and requesting help (such as via telephone or email). The home screen also includes a list 1504 of possible RFX-related functions that could be invoked by the user. The commands in the list 1504 may include creating different types of RFX responses (such as simple price bids or cost proposals), continuing with work on an existing proposal, and reviewing completed proposals. In addition, the home screen may optionally provide a helpful tip 1506, which might be based on the user's previous interactions with the GUI-based RFX platform.

Assume the user selects the option in the list 1504 to create a new sole source proposal, meaning the user wishes to prepare a response to a specific RFX. The graphical user interface 1500 can then present the user with content as shown in FIG. 15B, which includes an explanation 1508 that the supplier needs to complete a proposal coversheet. The graphical user interface 1500 also includes options 1510 for importing data about the supplier to be included in a coversheet or for allowing the user to create the coversheet manually. Selecting the import option 1510 may allow the RFX platform to retrieve known supplier information and to prepopulate a coversheet, which may then be reviewed, revised, and approved by the user. The completed coversheet may contain various information, such as information about the supplier and general information about the RFX response being submitted by the supplier. The RFX platform can analyze the coversheet as submitted by the user, such as with a trained machine learning model or other logic, to identify any issues that might cause the coversheet to be considered non-compliant. Any identified non-compliance issues can be presented to the user for rectification by the user.

Figure 15C:
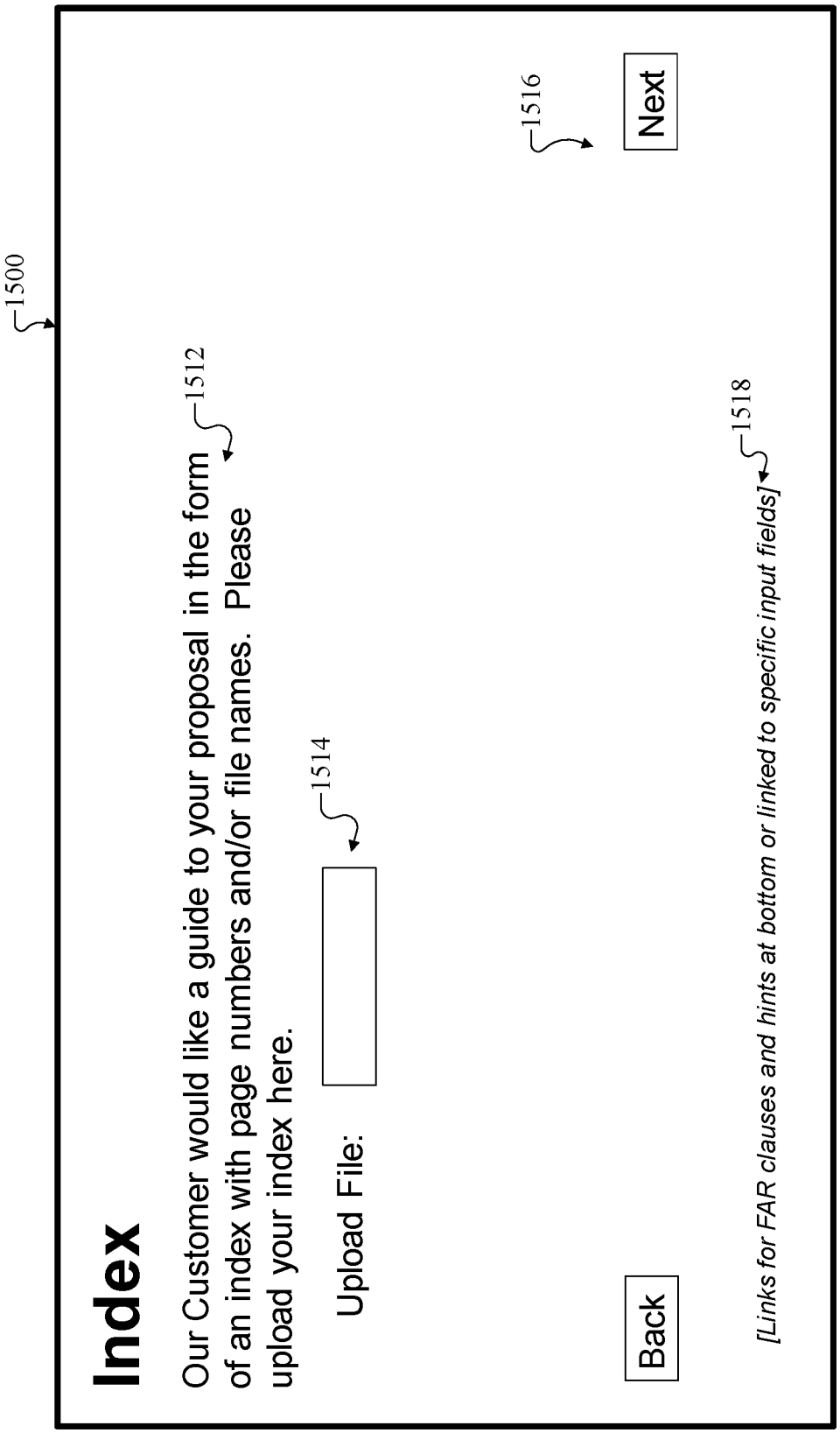

As shown in FIG. 15C, the graphical user interface 1500 then requests that the user provide an index for the RFX response being submitted. Here, the graphical user interface 1500 provides an explanation 1512 for the index and provides one or more options 1514 for obtaining the index, such as via drag-and-drop or file browsing. Controls 1516 can be used to continue or go back within the graphical user interface 1500, and information 1518 (such as explanations for the specific content being requested, hints, or links to useful information) may be provided. In the remaining discussion of the graphical user interface 1500, the controls 1516 and information 1518 are included in additional figures but not described again.

As shown in FIG. 15D, the graphical user interface 1500 next requests that the user provide cost information about materials that the supplier proposes providing to the originating organization under a received RFX. In this example, the graphical user interface 1500 provides an explanation 1520 for the requested information. The graphical user interface 1500 also provides a number of text boxes 1522 that can be manually filled in by the user, along with controls 1524 for uploading spreadsheet information related to each material. Here, the text boxes 1522 allow the user to identify, for each material, a part number, a number of years the supplier wishes to provide the part, and a quantity of parts that the supplier wishes to provide. A note 1526 is also provided to indicate that the user can download a spreadsheet template in which to enter this information, and one or more controls 1528 allow the user to upload a completed spreadsheet file, such as via drag-and-drop or file browsing.

As shown in FIG. 15E, the graphical user interface 1500 next requests that the user provide a BOM for each individual part previously identified in FIG. 15D. Here, the graphical user interface 1500 can present a list 1530 identifying each part previously identified by the user (either manually or via spreadsheet upload). The graphical user interface 1500 also presents one or more controls 1532 that allow the user to upload a BOM for each associated part, such as via drag-and-drop or file browsing. An explanation 1534 also requests that the user provide a consolidated BOM for all parts, and one or more controls 1538 allow the user to upload a consolidated BOM, such as via drag-and-drop or file browsing. If the supplier is unable or unwilling to provide any of the requested information, a text box 1540 allows the user to identify the reason(s).

As shown in FIG. 15F, the graphical user interface 1500 then provides the user with an explanation 1542 that the supplier needs to complete a checklist 1544 related to the materials portion of the supplier's RFX response. Here, the checklist 1544 asks whether the supplier has provided certain information or taken certain steps as they relate to the materials portion of the supplier's RFX response. For each item in the checklist 1544, the user can answer yes or no and provide any comments about the user's answer. In some cases, an explanation is optional for each yes answer and required for each no answer.

As shown in FIG. 15G, the graphical user interface 1500 next requests that the user provide labor-related information for the supplier's RFX response. Here, the graphical user interface 1500 includes an explanation 1546 for the requested labor-related information, and the graphical user interface 1500 includes a number of requests 1548 for specific labor-related information. For each request 1548, the graphical user interface 1500 provides one or more controls 1550 for uploading the requested information, such as via drag-and-drop or file browsing. The graphical user interface 1500 also provides a checklist 1552 related to the labor portion of the supplier's RFX response. Here, the checklist 1552 asks whether the supplier has provided certain information or taken certain steps as they relate to the labor portion of the supplier's RFX response. For each item in the checklist 1552, the user can answer yes or no and provide any comments about the user's answer. In some cases, an explanation is optional for each yes answer and required for each no answer.

As shown in FIG. 15H, the graphical user interface 1500 next requests that the user provide rate-related information for the supplier's RFX response. Here, the graphical user interface 1500 includes an explanation 1554 of the requested rate-related information and one or more controls 1556 for uploading the requested rate-related information, such as via drag-and-drop or file browsing. The graphical user interface 1500 also provides a checklist 1558 related to the rate portion of the supplier's RFX response. Here, the checklist 1558 asks whether the supplier has provided certain information or taken certain steps as they relate to the rate portion of the supplier's RFX response. For each item in the checklist 1558, the user can answer yes or no and provide any comments about the user's answer. In some cases, an explanation is optional for each yes answer and required for each no answer.

As shown in FIG. 15I, the graphical user interface 1500 then requests that the user provide other direct cost (ODC)-related information for the supplier's RFX response. Here, the graphical user interface 1500 includes an explanation 1560 for the requested ODC-related information and one or more controls 1562 for uploading the requested ODC-related information, such as via drag-and-drop or file browsing. The graphical user interface 1500 also provides a checklist 1564 related to the ODC portion of the supplier's RFX response. Here, the checklist 1564 asks whether the supplier has provided certain information or taken certain steps as they relate to the ODC portion of the supplier's RFX response. For each item in the checklist 1564, the user can answer yes or no and provide any comments about the user's answer. In some cases, an explanation is optional for each yes answer and required for each no answer.

As shown in FIG. 15J, the graphical user interface 1500 next requests that the user provide non-recurring engineering (NRE) cost-related information for the supplier's RFX response. Here, the graphical user interface 1500 includes an explanation 1566 for the requested NRE cost-related information and a control 1568 that allows the user to indicate whether NRE cost-related information is being submitted as part of the RFX response. If so, a checklist 1570 can be completed by the user, and one or more controls 1572 can be provided for uploading the requested NRE cost-related information, such as via drag-and-drop or file browsing.

Another checklist 1574 is provided requesting general information about the proposal and how it is being submitted. Here, each checklist 1570) and 1574 asks whether the supplier has provided certain information or taken certain steps as they relate to the NRE portion of the supplier's RFX response or to the supplier's RFX response generally. For each item in the checklists 1570 and 1574, the user can answer yes or no and provide any comments about the user's answer. In some cases, an explanation is optional for each yes answer and required for each no answer.

As shown in FIG. 15K, once the user has provided all information for the RFX response, the graphical user interface 1500 provides the user with an opportunity to electronically sign and submit the RFX response. Here, the graphical user interface 1500 provides an explanation 1576 to the user indicating that the user is signing the RFX response and certifying the data being submitted. A section 1578 of the graphical user interface 1500 allows the user to type his or her name, provide an electronic signature, and optionally provide a date (although the date may auto-fill to the current date). The user can select a submit button 1580 in order to officially submit the supplier's RFX response to the GUI-based RFX platform.

Although FIGS. 15A through 15K illustrate one example of a graphical user interface 1500 for providing an RFX response in a GUI-based RFX platform, various changes may be made to FIGS. 15A through 15K. For example, the content, layout, and arrangement of the graphical user interface 1500 are for illustration only. Also, while certain I/O mechanisms (such as text boxes, checklists, and buttons) are shown here, the graphical user interface 1500 may support the use of any suitable I/O mechanisms to obtain data from or provide data to users.

Note that a graphical user interface used by a supplier may allow the supplier to perform any number of additional operations involving an RFX response. For example, a graphical user interface may allow a user to review individual elements in an RFX received from an originating organization and to individually accept or not accept the elements in the RFX. A graphical user interface may also allow the user to propose additional or alternative contract terms to the originating organization for negotiation.

Figure 16A:
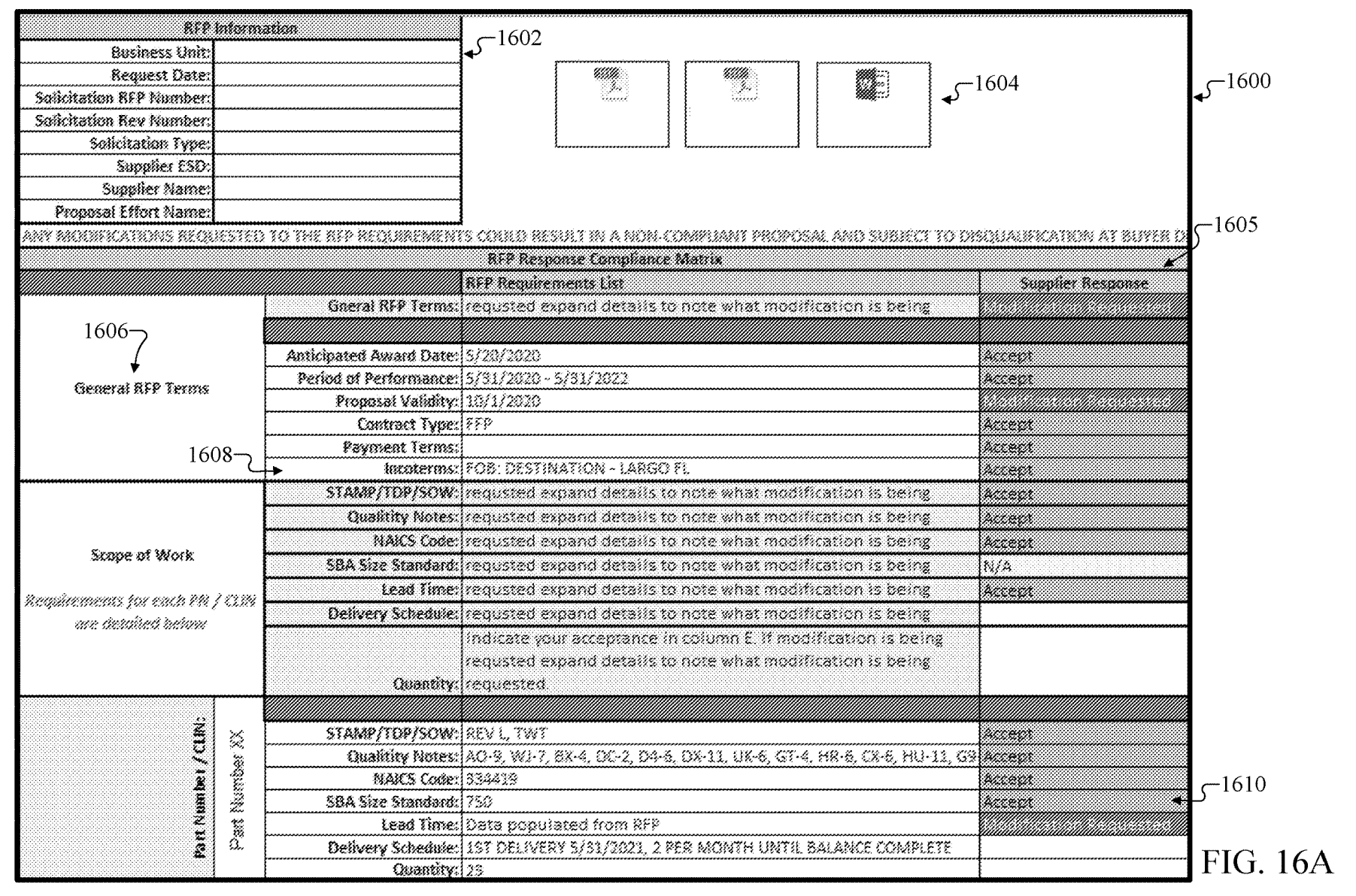
Figure 16B:
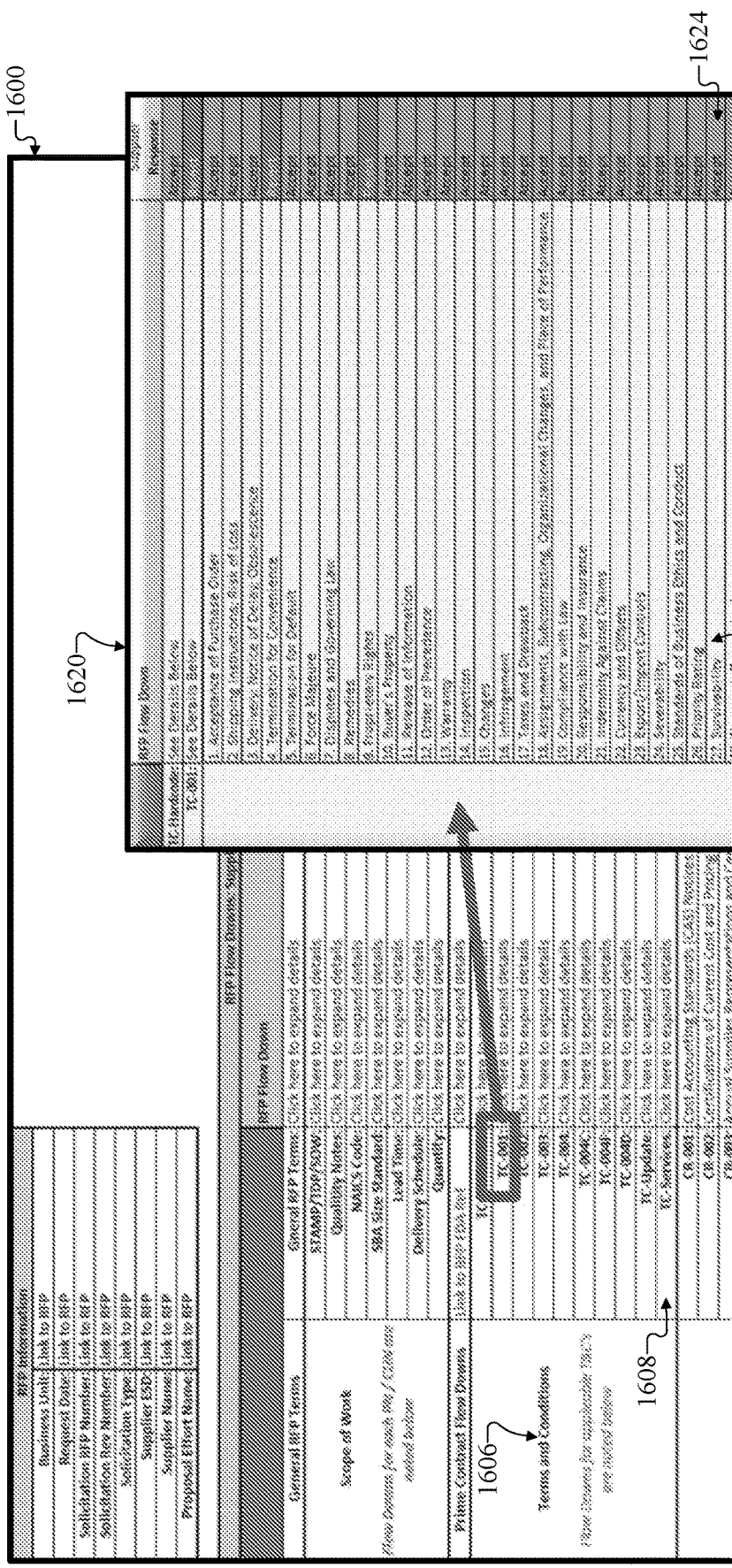

FIGS. 16A and 16B illustrate an example graphical user interface 1600 for providing responses to individual elements of an RFX in a GUI-based RFX platform according to this disclosure. In particular, the graphical user interface 1600 may be used by a supplier to accept or not accept individual elements contained in an RFX from an originating organization. Note that while the graphical user interface 1600 is described here separate from the graphical user interface 1500, the functionality of the graphical user interface 1600 may be incorporated into the graphical user interface 1500, such as at any point prior to submission of a completed RFX response. This may thereby provide a supplier with a single user interface for performing all RFX response-related functions.

As shown in FIG. 16A, the graphical user interface 1600 includes an RFX information section 1602, which provides various non-price information from the RFX response being reviewed by the user. The graphical user interface 1600 also includes an RFX attachment section 1604, which may contain any attachments provided with the RFX by the originating organization. In addition, the graphical user interface 1600 includes an RFX response compliance matrix 1605, which allows the supplier to individually accept or not accept individual elements contained in the RFX. In this example, the RFX elements are divided into groups 1606, where each group 1606 is associated with multiple individual RFX elements 1608. Each individual RFX element 1608 here is identified based on a type of RFX term and a specific value or link to specific information related to that element 1608, which can be extracted from or based on the received RFX. The user may click on each individual element 1608 in order to view information about that element. The user may also use an input 1610 for each element 1608 (such as a drop-down menu) to indicate whether the supplier accepts or does not accept the element 1608. In some cases, for each element 1608, the user may use the associated input 1610 to (i) accept the element 1608, (ii) request modification of the element 1608, or (iii) indicate that the element 1608 is not applicable.

In some instances, a single element 1608 identified in the graphical user interface 1600 may represent a collection of elements from an RFX. For example, one element 1608 in the RFX response compliance matrix 1605 may represent an entire collection of terms and conditions or other elements from the received RFX. In that case, selection of the element 1608 may present the user with a pop-up window 1620 as shown in FIG. 16B. The pop-up window 1620 includes a list 1622 of the various elements associated with the selected element 1608. The pop-up window 1620 also includes an input 1624 (such as a drop-down menu) for each element in the list 1622. In some cases, for each element in the list 1622, the user may use the associated input 1624 to (i) accept the element, (ii) request modification of the element, or (iii) indicate that the element is not applicable.

The graphical user interface 1600 here provides a convenient and efficient mechanism for suppliers to indicate acceptance or non-acceptance of various elements in an RFX. By using different graphical indicators, such as green cells for accepted elements, yellow cells for inapplicable elements, and red cells for modified elements, the graphical user interface 1600 provides a graphical representation of the supplier's responses for different elements of the RFX. A similar type of graphical display can also be generated and presented to one or more users associated with the originating organization that provided the RFX. For example, this same type of graphical display (without controls for changing the supplier responses) can be useful to the originating organization in various ways, such as to quickly and easily identify whether a supplier's response includes any modified RFX elements. When used by the originating organization, the inputs 1610 represent indicators (rather than controls), and the indicators indicate whether the individual elements or groups of elements were accepted in the supplier's response. The indicator for each group of elements can identify whether all individual elements in the group were or were not accepted by the supplier, and the pop-up window 1620 shown in response to a group being selected may be used to display the indicators for the individual elements in the group. Among other things, this can facilitate faster analysis of the supplier's RFX response and easier negotiations with the supplier. In addition, the ability to collect this information allows detailed recordkeeping to occur (such as collection and storage of historical supplier exceptions) and detailed reporting functions to occur, examples of which are provided below.

In some embodiments, the transaction server 306 or the data analytics and visualization system 310 may automatically generate the RFX response compliance matrix 1605 based on the contents of a generated RFX, such as an RFX 1300. For example, a trained machine learning model or other logic may be applied to an RFX 1300 for a particular supplier (or to the information used to generate that RFX 1300) in order to identify the various elements 1608 included in the RFX 1300. That information can then be used to automatically generate the RFX response compliance matrix 1605, which can be presented to the user via the graphical user interface 1600. This provides each supplier with a quick and easy way to accept various portions of an RFX, including the ability to accept portions of the RFX without having to reject larger sections of the RFX. This also provides the originating organization with a simpler mechanism for identifying supplier exceptions to RFX elements.

One way to help support the automatic generation of the RFX response compliance matrix 1605 is to include standardized or predefined elements within RFXs 1300 that are generated using the GUI-based RFX platform, such as elements with standardized or predefined headers or categories. This can be easily accomplished by configuring the GUI-based RFX platform to include these standardized or predefined elements and headers or categories when generating each RFX 1300, which then allows for the generation of the associated RFX response compliance matrix 1605 based at least partially on the standardized or predefined contents of the RFX 1300.

Although FIGS. 16A and 16B illustrate one example of a graphical user interface 1600 for providing responses to individual elements of an RFX in a GUI-based RFX platform, various changes may be made to FIGS. 16A and 16B. For example, the content, layout, and arrangement of the graphical user interface 1600 are for illustration only. Also, while certain I/O mechanisms (such as links and drop-down menus) are discussed here, the graphical user interface 1600 may support the use of any suitable I/O mechanisms to obtain data from or provide data to users.

Once a supplier's RFX response is received by the GUI-based RFX platform, the RFX platform can perform various functions involving the RFX response. For example, the transaction server 306 or the data analytics and visualization system 310 may perform an initial validation of the RFX response in order to determine whether there are any regulatory requirements or other requirements associated with RFX responses that have not been satisfied by the supplier's RFX response. While manual reviews of supplier RFX responses can be performed, these processes can be time-consuming, and oversights are possible. If a non-compliance issue is missed and later identified, it may take weeks or months for the non-compliance issue to be resolved, which can create significant delays.

FIG. 17 illustrates an example auto-compliance matrix 1700 used in a GUI-based RFX platform according to this disclosure. The auto-compliance matrix 1700 may, for example, be used during the analysis of a supplier's RFX response in order to identify any non-compliance issues with the supplier's RFX response. For ease of explanation, the auto-compliance matrix 1700 may be described as being used by the architecture 300 of FIG. 3. However, the auto-compliance matrix 1700 may be used by any other suitable device(s) and in any other suitable system(s).

As shown in FIG. 17, the auto-compliance matrix 1700 includes a reference 1702, which identifies the specific regulatory or other requirement associated with the illustrated portion of the matrix 1700. The auto-compliance matrix 1700 also includes a question 1704, which identifies the specific question being answered to determine whether an RFX response is compliant. The auto-compliance matrix 1700 further includes a series of sub-question levels 1706a-1706d and resolution levels 1708a-1708d that are used to determine the compliance of the RFX response for the specific question 1704.

In this particular example, the illustrated portion of the auto-compliance matrix 1700 is determining whether an RFX response includes an appropriate profit total. Here, a portion 1710 of the auto-compliance matrix 1700 is used to determine compliance when no profit total is provided in an RFX response. Also, a portion 1712 of the auto-compliance matrix 1700 is used to determine compliance when a numeric profit total greater than zero is provided in an RFX response. In addition, a portion 1714 of the auto-compliance matrix 1700 is used to determine compliance when a numeric profit total less than zero is provided in an RFX response (which may occur in some circumstances). When an RFX response is being analyzed for compliance, machine learning or other logic can be used to extract information from the RFX response, and the transaction server 306 or the data analytics and visualization system 310 can apply at least some of the extracted information to the auto-compliance matrix 1700 in order to make at least an initial determination of whether the RFX response is compliant with various requirements.

This helps to provide an initial compliance review of a supplier's RFX response, which in some cases can be performed immediately upon receipt of the supplier's RFX response. For example, the supplier's RFX response can be processed using machine learning or other logic to map specified elements in the supplier's RFX response to a predefined data dictionary, which can help to convert the supplier's RFX response into normalized data. The normalized data can then be used to determine whether non-compliance issues exist, and the supplier may be notified (possibly immediately) of any identified non-compliance issues. In some embodiments, the supplier may be prevented from submitting a final version of an RFX response to the GUI-based RFX platform for consideration by the originating organization until the RFX response is determined to be compliant. Even if compliance checking is not fully automated here, this significantly reduces the amount of time needed for RFX responses to be placed into suitable form for consideration. This also reduces or eliminates the need to obtain additional information from the supplier later and removes the need for constant training of personnel responsible for compliance checking.

Note that the illustrated portion of the auto-compliance matrix 1700 involves a single requirement from a single reference. However, the auto-compliance matrix 1700 may be easily expanded using the approach shown in FIG. 17 to encompass any number of governmental or other requirements. Also note that different organizations can interpret governmental or other requirements in different ways. Thus, the contents of the auto-compliance matrix 1700 can vary based on a number of factors, including the originating organization that is analyzing RFX responses and its interpretation of the applicable regulations. As a result, the specific sub-question and resolution levels can vary across originating organizations and across industries. In addition, the governmental or other requirements applicable to a particular sourcing event can vary based on the acquisition scenario associated with the sourcing event. Thus, the specific sub-question and resolution levels applied to any particular RFX response can vary based on the acquisition scenario associated with the sourcing event, which can be identified as described above.

Although FIG. 17 illustrates one example of an auto-compliance matrix 1700 used in a GUI-based RFX platform, various changes may be made to FIG. 17. For example, the contents shown in FIG. 17 are for illustration only and can vary as needed or desired, such as based on the types of regulations or other requirements for a given originating organization or a given industry. Also, since the regulatory or other requirements associated with RFX responses can vary based on a number of factors, the sub-questions and resolutions here are provided merely for illustration only. In addition, note that the logic represented by the contents of the matrix 1700 may be implemented in any suitable manner, and the use of an actual table is not necessarily required.

Note that while automated compliance checking is one example of the types of processing that may occur once RFX responses are received, other types of processing may also occur. The processing here can vary widely based on the desired functionality in the GUI-based RFX platform. While the following describes example ways in which RFX responses can be processed or analyzed in order to present results to users, any other or additional processing or analysis of RFX responses may be performed.

Figure 18B:
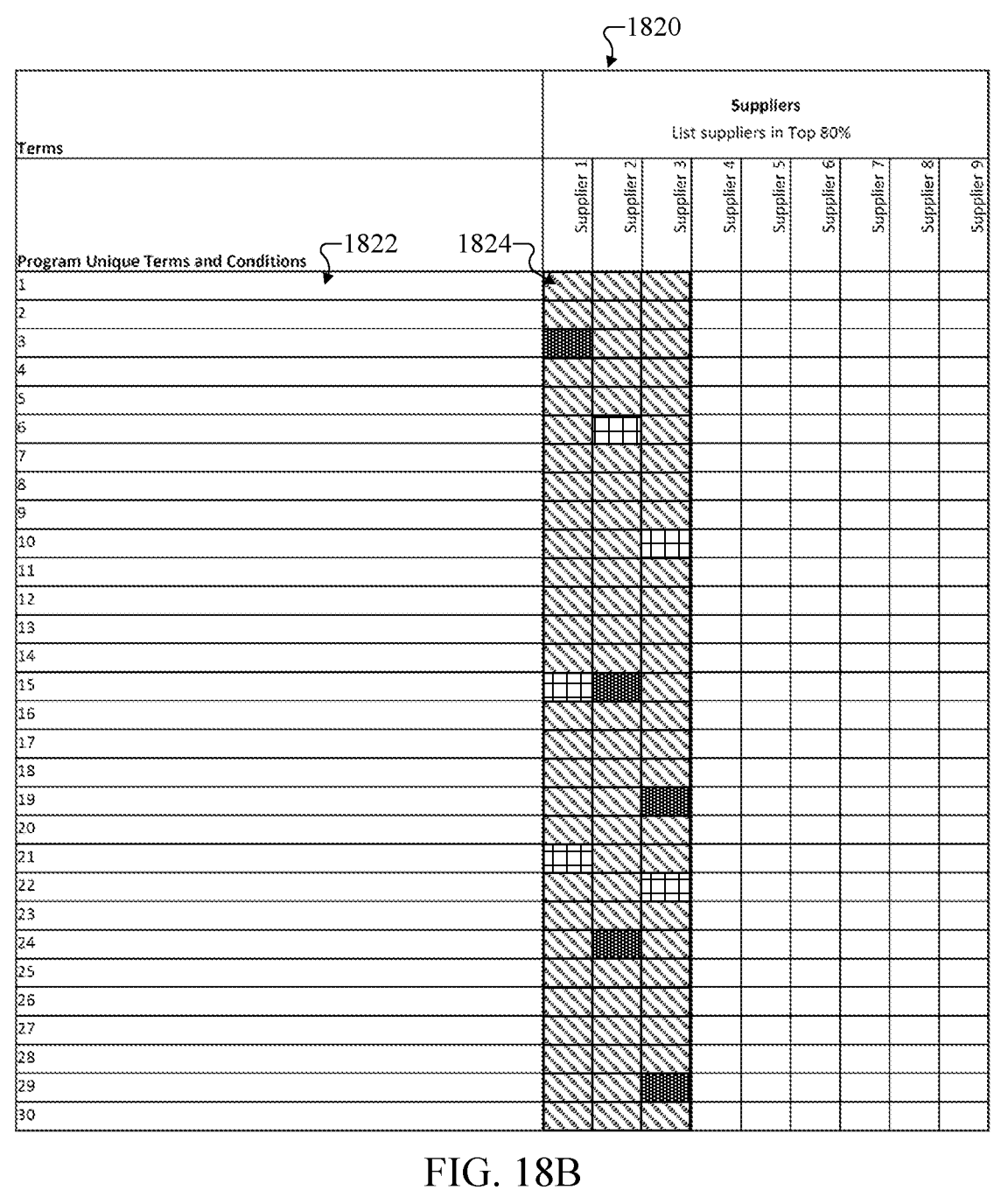

FIGS. 18A through 18C illustrate example visualizations containing exception-related information or other information for RFX responses in a GUI-based RFX platform according to this disclosure. For example, the visualizations shown in FIGS. 18A through 18C may be generated after one or more suppliers have submitted RFX responses using the graphical user interfaces 1500 and 1600. For ease of explanation, the visualizations may be described as being provided using the architecture 300 of FIG. 3. However, the visualizations may be provided using any suitable device(s) and in any suitable system(s).

As shown in FIG. 18A, a visualization 1800 identifies various elements 1802 contained in RFXs sent to various suppliers. In this example, the elements 1802 relate to one set of terms and conditions, although other elements 1802 may be identified here. The visualization 1800 also provides various indicators 1804 indicating whether the responding suppliers accepted, marked as inapplicable, or requested modification of the identified elements 1802. This type of visualization 1800 provides the originating organization with the ability to see any RFX elements that are routinely subject to supplier exceptions. This may be useful, for instance, in excluding suppliers who routinely object to RFX elements that other suppliers do not object to or in revising future RFXs to be sent to suppliers.

As shown in FIG. 18B, a visualization 1820 may have a similar format and purpose as the visualization 1800, except the visualization 1820 relates to unique terms and conditions 1822 associated with a specific program (rather than terms and conditions that might apply across many programs). Again, however, the visualization 1820 provides various indicators 1824 indicating whether responding suppliers accepted, marked as inapplicable, or requested modification of the identified unique terms and conditions 1822 contained in the RFXs.

As shown in FIG. 18C, a visualization 1840 identifies various suppliers and associated risk information about the suppliers, which can be based (at least partially) on the suppliers RFX responses. In FIG. 18C, the visualization 1840 identifies various suppliers 1842 and identifies a type of material or activity 1844 that each supplier 1842 is associated with on a given project. The visualization 1840 also includes various indicators 1846 identifying different types of risks currently or previously associated with each supplier 1842. The visualization 1840 further includes various indicators 1848 identifying different types of risks expected for each supplier 1842 in the current project (such as based on their RFX responses). Here, the different types of risks include risks associated with cost, schedule, adherence to terms and conditions, and performance, although other or additional types of risks may be used here.

If necessary, a risk description 1850 can be provided for each supplier 1842, and a mitigation plan 1852 can be defined for each supplier 1842 to mitigate the associated risk(s). Funding indicators 1854 indicate whether funding for each mitigation plan 1852 has been approved, and (if so) two fields 1856 and 1858 identify by whom and when. Note that this type of visualization 1840 can be generated based on information obtained from various sources beyond the suppliers' RFX responses. However, this type of visualization 1840 is still useful when performing tasks related to analyzing supplier RFX responses, such as when an originating organization is attempting to select suppliers for a project based on their RFX responses (since risks associated with those suppliers can clearly play a role here).

The various visualizations shown in FIGS. 18A through 18C are merely meant to represent example types of visualizations that can be generated based on or associated with suppliers who submit RFX responses. However, numerous other types of visualizations may be generated based on or associated with suppliers who submit RFX responses. Thus, this disclosure is not limited to any specific types of visualizations that are based on or associated with suppliers' RFX responses.

Although FIGS. 18A through 18C illustrate examples of visualizations containing exception-related information or other information for RFX responses in a GUI-based RFX platform, various changes may be made to FIGS. 18A through 18C. For example, the content, layout, and arrangement of the visualizations here are for illustration only.

Figure 19:
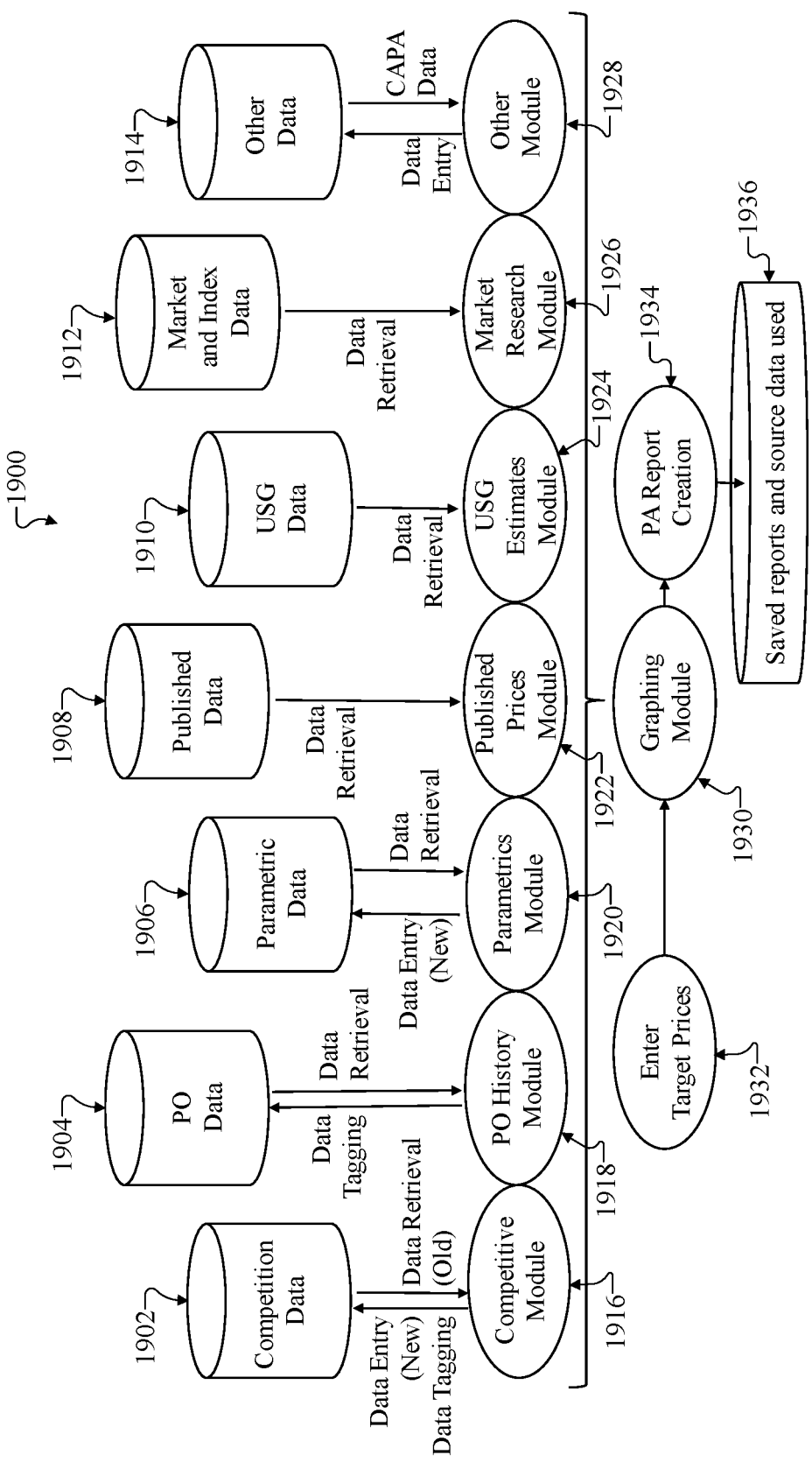
FIG. 19 illustrates an example functional architecture for analysis of RFX responses in a GUI-based RFX platform according to this disclosure.

FIG. 19 illustrates an example functional architecture 1900 for analysis of RFX responses in a GUI-based RFX platform according to this disclosure. For example, the functional architecture 1900 may be used to perform different price analyses based on suppliers RFX responses. For ease of explanation, the functional architecture 1900 may be described as being used within the architecture 300 of FIG. 3. However, the functional architecture 1900 may be used by any other suitable device(s) and in any other suitable system(s).

As shown in FIG. 19, the functional architecture 1900 includes a number of data sources 1902-1914, which may form part of the architecture 300 or functional architecture 1900 or may be accessible by the functional architecture 1900. The data sources 1902-1914 can be used to obtain data related to price analyses for RFX responses. Any suitable data sources 1902-1914 may be used here to obtain any suitable data related to price analyses for RFX responses.

In this particular example, the data source 1902 is used to obtain competition-related data, such as prices associated with multiple suppliers who responded to the same RFX. The data source 1904 is used to obtain purchase order data, such as prices associated with prior purchase orders submitted to suppliers by the originating organization. The data source 1906 is used to obtain parametric data, which may represent pricing information estimated for the future based on past pricing information and one or more mathematical relationships. The data source 1908 is used to obtain published information, such as prices for materials that are similar to materials being sourced in an RFX response under analysis. The data source 1910 is used to obtain data from the U.S. government (USG) or other governmental source. The data source 1912 is used to obtain market and index data, such as catalog prices or other prices charged by competitors or suppliers. The data source 1914 represents any other suitable source of information that might be useful for price analysis.

Various pricing analysis modules 1916-1928 are used to analyze the obtained data in order to generate pricing analyses for RFX responses. Note that in FIG. 19, there is a one-to-one relationship between the data sources 1902-1914 and the pricing analysis modules 1916-1928, although this need not be the case. Any suitable pricing analysis techniques may be supported by the pricing analysis modules 1916-1928.

In this particular example, a competitive pricing module 1916 can compare prices associated with multiple suppliers who responded to the same RFX or similar RFXs issued in the past in order to analyze the prices in a specific RFX response being analyzed. A purchase order history pricing module 1918 can analyze purchase order data, such as prices associated with prior purchase orders submitted to suppliers by the originating organization, in order to determine how those prices compare to the prices in the specific RFX response being analyzed. A parametric pricing module 1920 can generate pricing data using parametric pricing or modeling methods in order to determine how those prices compare to the prices in the specific RFX response being analyzed. A published prices pricing module 1922 can determine prices for similar materials in order to determine how those prices compare to the prices in the specific RFX response being analyzed. A USG estimates pricing module 1924 can determine prices based on data from the U.S. government or other governmental source, which may allow an independent estimate to be generated based on government data for comparison to the prices in the specific RFX response being analyzed. A market research pricing module 1926 can determine publicly-available prices of materials offered by competitors or suppliers in order to determine how those prices compare to the prices in the specific RFX response being analyzed. One or more additional pricing modules 1928 can process any other or additional pricing data to support one or more desired pricing analyses.

Outputs from the pricing analysis modules 1916-1928 are provided to a graphing module 1930, which can generate at least one visualization that includes results from one or more pricing analyses from the pricing analysis modules 1916-1928. For example, the results from the different pricing analyses can be overlaid on the same graph in order to show how the pricing analyses compare to each other. The graphing module 1930 may also optionally receive one or more target prices 1932, which may represent prices from the specific RFX response being analyzed, for presentation in the at least one visualization. One or more outputs from the graphing module 1930 may be provided to a price analysis (PA) report creation function 1934, which can include the visualization(s) in suitable reports or otherwise use the visualization(s) in any suitable manner. In this example, generated visualizations/reports and the source data used for those visualizations/reports can be stored in a repository 1936.

Various techniques for performing price analyses can be used here, and various regulations (such as FAR) allow specific types of price analyses to be used and provided in bid proposals or other submissions to the U.S. government. However, it is common for inconsistent methodologies and formats to exist for price analyses, even when different organizations operate under the same government standards. Also, persistence of data is typically not maintained in many organizations, which can lead to re-work and inconsistency of results when future price analyses are undertaken for the same materials. Further, it often requires significant effort to perform multiple price analyses, and different price analyses may lead to significantly different results being generated. In addition, there is no single user interface that allows for management of multiple layers of data associated with different price analyses in many organizations.

The functional architecture 1900 shown in FIG. 19 supports the use of a standard price analysis report format and helps to ensure that consistent approaches are used. Also, as described below, users can view visualizations of results from price analyses and optionally exclude data from use, and data can be meta-tagged as usable or unusable for future price analyses (with auditable explanations for exclusion). Results and variance explanations can be saved, as well. Moreover, the functional architecture 1900 can support any desired price analysis technique or combination of price analysis techniques in any given situation, including various techniques supported by FAR regulation or other regulations. In addition, as described below, the visualizations of the results from the price analyses are intuitive and can provide for various user controls. The functional architecture 1900 here can be used by various users at various points in time across an originating organization, and the functional architecture 1900 can serve as a single solution for price analysis. Note that while the pricing analysis functionality is described here as forming part of the RFX process, pricing analysis is useful in a number of applications and can be used in any other suitable platform (whether or not related to RFX analysis). If used separate from the GUI-based RFX platform, the architecture 1900 may be used to support any other suitable price analyses.

Although FIG. 19 illustrates one example of a functional architecture 1900 for analysis of RFX responses in a GUI-based RFX platform, various changes may be made to FIG. 19. For example, the functional architecture 1900 may include any suitable number of data sources and any suitable number of pricing modules. Also, pricing analysis results may be used in any other suitable manner.

Figure 20:
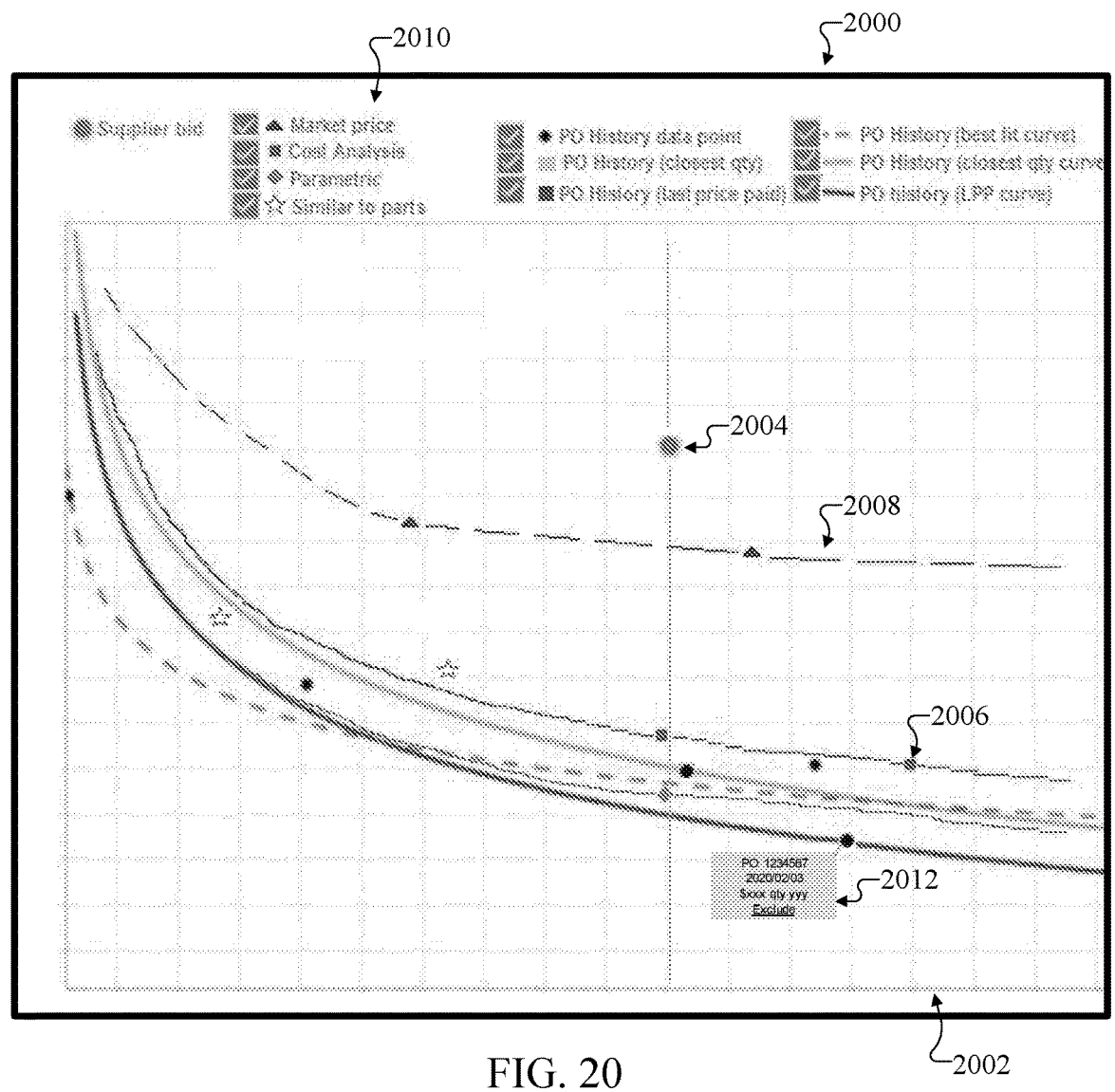
FIG. 20 illustrates an example visualization for providing analysis results involving RFX responses in a GUI-based RFX platform according to this disclosure.

FIG. 20 illustrates an example visualization 2000 for providing analysis results involving RFX responses in a GUI-based RFX platform according to this disclosure. For example, the visualization 2000 shown in FIG. 20 may be generated after the functional architecture 1900 has performed various price analyses for a specific RFX being analyzed. For ease of explanation, the visualization 2000 may be described as being provided using the functional architecture 1900 of FIG. 19 within the architecture 300 of FIG. 3. However, the visualization 2000 may be provided using any suitable device(s) and in any suitable system(s).

As shown in FIG. 20, the visualization 2000 includes a graph 2002 showing at least one data point 2004 identifying at least one price associated with an RFX being analyzed. The graph 2002 also includes multiple data points 2006 associated with different price analyses that have been performed by the functional architecture 1900, and curves 2008 can be fit to the data points 2006 for the different price analyses. The data points 2006 and/or the curves 2008 may be interpolated or extrapolated in order to identify expected pricing for a quantity or a range of quantities of at least one material to be sourced from one or more suppliers. The graph 2002 further includes controls 2010 that allow the user to select which curves are fit to the data points 2006 in the graph 2002. This allows the visualization 2000 to layer data from multiple price analysis techniques and to select curve overlays shown in the graph 2002.

The visualization 2000 may also allow the user to view specific information about each data point shown in the graph 2002. For example, the user may position a mouse cursor on a data point in the graph 2002, at which point source information about that data point can be presented over or near the data point (such as in a pop-up menu 2012). The user can also be given the option, such as in the pop-up menu 2012, to deselect or exclude that source data point in the graph 2002 from use in a final price analysis report generated by the report creation function 1934. These features may allow, for example, the user to review data points associated with distinctly-different price analysis results to determine why the price analysis results differed. If one or more data points are determined by the user to be unreliable, the user may exclude these data points and provide an annotation (meta-tag) for the exclusion. The relevant price analysis or analyses can then be repeated without the excluded data, and the graph 2002 can be updated by omitting the excluded data point(s). The user may similarly use a pop-up menu or other mechanism to re-include data points that were previously excluded.

The visualization 2000 shown in FIG. 20 is merely meant to represent one example type of visualization that can be generated based on or associated with price analyses for an RFX response. However, numerous other types of visualizations may be generated based on or associated with price analyses for an RFX response. Thus, this disclosure is not limited to any specific types of visualizations that are based on or associated with price analyses for one or more RFX responses.

Although FIG. 20 illustrates one example of a visualization 2000 for providing analysis results involving RFX responses in a GUI-based RFX platform, various changes may be made to FIG. 20. For example, the content, layout, and arrangement of the visualization here are for illustration only.

FIGS. 21A through 21D illustrate an example graphical user interface 2100 for defining an analysis report for an RFX response in a GUI-based RFX platform according to this disclosure. For ease of explanation, the graphical user interface 2100 may be described as being provided using the functional architecture 1900 of FIG. 19 within the architecture 300 of FIG. 3. However, the graphical user interface 2100 may be provided using any suitable device(s) and in any suitable system(s).

The graphical user interface 2100 here can be used to define one type of pricing analysis report that might be generated for inclusion with a proposal being submitted by the originating organization, such as a pricing analysis report submitted to the U.S. government. As shown in FIG. 21A, the graphical user interface 2100 includes a header 2102, which can identify a case number for a price analysis and the name of a program associated with the price analysis. The graphical user interface 2100 also includes a background information section 2104, which can be used to collect various information about the price analysis. For instance, radio buttons 2106 can be used to indicate whether the price analysis relates to a purchase order or a proposal (such as an RFX). Note that the ability to perform a price analysis for a purchase order is optional and need not be supported here. A text box 2108 can be used by the user to provide a description of the purchase order or RFX, and a text box 2110 can be used by the user to provide a description of the prime proposal associated with the purchase order or RFX (if any). Text boxes 2112 allow the user to provide various information about the purchase order or RFX, and text boxes 2114 allow the user to provide various information about the associated supplier. A text box 2116 allows the user to provide a brief description of the product associated with the purchase order or RFX. A summary section 2118 of the graphical user interface 2100 includes a text box 2120, which allows the user to provide summary information. The summary information here may include information about proposed, analyzed, and recommended prices for the purchase order or RFX.

Figure 21B:
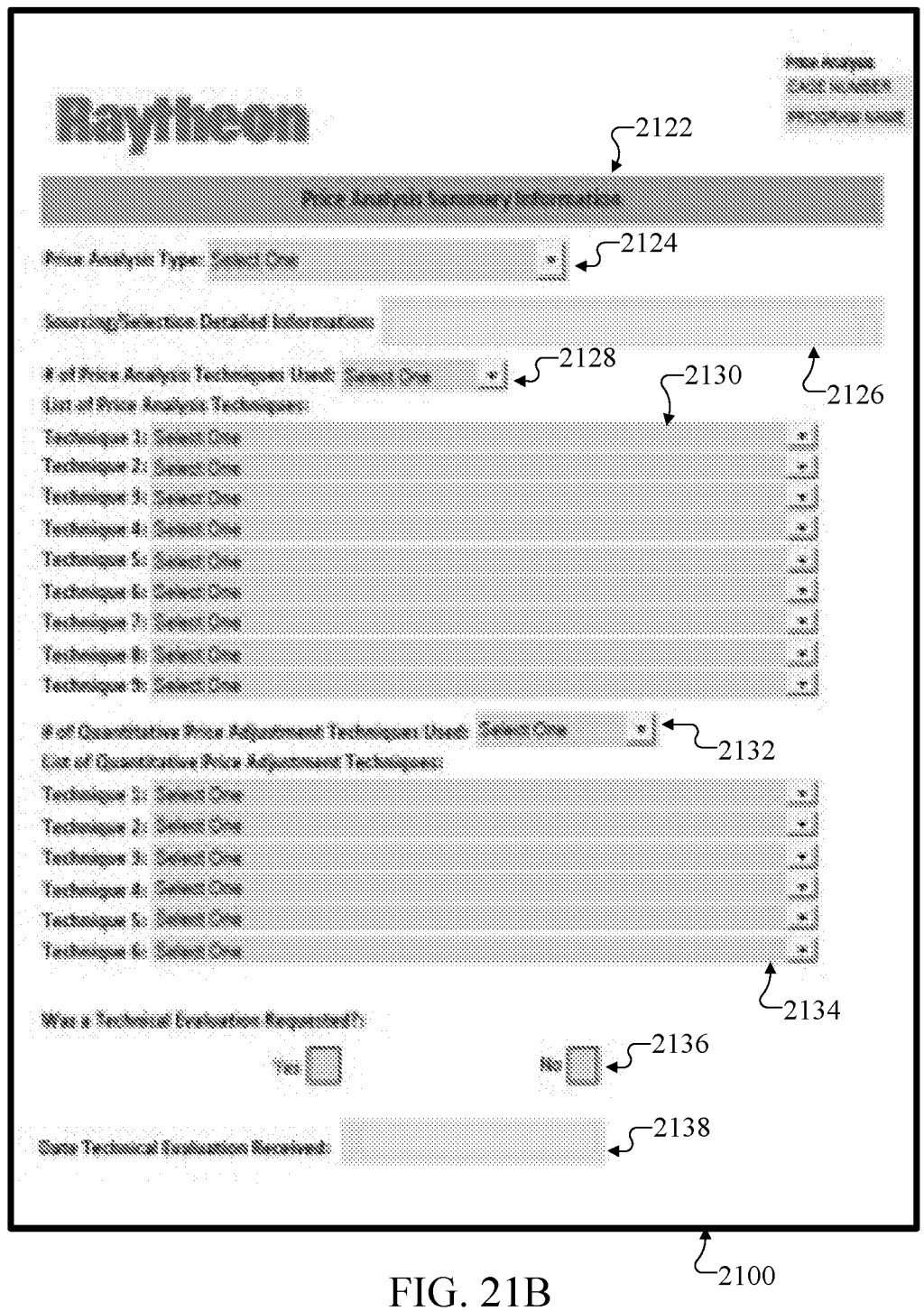

As shown in FIG. 21B, the graphical user interface 2100 also includes a price analysis summary section 2122, which can be used to summarize the price analysis or analyses performed. A drop-down menu 2124 allows the user to identify the type of price analysis performed, such as whether a single analysis or a collection of analyses were performed. A text box 2126 allows the user to provide a description of the data sources and the information used in the price analysis or analyses. A drop-down menu 2128 allows the user to identify a specific number of price analysis techniques whose results will be included in a report to be generated, and drop-down menus 2130 allow the user to identify the specific price analysis techniques that were used. Optionally, a drop-down menu 2132 allows the user to identify a number of quantitative price adjustment techniques used with the price analysis techniques (if any), and drop-down menus 2134 allow the user to identify the specific quantitative price adjustment techniques that were used (again, if any). A control 2136 allows the user to identify whether a technical evaluation was requested as part of the pricing analyses, and a text box 2138 allows the user to provide the date when the technical evaluation was received (if any).

Figure 21C:
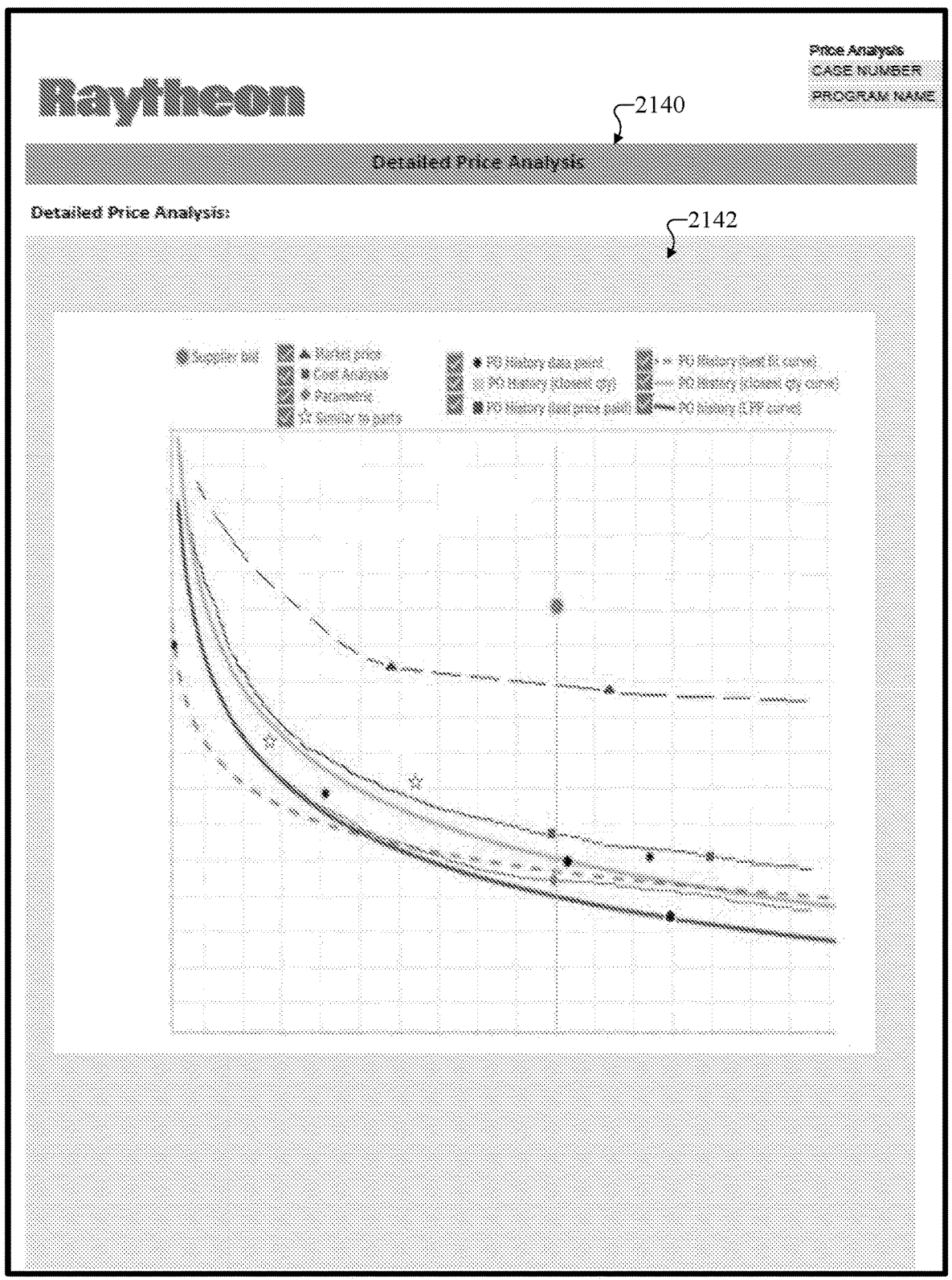

As shown in FIG. 21C, the graphical user interface 2100 further includes a detailed price analysis section 2140, which allows the user to provide actual detailed results from the price analysis or analyses that were performed. In this example, the detailed price analysis section 2140 includes a graph 2142, which can have the same form as the visualization 2000 described above.

As shown in FIG. 21D, the graphical user interface 2100 also includes a price analysis conclusion section 2144, which provides final results from the price analysis or analyses. For example, a text box 2146 allows the user to provide information indicating whether a particular supplier RFX response qualifies as a fair and reasonable proposal. A control 2148 allows the user to indicate whether the supplier's quoted price will be included as part of a prime proposal, such as in a proposal submitted by the originating organization to the U.S. or other government. A control 2150 allows the user to indicate whether the supplier's quoted price was the result of negotiations involving the supplier. A text box 2152 allows the user to provide information supporting the fair and reasonable determination. In addition, the graphical user interface 2100 includes a signatures and attachments section 2154, which includes various fields 2156 for identifying different users and receiving digital signatures and a field 2158 for receiving any desired attachments.

Using the graphical user interface 2100, a user can quickly and easily define the contents of a pricing analysis report or other report to be generated, such as by the report creation function 1934. Overall, the functional architecture 1900, visualization 2000, and graphical user interface 2100 can be used to provide a robust database of annotated input data, a graphical display of multiple unrelated data points that gather together the totality of all possible information used in price analyses, and a process to designate possible data points as relevant or not and to annotate the rationale for the selection. These components also provide a graphical and non-graphical representation of selected outputs that support a price analysis conclusion. The ability to display the universe of possible data that might be applicable to a single price analysis event in one graphical display that also allows users to visually identify outlying data points can be particularly useful when users are attempting to determine whether the cost analyses justify accepting a supplier's RFX response.

In some cases, various fields of the graphical user interface 2100 may be prepopulated by the GUI-based RFX platform. For example, if the user has initiated performance of one or more price analyses associated with a specific supplier's RFX response and then accesses the graphical user interface 2100 to generate a report, various fields related to the supplier and the RFX response can be prepopulated, as can any fields related to the specific price analyses used, any quantitative price adjustment techniques used, and the price analysis results obtained.

Although FIGS. 21A through 21D illustrate one example of a graphical user interface 2100 for defining an analysis report for an RFX response in a GUI-based RFX platform, various changes may be made to FIGS. 21A through 21D. For example, the content, layout, and arrangement of the graphical user interface 2100 are for illustration only. Also, while certain I/O mechanisms (such as text boxes, drop-down menus, and radio buttons) are shown here, the graphical user interface 2100 may support the use of any suitable I/O mechanisms to obtain data from or provide data to users.

The generation of visualizations and price analysis reports are examples of how the GUI-based RFX platform can analyze suppliers' RFX responses. However, there are other processing operations that can be performed using suppliers' RFX responses in order to facilitate other functions (either automated functions or human-based functions).

Figure 22A:
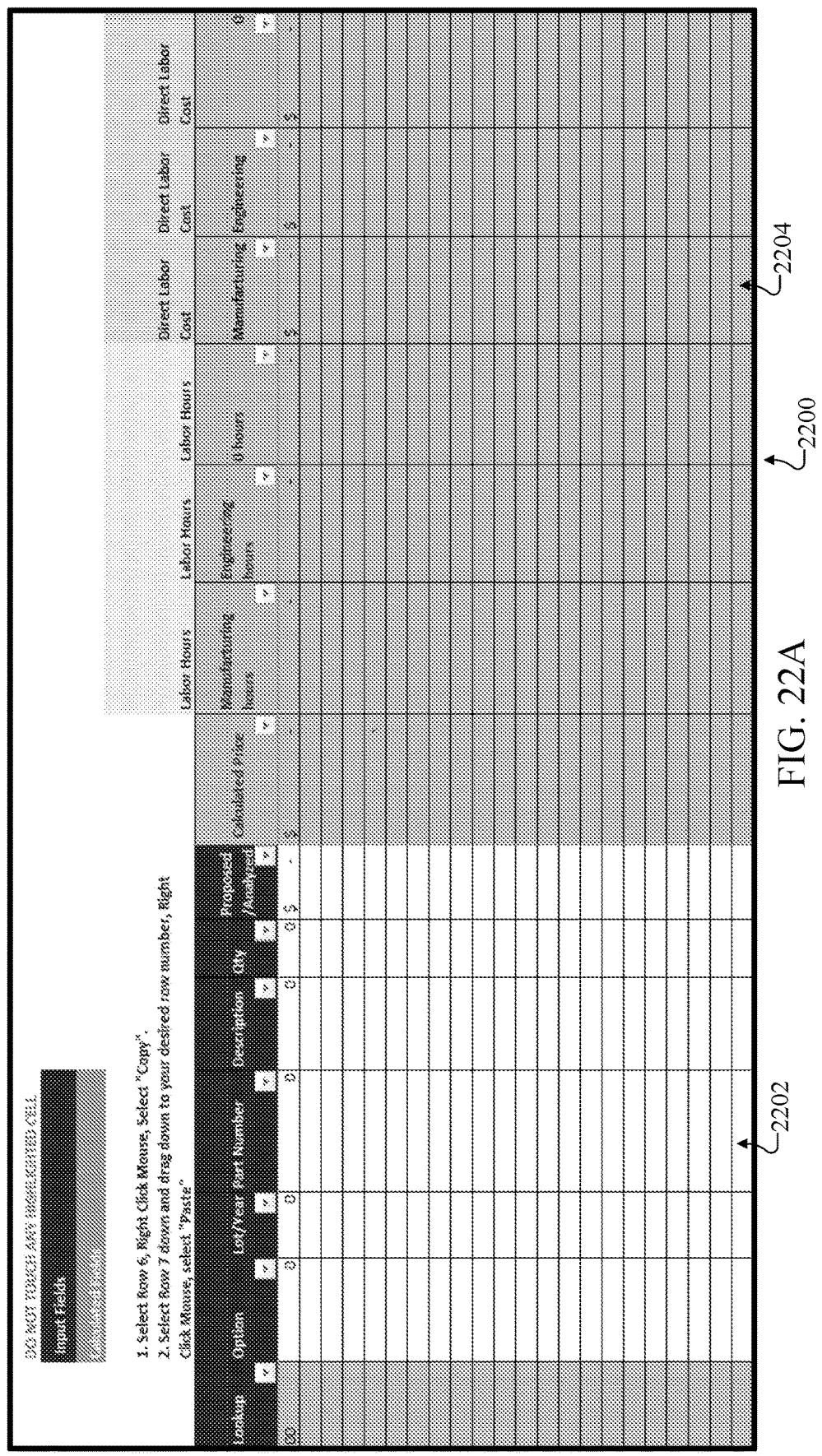
Figure 22B:
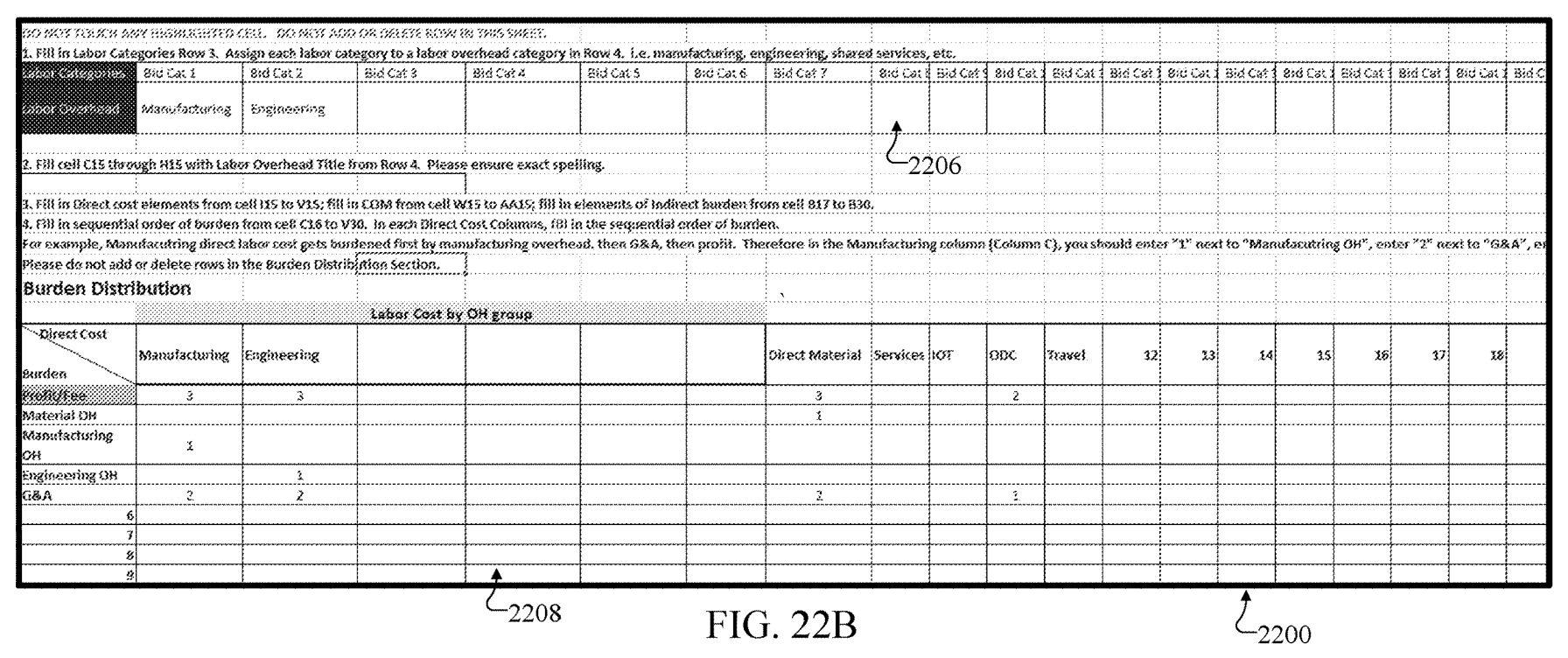
Figure 22C:
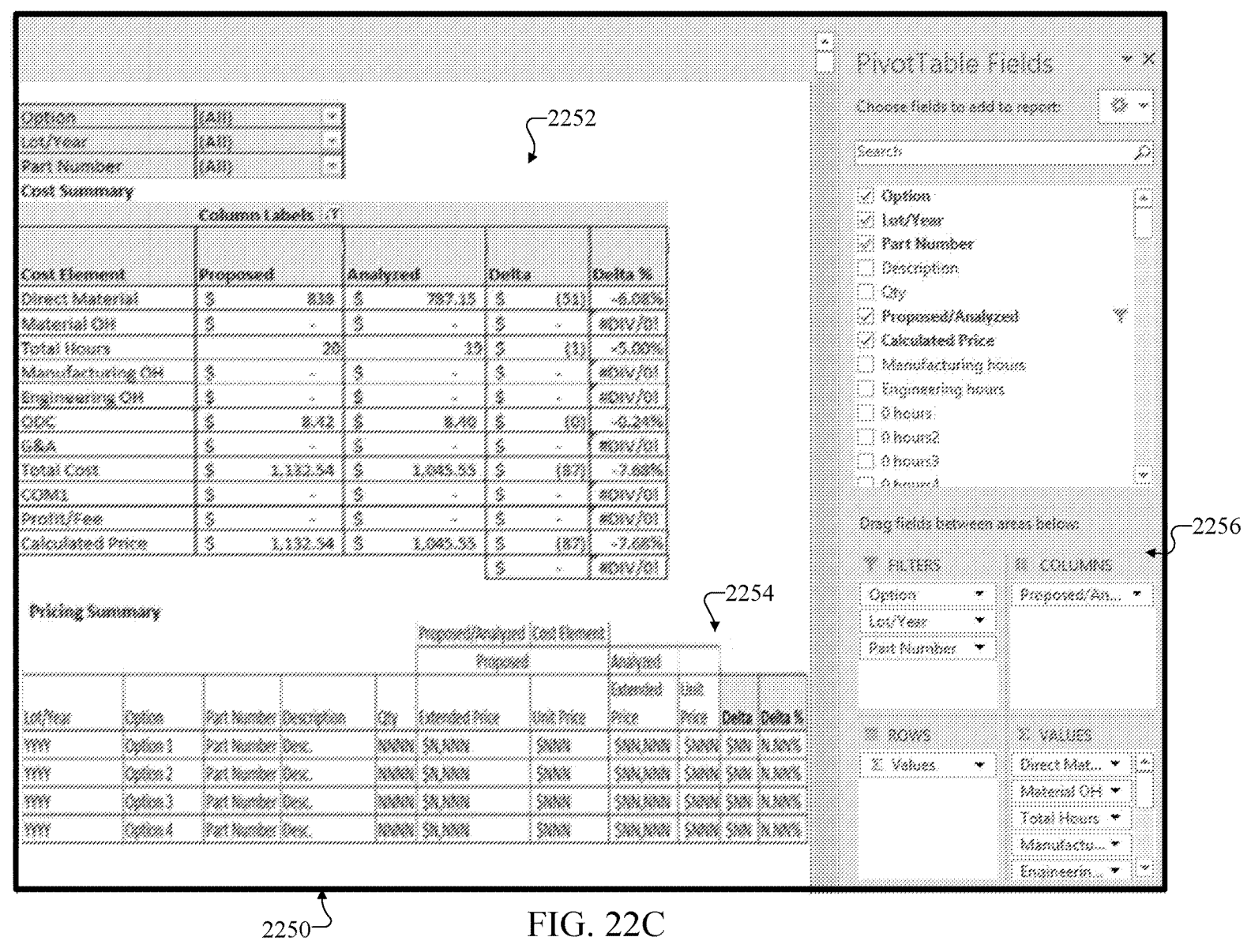

FIGS. 22A through 22C illustrate an example cost and price analysis (CAPA) workbook 2200 for use with RFX responses in a GUI-based RFX platform according to this disclosure. For ease of explanation, the workbook 2200 may be described as being generated using the architecture 300 of FIG. 3. However, the workbook 2200 may be generated using any suitable device(s) and in any suitable system(s).

A CAPA workbook (at least in the context of this disclosure) generally refers to an electronic spreadsheet that contains data scraped or otherwise obtained from a supplier's RFX response, where the electronic spreadsheet includes various macros or other built-in programming designed to make specific calculations involving the data entered into the electronic spreadsheet. As shown in FIG. 22A, one part of the CAPA workbook 2200 (such as one tab) may include a number of input fields 2202 in which data values can be entered, as well as a number of calculated fields 2204 in which data values can be calculated based (at least partially) on the input fields 2202. Here, the input fields 2202 and calculated fields 2204 relate to materials that a supplier has offered to provide in the supplier's RFX response. As shown in FIG. 22B, another part of the CAPA workbook 2200 (such as another tab) may include a number of input fields 2206 in which different types of labor costs can be entered, as well as a number of input fields 2206 in which actual labor-related data can be entered or calculated. Although not shown here, the CAPA workbook 2200 may contain additional fields (such as in additional tabs) for other data retrieved from the supplier's RFX response, such as overhead-related data, profit-related data, ODC-related data, or NRE-related data.

The use of a CAPA workbook is often desired and, in many cases, is required when used by a government contractor as the originating organization. For example, FAR requirements may indicate that certain suppliers need to gather and submit cost data to prime contractors, which results in the creation of large and complex cost proposals. The FAR requirements may also indicate that cost data is to be evaluated using specific techniques. In practice, this often requires the use of various spreadsheets, manual time-consuming processes for transcribing data, and guided tables of outputs.

In the GUI-based RFX platform, a trained machine learning model or other logic can be used to scrape (i.e., read) data from a supplier's RFX response (in whatever format the RFX response is submitted) in order to automatically identify data that is then input into the CAPA workbook 2200. As a result, a CAPA workbook 2200 for each supplier's RFX response can be automatically generated and substantially or completely populated with the required data. This allows data, such as complex cost data, to be entered into a CAPA workbook 2200 in a substantially or completely automated manner. This also allows a CAPA workbook 2200 to be used to perform complex or other cost analysis techniques or other evaluation techniques, which can be programmed into the CAPA workbook 2200 and operate based on the data entered into the CAPA workbook 2200. Among other things, this can greatly reduce the effort needed to complete any evaluation and analysis techniques required by regulations.

A particular example of this is shown in FIG. 22C, where a report 2250 can be generated within or based on the contents of a CAPA workbook 2200. Here, the report 2250 includes a number of data fields 2252, which may represent different data values input into or calculated using the CAPA workbook 2200. The report 2250 also includes a pricing summary 2254, which includes results from pricing analysis calculations or other calculations performed using macros or other logic of the CAPA workbook 2200 (or an external component that processes data from the CAPA workbook 2200). The report 2250 further includes controls 2256 that may be used to control, for instance, what data is presented in the fields 2252 or 2254. By auto-populating the CAPA workbook 2200 based on information scraped from a supplier's RFX response, reports can be generated with much less effort and with much greater accuracy.

In some embodiments, after data is scraped from suppliers' RFX responses, the data can be mapped to standard elements in a predefined data dictionary, which allows specific types of data to then be used in various ways depending on the needs or desires of the originating organization. Among other things, this allows the insertion of scraped data from one or more suppliers' RFX responses into any desired fields of one or more CAPA workbooks 2200. This arrangement is highly flexible and can be easily modified, such as by changing how standard elements in the predefined data dictionary are mapped to specific fields in the CAPA workbook(s) 2200.

Although FIGS. 22A through 22C illustrate one example of a CAPA workbook 2200 for use with RFX responses in a GUI-based RFX platform, various changes may be made to FIGS. 22A through 22C. For example, the content, layout, and arrangement of the CAPA workbook 2200 and the content, layout, and arrangement of any report or visualization that uses the CAPA workbook 2200 are for illustration only.

Figure 23:
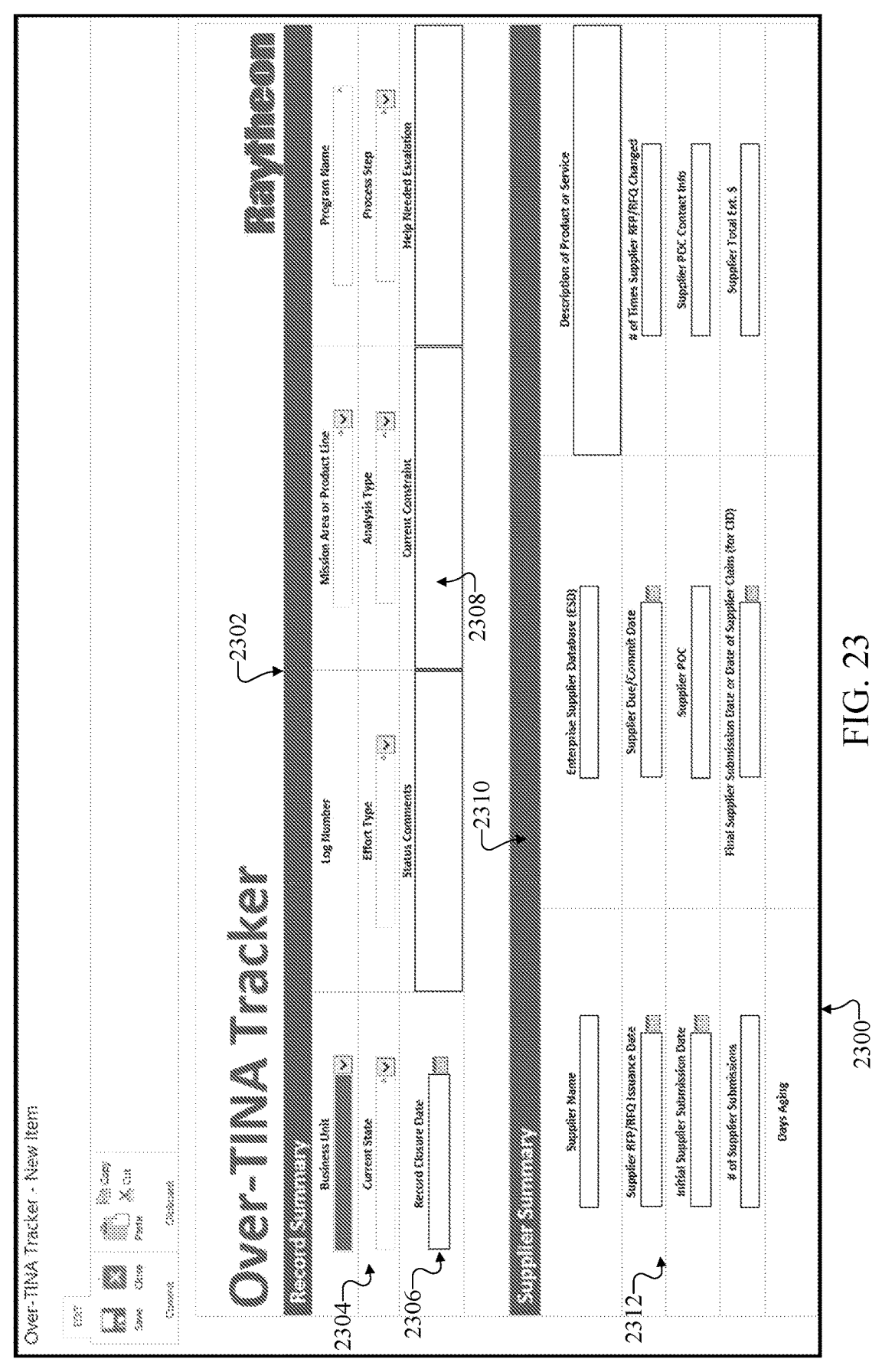

FIG. 23 illustrates an example graphical user interface 2300 for obtaining information related to reporting requirement events associated with a GUI-based RFX platform according to this disclosure. For ease of explanation, the graphical user interface 2300 may be described as being provided using the architecture 300 of FIG. 3. However, the graphical user interface 2300 may be provided using any suitable device(s) and in any suitable system(s).

The graphical user interface 2300 here is useful in obtaining information about sourcing events that involve monetary values over TINA thresholds or that otherwise trigger some type of governmental or other reporting requirement. Thus, the graphical user interface 2300 can be used by a user to provide an indication of a particular event and a particular supplier that has become subject to a reporting requirement, as well as to supplement previous information provided about the particular event and supplier.

As shown in FIG. 23, the graphical user interface 2300 includes a record summary section 2302, which identifies various information about the originating organization and the program in which the reporting threshold has been met. Here, the record summary section 2302 includes a number of controls 2304, such as drop-down menus and text boxes, that allow the user to enter various information about the originating organization and the program. In this example, the information includes the associated business unit of the originating organization, a log number (for previously-defined reporting events), a mission area or product line, and a program name. The information also includes a current state of the program, a type of effort in which the reporting requirement was triggered, an analysis type indicating that the reporting requirement was triggered, and the process step in which the reporting requirement was triggered. These are typically organization-specific fields and can be used to provide general information about how the associated reporting requirement has been triggered. A calendar box 2306 can be used by the user to provide an indication of when the associated reporting event record can be closed, meaning the appropriate steps have been taken to comply with the reporting requirement. In addition, text boxes 2308 can be used by the user to provide comments, constraints, or help escalation information related to the reporting requirement event.

The graphical user interface 2300 also includes a supplier summary section 2310, which may optionally identify various information about the supplier associated with the reporting threshold. Here, the supplier summary section 2310 includes a number of controls 2312, such as drop-down menus, calendar boxes, and text boxes, that allow the user to enter various information about the supplier. In this example, the information includes the supplier's name, the supplier's identifier, and an explanation of the product or service provided by the supplier. The information also includes a date that an RFX was issued to the supplier, a date that the supplier provided a submission in response to the RFX, a number of times the supplier attempted to change the RFX, and a due date or commit date in which the supplier was selected by the originating organization. The information further includes point of contact (POC) information for the supplier, the number of orders or other submissions to the supplier, and the date of a final submission (if any) to the supplier. In addition, the information includes a total expense associated with a supplier and the number of days since the reporting requirement was triggered.

Using the graphical user interface 2300, a user can quickly and easily create a new reporting requirement record associated with a reporting event, and the graphical user interface 2300 can be used to update the reporting event over time as needed. Eventually, the reporting event is closed, such as when the required reporting has been made. This allows the GUI-based RFX platform to easily track reporting requirements across a number of programs and suppliers and track when those reporting requirements have been satisfied.

Although FIG. 23 illustrates one example of a graphical user interface 2300 for obtaining information related to reporting requirement events associated with a GUI-based RFX platform, various changes may be made to FIG. 23. For example, the content, layout, and arrangement of the graphical user interface 2300 are for illustration only. Also, while certain I/O mechanisms (such as text boxes, calendar boxes, and drop-down menus) are shown here, the graphical user interface 2300 may support the use of any suitable I/O mechanisms to obtain data from or provide data to users.

FIGS. 24A through 24E illustrate example visualizations that can be generated based on reporting requirement events in a GUI-based RFX platform according to this disclosure. For example, the visualizations shown in FIGS. 24A through 24E may be generated based (at least partially) on reporting requirement event information provided by users via the graphical user interface 2300. For ease of explanation, the visualizations may be described as being provided using the architecture 300 of FIG. 3. However, the visualizations may be provided using any suitable device(s) and in any suitable system(s).

Figure 24A:
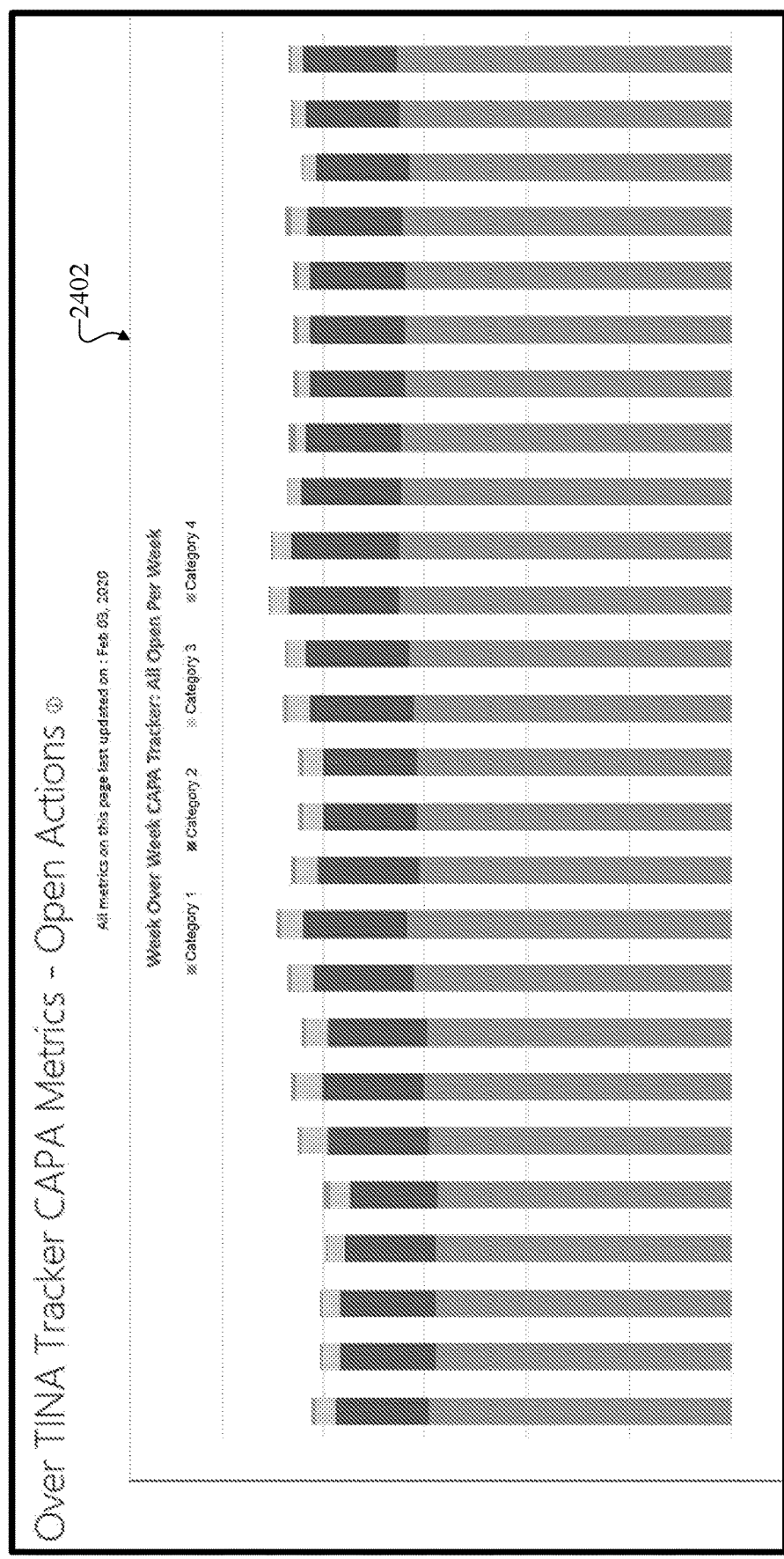
FIGS. 24A through 24E illustrate example visualizations that can be generated based on reporting requirement events in a GUI-based RFX platform according to this disclosure.

As shown in FIG. 24A, a first example visualization 2400 includes a graph 2402 that identifies the numbers of different types of analyses that are open (not yet completed) over different periods of time. Here, each vertical bar is associated with a different time period, and each vertical bar identifies numbers of multiple types of analyses. Note that any suitable types of analyses may be used by an originating organization, such as CAPA analyses, commercial item determination (CID) price analyses, or other price analyses. Using this type of visualization 2400, users are able to quickly identify the numbers of various analyses to be performed and how those numbers vary over time.

Figure 24B:
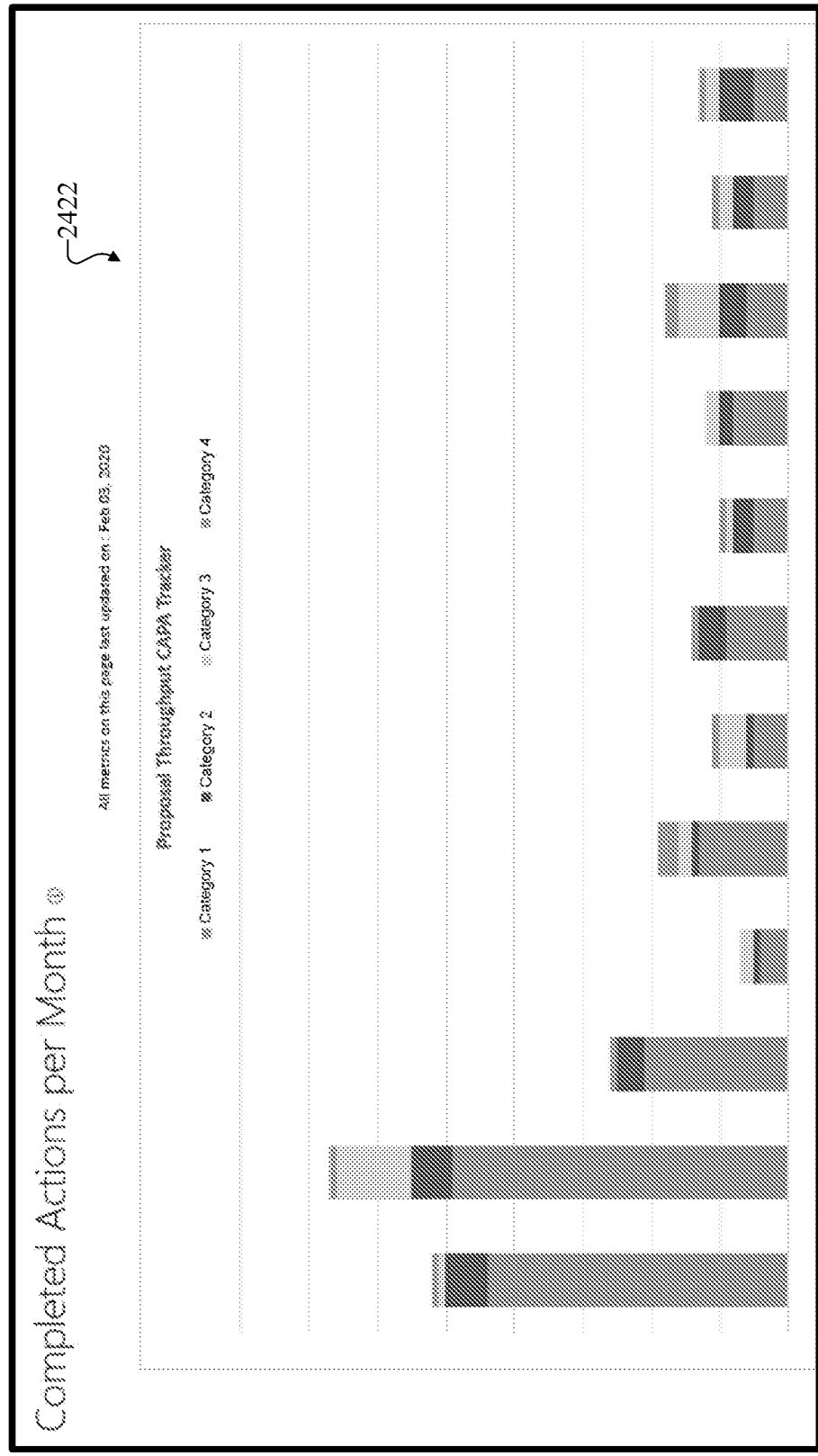

Similarly, as shown in FIG. 24B, a second example visualization 2420 includes a graph 2422 that identifies the numbers of different types of analyses that are closed (have been completed) over different periods of time. Again, each vertical bar is associated with a different time period, and each vertical bar identifies numbers of multiple types of analyses. Using this type of visualization 2420, users are able to quickly identify the numbers of various analyses that have been performed and how those numbers vary over time.

Figure 24C:
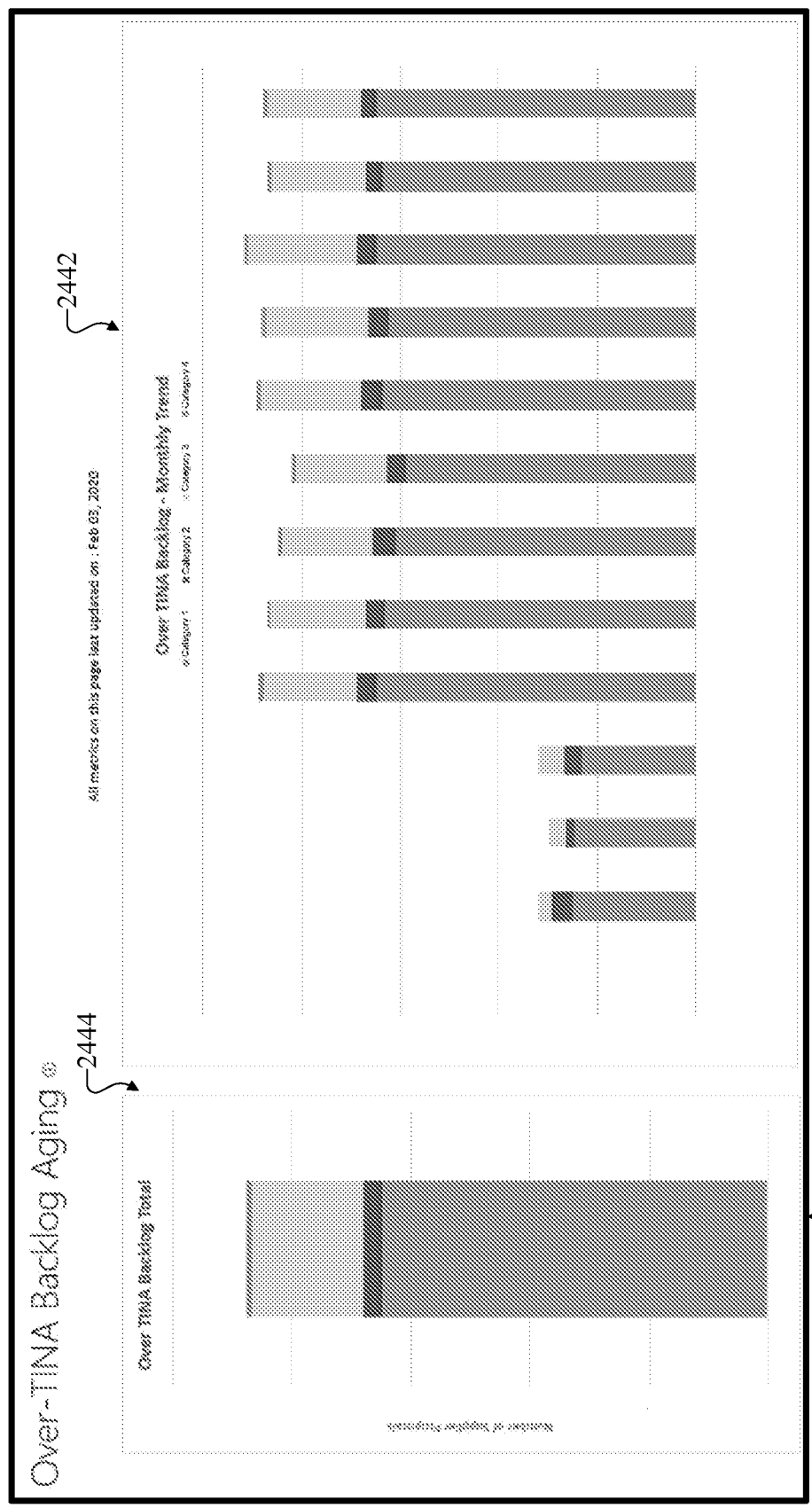

As shown in FIG. 24C, a third example visualization 2440 includes a graph 2442 that identifies the numbers of different types of analyses that are considered to be backlogged (due to their aging) over different periods of time. Here, each vertical bar in the graph 2442 is associated with a different time period, and each vertical bar identifies numbers of multiple types of analyses. Another graph 2444 can provide an enlarged view of one of the time periods, such as the most recent time period or a time period selected by the user. Using this type of visualization 2440, users are able to quickly identify the backlog of various analyses and how the backlog varies over time.

Figure 24D:
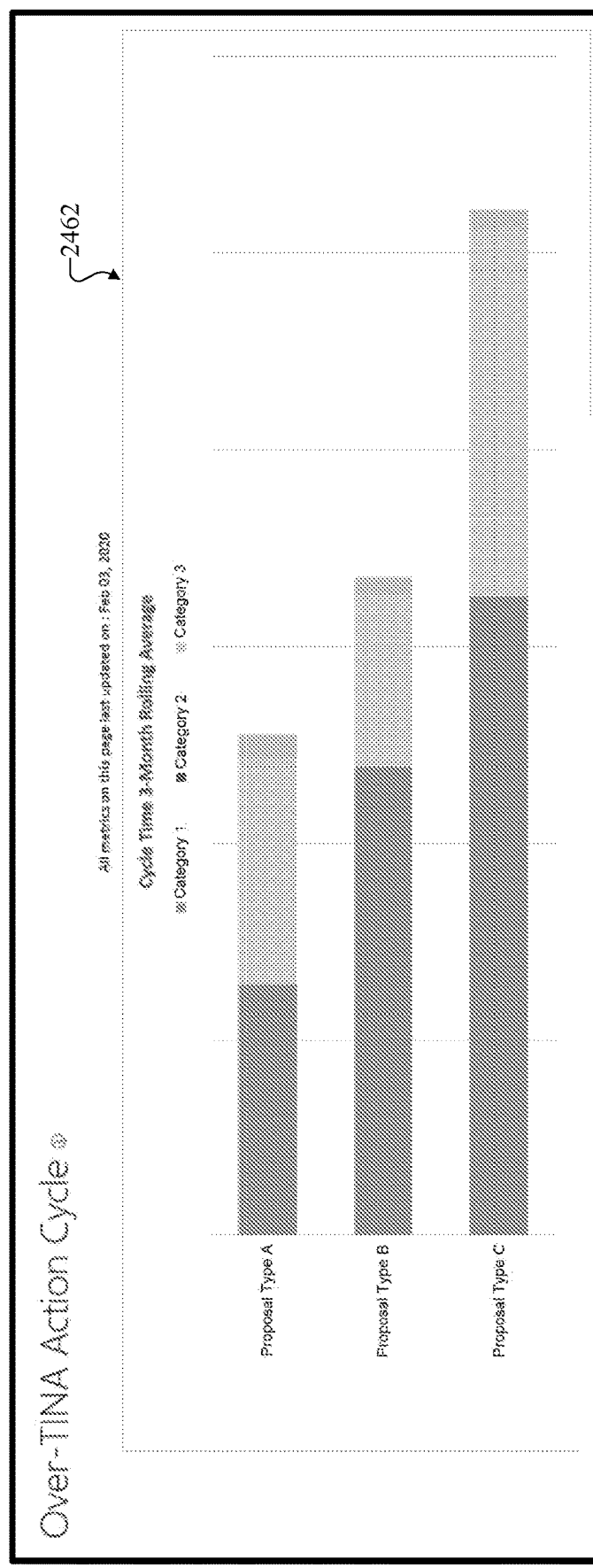
Figure 24E:
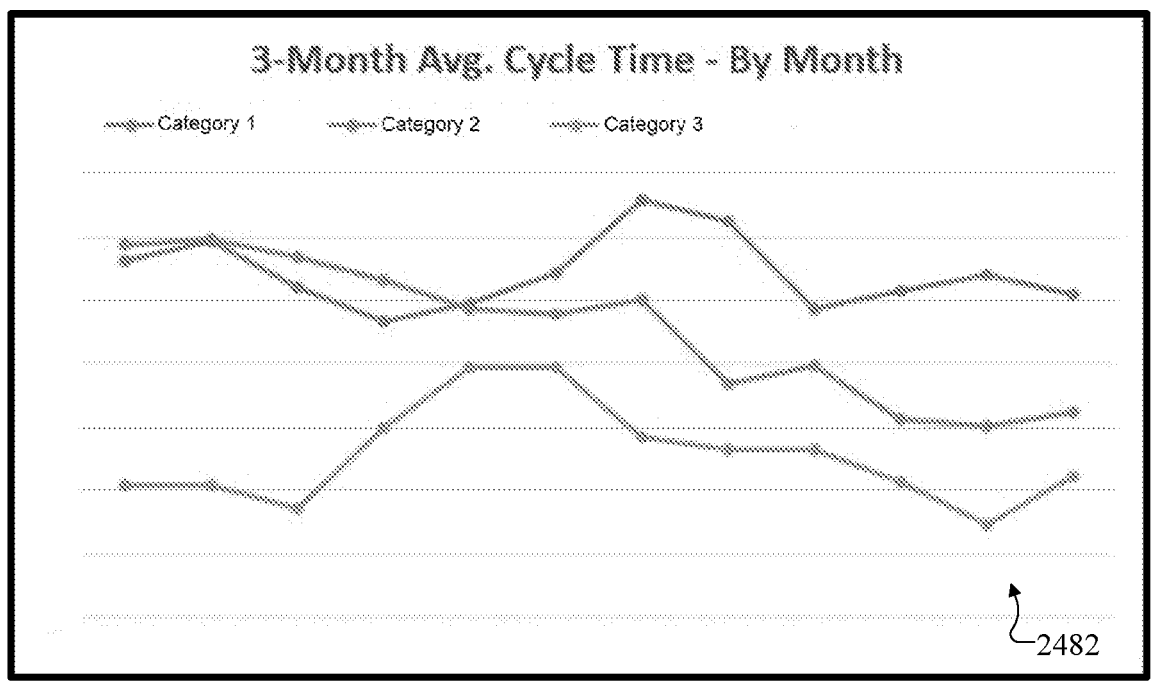

As shown in FIG. 24D, a fourth example visualization 2460 includes a graph 2462 that identifies the average cycle time for different types of proposals whose analyses are completed over a three-month rolling time period (although other time periods like twelve months can be used). Here, each horizontal bar in the graph 2462 is associated with a different type of proposal, and each horizontal bar identifies different lengths of time needed for different functions or groups of functions to occur during the analyses for those proposal types. As shown in FIG. 24E, a fifth example visualization 2480 identifies the average cycle time for different types of proposals whose analyses are completed over a three-month rolling time period (although other time periods like twelve months can be used).

While not shown here, any of these visualizations may be presented along with various controls that allow the user to control the contents of the visualizations. For example, controls may be provided that allow the user to limit the displayed results based on business unit(s) or division(s) of the originating organization, mission area(s) or product line(s) of the originating organization, or bid location(s) where the originating organization or suppliers are located. Among other things, this may allow users to view visualizations related to more specific areas of the originating organization.

The various visualizations shown in FIGS. 24A through 24E are merely meant to represent example types of visualizations that can be generated based at least partially on reporting requirement event information. However, numerous other types of visualizations may be generated based on this information. Thus, this disclosure is not limited to any specific types of visualizations that are based on reporting requirement event information.

Although FIGS. 24A through 24E illustrate examples of visualizations that can be generated based on reporting requirement events in a GUI-based RFX platform, various changes may be made to FIGS. 24A through 24E. For example, the content, layout, and arrangement of the visualizations here are for illustration only.

Figure 25:
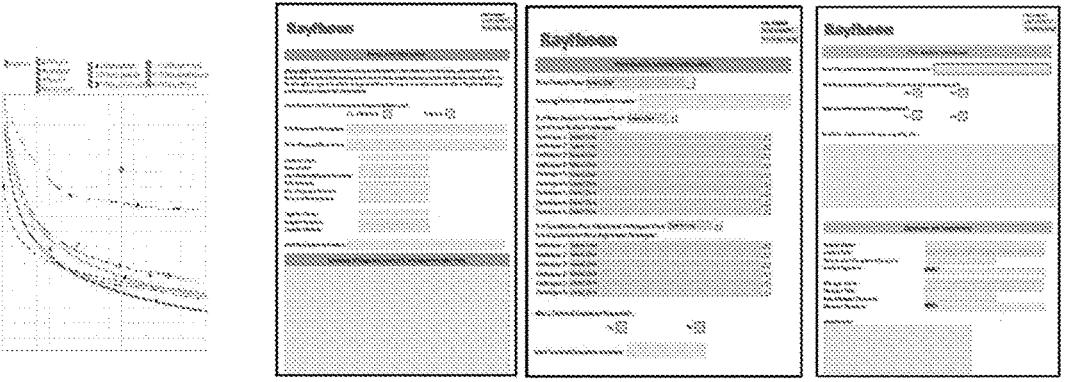
FIG. 25 illustrates an example summary of award that can be generated in a GUI-based RFX platform according to this disclosure.

The GUI-based RFX platform can further use information provided by users, analysis results, visualizations, and other information to generate electronic or printed documentation for the originating organization. Various types of documentation may be generated by the GUI-based RFX platform, examples of which are provided below:

FIG. 25 illustrates an example summary of award 2500 that can be generated in a GUI-based RFX platform according to this disclosure. For ease of explanation, the summary of award 2500 may be described as being provided using the architecture 300 of FIG. 3. However, the summary of award 2500 may be provided using any suitable device(s) and in any suitable system(s).

The creation of a summary of award is a task often required by regulation for nearly all U.S. government contracts, and it may be required based on an originating organization's internal policies. Often times, summaries of awards are created manually using different formats, data sources, and data contents. Here, the GUI-based RFX platform has access to both the contents of an RFX and the contents of each supplier's response to that RFX and can map those contents into a standard set of data. Moreover, the GUI-based RFX platform has access to additional information associated with the lifecycle of a sourcing event, such as how negotiations occurred and what price analyses were performed. The GUI-based RFX platform can therefore use appropriate information to automatically generate a summary of award in a predefined format with predefined data fields. By having one integrated system that captures activities and data elements involved with quoting and analyzing bids, this allows for use of auto-population logic or other logic for the various data fields in a summary of award template. This can be used to easily create a summary of award document each time one is needed. If necessary, a user may edit the summary of award document as needed or desired.

The summary of award 2500 shown in FIG. 25 represents part of a template that may be completed using data available in the GUI-based RFX platform. In this example, the summary of award 2500 includes a basic data section 2502, which provides general information about the summary of award. In this example, the general information includes a record identifier, an author, a business, a type of proposal activity, and a status. The general information also includes a template type, a description, an indication whether the summary is a restricted record, and an indication whether the summary is inactive.

A summary of award data section 2504 provides general information about the contract being awarded. In this example, the information includes an owner of the agreement (who is making the agreement), a creation date, a suitable sustainability clause, and agreement start and end dates. The information also includes a total value to be approved, a sourcing agreement type, a Universal Commercial Code (UCC) and related description, and an agreement pricing structure. The information further includes payment terms, delivery terms, an identification of related agreements (if any), a TINA statement, and an identification of an associated proprietary information agreement (PIA) (if any). In addition, the information includes supplier relationship management (SRM), PRISM, and APEX numbers, an indication whether goods or services will be provided from a non-U.S. location, and an indication whether the agreement can be used by an originating organization's non-U.S. location(s).

A supplier section 2506 provides general information about the supplier that is being awarded a contract. In this example, the information includes a name, identifier, and address of the supplier. The information also includes an indication of an expiration date for any representations and certifications made by the supplier. The information further includes contact information for at least one person associated with the supplier.

A background section 2508 generally describes how the particular supplier was selected for this award. Example contents here can include a description of the materials or services to be provided by the supplier, a history of the supplier's proposal and any negotiations involving the supplier, and the supplier's capabilities and related performance data. A source justification section 2510 generally describes why the particular supplier here was selected. Example contents here can include an identification of a competition type for the award and the associated program. An award justification section 2512 generally describes the price basis for why the particular supplier here was selected. Example contents here can include an identification of the total number of materials to be provided for a particular program during a defined period, plus a reference to one or more price analyses. A price analysis section 2514 can graphically present the results from one or more price analyses.

Various fields in the sections 2502-2506 can be auto-populated based on information available in the GUI-based RFX platform, such as information scraped from an initial customer RFX, an RFX generated by the originating organization, and the supplier's RFX response. Other sections 2508-2512 can include text 2516 in which data can be inserted into different fields (denoted by brackets) by the GUI-based RFX platform within the text. In addition, the GUI-based RFX platform can insert a price analysis graph and the information provided via the graphical user interface 2100 into the section 2514. Thus, as can be seen here, most or all of the summary of award 2500 can be auto-populated based on information available to the GUI-based RFX platform. As a result, significantly less effort is required to produce the summary of award 2500 for each sourcing event, and significantly fewer errors are made when generating each summary of award 2500.

Note that the contents of the summary of award 2500 in FIG. 25 are not necessarily complete. For example, to officially comply with certain regulations, the summary of award 2500 may require a number of additional sections and explanations. Some additional examples of sections to be included in a summary of award 2500 might include a background and chronology of the RFX solicitation (such as the number of suppliers solicited, the number of materials quoted, pricing requirements, and periods of performance) and an identification of any variances in the RFX process (such as bid extensions, rebids, or best and final offers). However, most or all of this information can be based on information available to the GUI-based RFX platform, allowing the same types of operations to occur in order to generate a completed summary of award 2500.

Although FIG. 25 illustrates one example of a summary of award 2500 that can be generated in a GUI-based RFX platform, various changes may be made to FIG. 25. For example, the content, layout, and arrangement of the summary of award 2500 here are for illustration only.

Figure 26:
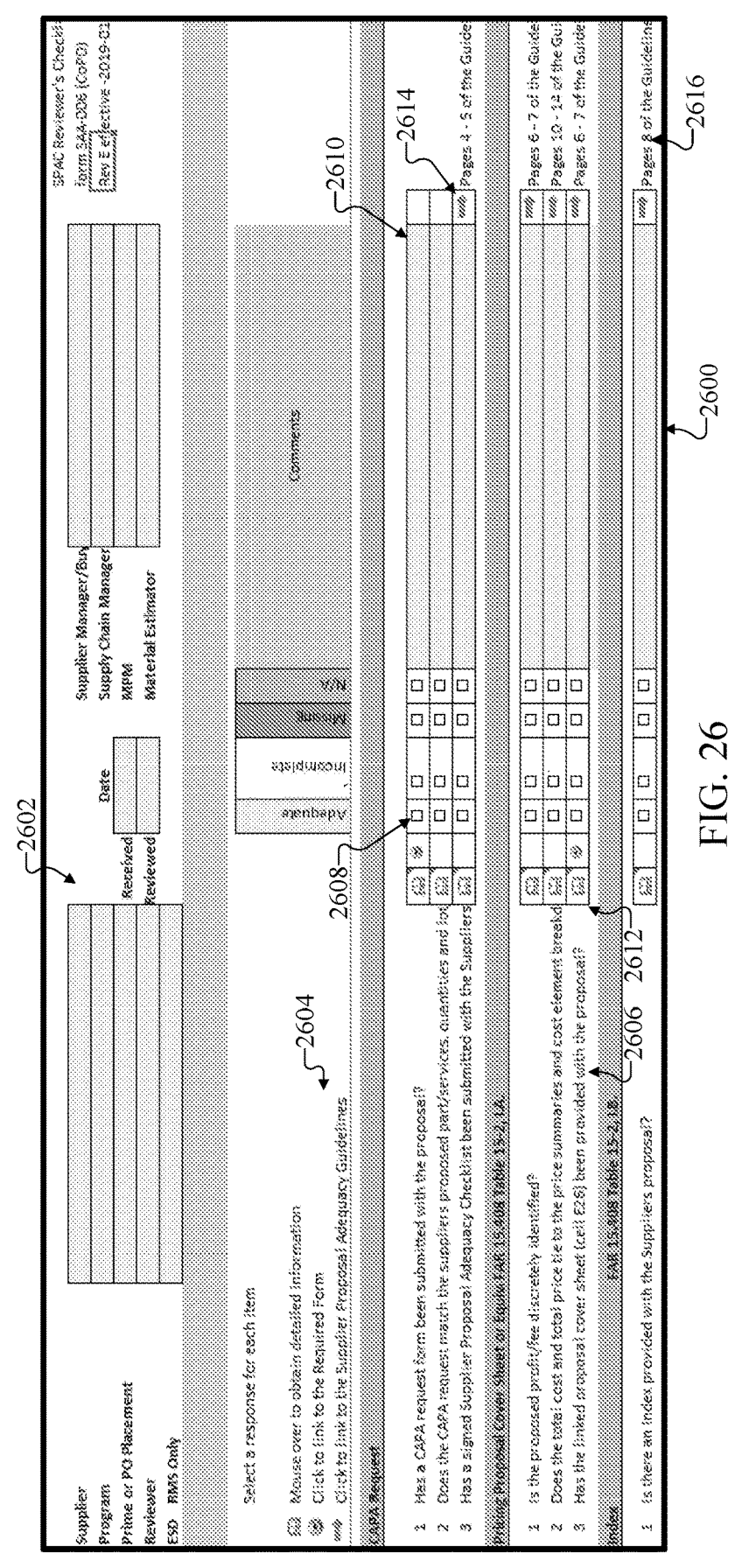

FIG. 26 illustrates an example checklist 2600 that can be generated in a GUI-based RFX platform according to this disclosure. For ease of explanation, the checklist 2600 may be described as being provided using the architecture 300 of FIG. 3. However, the checklist 2600 may be provided using any suitable device(s) and in any suitable system(s).

The creation and submission of complex cost proposals is a common occurrence with government contractors, and the completion of a supplier proposal adequacy checklist (SPAC) or similar form is another task often required by regulation for U.S. government contracts or an originating organization's internal policies. However, this type of checklist is often forgotten in the submission or is misunderstood. Here, the GUI-based RFX platform has access to the contents of each supplier's RFX response and can use this and other information to automatically generate a suitable checklist using a predefined checklist template and to populate answers to the questions in the checklist. The GUI-based RFX platform can therefore use appropriate information to automatically generate a completed or near-completed checklist for inclusion in a cost proposal or other proposal. If necessary, a user may edit the checklist as needed or desired.

The checklist 2600 shown in FIG. 26 represents part of a checklist template that may be completed using data available in the GUI-based RFX platform. In this example, the checklist 2600 includes general information 2602, which provides information about the supplier and the program associated with the checklist and about various users involved in the submission of a proposal that involves the supplier. The checklist 2600 also includes a legend 2604 that identifies the meanings of various icons used in the checklist 2600.

The checklist 2600 further includes multiple groups of questions 2606, where each question 2606 identifies a different issue that requires an answer to be selected from a group of radio buttons 2608. Each group of radio buttons 2608 allows the system or the user to identify whether the answer to an associated question 2606 is "adequate," "incomplete," or "missing" (although any other suitable options may be used here). Text boxes 2610 can be used to provide explanations for any of the answers to the questions 2606. Icons 2612 can be selected by the user to view detailed information about each question 2606 or to access an associated form. Icons 2614 can be selected by the user to view associated information in guidelines forming the basis for the questions 2606, and a text-based explanation 2616 may be provided identifying specific locations in the guidelines where the associated information may be located.

The checklist 2600 for a specific supplier can be generated and auto-populated based on various information, such as the supplier's RFX response, and at any suitable time. In some embodiments, for example, the checklist 2600 can be generated and auto-populated while or immediately after the supplier assembles its RFX response or uploads its RFX response to the GUI-based platform. As a particular example, machine learning or other logic can be used to analyze the supplier's RFX response, determine the answers to the various questions 2606 in the checklist (such as based on the supplier's answers to the various checklists in the graphical user interface 1500), and auto-populate the checklist 2600 with answers to the questions 2606. This can actually make the checklist 2600 an effective tool for evaluating compliance of a supplier' proposal and may even be used to provide instant feedback to the supplier. Note that while the checklist 2600 here can be auto-populated, a user may still make modifications to the checklist 2600 as needed or desired.

Although FIG. 26 illustrates one example of a checklist 2600 that can be generated in a GUI-based RFX platform, various changes may be made to FIG. 26. For example, the content, layout, and arrangement of the checklist 2600 here are for illustration only.

In addition to the documents described above and as another example, the GUI-based RFX platform can be used to produce final document packages, which are typically used after the originating organization has been awarded a contract from a customer and the originating organization needs to formalize its contract arrangements with the suppliers previously selected by the originating organization. In many cases, this is done manually and involves repeating much of the same work done previously. Since the GUI-based RFX platform has access to information related to the original RFXs sent to suppliers and their responses, the GUI-based RFX platform can easily generate the required documents for each supplier and auto-complete much or all of the documentation based on the available information. In this way, the GUI-based RFX platform can simplify the generation of a final document package for each supplier.

As can be seen from the description above, the GUI-based RFX platform can greatly simplify the generation and management of RFXs and the collection, analysis, and use of RFX responses. Also, as described above, machine learning can be leveraged in various areas to support functions of the GUI-based RFX platform. Training one or more machine learning models to perform the functions described above can occur in any suitable manner. For example, many organizations may have access to a large collection of RFXs, RFX responses, price analyses, summaries of awards, final document packages, and other information that have been collected or generated over the years. This type of information can act as training data in order to train one or more machine learning models to perform various functions described above. Many of these functions can be based on natural language understanding algorithms, which may be used to generate RFXs, process supplier responses, or perform other actions. Of course, one or more machine learning models may be trained in any other suitable manner.

Note that while it is often assumed above that things like initial customer RFXs and suppliers' RFX responses are received electronically, the use of paper documentation is also possible. Thus, in some embodiments, the GUI-based RFX platform can support functions such as optical character recognition in order to receive and process scanned versions of paper documentation. Once scanned and imported, the same types of operations described above (including various machine learning algorithms) can be applied to the imported text of the paper documentation.

Figure 27:
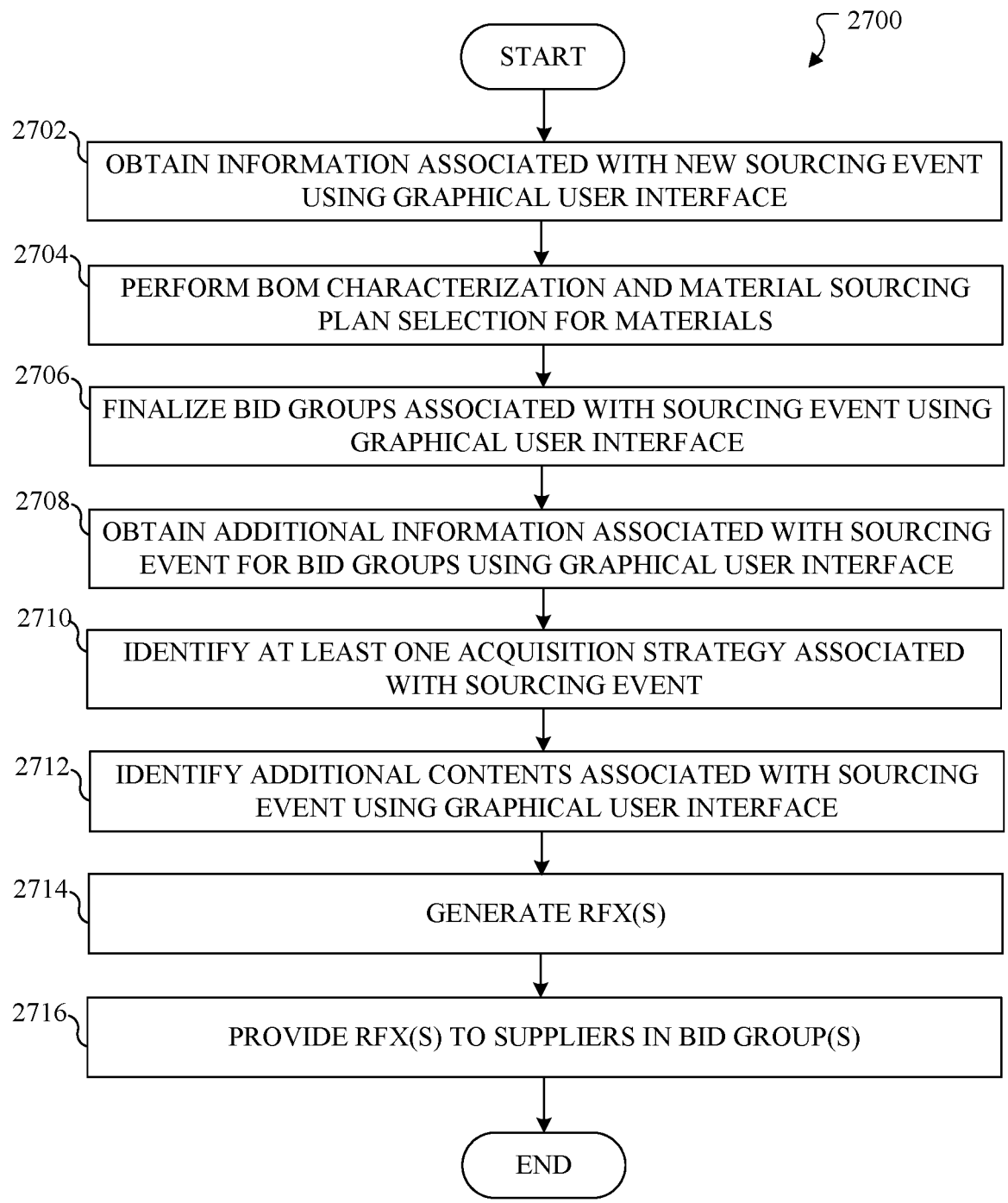
FIG. 27 illustrates an example method for RFX generation in a GUI-based RFX platform according to this disclosure.

FIG. 27 illustrates an example method 2700 for RFX generation in a GUI-based RFX platform according to this disclosure. For ease of explanation, the method 2700 may be described as being performed by the architecture 300 of FIG. 3, which may be at least partially implemented using the application server 112 and the database server 114/database 116 of FIG. 1 (at least one of which may be implemented using at least one device 200 of FIG. 2). However, the method 2700 may be performed using any suitable device(s) and in any suitable system(s).

As shown in FIG. 27, information associated with a new sourcing event is obtained using a graphical user interface at step 2702. This may include, for example, the processing device 202 of the transactional server 306 or data analytics and visualization system 310 presenting a user with the graphical user interface 500 and obtaining various information about the new sourcing event. Here, it is assumed that the user will be creating at least one RFX as part of the sourcing event. Note that at least some of the information may be collected using machine learning, such as by applying a trained machine learning model to an initial customer RFX in order to scrape information from the initial customer RFX that is used to prepopulate various fields in the graphical user interface 500.

BOM characterization and material sourcing plan selection for materials associated with the sourcing event are performed at step 2704, and bid groups associated with the sourcing event are finalized using a graphical user interface at step 2706. This may include, for example, the processing device 202 of the transactional server 306 or data analytics and visualization system 310 obtaining a bill of materials for a product associated with the new sourcing event, such as via interactions with the user through the graphical user interface 700. This may also include the processing device 202 of the transactional server 306 or data analytics and visualization system 310 processing the bill of materials and other information to identify at least one BOM characterization that includes groups of materials and groups of suppliers that may be permitted to bid on the groups of materials. In addition, this may include the processing device 202 of the transactional server 306 or data analytics and visualization system 310 interacting with the user via the graphical user interface 800 in order to allow the user to modify the bid groups. The result of this step is at least one material sourcing plan that identifies the suppliers to be allowed to bid on the groups of materials.

Additional information associated with the sourcing event is obtained for the bid groups using a graphical user interface at step 2708. This may include, for example, the processing device 202 of the transactional server 306 or data analytics and visualization system 310 presenting the user with the graphical user interface 1000 and obtaining additional information about the sourcing event. Depending on the user and the specific situation, the user may use the graphical user interface 1000 to provide information to be provided to all previously-identified bid groups, or the user may use the graphical user interface 1000 to provide different information to be provided to different bid groups. Again, note that at least some of the information may be collected using machine learning, such as based on scraped information from the initial customer RFX, and used to prepopulate various fields in the graphical user interface 1000.

At least one acquisition strategy associated with the sourcing event is identified at step 2710. This may include, for example, the processing device 202 of the transactional server 306 or data analytics and visualization system 310 identifying the acquisition strategy for each bid group or for multiple bid groups based on information provided by the user via the graphical user interface 500 or 1000. In other cases, the acquisition strategy for at least one bid group may be identified using machine learning, such as by applying a trained machine learning model to at least some of the information extracted from the initial customer RFX in order to estimate the type of acquisition strategy that may be needed to satisfy the initial customer RFX.

Additional contents associated with the sourcing event are identified using a graphical user interface at step 2712. This may include, for example, the processing device 202 of the transactional server 306 or data analytics and visualization system 310 presenting the user with the graphical user interface 1100, which allows the user to identify applicable terms and conditions, required forms, and proposed deliverables for the sourcing event. This may also include the processing device 202 of the transactional server 306 or data analytics and visualization system 310 presenting the user with the graphical user interface 1200, which allows the user to upload additional documentation related to the sourcing event. Again, note that at least some of the information may be collected using machine learning, such as based on scraped information from the initial customer RFX, and used to prepopulate various fields in the graphical user interface 1100.

One or more RFXs are generated at step 2714. This may include, for example, the processing device 202 of the transactional server 306 or data analytics and visualization system 310 generating an RFX 1300 for each supplier in each bid group. The contents of each RFX 1300 can be tailored for a specific supplier and for a specific bid group, such as by using information about each supplier available in the architecture 300. Also, part of each RFX 1300 can identify the acquisition strategy being used to source materials from a specific supplier or bid group. Since different RFXs 1300 can be generated for different suppliers and bid groups here, different acquisition strategies can be used in different RFXs 1300 and for different bid groups. Machine learning may be used here to generate the RFXs 1300, such as by applying a trained machine learning model to the various information previously collected in order to generate the RFXs 1300 using a standard template.

The one or more RFXs are provided to the suppliers in the bid groups at step 2716. This may include, for example, the processing device 202 of the transactional server 306 or data analytics and visualization system 310 emailing the RFXs 1300 or links to the RFXs 1300 to the suppliers. As noted above, however, there are various ways in which RFXs 1300 can be disseminated from an originating organization to various suppliers, and any suitable technique may be used here.

Although FIG. 27 illustrates one example of a method 2700 for RFX generation in a GUI-based RFX platform, various changes may be made to FIG. 27. For example, while shown as a series of steps, various steps in FIG. 27 may overlap, occur in parallel, occur in a different order, or occur any number of times. Also, various steps may be omitted if not needed or desired by a particular user.

Figure 28:
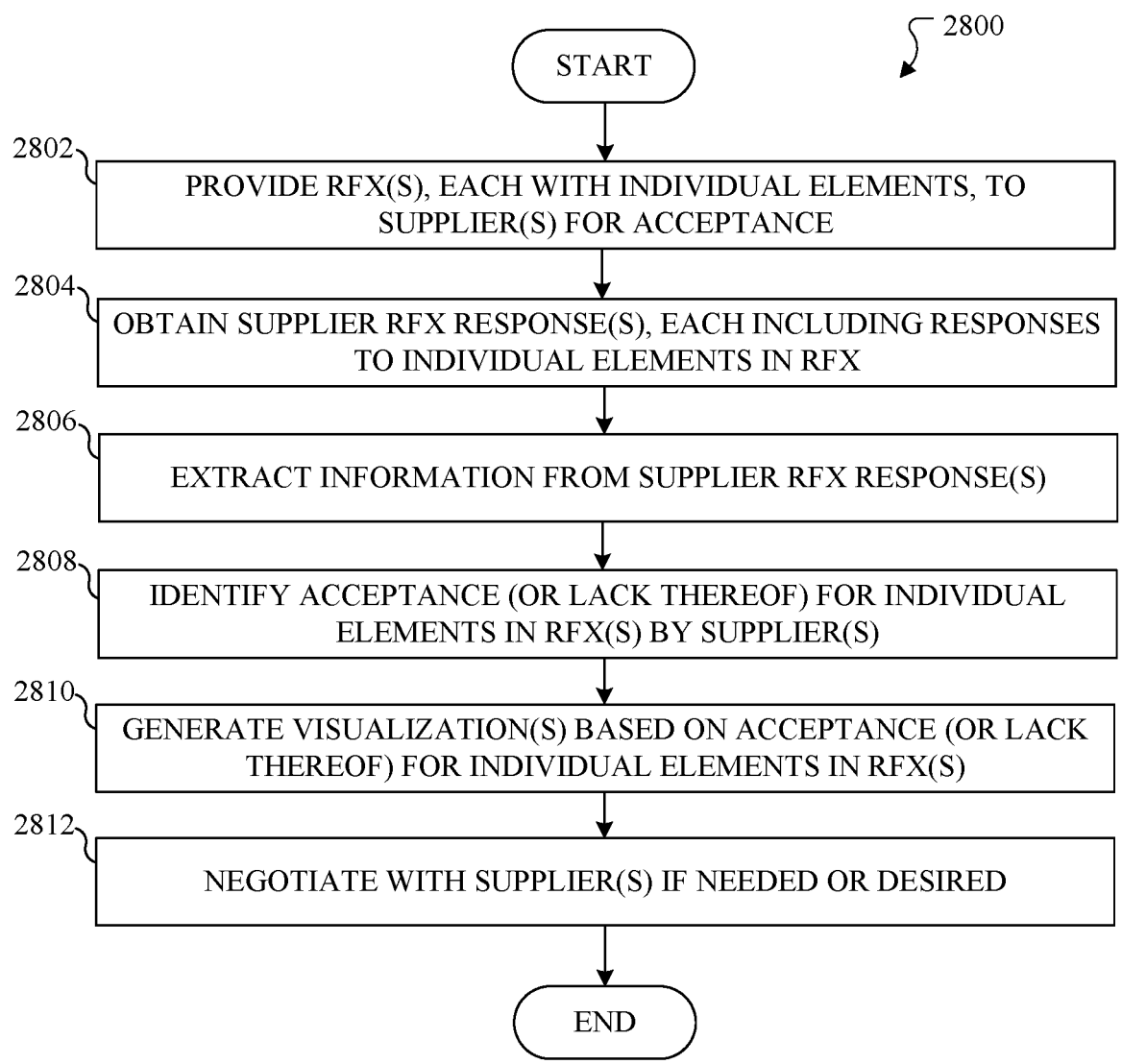
FIG. 28 illustrates an example method for supplier exception handling in a GUI-based RFX platform according to this disclosure.

FIG. 28 illustrates an example method 2800 for supplier exception handling in a GUI-based RFX platform according to this disclosure. For ease of explanation, the method 2800 may be described as being performed by the architecture 300 of FIG. 3, which may be at least partially implemented using the application server 112 and the database server 114/database 116 of FIG. 1 (at least one of which may be implemented using at least one device 200 of FIG. 2). However, the method 2800 may be performed using any suitable device(s) and in any suitable system(s).

As shown in FIG. 28, one or more RFXs (each having various individual elements) are presented to one or more suppliers for acceptance at step 2802, and one or more RFX responses (including responses to the individual elements) are received at step 2804. This may include, for example, the processing device 202 of the transactional server 306 or data analytics and visualization system 310 presenting one or more suppliers with the graphical user interfaces 1500 and 1600, where the graphical user interface 1600 allows each supplier to view and respond to each element of the associated RFX 1300. Machine learning may be used here, such as by applying a trained machine learning model to each RFX 1300 in order to split each RFX 1300 into its different elements, which can then be identified in the graphical user interface 1600 for acceptance. In some cases, each supplier can accept each element of the RFX 1300, indicate that each element of the RFX 1300 is not applicable, or reject (request modification of) each element of the RFX 1300.

Information from the one or more supplier RFX responses is extracted at step 2806. This may include, for example, the processing device 202 of the transactional server 306 or data analytics and visualization system 310 identifying how each supplier responded to the individual elements in that supplier's RFX. If a supplier used the graphical user interface 1600 to respond to each element of an RFX 1300, the information from the supplier's RFX response can be easily obtained based on the supplier's individual responses to the different elements of the RFX 1300. If a supplier did not use the graphical user interface 1600 to respond to each element of an RFX 1300 and instead submitted, for instance, a document responding to the RFX 1300, machine learning may be applied to extract the supplier's responses to individual elements of the RFX 1300 from the submitted documentation. However the information is obtained, this allows each supplier's acceptance (or lack thereof) of each RFX element in the supplier's RFX response to be identified at step 2808.

One or more visualizations are generated based on the acceptances (or lack thereof) of the RFX elements in the one or more supplier RFX responses at step 2810. This may include, for example, the processing device 202 of the transactional server 306 or data analytics and visualization system 310 providing a visualization (such as a visualization similar to the graphical user interface 1600) to graphically illustrate any exceptions in a single supplier's RFX response. This may also include the processing device 202 of the transactional server 306 or data analytics and visualization system 310 providing a visualization (such as a visualization 1800 or 1820) to graphically illustrate any exceptions in multiple suppliers' RFX responses. This may further include the processing device 202 of the transactional server 306 or data analytics and visualization system 310 performing a risk analysis based on suppliers' RFX responses and providing a visualization (such as a visualization 1840) based on the analysis. If needed, negotiations may then occur between the originating organization and any supplier who requested modification of or otherwise rejected at least one element in that supplier's RFX response at step 2812. In some cases, this may occur electronically, and various communications or results of the negotiation may be logged by the architecture 300 in order to provide an audit trail for the negotiation.

Although FIG. 28 illustrates one example of a method 2800 for supplier exception handling in a GUI-based RFX platform, various changes may be made to FIG. 28. For example, while shown as a series of steps, various steps in FIG. 28 may overlap, occur in parallel, occur in a different order, or occur any number of times. Also, various steps may be omitted if not needed or desired by a particular user.

Figure 29:
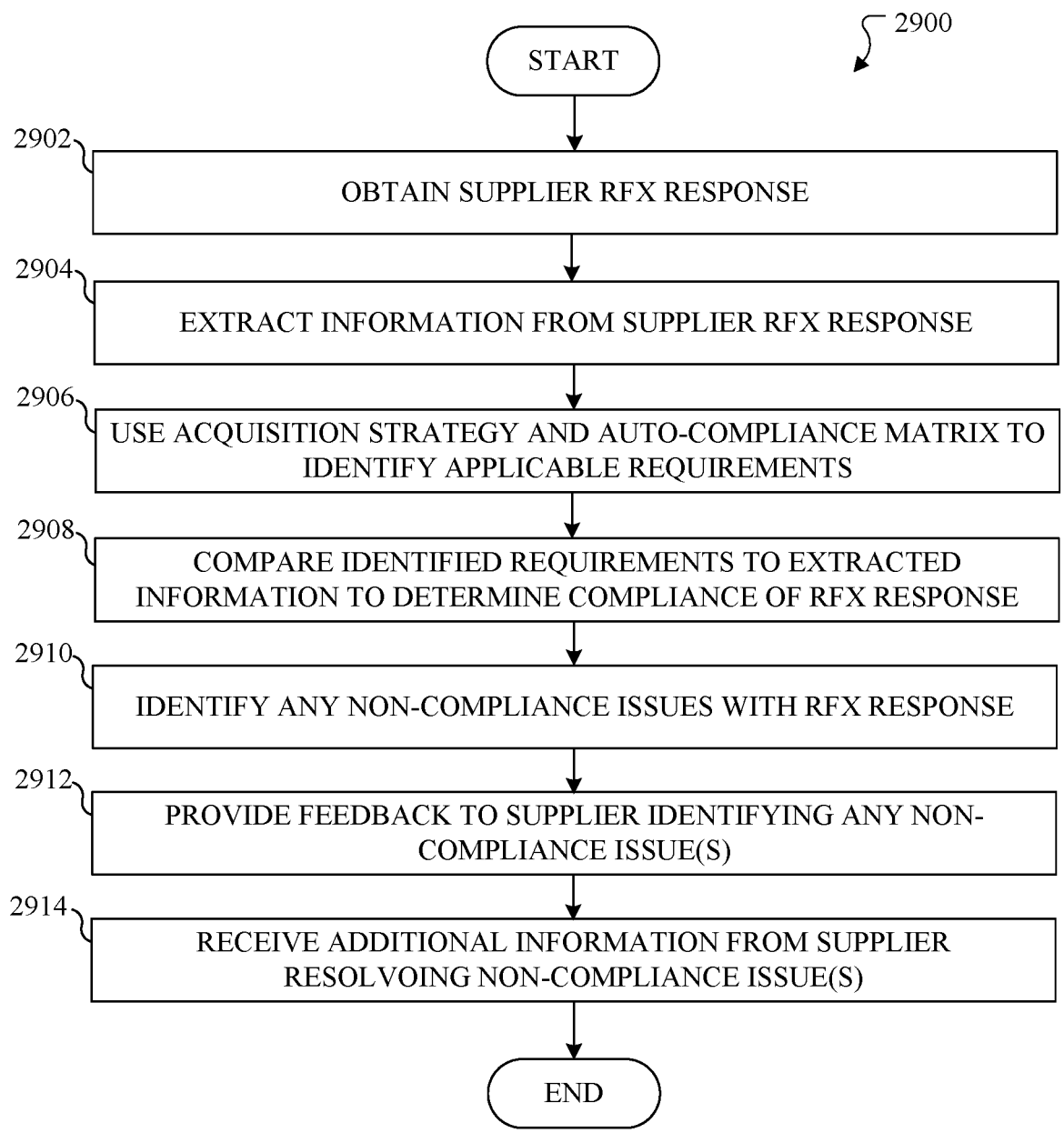
FIG. 29 illustrates an example method for supplier compliance checking in a GUI-based RFX platform according to this disclosure.

FIG. 29 illustrates an example method 2900 for supplier compliance checking in a GUI-based RFX platform according to this disclosure. For ease of explanation, the method 2900 may be described as being performed by the architecture 300 of FIG. 3, which may be at least partially implemented using the application server 112 and the database server 114/database 116 of FIG. 1 (at least one of which may be implemented using at least one device 200 of FIG. 2). However, the method 2900 may be performed using any suitable device(s) and in any suitable system(s).

As shown in FIG. 29, a supplier's RFX response is obtained at step 2902. This may include, for example, the processing device 202 of the transactional server 306 or data analytics and visualization system 310 receiving the supplier's RFX response via the graphical user interfaces 1500 and 1600. Information is extracted from the supplier's RFX response at step 2904. This may include, for example, the processing device 202 of the transactional server 306 or data analytics and visualization system 310 applying machine learning or other logic in order to identify (among other things) what type of contents were provided in the supplier's RFX response.

The acquisition strategy associated with this supplier is used along with an auto-compliance matrix to identify any regulatory requirements or other requirements that might be placed on the supplier or the supplier's RFX response at step 2906. This may include, for example, the processing device 202 of the transactional server 306 or data analytics and visualization system 310 using the previously-identified acquisition strategy associated with the supplier to access an auto-compliance matrix 1700 and identify requirements related to contents that should have been included in the supplier's RFX response.

The identified requirements are compared to the extracted information from the supplier's RFX response to determine the compliance of the supplier's RFX response at step 2908, and any non-compliance issues with the supplier's RFX response are identified at step 2910. This may include, for example, the processing device 202 of the transactional server 306 or data analytics and visualization system 310 determining which of the identified requirements (if any) is not satisfied based on the current contents of the supplier's RFX response. Feedback can be provided to the supplier identifying any non-compliance issues at step 2912, and (ideally) additional information is received from the supplier resolving any non-compliance issue(s) at step 2914. This may include, for example, the processing device 202 of the transactional server 306 or data analytics and visualization system 310 presenting a notification to the supplier via the graphical user interface 1500 and requesting the user provide additional information (such as in the form of a supplemental or substitute RFX response) with any missing contents.

Although FIG. 29 illustrates one example of a method 2900 for supplier compliance checking in a GUI-based RFX platform, various changes may be made to FIG. 29. For example, while shown as a series of steps, various steps in FIG. 29 may overlap, occur in parallel, occur in a different order, or occur any number of times. Also, various steps may be omitted if not needed or desired by a particular user.

Figure 30:
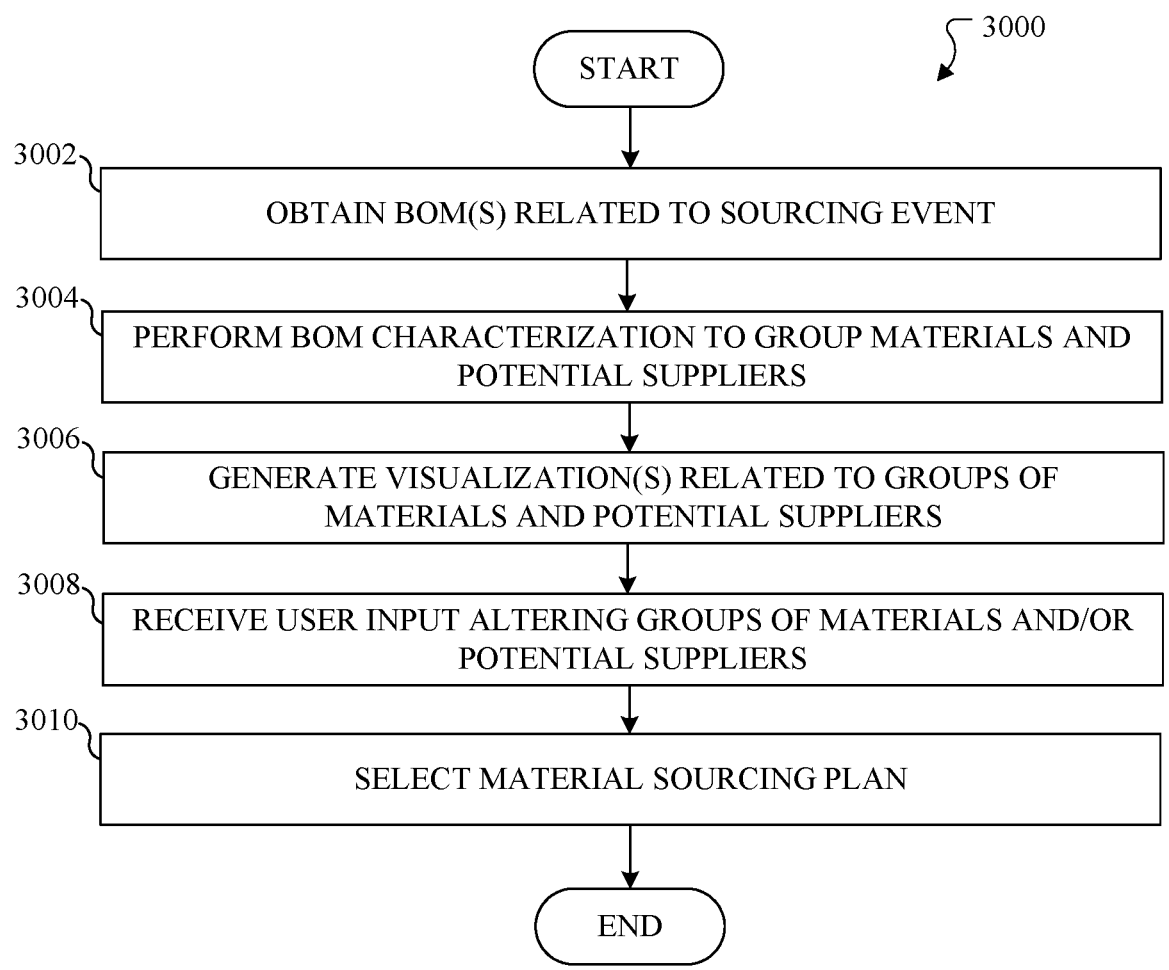
FIG. 30 illustrates an example method for BOM characterization and supplier sourcing in a GUI-based RFX platform according to this disclosure.

FIG. 30 illustrates an example method 3000 for BOM characterization and supplier sourcing in a GUI-based RFX platform according to this disclosure. For ease of explanation, the method 3000 may be described as being performed by the architecture 300 of FIG. 3, which may be at least partially implemented using the application server 112 and the database server 114/database 116 of FIG. 1 (at least one of which may be implemented using at least one device 200 of FIG. 2). However, the method 3000 may be performed using any suitable device(s) and in any suitable system(s).

As shown in FIG. 30, at least one bill of materials related to a sourcing event is obtained at step 3002. This may include, for example, the processing device 202 of the transactional server 306 or data analytics and visualization system 310 presenting the user with the graphical user interface 700 and obtaining BOM-related information about the sourcing event, such as via an upload of at least one spreadsheet or other information defining one or more bills of materials.

BOM characterization is performed to identify groups of materials and potential suppliers for those groups of materials at step 3004. This may include, for example, the processing device 202 of the transactional server 306 or data analytics and visualization system 310 processing the bill(s) of materials and other information to identify initial groups of materials and to identify initial groups of suppliers that may be permitted to bid on the initial groups of materials. As described above, in some embodiments, this may be accomplished using machine learning, such as by using a trained machine learning model to group the materials in at least one BOM and to identify possible suppliers for those materials. As a particular example, materials of similar types may be grouped together in different groups, and supplier information about available suppliers can be matched to the groups of materials (such as by using the hierarchy described above) to identify potential suppliers for the groups of materials. An optimization process may then be performed (possibly iteratively) in a partially-automated or fully-automated manner in order to assign specific suppliers to bid groups for the groups of materials. Part of the optimization process can involve the consideration of user-defined criteria, such as when the iterative process identifies a BOM characterization that partially satisfies the user-defined criteria and then modifies the BOM characterization to more fully satisfy the user-defined criteria. Of course, any other suitable mechanism may be used to group materials and suppliers.

One or more visualizations are generated based on the groups of materials and the associated suppliers at step 3006, and user input altering one or more of the groups of materials or associated suppliers may be received at step 3008. This may include, for example, the processing device 202 of the transactional server 306 or data analytics and visualization system 310 providing a visualization (such as a visualization 900-980) based on at least some of the groups of materials and at least some of the potential suppliers of those groups. The user may be allowed to interact with the visualization(s) in order to change the BOM characterization, such as by changing the suppliers used to provide certain materials or by changing the materials that may be provided by certain suppliers. This may also include the processing device 202 of the transactional server 306 or data analytics and visualization system 310 interacting with the user via the graphical user interface 800 to control the bid groups.

Different groups of materials and different bid groups of suppliers that may be used to procure those groups of materials may be said to represent different material sourcing plans, and at least one specific material sourcing plan may be selected at step 3010. This may include, for example, the processing device 202 of the transactional server 306 or data analytics and visualization system 310 allowing the user to indicate that specified groups of materials and specified bid groups should be used in the generation of at least one RFX or in the performance of some other function. As noted above, however, this may also be done in a fully-automated manner, in which case the system can simply select and output a material sourcing plan.

Although FIG. 30 illustrates one example of a method 3000 for BOM characterization and supplier sourcing in a GUI-based RFX platform, various changes may be made to FIG. 30. For example, while shown as a series of steps, various steps in FIG. 30 may overlap, occur in parallel, occur in a different order, or occur any number of times. Also, various steps may be omitted if not needed or desired by a particular user.

Figure 31:
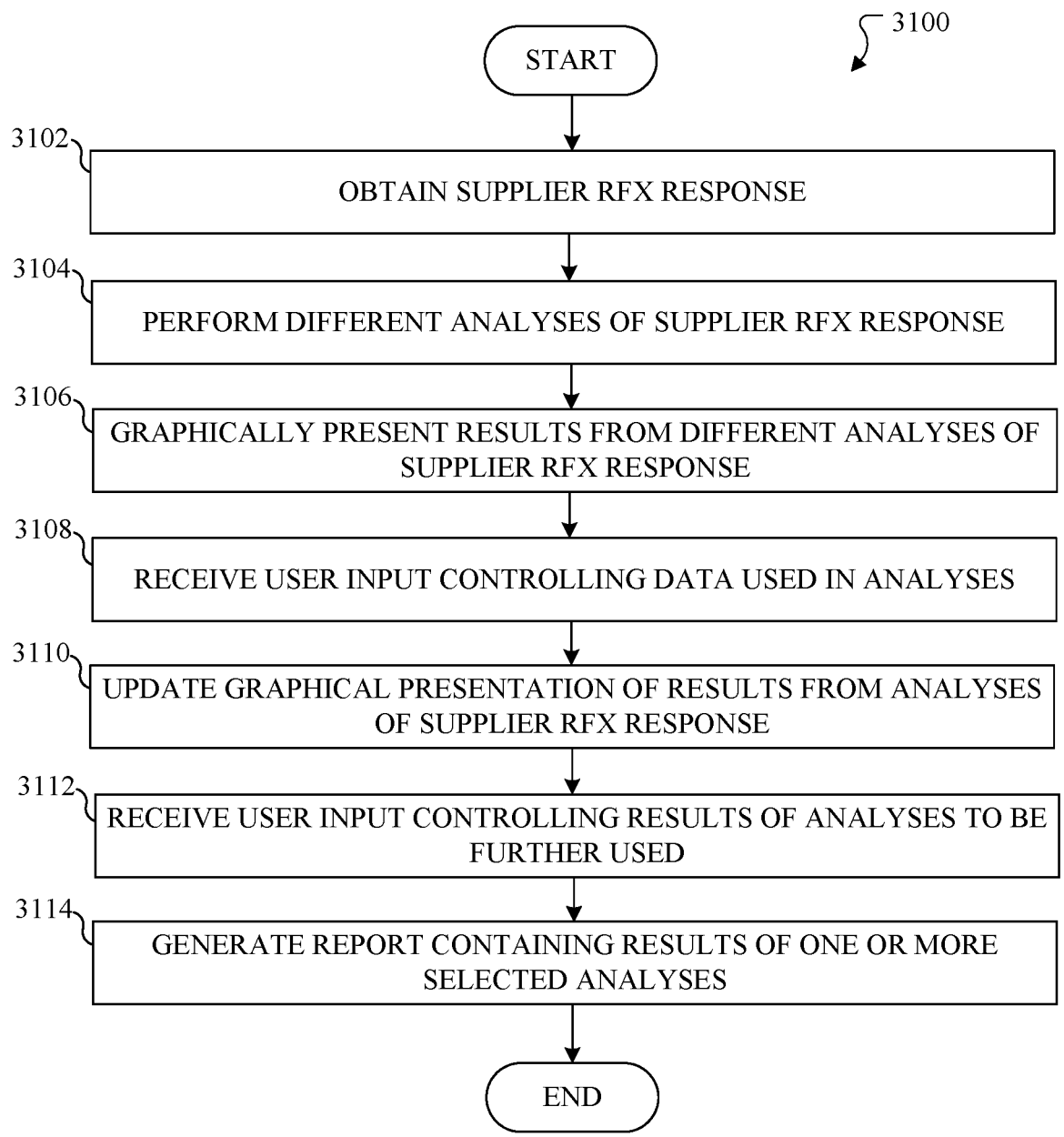
FIG. 31 illustrates an example method for performing controllable analyses of supplier RFX responses in a GUI-based RFX platform according to this disclosure.

FIG. 31 illustrates an example method 3100 for performing controllable analyses of supplier RFX responses in a GUI-based RFX platform according to this disclosure. For ease of explanation, the method 3100 may be described as being performed by the architectures 300 and 1900 of FIGS. 3 and 19, which may be at least partially implemented using the application server 112 and the database server 114/database 116 of FIG. 1 (at least one of which may be implemented using at least one device 200 of FIG. 2). However, the method 3100 may be performed using any suitable device(s) and in any suitable system(s).

As shown in FIG. 31, a supplier's RFX response is obtained at step 3102. This may include, for example, the processing device 202 of the transactional server 306 or data analytics and visualization system 310 receiving the supplier's RFX response via the graphical user interfaces 1500 and 1600. Different analyses of the supplier's RFX response are performed at step 3104. This may include, for example, the processing device 202 implementing at least part of the architecture 1900 receiving data from various data sources 1902-1914 and performing various analyses using the pricing analysis modules 1916-1928. The analyses can be performed to obtain price analysis or other analysis results associated with the supplier's proposal from the RFX response. Note that the specific types of analyses performed here may be controlled by a user, or all types of analyses can be performed here.

Results obtained using the various analyses are graphically presented to the user at step 3106. This may include, for example, the processing device 202 implementing at least part of the architecture 1900 providing a visualization 2000 containing the results of the various analyses to the user. User input controlling the data used in the analyses may be received at step 3108, and the graphical presentation of the results of the analyses is updated at step 3110. This may include, for example, the processing device 202 implementing at least part of the architecture 1900 receiving an indication from the user that certain data contained in the visualization 2000 should be excluded from use. As a particular example, the user may hover over a specific data point in the visualization 2000 to view a pop-up menu, which the user can use to provide an indication that the data point should be excluded and to provide an explanation why. This can cause at least one of the analyses to be repeated without using the excluded data, and updated results of the one or more analyses can be included in an updated visualization 2000.

User input controlling which results of the analyses may be provided for further use is received at step 3112. This may include, for example, the processing device 202 implementing at least part of the architecture 1900 presenting the user with the graphical user interface 2100 that allows the user to select the results from specific analyses for further use. In this example, a report containing the results from one or more selected analyses is generated at step 3114. This may include, for example, the processing device 202 implementing at least part of the architecture 1900 using the results from the one or more selected analyses to generate a report or other documentation, which may include a visualization 2000 generated previously.

Although FIG. 31 illustrates one example of a method 3100 for performing controllable analyses of supplier RFX responses in a GUI-based RFX platform, various changes may be made to FIG. 31. For example, while shown as a series of steps, various steps in FIG. 31 may overlap, occur in parallel, occur in a different order, or occur any number of times. Also, various steps may be omitted if not needed or desired by a particular user.

Figure 32:
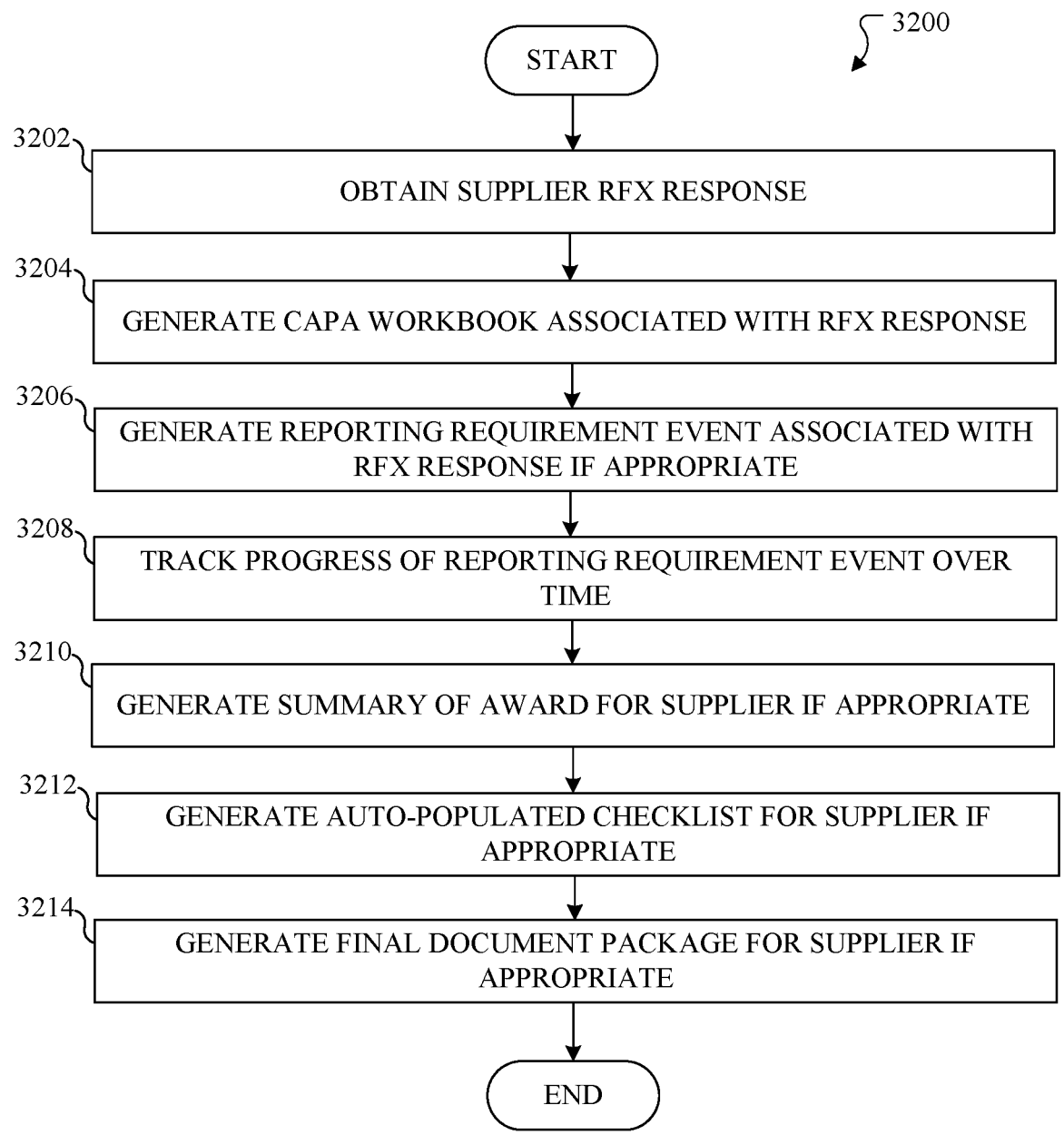
FIG. 32 illustrates an example method for additional processing of supplier RFX responses in a GUI-based RFX platform according to this disclosure.

FIG. 32 illustrates an example method 3200 for additional processing of supplier RFX responses in a GUI-based RFX platform according to this disclosure. For ease of explanation, the method 3200 may be described as being performed by the architecture 300 of FIG. 3, which may be at least partially implemented using the application server 112 and the database server 114/database 116 of FIG. 1 (at least one of which may be implemented using at least one device 200 of FIG. 2). However, the method 3200 may be performed using any suitable device(s) and in any suitable system(s).

As shown in FIG. 32, a supplier's RFX response is obtained at step 3202. This may include, for example, the processing device 202 of the transactional server 306 or data analytics and visualization system 310 receiving the supplier's RFX response via the graphical user interfaces 1500 and 1600. A CAPA workbook associated with the RFX response is generated at step 3204. This may include, for example, the processing device 202 of the transactional server 306 or data analytics and visualization system 310 populating a spreadsheet or other CAPA workbook 2200 with information extracted from the supplier's RFX response. In some cases, machine learning can be used to identify specific information extracted from the supplier's RFX response and how that information maps to different fields in the CAPA workbook 2200.

A reporting requirement event associated with the supplier's RFX response is generated (if appropriate) at step 3206, and progress of the reporting requirement event is tracked at step 3208. This may include, for example, the processing device 202 of the transactional server 306 or data analytics and visualization system 310 presenting the user with the graphical user interface 2300 and obtaining various information about a new reporting requirement event. This may also include the processing device 202 of the transactional server 306 or data analytics and visualization system 310 tracking the reporting requirement event over time and receiving user input when the required reporting has occurred. Of course, the identification and tracking of a reporting requirement event may also occur automatically, such as in response to the architecture 300 detecting that a reporting requirement threshold has been met.

A summary of award may be generated for the supplier (if appropriate) at step 3210. This may include, for example, the processing device 202 of the transactional server 306 or data analytics and visualization system 310 generating a summary of award 2500 for the supplier based on information collected or otherwise available in the architecture 300. This may be done, for instance, if and when the supplier is selected by the originating organization based on the supplier's RFX response.

An auto-populated checklist may be generated for the supplier (if appropriate) at step 3212. This may include, for example, the processing device 202 of the transactional server 306 or data analytics and visualization system 310 generating a checklist 2600 for the supplier based on information collected or otherwise available in the architecture 300. Various answers or other fields of the checklist 2600 can be auto-populated based on the available information, such as based on the supplier's answers to various questions in the checklists of the graphical user interface 1500. This may be done, for instance, so that the checklist 2600 can be included in any documentation submitted by the originating organization.

A final document package may be generated for the supplier (if appropriate) at step 3214. This may include, for example, the processing device 202 of the transactional server 306 or data analytics and visualization system 310 generating a final document package used by the originating organization to formalize its contract arrangements with the supplier. The final document package may be based on various information collected by the architecture 300, such as the supplier's RFX response and any related information.

Although FIG. 32 illustrates one example of a method 3200 for additional processing of supplier RFX responses in a GUI-based RFX platform, various changes may be made to FIG. 32. For example, while shown as a series of steps, various steps in FIG. 32 may overlap, occur in parallel, occur in a different order, or occur any number of times. Also, various steps may be omitted if not needed or desired by a particular user.

The following describes example embodiments of a GUI-based RFX platform or other platform according to this disclosure. However, other embodiments of a GUI-based RFX platform or other platform may be used in accordance with the teachings of this disclosure.

In a first embodiment, a method includes receiving, using a first graphical user interface, information associated with at least one request for proposal, quote, bid, or information (RFX) to be generated and provided to one or more suppliers. The method also includes identifying at least one of multiple acquisition scenarios associated with the at least one RFX to be generated based on the received information. The method further includes generating the at least one RFX based on the received information and the at least one identified acquisition scenario, where each RFX includes multiple elements. The method also includes receiving one or more RFX responses from the one or more suppliers, where the one or more RFX responses include the one or more suppliers' responses to the multiple elements of the at least one RFX. In addition, the method includes presenting a second graphical user interface. The second graphical user interface identifies at least one of the one or more supplier's responses to at least some of the multiple elements of the at least one RFX. Different indicators in the second graphical user interface identify different elements of the at least one RFX that have been accepted and not accepted by the at least one supplier.

In a second embodiment, an apparatus includes at least one processor configured to receive, using a first graphical user interface, information associated with at least one request for proposal, quote, bid, or information (RFX) to be generated and provided to one or more suppliers. The at least one processor is also configured to identify at least one of multiple acquisition scenarios associated with the at least one RFX to be generated based on the received information. The at least one processor is further configured to generate the at least one RFX based on the received information and the at least one identified acquisition scenario, where each RFX includes multiple elements. The at least one processor is also configured to receive one or more RFX responses from the one or more suppliers, where the one or more RFX responses include the one or more suppliers responses to the multiple elements of the at least one RFX. In addition, the at least one processor is configured to initiate presentation of a second graphical user interface. The second graphical user interface identifies at least one of the one or more supplier's responses to at least some of the multiple elements of the at least one RFX. Different indicators in the second graphical user interface identify different elements of the at least one RFX that have been accepted and not accepted by the at least one supplier.

In a third embodiment, a non-transitory computer readable medium contains instructions that when executed cause at least one processor to receive, using a first graphical user interface, information associated with at least one request for proposal, quote, bid, or information (RFX) to be generated and provided to one or more suppliers. The medium also contains instructions that when executed cause the at least one processor to identify at least one of multiple acquisition scenarios associated with the at least one RFX to be generated based on the received information. The medium further contains instructions that when executed cause the at least one processor to generate the at least one RFX based on the received information and the at least one identified acquisition scenario, where each RFX includes multiple elements. The medium also contains instructions that when executed cause the at least one processor to receive one or more RFX responses from the one or more suppliers, where the one or more RFX responses include the one or more suppliers' responses to the multiple elements of the at least one RFX. In addition, the medium contains instructions that when executed cause the at least one processor to initiate presentation of a second graphical user interface. The second graphical user interface identifies at least one of the one or more supplier's responses to at least some of the multiple elements of the at least one RFX. Different indicators in the second graphical user interface identify different elements of the at least one RFX that have been accepted and not accepted by the at least one supplier.

Any single one or any combination of the following specific features may be used with the first, second, or third embodiment. The second graphical user interface may be presented by identifying at least one group of elements from an associated RFX, presenting a first indicator associated with each group of elements (where the first indicator identifies whether all individual elements in the associated group of elements have been accepted or not accepted by the associated supplier), and, in response to a user selection of a specific group of elements, presenting second indicators identifying whether different individual elements in the specific group of elements have been accepted or not accepted by the associated supplier. The first and second indicators may use different colors to identify different elements or groups of elements from the associated RFX that are accepted or not accepted by the associated supplier. The second graphical user interface may be presented by presenting a listing of at least some of the elements from the at least one RFX and presenting indicators identifying whether each of the one or more suppliers has accepted or not accepted different elements from the at least one RFX. Multiple ones of the acquisition scenarios may be identified based on the received information, multiple RFXs may be generated for multiple suppliers, different ones of the RFXs may be associated with different acquisition scenarios, the RFXs may have a common format, and the different ones of the RFXs may contain content that varies based on the different acquisition scenarios. Machine learning may be applied to at least one of the one or more RFX responses in order to extract at least one supplier's responses to the multiple elements of the at least one RFX. The first graphical user interface may include multiple fields configured to receive from at least one user information related to an organization providing the at least one RFX; information related to a sourcing event associated with the at least one RFX; information used to identify the at least one of the acquisition scenarios; information defining multiple bid groups associated with multiple groups of materials to be sourced from different groups of suppliers: information identifying selected terms and conditions, forms, and deliverables associated with the at least one RFX; and one or more attachments associated with the at least one RFX.

In a fourth embodiment, a method includes receiving, using a first graphical user interface, information associated with multiple requests for proposal, quote, bid, or information (RFXs) to be generated and provided to multiple suppliers. The method also includes identifying multiple bid groups associated with different groups of materials from at least one bill of materials (BOM) to be potentially sourced from different groups of the suppliers. Some of the information received using the first graphical user interface varies for different ones of the bid groups. The method further includes identifying one or more acquisition scenarios based on the received information. The method also includes generating the RFXs based on the received information, the identified bid groups, and the one or more identified acquisition scenarios, where different ones of the RFXs are associated with different ones of the bid groups. The method further includes receiving, using a second graphical user interface, an RFX response from each of at least some of the suppliers. In addition, the method includes presenting a third graphical user interface, where the third graphical user interface is based on at least one of the RFX responses.

In a fifth embodiment, an apparatus includes at least one processor configured to receive, using a first graphical user interface, information associated with multiple requests for proposal, quote, bid, or information (RFXs) to be generated and provided to multiple suppliers. The at least one processor is also configured to identify multiple bid groups associated with different groups of materials from at least one bill of materials (BOM) to be potentially sourced from different groups of the suppliers. Some of the information received using the first graphical user interface varies for different ones of the bid groups. The at least one processor is further configured to identify one or more acquisition scenarios based on the received information. The at least one processor is also configured to generate the RFXs based on the received information, the identified bid groups, and the one or more identified acquisition scenarios, where different ones of the RFXs are associated with different ones of the bid groups. The at least one processor is further configured to receive, using a second graphical user interface, an RFX response from each of at least some of the suppliers. In addition, the at least one processor is configured to initiate presentation of a third graphical user interface, where the third graphical user interface is based on at least one of the RFX responses.

In a sixth embodiment, a non-transitory computer readable medium contains instructions that when executed cause at least one processor to receive, using a first graphical user interface, information associated with multiple requests for proposal, quote, bid, or information (RFXs) to be generated and provided to multiple suppliers. The medium also contains instructions that when executed cause the at least one processor to identify multiple bid groups associated with different groups of materials from at least one bill of materials (BOM) to be potentially sourced from different groups of the suppliers. Some of the information received using the first graphical user interface varies for different ones of the bid groups. The medium further contains instructions that when executed cause the at least one processor to identify one or more acquisition scenarios based on the received information. The medium also contains instructions that when executed cause the at least one processor to generate the RFXs based on the received information, the identified bid groups, and the one or more identified acquisition scenarios, where different ones of the RFXs are associated with different ones of the bid groups. The medium further contains instructions that when executed cause the at least one processor to receive, using a second graphical user interface, an RFX response from each of at least some of the suppliers. In addition, the medium contains instructions that when executed cause the at least one processor to initiate presentation of a third graphical user interface, where the third graphical user interface is based on at least one of the RFX responses.

Any single one or any combination of the following specific features may be used with the fourth, fifth, or sixth embodiment. The first graphical user interface may include multiple fields configured to receive from at least one user information related to an organization providing the RFXs; information related to a sourcing event associated with the RFXs; information used to identify the one or more acquisition scenarios: information used to define the bid groups; information identifying selected terms and conditions, forms, and deliverables associated with the RFXs; and one or more attachments associated with the RFXs. The second graphical user interface may include multiple fields configured to receive from at least one user associated with a specific one of the suppliers information related to materials or services to be provided by the specific supplier, answers to checklist questions for the specific supplier, and information identifying whether the specific supplier accepts or does not accept individual elements of the RFX provided to the specific supplier. The third graphical user interface may include at least one of: (i) an identification from one or more RFX responses of one or more suppliers' responses to individual elements or groups of elements contained in the one or more RFXs provided to the one or more suppliers, where different indicators identify different elements or groups of elements that have been accepted and not accepted by the one or more suppliers; (ii) an identification of multiple suppliers and risks associated with the multiple suppliers, where at least some of the risks are at least partially based on the multiple suppliers' RFX responses; and (iii) analysis results produced using at least one RFX response from at least one supplier. An electronic spreadsheet file may be generated for each RFX response by extracting information from the RFX response and inserting the extracted information into an electronic spreadsheet: reporting requirement events associated with at least some of the suppliers may be tracked; and/or one or more visualizations may be generated based at least partially on the reporting requirement events associated with at least some of the suppliers. A summary of award associated with a specific one of the suppliers (where at least some contents of the summary of award are based on the specific supplier's RFX response) may be generated; a document package associated with the specific supplier (where at least some contents of the document package based on the specific supplier's RFX response) may be generated; and/or a checklist associated with the specific supplier (where at least part of the checklist auto-populated based on the specific supplier's RFX response) may be generated. Multiple acquisition scenarios may be identified based on the received information, the RFXs may have a common format, and different ones of the RFXs may be associated with different acquisition scenarios and may contain content that varies based on the different acquisition scenarios.

In a seventh embodiment, a method includes receiving, using a first graphical user interface, information associated with a request for proposal, quote, bid, or information (RFX) to be generated and provided to a supplier. The method also includes identifying one of multiple acquisition scenarios associated with the RFX to be generated based on the received information. The method further includes generating the RFX based on the received information and the identified acquisition scenario. The method also includes receiving, using a second graphical user interface, an RFX response from the supplier. The method further includes identifying multiple requirements associated with the RFX response based on the identified acquisition scenario and comparing contents of the RFX response to the identified requirements. In addition, the method includes automatically informing the supplier of one or more identified requirements for which the RFX response is non-compliant.

In an eighth embodiment, an apparatus includes at least one processor configured to receive, using a first graphical user interface, information associated with a request for proposal, quote, bid, or information (RFX) to be generated and provided to a supplier. The at least one processor is also configured to identify one of multiple acquisition scenarios associated with the RFX to be generated based on the received information. The at least one processor is further configured to generate the RFX based on the received information and the identified acquisition scenario. The at least one processor is also configured to receive, using a second graphical user interface, an RFX response from the supplier. The at least one processor is further configured to identify multiple requirements associated with the RFX response based on the identified acquisition scenario and compare contents of the RFX response to the identified requirements. In addition, the at least one processor is configured to automatically inform the supplier of one or more identified requirements for which the RFX response is non-compliant.

In a ninth embodiment, a non-transitory computer readable medium contains instructions that when executed cause at least one processor to receive, using a first graphical user interface, information associated with a request for proposal, quote, bid, or information (RFX) to be generated and provided to a supplier. The medium also contains instructions that when executed cause the at least one processor to identify one of multiple acquisition scenarios associated with the RFX to be generated based on the received information. The medium further contains instructions that when executed cause the at least one processor to generate the RFX based on the received information and the identified acquisition scenario. The medium also contains instructions that when executed cause the at least one processor to receive, using a second graphical user interface, an RFX response from the supplier. The medium further contains instructions that when executed cause the at least one processor to identify multiple requirements associated with the RFX response based on the identified acquisition scenario and compare contents of the RFX response to the identified requirements. In addition, the medium contains instructions that when executed cause the at least one processor to automatically inform the supplier of one or more identified requirements for which the RFX response is non-compliant.

Any single one or any combination of the following specific features may be used with the seventh, eighth, or ninth embodiment. The multiple requirements associated with the RFX response may be identified by accessing a compliance matrix to identify the requirements, where the compliance matrix contains requirements associated with the multiple acquisition scenarios. The supplier may be informed of the one or more identified requirements for which the RFX response is non-compliant immediately after receipt of the RFX response. An updated RFX response may be received from the supplier after informing the supplier of the one or more identified requirements for which the RFX response is non-compliant. Machine learning may be applied to the RFX response in order to extract the contents of the RFX response. The RFX may include multiple elements, and the second graphical user interface may be configured to receive from the supplier a response to each of the multiple elements of the RFX. The multiple requirements may include multiple regulatory requirements.

In a tenth embodiment, a method includes performing, using at least one processor, multiple price analyses associated with a proposal. The method also includes generating a visualization that overlays results of the multiple price analyses in a common graph, where different ones of the price analyses are associated with different data points in the graph. The method further includes receiving a user selection of one or more of the data points in the visualization to be excluded. The method also includes repeating, using the at least one processor, the multiple price analyses without using the one or more excluded data points. In addition, the method includes updating the visualization based on results of the repeated price analyses.

In an eleventh embodiment, an apparatus includes at least one processor configured to perform multiple price analyses associated with a proposal. The at least one processor is also configured to generate a visualization that overlays results of the multiple price analyses in a common graph, where different ones of the price analyses are associated with different data points in the graph. The at least one processor is further configured to receive a user selection of one or more of the data points in the visualization to be excluded. The at least one processor is also configured to repeat the multiple price analyses without using the one or more excluded data points. In addition, the at least one processor is also configured to update the visualization based on results of the repeated price analyses.

In a twelfth embodiment, a non-transitory computer readable medium contains instructions that when executed cause at least one processor to perform multiple price analyses associated with a proposal. The medium also contains instructions that when executed cause the at least one processor to generate a visualization that overlays results of the multiple price analyses in a common graph, where different ones of the price analyses are associated with different data points in the graph. The medium further contains instructions that when executed cause the at least one processor to receive a user selection of one or more of the data points in the visualization to be excluded. The medium also contains instructions that when executed cause the at least one processor to repeat the multiple price analyses without using the one or more excluded data points. In addition, the medium contains instructions that when executed cause the at least one processor to update the visualization based on results of the repeated price analyses.

Any single one or any combination of the following specific features may be used with the tenth, eleventh, or twelfth embodiment. The user selection of the one or more data points to be excluded may be received by providing a pop-up menu in association with one of the data points in the visualization and receiving a user invocation of a function to exclude the associated data point. An annotation associated with each of the one or more excluded data points may be received and stored, and each annotation may provide an explanation for excluding the associated data point. The visualization may include controls configured to identify which of multiple curves are fit to the data points in the common graph, and different curves may be associated with different price analyses. A report or summary of award that includes the updated visualization may be generated. At least one excluded data point may be reintroduced back into the multiple price analyses. The proposal may include a supplier's response to a request for proposal, quote, bid, or information (RFX).

In a thirteenth embodiment, a method includes receiving, using a graphical user interface, an identification of at least one bill of materials (BOM). The method also includes identifying multiple materials contained in the at least one BOM. The method further includes determining a BOM characterization that identifies multiple bid groups associated with different groups of the materials from the at least one BOM to be potentially sourced from different groups of suppliers. The method also includes presenting at least one visualization to one or more users, where the at least one visualization is based on how the different groups of the materials are to be potentially sourced from the different groups of the suppliers according to the determined BOM characterization. The method further includes receiving user input via the at least one visualization, where the user input modifies at least one of the bid groups. In addition, the method includes updating the at least one visualization based on the user input.

In a fourteenth embodiment, an apparatus includes at least one processor configured to receive, using a graphical user interface, an identification of at least one bill of materials (BOM). The at least one processor is also configured to identify multiple materials contained in the at least one BOM. The at least one processor is further configured to determine a BOM characterization that identifies multiple bid groups associated with different groups of the materials from the at least one BOM to be potentially sourced from different groups of suppliers. The at least one processor is also configured to initiate presentation of at least one visualization to one or more users, where the at least one visualization is based on how the different groups of the materials are to be potentially sourced from the different groups of the suppliers according to the determined BOM characterization. The at least one processor is further configured to receive user input via the at least one visualization, where the user input modifies at least one of the bid groups. In addition, the at least one processor is configured to update the at least one visualization based on the user input.

In a fifteenth embodiment, a non-transitory computer readable medium contains instructions that when executed cause at least one processor to receive, using a graphical user interface, an identification of at least one bill of materials (BOM). The medium also contains instructions that when executed cause the at least one processor to identify multiple materials contained in the at least one BOM. The medium further contains instructions that when executed cause the at least one processor to determine a BOM characterization that identifies multiple bid groups associated with different groups of the materials from the at least one BOM to be potentially sourced from different groups of suppliers. The medium also contains instructions that when executed cause the at least one processor to initiate presentation of at least one visualization to one or more users, where the at least one visualization is based on how the different groups of the materials are to be potentially sourced from the different groups of the suppliers according to the determined BOM characterization. The medium further contains instructions that when executed cause the at least one processor to receive user input via the at least one visualization, where the user input modifies at least one of the bid groups. In addition, the medium contains instructions that when executed cause the at least one processor to update the at least one visualization based on the user input.

Any single one or any combination of the following specific features may be used with the thirteenth, fourteenth, or fifteenth embodiment. The at least one visualization may include at least one chart or graph: the user input may include a user selection of a portion of the at least one chart or graph and a user modification to one or more suppliers or one or more materials associated with the selected portion of the at least one chart or graph; and the at least one visualization may be updated based on the user modification. The BOM characterization may be determined by grouping related materials contained in the at least one BOM based on a similarity of the materials or one or more user-defined criteria to identify the different groups of the materials. The BOM characterization may be determined by identifying an initial BOM characterization and, using an optimization process, iteratively modifying the initial BOM characterization in order to satisfy one or more criteria and generate the determined BOM characterization. The BOM characterization may be determined by (i) automatically determining whether one or more potential BOM characterizations that satisfy one or more criteria are identified, (ii) if a single potential BOM characterization that satisfies the one or more criteria is identified, using the single potential BOM characterization as the determined BOM characterization, (iii) if multiple potential BOM characterizations that satisfy the one or more criteria are identified, selecting one of the multiple potential BOM characterizations as the determined BOM characterization automatically or based on user input, and (iv) if no potential BOM characterizations that satisfy the one or more criteria are identified, selecting an imperfect BOM characterization as the determined BOM characterization automatically or based on user input. The BOM characterization may be determined by identifying a potential BOM characterization that satisfies some but not all user-defined or other criteria using an optimization process and prompting a user to: (i) accept the potential BOM characterization as the determined BOM characterization, (ii) request that the optimization process be repeated, or (iii) perform one or more manipulations manually to the potential BOM characterization in order to generate the determined BOM characterization. The BOM characterization may be determined by applying machine learning to associate different ones of the suppliers with the different groups of the materials.

Note that while fifteen example embodiments of a GUI-based RFX platform or other platform are described separately above, any individual one of these fifteen embodiments or any combination of two or more of these fifteen embodiments may be used in any given implementation. Moreover, when multiple embodiments described above are used in a specific implementation, the implementation may include none, one, some, or all of the specific features associated with those embodiments and described above.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element,"

"member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    training at least one machine learning model using a plurality of previous requests for proposal, quote, bid, or information (RFXs), the at least one machine learning model comprising at least one natural language algorithm;
    receiving, using a first graphical user interface, at least one uploaded spreadsheet file containing at least one bill of materials (BOM) to be used in an RFX;
    identifying, from the at least one uploaded spreadsheet file, multiple materials contained in the at least one BOM;
    applying the at least one machine learning model to group the multiple materials into different groups of materials;
    applying the at least one machine learning model to associate different groups of suppliers with the different groups of the materials;
    determining a BOM characterization that identifies multiple bid groups associated with the different groups of the materials from the at least one BOM to be potentially sourced from the different groups of suppliers;
    presenting at least one visualization to one or more users, the at least one visualization based on how the different groups of the materials are to be potentially sourced from the different groups of the suppliers according to the determined BOM characterization, the at least one visualization comprising at least one graph;
    receiving a first user input associated with the at least one visualization via an application programming interface (API) gateway and at least one API, the first user input comprising a user selection of a portion of the at least one graph, the portion indicating a quantity corresponding to one or more suppliers or one or more materials associated with the selected portion of the at least one graph;
    presenting a second graphical user interface identifying the one or more suppliers or the one or more materials associated with the selected portion of the at least one graph;
    receiving a second user input via the second graphical user interface, the second user input comprising a user modification to the one or more suppliers or the one or more materials associated with the selected portion of the at least one graph; and
    updating the at least one visualization based on the second user input and presenting the at least one updated visualization to the one or more users.

2. The method of claim 1, wherein determining the BOM characterization comprises:
    grouping related materials contained in the at least one BOM based on a similarity of the materials or one or more user-defined criteria to identify the different groups of the materials.

3. The method of claim 1, wherein determining the BOM characterization comprises:
    identifying an initial BOM characterization; and
    using an optimization process, iteratively modifying the initial BOM characterization in order to satisfy one or more criteria and generate the determined BOM characterization.

4. The method of claim 1, wherein determining the BOM characterization comprises:
    automatically determining whether one or more potential BOM characterizations that satisfy one or more criteria are identified;
    if a single potential BOM characterization that satisfies the one or more criteria is identified, using the single potential BOM characterization as the determined BOM characterization;
    if multiple potential BOM characterizations that satisfy the one or more criteria are identified, selecting one of the multiple potential BOM characterizations as the determined BOM characterization automatically or based on user input; and
    if no potential BOM characterizations that satisfy the one or more criteria are identified, selecting an imperfect BOM characterization as the determined BOM characterization automatically or based on user input.

5. The method of claim 1, wherein determining the BOM characterization comprises:
    identifying a potential BOM characterization that satisfies some but not all user-defined or other criteria using an optimization process; and
    prompting a user to: (i) accept the potential BOM characterization as the determined BOM characterization, (ii) request that the optimization process be repeated, or (iii) perform one or more manipulations manually to the potential BOM characterization in order to generate the determined BOM characterization.

6. The method of claim 1, wherein the at least one graph identifies different diversity-related classifications of the suppliers and percentages of overall monetary value associated with the different diversity-related classifications of the suppliers.

7. The method of claim 1, wherein the at least one visualization further comprises at least one table displayed adjacent to the at least one graph.

8. An apparatus comprising:
    at least one processor configured to:
        train at least one machine learning model using a plurality of previous requests for proposal, quote, bid, or information (RFXs), the at least one machine learning model comprising at least one natural language algorithm;
        receive, using a first graphical user interface, at least one uploaded spreadsheet file containing at least one bill of materials (BOM) to be used in an RFX;
        identify multiple materials contained in the at least one BOM;
        apply the at least one machine learning model to group the multiple materials into different groups of materials;
        apply the at least one machine learning model to associate different groups of suppliers with the different groups of the materials;

determine a BOM characterization that identifies multiple bid groups associated with the different groups of the materials from the at least one BOM to be potentially sourced from the different groups of suppliers;

initiate presentation of at least one visualization to one or more users, the at least one visualization based on how the different groups of the materials are to be potentially sourced from the different groups of the suppliers according to the determined BOM characterization, the at least one visualization comprising at least one graph;

receive a first user input associated with the at least one visualization via an application programming interface (API) gateway and at least one API, the first user input comprising a user selection of a portion of the at least one graph, the portion indicating a quantity corresponding to one or more suppliers or one or more materials associated with the selected portion of the at least one graph;

initiate presentation of a second graphical user interface identifying the one or more suppliers or the one or more materials associated with the selected portion of the at least one graph;

receive a second user input via the second graphical user interface, the second user input comprising a user modification to the one or more suppliers or the one or more materials associated with the selected portion of the at least one graph; and update the at least one visualization based on the second user input and initiate presentation of the at least one updated visualization to the one or more users.

9. The apparatus of claim 8, wherein, to determine the BOM characterization, the at least one processor is configured to group related materials contained in the at least one BOM based on a similarity of the materials or one or more user-defined criteria to identify the different groups of the materials.

10. The apparatus of claim 8, wherein, to determine the BOM characterization, the at least one processor is configured to:
identify an initial BOM characterization; and
using an optimization process, iteratively modify the initial BOM characterization in order to satisfy one or more criteria and generate the determined BOM characterization.

11. The apparatus of claim 8, wherein, to determine the BOM characterization, the at least one processor is configured to:
automatically determine whether one or more potential BOM characterizations that satisfy one or more criteria are identified;
if a single potential BOM characterization that satisfies the one or more criteria is identified, use the single potential BOM characterization as the determined BOM characterization;
if multiple potential BOM characterizations that satisfy the one or more criteria are identified, select one of the multiple potential BOM characterizations as the determined BOM characterization automatically or based on user input; and
if no potential BOM characterizations that satisfy the one or more criteria are identified, select an imperfect BOM characterization as the determined BOM characterization automatically or based on user input.

12. The apparatus of claim 8, wherein, to determine the BOM characterization, the at least one processor is configured to:
identify a potential BOM characterization that satisfies some but not all user-defined or other criteria using an optimization process; and
prompt a user to: (i) accept the potential BOM characterization as the determined BOM characterization, (ii) request that the optimization process be repeated, or (iii) perform one or more manipulations manually to the potential BOM characterization in order to generate the determined BOM characterization.

13. The apparatus of claim 8, wherein the at least one graph identifies different diversity-related classifications of the suppliers and percentages of overall monetary value associated with the different diversity-related classifications of the suppliers.

14. The apparatus of claim 8, wherein the at least one visualization further comprises at least one table displayed adjacent to the at least one graph.

15. A non-transitory computer readable medium containing instructions that when executed cause at least one processor to:
train at least one machine learning model using a plurality of previous requests for proposal, quote, bid, or information (RFXs), the at least one machine learning model comprising at least one natural language algorithm;
receive, using a first graphical user interface, at least one uploaded spreadsheet file containing at least one bill of materials (BOM) to be used in an RFX;
identify multiple materials contained in the at least one BOM;
apply the at least one machine learning model to group the multiple materials into different groups of materials;
apply the at least one machine learning model to associate different groups of suppliers with the different groups of the materials;
determine a BOM characterization that identifies multiple bid groups associated with the different groups of the materials from the at least one BOM to be potentially sourced from the different groups of suppliers;
initiate presentation of at least one visualization to one or more users, the at least one visualization based on how the different groups of the materials are to be potentially sourced from the different groups of the suppliers according to the determined BOM characterization, the at least one visualization comprising at least one graph;
receive a first user input associated with the at least one visualization via an application programming interface (API) gateway and at least one API, the first user input comprising a user selection of a portion of the at least one graph, the portion indicating a quantity corresponding to one or more suppliers or one or more materials associated with the selected portion of the at least one graph;
initiate presentation of a second graphical user interface identifying the one or more suppliers or the one or more materials associated with the selected portion of the at least one graph;
receive a second user input via the second graphical user interface, the second user input comprising a user modification to the one or more suppliers or the one or more materials associated with the selected portion of the at least one graph; and update the at least one visualization based on the second user input and initiate presentation of the at least one updated visualization to the one or more users.

16. The non-transitory computer readable medium of claim 15, wherein the instructions that when executed cause the at least one processor to determine the BOM characterization comprise:

instructions that when executed cause the at least one processor to group related materials contained in the at least one BOM based on a similarity of the materials or one or more user-defined criteria to identify the different groups of the materials.

17. The non-transitory computer readable medium of claim 15, wherein the instructions that when executed cause the at least one processor to determine the BOM characterization comprise:

instructions that when executed cause the at least one processor to:
identify an initial BOM characterization; and
using an optimization process, iteratively modify the initial BOM characterization in order to satisfy one or more criteria and generate the determined BOM characterization.

18. The non-transitory computer readable medium of claim 15, wherein the instructions that when executed cause the at least one processor to determine the BOM characterization comprise:

instructions that when executed cause the at least one processor to:
automatically determine whether one or more potential BOM characterizations that satisfy one or more criteria are identified;
if a single potential BOM characterization that satisfies the one or more criteria is identified, use the single potential BOM characterization as the determined BOM characterization;
if multiple potential BOM characterizations that satisfy the one or more criteria are identified, select one of the multiple potential BOM characterizations as the determined BOM characterization automatically or based on user input; and
if no potential BOM characterizations that satisfy the one or more criteria are identified, select an imperfect BOM characterization as the determined BOM characterization automatically or based on user input.

19. The non-transitory computer readable medium of claim 15, wherein the instructions that when executed cause the at least one processor to determine the BOM characterization comprise:

instructions that when executed cause the at least one processor to:
identify a potential BOM characterization that satisfies some but not all user-defined or other criteria using an optimization process; and
prompt a user to: (i) accept the potential BOM characterization as the determined BOM characterization, (ii) request that the optimization process be repeated, or (iii) perform one or more manipulations manually to the potential BOM characterization in order to generate the determined BOM characterization.

20. The non-transitory computer readable medium of claim 15, wherein the at least one graph identifies different diversity-related classifications of the suppliers and percentages of overall monetary value associated with the different diversity-related classifications of the suppliers.

* * * * *